(12) United States Patent
Holmgren et al.

(10) Patent No.: US 8,553,014 B2
(45) Date of Patent: Oct. 8, 2013

(54) OPTICAL TOUCH SCREEN SYSTEMS USING TOTAL INTERNAL REFLECTION

(71) Applicant: Neonode Inc., Santa Clara, CA (US)

(72) Inventors: Stefan Holmgren, Sollentuna (SE); Lars Sparf, Vällingby (SE); Remo Behdasht, New South Wales (AU); Thomas Eriksson, Stocksund (SE); Michael Lawrence Elyan, Drummoyne (AU); Joseph Shain, Rehovot (IL); Anders Jansson, Älta (SE); Robert Pettersson, Hägersten (SE); John Karlsson, Märsta (SE)

(73) Assignee: Neonode Inc., Santa Clara, CA (US)

( * ) Notice: Subject to any disclaimer, the term of this patent is extended or adjusted under 35 U.S.C. 154(b) by 0 days.

(21) Appl. No.: 13/764,812

(22) Filed: Feb. 12, 2013

(65) Prior Publication Data

US 2013/0155027 A1 Jun. 20, 2013

Related U.S. Application Data

(63) Continuation-in-part of application No. 13/424,592, filed on Mar. 20, 2012, now Pat. No. 8,416,217, and a continuation-in-part of application No. 13/424,543, filed on Mar. 20, 2012, which is a continuation-in-part of application No. PCT/US2011/029191, filed on Mar. 21, 2011, and a continuation-in-part of application No. 12/371,609, filed on Feb. 15, 2009, now Pat. No. 8,339,379, and a continuation-in-part of application No. 12/486,033, filed on Jun. 17, 2009, and a continuation-in-part of application No. 12/760,567, (Continued)

(51) Int. Cl.
*G06F 3/042* (2006.01)

(52) U.S. Cl.
USPC .................................. 345/176; 345/173

(58) Field of Classification Search
USPC .................. 345/173, 175, 176, 179, 183
See application file for complete search history.

(56) References Cited

U.S. PATENT DOCUMENTS 4,710,760 A 12/1987 Kasday
6,429,857 B1 * 8/2002 Masters et al. ............... 345/175

(Continued)

FOREIGN PATENT DOCUMENTS

WO 2005026938 A2 3/2005

OTHER PUBLICATIONS

Moeller, J. and Kerne, A., "Scanning FTIR: Unobstrusive Multi-Touch Sensing through Waveguide Transmissivity Imaging", TEI '10, Proceedings of the Fourth International Conference on Tangible, Embedded, and Embodied Interaction, ACM, New York, NY, Jan. 2010, pp. 73-76.

*Primary Examiner* — Duc Dinh
(74) *Attorney, Agent, or Firm* — Soquel Group LLC

(57) ABSTRACT

A touch screen, including a layer of light-transmissive material having an upper surface that is exposed for touch by one or more objects, a plurality of light emitters underneath the upper surface, a first lens assembly for directing light beams emitted by the light emitters into the layer at an angle such that the light beams, when entering the layer, remain confined to the layer by total internal reflection when the light beams are not absorbed by any of the objects touching the upper surface, a plurality of light detectors for detecting light beams and for generating outputs indicating the amounts of light detected, a second lens assembly for directing light beams at a surface of the layer towards the light detectors, and a calculating unit for determining respective one or more locations of the one or more objects touching the upper surface, based on outputs of the light detectors.

20 Claims, 174 Drawing Sheets

Related U.S. Application Data filed on Apr. 15, 2010, and a continuation of application No. 12/760,568, filed on Apr. 15, 2010.

(60) Provisional application No. 61/609,325, filed on Mar. 11, 2012, provisional application No. 61/564,868, filed on Nov. 30, 2011, provisional application No. 61/564,164, filed on Nov. 28, 2011, provisional application No. 61/379,012, filed on Sep. 1, 2010, provisional application No. 61/380,600, filed on Sep. 7, 2010, provisional application No. 61/410,930, filed on Nov. 7, 2010, provisional application No. 61/132,469, filed on Jun. 19, 2008, provisional application No. 61/169,779, filed on Apr. 16, 2009.

(56) References Cited

U.S. PATENT DOCUMENTS

| | | |
|---|---|---|
| 7,435,940 B2 | 10/2008 | Eliasson et al. |
| 7,442,914 B2 | 10/2008 | Eliasson et al. |
| 7,465,914 B2 | 12/2008 | Eliasson et al. |
| 7,705,835 B2 | 4/2010 | Eikman |
| 2005/0128190 A1* | 6/2005 | Ryynanen ............... 345/173 |
| 2006/0001653 A1* | 1/2006 | Smits ..................... 345/176 |
| 2008/0074402 A1* | 3/2008 | Cornish et al. ......... 345/176 |
| 2010/0193259 A1 | 8/2010 | Wassvik |
| 2011/0074736 A1 | 3/2011 | Takakura |

* cited by examiner (a)

(b)

OPTICAL TOUCH SCREEN SYSTEMS USING TOTAL INTERNAL REFLECTION

CROSS REFERENCES TO RELATED APPLICATIONS

This application claims priority benefit of U.S. Provisional Patent Application Ser. No. 61/609,325, entitled RESILIENT LIGHT-BASED TOUCH SURFACE, filed on Mar. 11, 2012 by inventors Thomas Eriksson and Michael Elyan, the contents of which are hereby incorporated herein in their entirety.

This application is a continuation-in-part of U.S. application Ser. No. 13/424,592, entitled LIGHT-BASED FINGER GESTURE USER INTERFACE, filed on Mar. 20, 2012 by inventors Thomas Eriksson, Per Leine, Jochen Laveno Mangelsdorff, Robert Pettersson and Anders Jansson, the contents of which are hereby incorporated herein in their entirety.

This application is a continuation-in-part of U.S. application Ser. No. 13/424,543, entitled OPTICAL ELEMENTS WITH ALTERNATING REFLECTIVE LENS FACETS, filed on Mar. 20, 2012 by inventors Stefan Holmgren, Lars Sparf, Magnus Goertz, Thomas Eriksson, Joseph Shain, Anders Jansson, Niklas Kvist, Robert Pettersson and John Karlsson, the contents of which are hereby incorporated herein in their entirety.

U.S. application Ser. No. 13/424,592 claims priority benefit of U.S. Provisional Application Ser. No. 61/564,868, entitled LIGHT-BASED FINGER GESTURE USER INTERFACE, filed on Nov. 30, 2011 by inventors Thomas Eriksson, Per Leine, Jochen Laveno Mangelsdorff, Robert Pettersson and Anders Jansson, the contents of which are hereby incorporated herein in their entirety.

U.S. application Ser. No. 13/424,543 claims priority benefit of U.S. Provisional Application Ser. No. 61/564,164, entitled OPTICAL ELEMENTS WITH ALTERNATIVE REFLECTIVE LENS FACETS, filed on Nov. 28, 2011 by inventors Stefan Holmgren, Lars Sparf, Thomas Eriksson, Joseph Shain, Anders Jansson, Niklas Kvist, Robert Pettersson and John Karlsson, the contents of which are hereby incorporated herein in their entirety.

U.S. application Ser. No. 13/424,543 claims priority benefit of PCT Application No. PCT/US11/29191, entitled LENS ARRANGEMENT FOR LIGHT-BASED TOUCH SCREEN, filed on Mar. 21, 2011 by inventors Magnus Goertz, Thomas Eriksson, Joseph Shain, Anders Jansson, Niklas Kvist, Robert Pettersson, Lars Sparf and John Karlsson, the contents of which are hereby incorporated herein in their entirety.

U.S. application Ser. No. 13/424,543 is a continuation-in-part of U.S. application Ser. No. 12/371,609, now U.S. Pat. No. 8,339,379, entitled LIGHT-BASED TOUCH SCREEN, filed on Feb. 15, 2009 by inventors Magnus Goertz, Thomas Eriksson and Joseph Shain, the contents of which are hereby incorporated herein in their entirety.

U.S. application Ser. No. 13/424,543 is a continuation-in-part of U.S. application Ser. No. 12/486,033, entitled USER INTERFACE FOR MOBILE COMPUTER UNIT, filed on Jun. 17, 2009 by inventors Magnus Goertz and Joseph Shain, the contents of which are hereby incorporated herein in their entirety.

U.S. application Ser. No. 13/424,543 is a continuation-in-part of U.S. application Ser. No. 12/760,567, entitled OPTICAL TOUCH SCREEN SYSTEMS USING REFLECTED LIGHT, filed on Apr. 15, 2010 by inventors Magnus Goertz, Thomas Eriksson and Joseph Shain, the contents of which are hereby incorporated herein in their entirety.

U.S. application Ser. No. 13/424,543 is a continuation-in-part of U.S. application Ser. No. 12/760,568, entitled OPTICAL TOUCH SCREEN SYSTEMS USING WIDE LIGHT BEAMS, filed on Apr. 15, 2010 by inventors Magnus Goertz, Thomas Eriksson and Joseph Shain, the contents of which are hereby incorporated herein in their entirety.

PCT Application No. PCT/US11/29191 claims priority benefit of U.S. Provisional Application Ser. No. 61/379,012, entitled OPTICAL TOUCH SCREEN SYSTEMS USING REFLECTED LIGHT, filed on Sep. 1, 2010 by inventors Magnus Goertz, Thomas Eriksson, Joseph Shain, Anders Jansson, Niklas Kvist and Robert Pettersson, the contents of which are hereby incorporated herein in their entirety.

PCT Application No. PCT/US11/29191 claims priority benefit of U.S. Provisional Application Ser. No. 61/380,600, entitled OPTICAL TOUCH SCREEN SYSTEMS USING REFLECTED LIGHT, filed on Sep. 7, 2010 by inventors Magnus Goertz, Thomas Eriksson, Joseph Shain, Anders Jansson, Niklas Kvist and Robert Pettersson, the contents of which are hereby incorporated herein in their entirety.

PCT Application No. PCT/US11/29191 claims priority benefit of U.S. Provisional Application Ser. No. 61/410,930, entitled OPTICAL TOUCH SCREEN SYSTEMS USING REFLECTED LIGHT, filed on Nov. 7, 2010 by inventors Magnus Goertz, Thomas Eriksson, Joseph Shain, Anders Jansson, Niklas Kvist, Robert Pettersson and Lars Sparf, the contents of which are hereby incorporated herein in their entirety.

U.S. application Ser. No. 12/486,033 claims priority benefit of U.S. Provisional Application Ser. No. 61/132,469, entitled IMPROVED KEYPAD FOR CHINESE CHARACTERS, filed on Jun. 19, 2008 by inventors Magnus Goertz, Robert Pettersson, Staffan Gustafsson and Johann Gerell, the contents of which are hereby incorporated herein in their entirety.

U.S. application Ser. No. 12/760,567 claims priority benefit of U.S. Provisional Application Ser. No. 61/169,779, entitled OPTICAL TOUCH SCREEN, filed on Apr. 16, 2009 by inventors Magnus Goertz, Thomas Eriksson and Joseph Shain, the contents of which are hereby incorporated herein in their entirety.

FIELD OF THE INVENTION

The field of the present invention is light-based touch screens.

BACKGROUND OF THE INVENTION

Many consumer electronic devices are now being built with touch sensitive screens, for use with finger or stylus touch user inputs. These devices range from small screen devices such as mobile phones and car entertainment systems, to mid-size screen devices such as notebook computers, to large screen devices such as check-in stations at airports.

Most conventional touch screen systems are based on resistive or capacitive layers. Such systems are not versatile enough to offer an all-encompassing solution, as they are not easily scalable.

Reference is made to FIG. 1, which is a prior art illustration of a conventional touch screen system. Such systems include an LCD display surface 606, a resistive or capacitive overlay 801 that is placed over the LCD surface, and a controller integrated circuit (IC) 701 that connects to the overlay and converts inputs from the overlay to meaningful signals. A host device (not shown), such as a computer, receives the signals from controller IC 701, and a device driver or such other program interprets the signals to detect a touch-based input such as a key press or scroll movement.

Reference is made to FIG. 2, which is a prior art illustration of a conventional resistive touch screen. Shown in FIG. 2 are conductive and resistive layers 802 separated by thin spaces. A PET film 803 overlays a top circuit layer 804, which overlays a conductive coating 806. Similarly, a conductive coating 807 with spacer dots 808 overlays a bottom circuit layer 805, which overlays a glass layer 607. When a pointer 900, such as a finger or a stylus, touches the screen, a contact is created between resistive layers, closing a switch. A controller 701 determines the current between layers to derive the position of the touch point.

Advantages of resistive touch screens are their low cost, low power consumption and stylus support.

A disadvantage of resistive touch screens is that as a result of the overlay, the screens are not fully transparent. Another disadvantage is that pressure is required for touch detection; i.e., a pointer that touches the screen without sufficient pressure goes undetected. As a consequence, resistive touch screens do not detect finger touches well. Another disadvantage is that resistive touch screens are generally unreadable in direct sunlight. Another disadvantage is that resistive touch screens are sensitive to scratches. Yet another disadvantage is that resistive touch screens are unable to discern that two or more pointers are touching the screen simultaneously, referred to as "multi-touch".

Reference is made to FIG. 3, which is a prior art illustration of a conventional surface capacitive touch screen. Shown in FIG. 3 is a touch surface 809 overlaying a coated glass substrate 810. Two sides of a glass 811 are coated with a uniform conductive indium in oxide (ITO) coating 812. In addition, a silicon dioxide hard coating 813 is coated on the front side of one of the ITO coating layers 812. Electrodes 814 are attached at the four corners of the glass, for generating an electric current. A pointer 900, such as a finger or a stylus, touches the screen, and draws a small amount of current to the point of contact. A controller 701 then determines the location of the touch point based on the proportions of current passing through the four electrodes.

Advantages of surface capacitive touch screens are finger touch support and a durable surface.

A disadvantage of surface capacitive touch screens is that as a result of the overlay, the screens are not fully transparent. Another disadvantage is a limited temperature range for operation. Another disadvantage is a limited capture speed of pointer movements, due to the capacitive nature of the touch screens. Another disadvantage is that surface capacitive touch screens are susceptible to radio frequency (RF) interference and electromagnetic (EM) interference. Another disadvantage is that the accuracy of touch location determination depends on the capacitance. Another disadvantage is that surface capacitive touch screens cannot be used with gloves. Another disadvantage is that surface capacitive touch screens require a large screen border. As a consequence, surface capacitive touch screens cannot be used with small screen devices. Yet another disadvantage is that surface capacitive touch screens are unable to discern a mufti-touch.

Reference is made to FIG. 4, which is a prior art illustration of a conventional projected capacitive touch screen. Shown in FIG. 4 are etched ITO layers 815 that form multiple horizontal (x-axis) and vertical (y-axis) electrodes. Etched layers 815 include outer hard coat layers 816 and 817, an x-axis electrode pattern 818, a y-axis electrode pattern 819, and an ITO glass 820 in the middle. AC signals 702 drive the electrodes on one axis, and the response through the screen loops back via the electrodes on the other axis. Location of a pointer 900 touching the screen is determined based on the signal level changes 703 between the horizontal and vertical electrodes.

Advantages of projective capacitive touch screens are finger mufti-touch detection and a durable surface.

A disadvantage of projected capacitive touch screens is that as a result of the overlay, the screens are not fully transparent. Another disadvantage is their high cost. Another disadvantage is a limited temperature range for operation. Another disadvantage is a limited capture speed, due to the capacitive nature of the touch screens. Another disadvantage is a limited screen size, typically less than 5". Another disadvantage is that surface capacitive touch screens are susceptible to RF interference and EM interference. Yet another disadvantage is that the accuracy of touch location determination depends on the capacitance.

Conventional optical touch screens project light beams from one edge of the screen, over and across the screen surface to where photo detectors detect the uninterrupted beams. Touches are detected when an object placed on the screen blocks one or more of the projected light beams, and some of the photo detectors do not detect the expected light.

A disadvantage of conventional optical touch screens is that they require a raised bezel around the screen in order to project the light beams across the screen. This requirement is incompatible with some product designs that require a completely flat upper surface with the edges of the device being flush with the screen surface.

Another disadvantage of conventional optical touch screens is an artifact known as "ghosting". Ghosting is manifested when a pointer such as a finger completely blocks a light beam, and a second pointer situated inside the shadow of the blocked beam goes undetected, since the second pointer does not affect the amount of light that reaches the detector.

It would thus be beneficial to provide touch screens that overcome the disadvantages of conventional resistive and capacitive touch screens described above, while enabling flush device designs and detecting multiple objects in a single beam's path.

SUMMARY OF THE DESCRIPTION

Aspects of the present invention provide light-based touch screens with light beams directed over and across a display though a solid or liquid layer covering the display, for which locations of two or more pointers touching the screen simultaneously may be unambiguously inferred.

There is thus provided in accordance with an embodiment of the present invention a touch screen for a computing device, including a housing, a layer of light-transmissive material mounted in the housing, including an upper surface that is exposed to be touched by one or more objects from outside of the housing, a plurality of light emitters mounted in the housing underneath the upper surface, for emitting light beams, a first lens assembly for directing the light beams emitted by the light emitters into the layer at an angle such that the light beams, when entering the layer, remain confined to the layer by total internal reflection at the upper and lower surfaces of the layer when the light beams are not absorbed by any of the objects touching the upper surface, a plurality of light detectors mounted in the housing underneath the upper surface, for detecting light beams and for generating outputs indicating the amounts of light detected, a second lens assembly for directing light beams at a surface of the layer towards one or more of the light detectors, and a calculating unit, mounted in the housing and connected to the light receivers, for determining respective one or more locations of the one or more objects touching the upper surface, based on outputs of the light detectors, wherein light beams in the layer are partially absorbed at the upper surface when they come into contact with any of the objects.

There is additionally provided in accordance with an embodiment of the present invention a touch screen for a computing device, including a housing, a layer of light-transmissive material mounted in the housing, including an upper surface that is exposed for touch by one or more objects from outside of the housing, a plurality of light emitters mounted in the housing underneath the upper surface, for emitting light beams, a first lens assembly mounted in the housing for directing the light beams emitted by the light emitters into the layer at an angle such that the light beams, when entering the layer, remain confined to the layer by total internal reflection at the upper and lower surfaces of said layer, a plurality of light detectors mounted in the housing underneath the upper surface, for detecting light beams and for generating outputs indicating the amounts of light detected, a second lens assembly mounted in the housing for directing light beams at a surface of the layer towards one or more of the light detectors, and a calculating unit, mounted in the housing and connected to said light receivers, for determining respective one or more locations of the one or more objects touching the upper surface, based on outputs of the light detectors, wherein light beams in the layer are scattered back into the layer at the upper surface when they come into contact with any of the objects, so that the second lens assembly directs them to more of the light detectors than had they not been scattered.

BRIEF DESCRIPTION OF THE DRAWINGS

The present invention will be more fully understood and appreciated from the following detailed description, taken in conjunction with the drawings in which:

FIG. 140 is a simplified flowchart of a method for touch detection for a light-based touch screen, in accordance with an embodiment of the present invention;

FIGS. 141-143 are illustrations of a rotation gesture, whereby a user places two fingers on the screen and rotates them around an axis;

FIGS. 144-147 are illustrations of touch events at various locations on a touch screen, in accordance with an embodiment of the present invention;

FIGS. 148-151 are respective bar charts of light saturation during the touch events illustrated in FIGS. 144-147, in accordance with an embodiment of the present invention;

FIG. 152 is a simplified flowchart of a method for determining the locations of simultaneous, diagonally opposed touches, in accordance with an embodiment of the present invention;

FIG. 153 is a simplified flowchart of a method for discriminating between clockwise and counter-clockwise gestures, in accordance with an embodiment of the present invention;

FIG. 154 is a simplified flowchart of a method of calibration and touch detection for a light-based touch screen, in accordance with an embodiment of the present invention;

FIG. 155 is a picture showing the difference between signals generated by a touch, and signals generated by a mechanical effect, in accordance with an embodiment of the present invention;

FIG. 156 is a simplified diagram of a control circuit for setting pulse strength when calibrating a light-based touch screen, in accordance with an embodiment of the present invention;

FIG. 157 is a plot of calibration pulses for pulse strengths ranging from a minimum current to a maximum current, for calibrating a light-based touch screen in accordance with an embodiment of the present invention;

FIG. 158 is a simplified pulse diagram and a corresponding output signal graph, for calibrating a light-based touch screen, in accordance with an embodiment of the present invention;

FIG. 159 is an illustration showing how a capillary effect is used to increase accuracy of positioning a component, such as an emitter or a receiver, on a printed circuit board, in accordance with an embodiment of the present invention;

Figure 159:
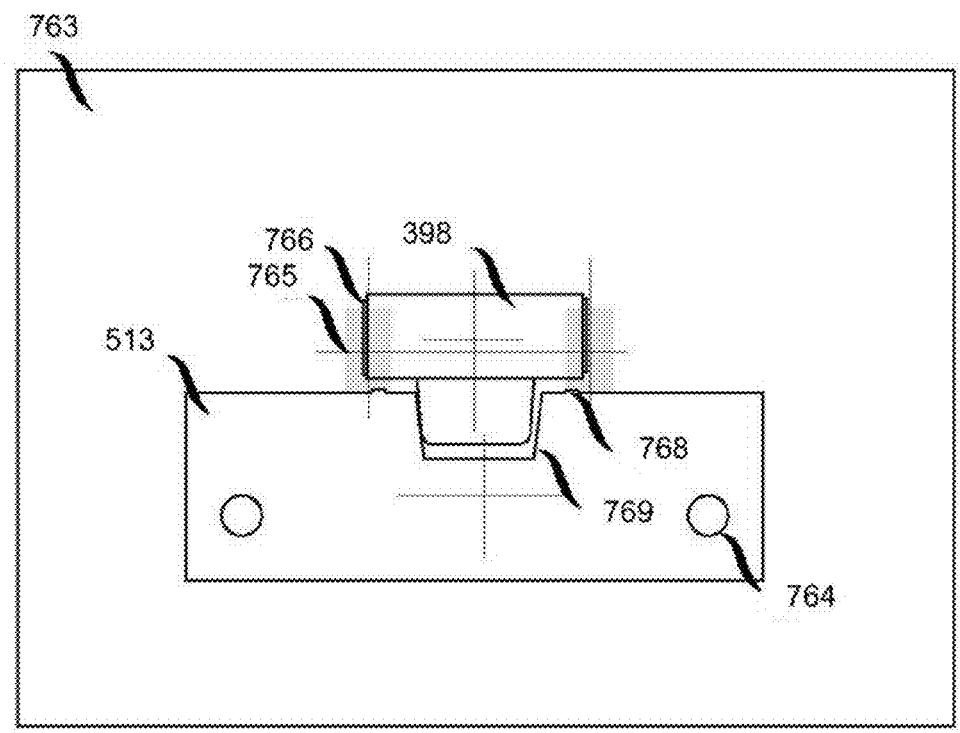
Figure 160:
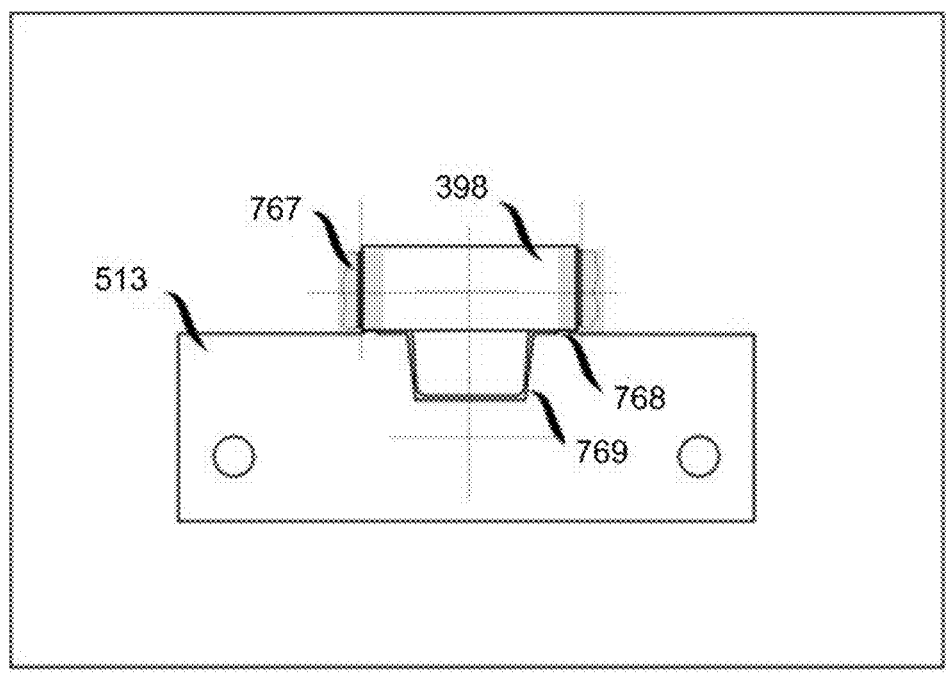
Figure 161:
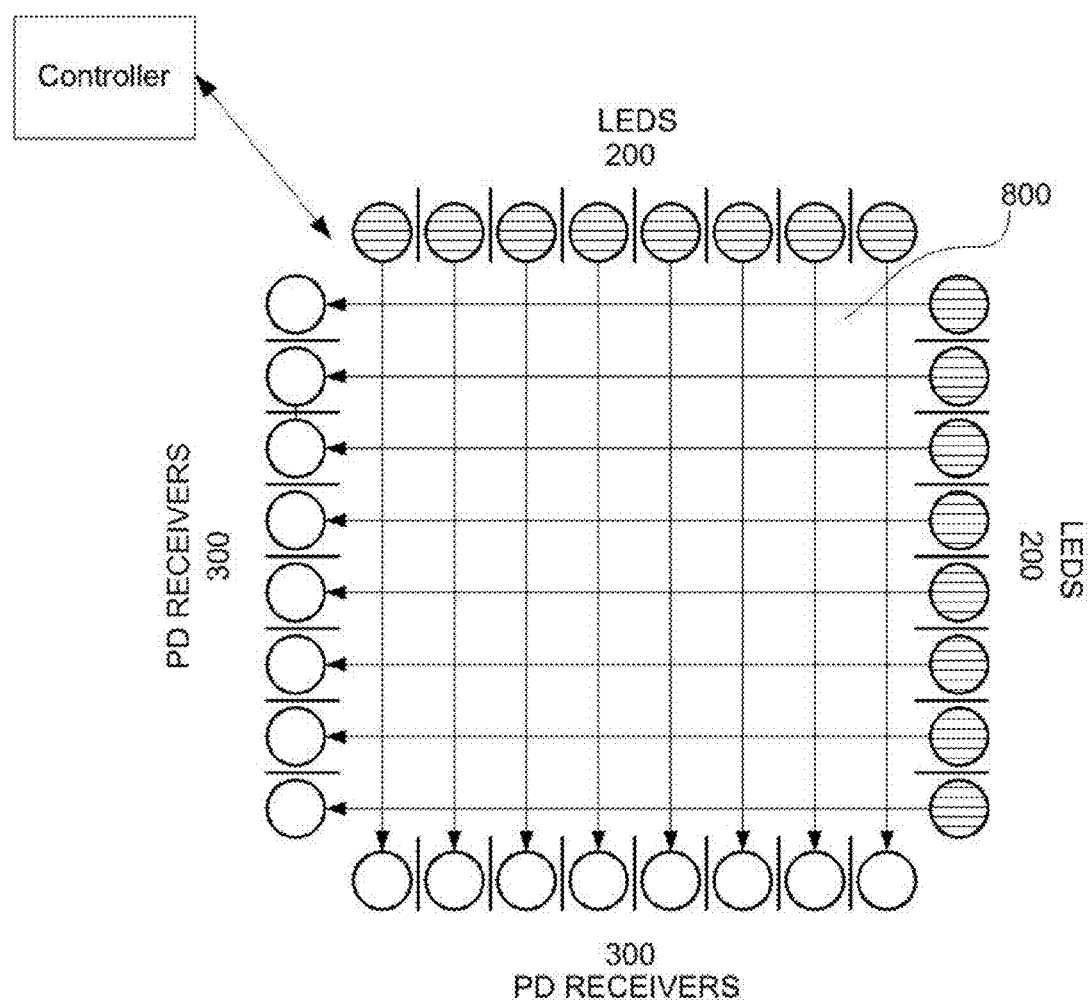
Figure 162:
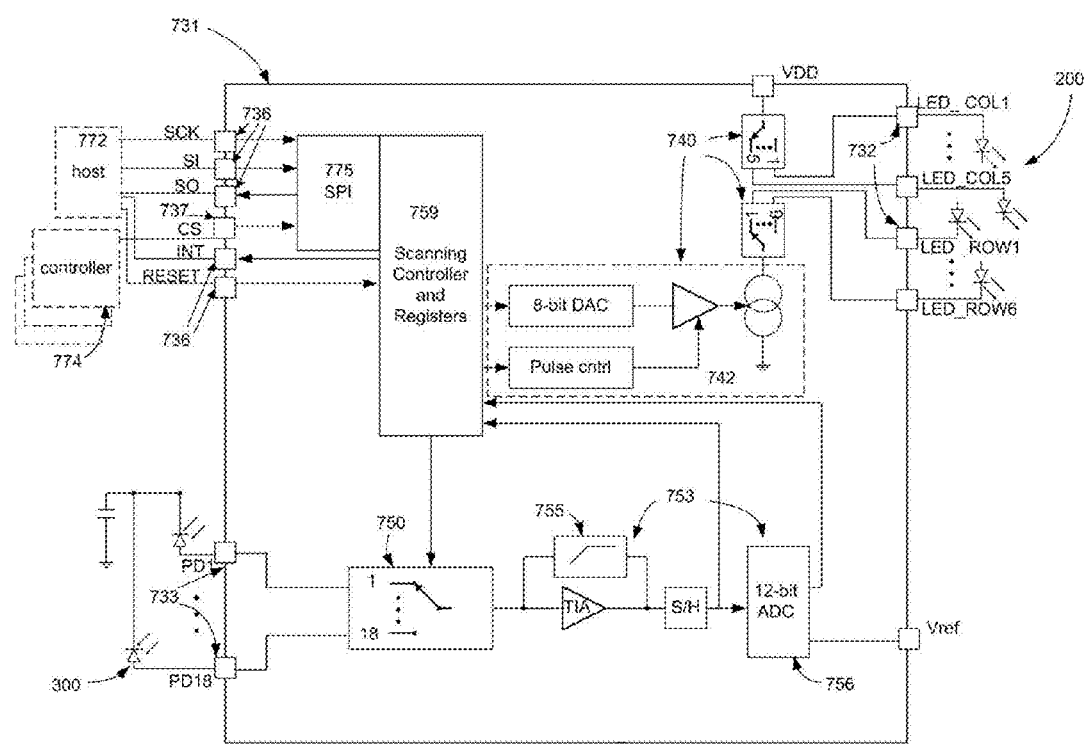
Figure 163:
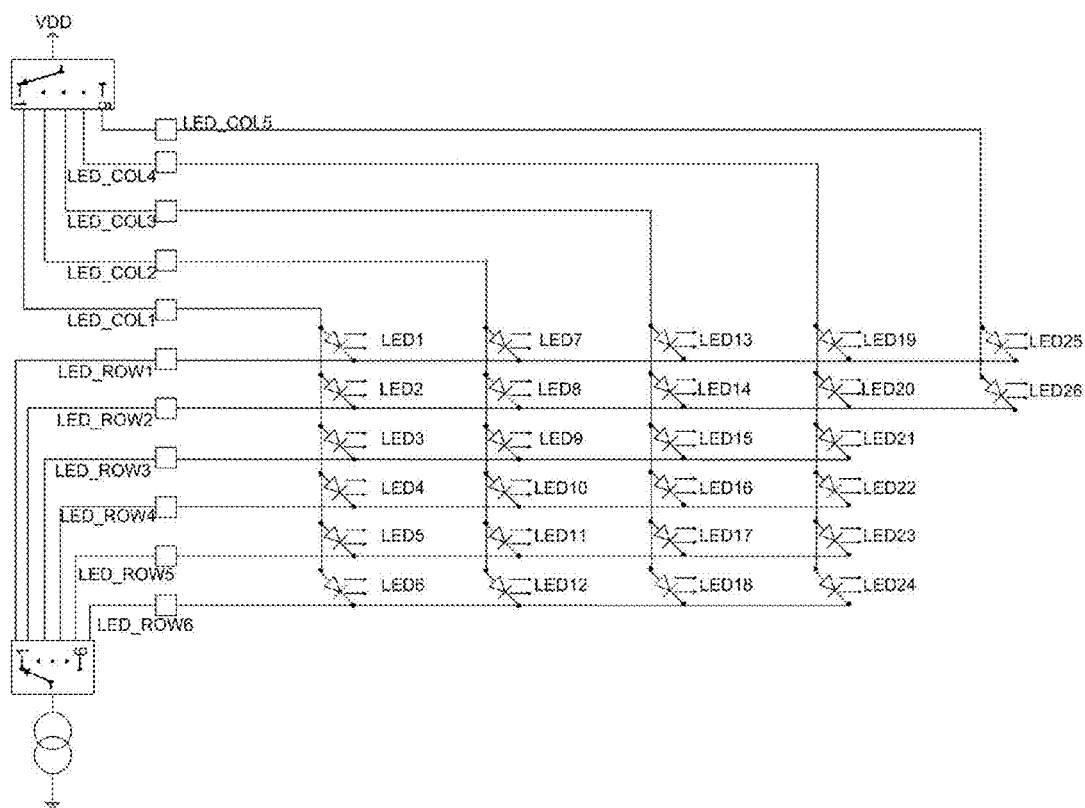
Figure 164:
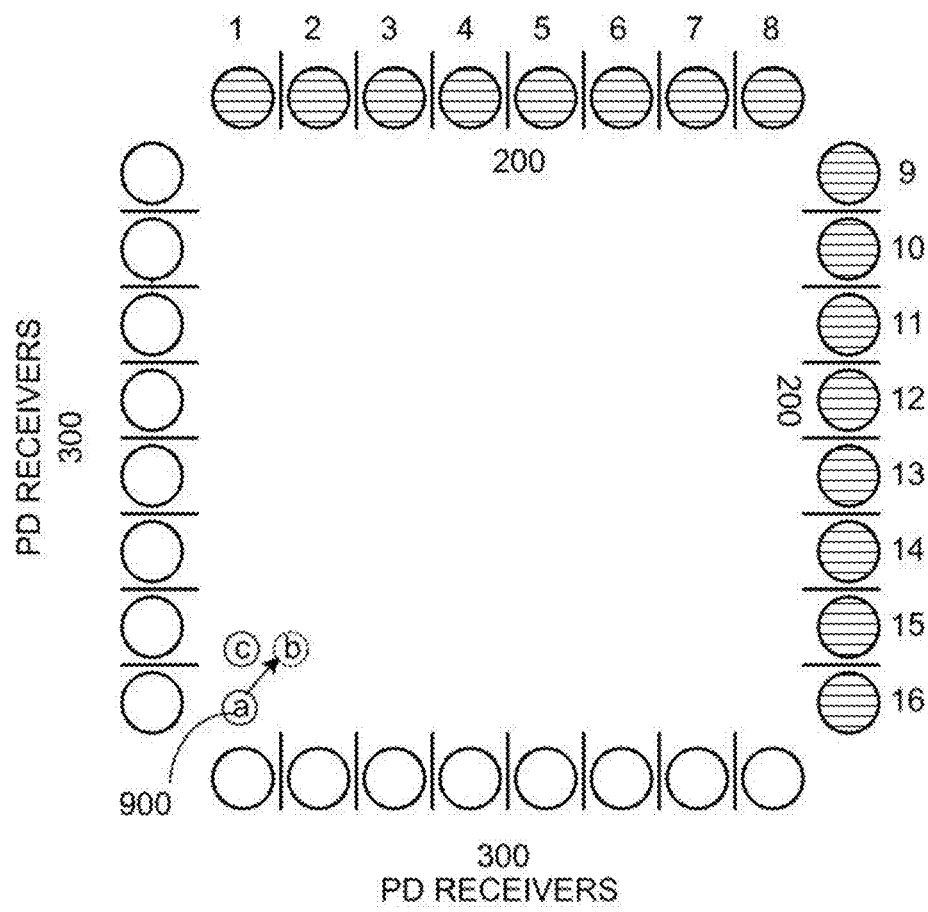
Figure 165:
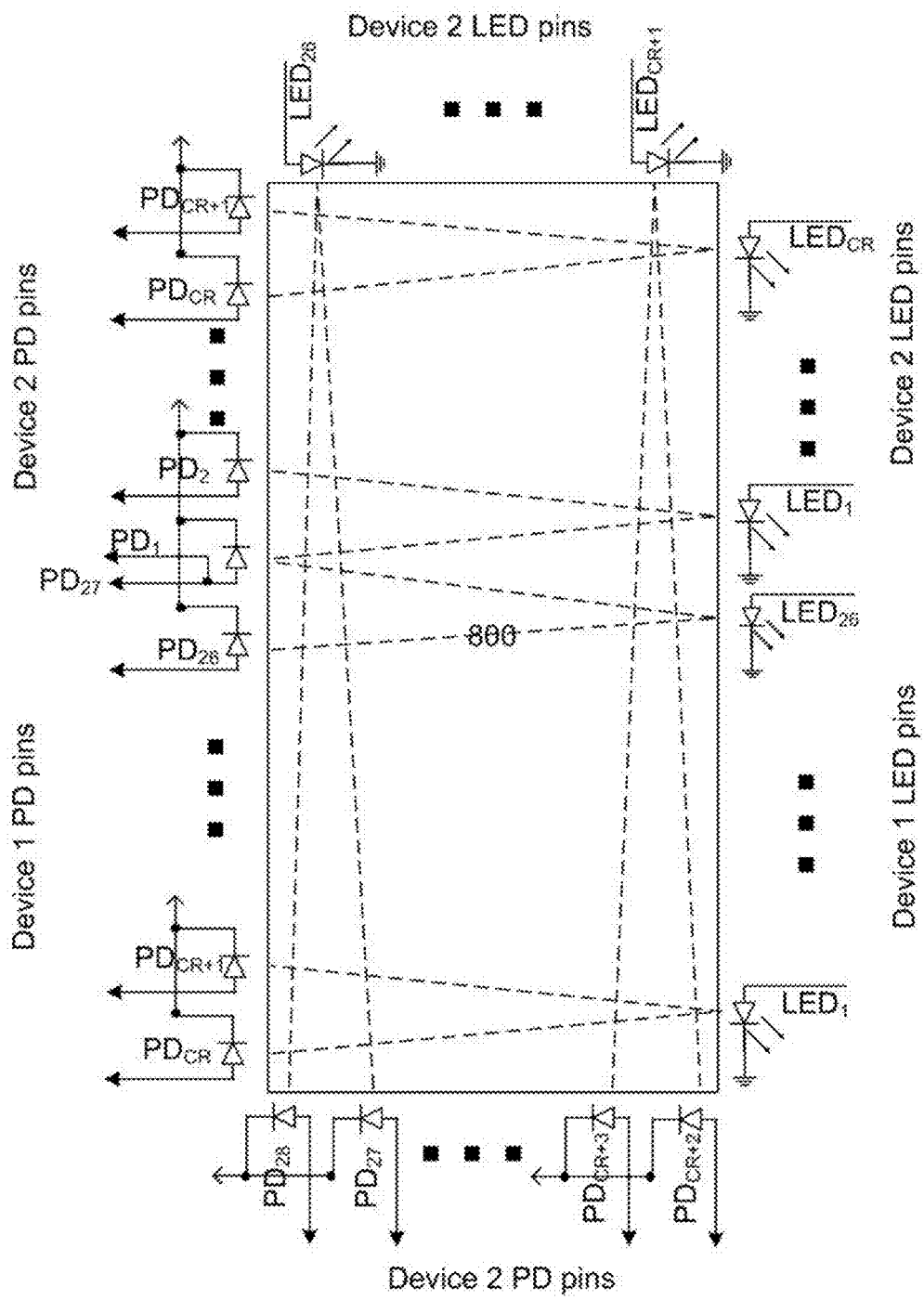
Figure 166:
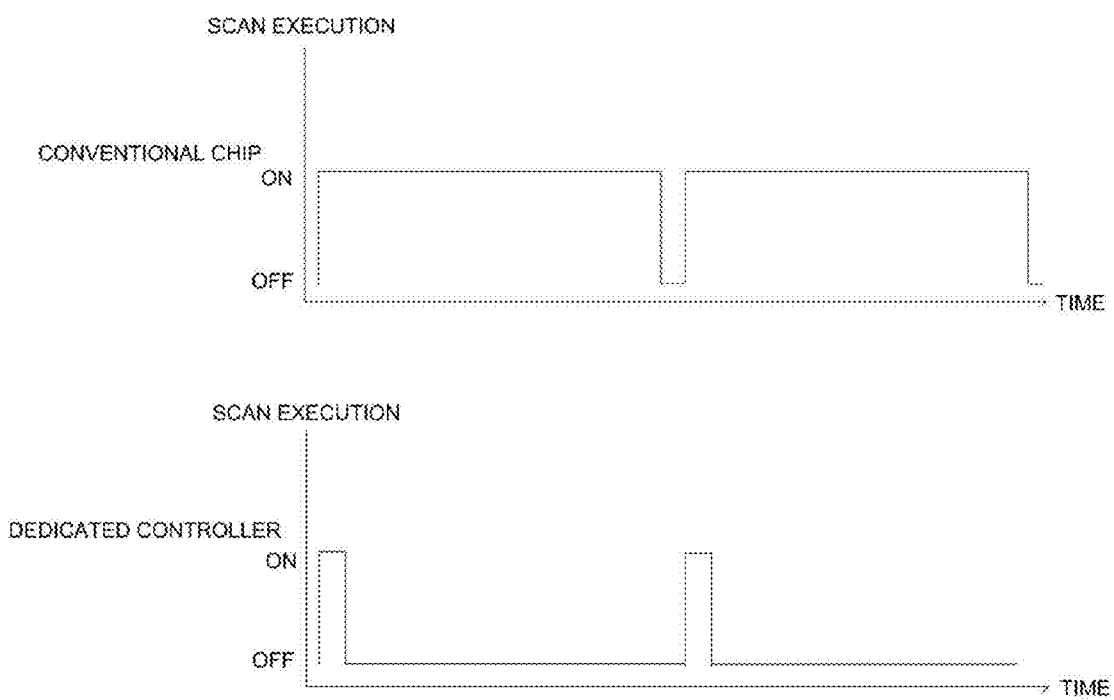
Figure 167:
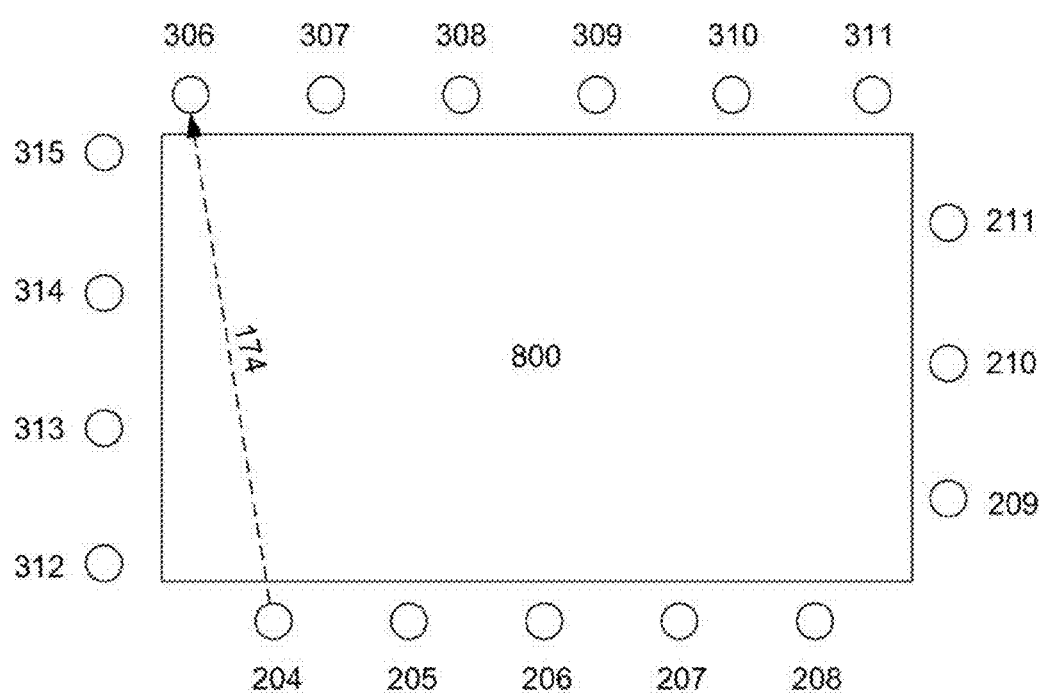
Figure 168:
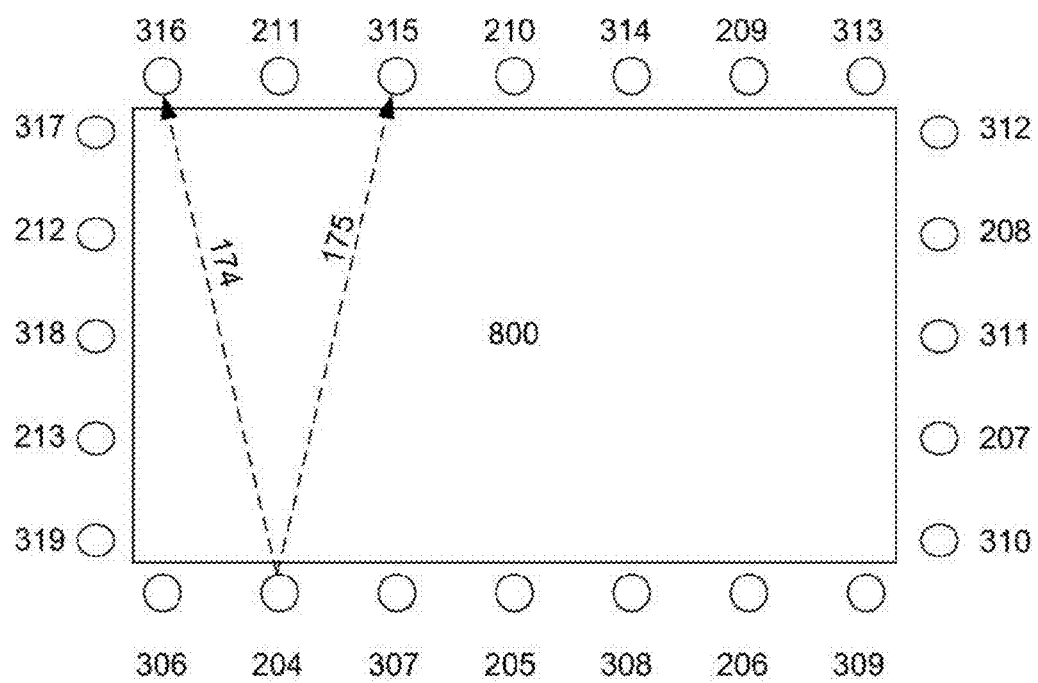
Figure 169:
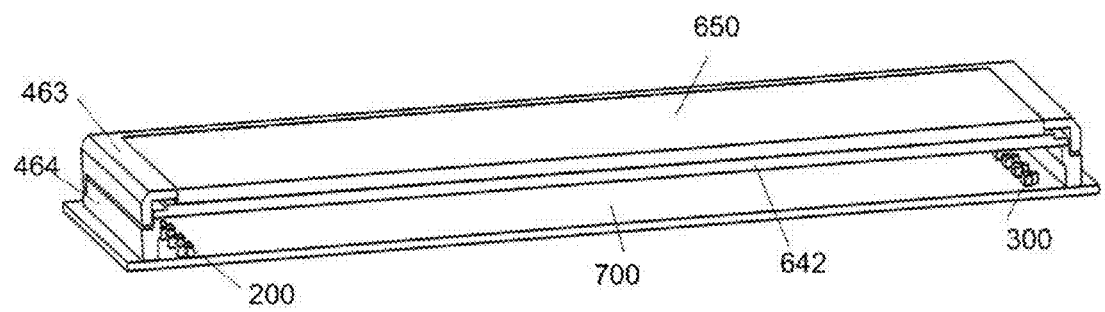
Figure 170:
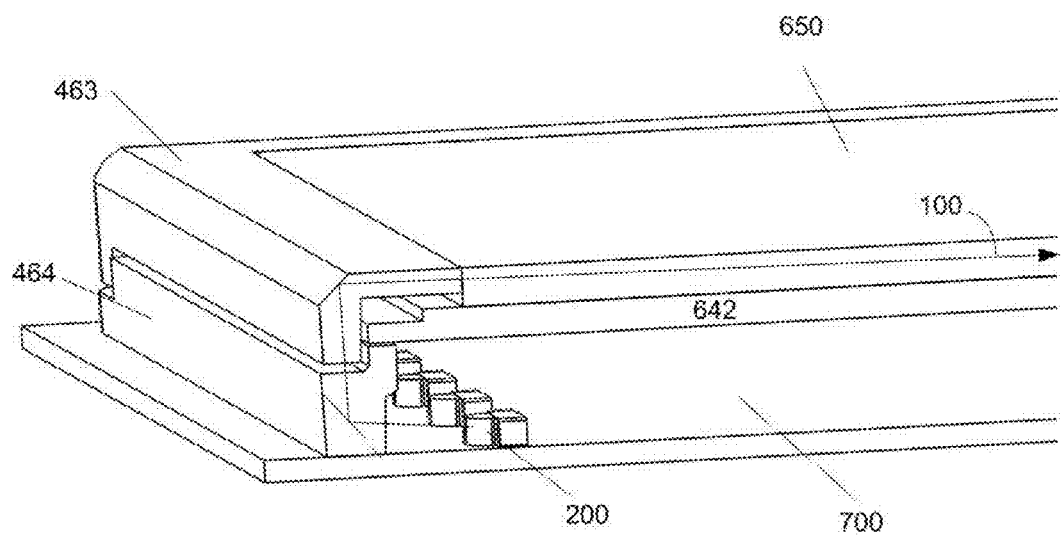
Figure 171:
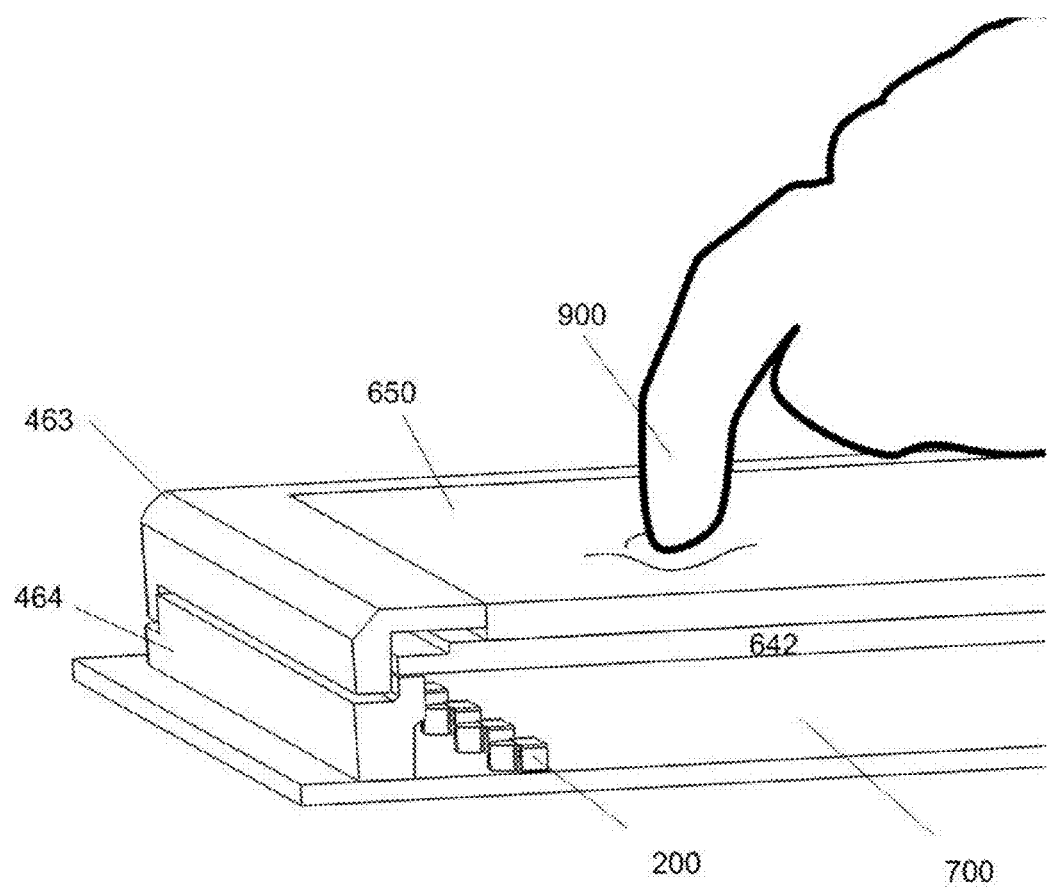
Figure 172:
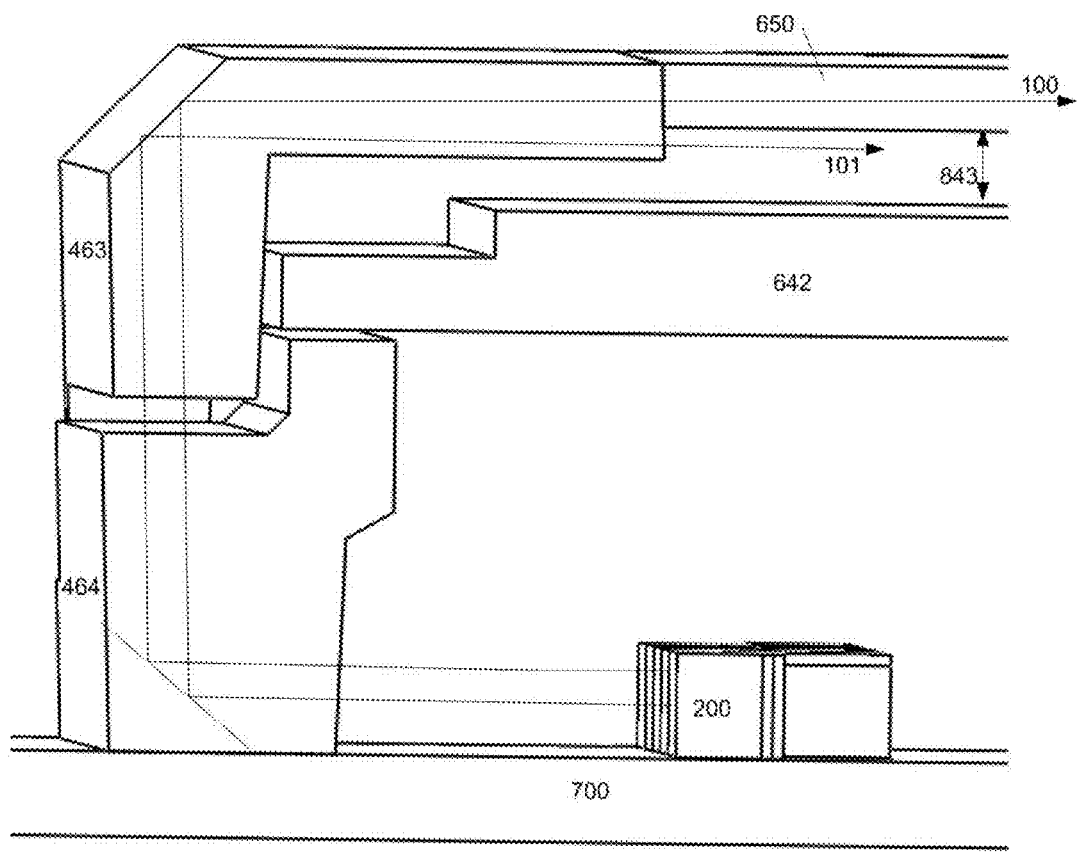
Figure 173:
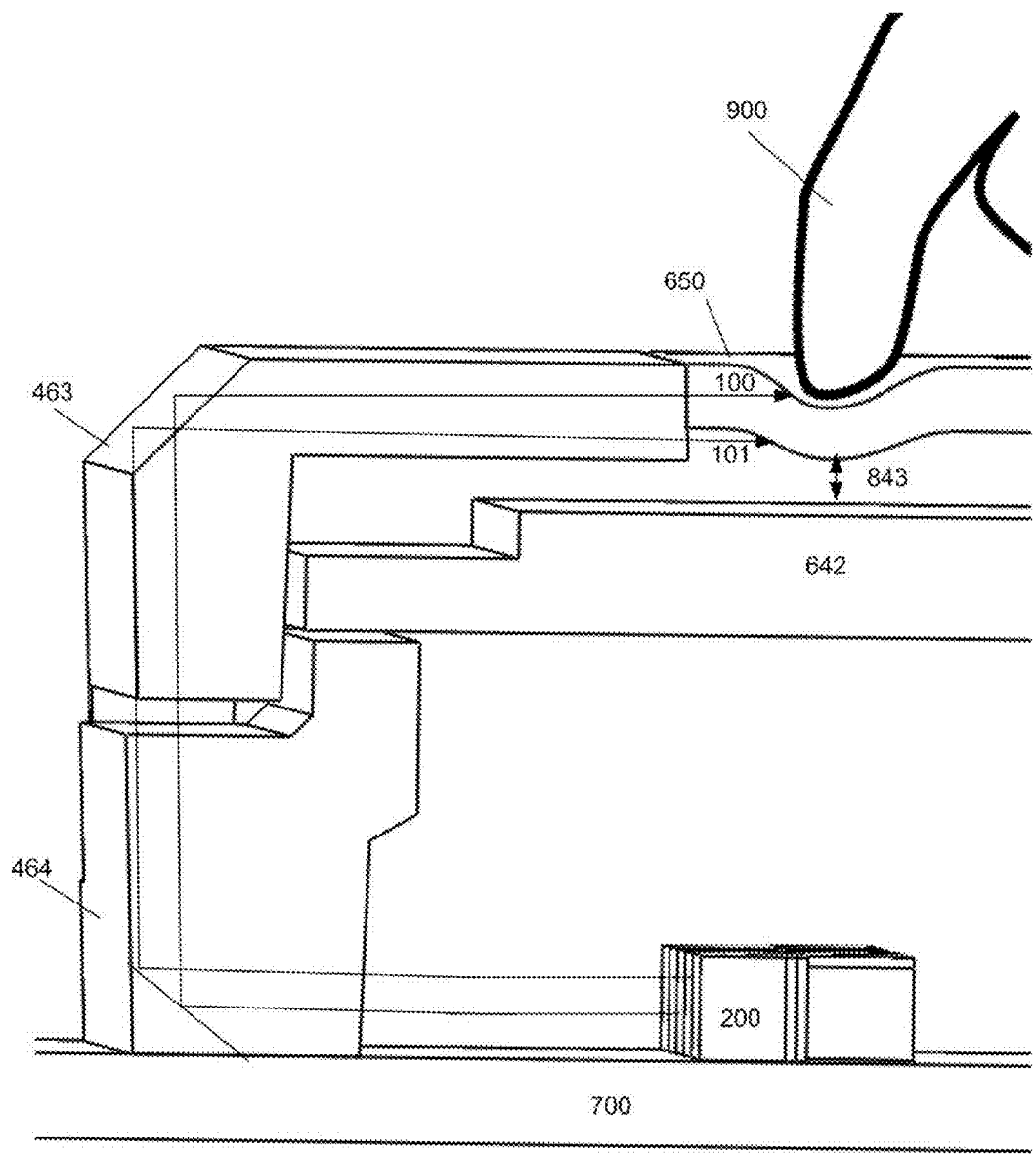
Figure 174:
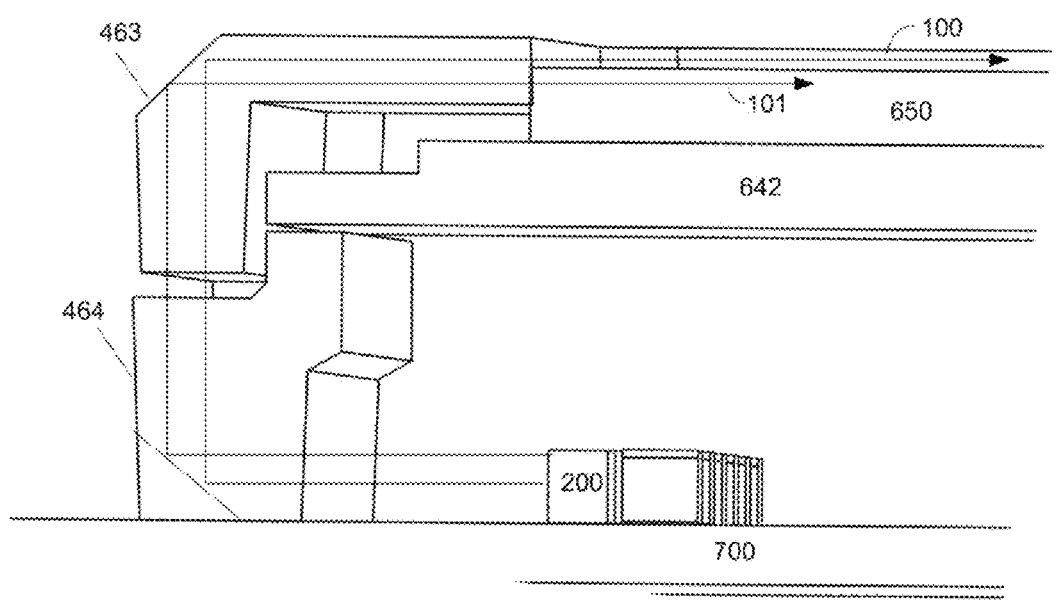

FIG. 160 is an illustration showing the printed circuit board of FIG. 159, after having passed through a heat oven, in accordance with an embodiment of the present invention;

FIG. 161 is a simplified illustration of a light-based touch screen and an ASIC controller therefor, in accordance with an embodiment of the present invention;

FIG. 162 is a circuit diagram of a chip package for a controller of a light-based touch screen, in accordance with an embodiment of the present invention;

FIG. 163 is a circuit diagram for six rows of photo emitters with 4 or 5 photo emitters in each row, for connection to the chip package of FIG. 162, in accordance with an embodiment of the present invention;

FIG. 164 is a simplified illustration of a touch screen surrounded by emitters and receivers, in accordance with an embodiment of the present invention;

FIG. 165 is a simplified application diagram illustrating a touch screen configured with two controllers, in accordance with an embodiment of the present invention;

FIG. 166 is a graph comparing scan sequence performance using a conventional chip vs. a dedicated controller of the present invention;

FIG. 167 is a simplified illustration of a touch screen having a shift-aligned arrangement of emitters and receivers, in accordance with an embodiment of the present invention;

FIG. 168 is a simplified diagram of a touch screen having alternating emitters and receivers along each screen edge, in accordance with an embodiment of the present invention;

FIG. 169 is a simplified illustration of a touch surface with a flexible compressible layer on top of the surface, in accordance with an embodiment of the present invention;

FIG. 170 is a magnified view of the touch surface of FIG. 169, in accordance with an embodiment of the present invention;

FIG. 171 is a simplified illustration of an object pressing down on the flexible compressible layer of the touch surface of FIG. 169, and creating an impression thereon, in accordance with an embodiment of the present invention;

FIG. 172 is a simplified illustration of an alternative touch surface with a flexible compressible layer on top of the surface, in accordance with an embodiment of the present invention;

FIG. 173 is a simplified illustration of an object pressing down on the flexible compressible layer of the touch surface of FIG. 172, and creating an impression thereon, in accordance with an embodiment of the present invention; and FIG. 174 is a simplified illustration of another alternative touch surface with a flexible compressible layer on top of the surface, in accordance with an embodiment of the present invention.

For reference to the figures, the following index of elements and their numerals is provided. Elements numbered in the 100's generally relate to light beams, elements numbered in the 200's generally relate to light sources, elements numbered in the 300's generally relate to light receivers, elements numbered in the 400's and 500's generally relate to light guides, elements numbered in the 600's generally relate to displays, elements numbered in the 700's generally relate to circuit elements, elements numbered in the 800's generally relate to electronic devices, and elements numbered in the 900's generally relate to user interfaces. Elements numbered in the 1000's are operations of flow charts.

Similarly numbered elements represent elements of the same type, but they need not be identical elements.

| Elements generally related to light beams | |
|---|---|
| Element | Description |
| 100-102 | Light beams |
| 105, 106 | Reflected light beam |
| 107-109 | Arc of light output from light source |
| 110 | Dist between centers of two beams |
| 111 | Dist from emitter/rcvr to opt element |
| 112 | Refracted beam |
| 113-117 | Blocked light beams |
| 120 | Light beams (full intensity) |
| 121 | Light beams (partial intensity) |
| 122 | Scattered light beams |
| 123 | Absorbed light beams |
| 142 | Arc of light output from light source |
| 143 | Arc of light input to light receiver |
| 144 | Wide light beams |
| 145-148 | Edge of wide light beam |
| 151-154 | Light beams |
| 158 | Wide light beam |
| 167-169 | Wide light beam |
| 170-172 | Signals received by light receivers |
| 173 | Beam from 1 emitter to 2 receivers |
| 174 | Beam from 1 emitter to $1^{st}$ receiver |
| 175 | Beam from 1 emitter to $2^{nd}$ receiver |
| 176 | Beam from emitter to $1^{st}$ receiver |
| 177 | Beam from emitter to $2^{nd}$ receiver |
| 178 | Beam from 1 emitter to $1^{st}$ receiver |
| 179 | Beam from 1 emitter to $2^{nd}$ receiver |
| 182 | Beam from 1 emitter to 2 receivers |
| 183-187 | Middle of arc of light |
| 190 | Light beams output from light source |
| 191 | Light beams input to light receiver |
| 192 | Arcs of light |
| 193 | Wide light beam from two sources |
| 194-196 | Arcs of light |
| 197 | Reflected light beam |

| Elements generally related to light sources | |
|---|---|
| Element | Description |
| 200-213 | Light emitters |
| 220 | LED cavity |
| 230 | Combined emitter-receiver elements |
| 231-233 | Combined emitter-receiver elements |
| 235-241 | Light emitters |

| Elements generally related to light receivers | |
|---|---|
| Element | Description |
| 300-319 | Light receivers |
| 394 | Light receiver |
| 398 | Light receiver/light emitter |

| Elements generally related to light guides | |
|---|---|
| Element | Description |
| 400 | Lens |
| 401, 402 | Fiber optic light guides |
| 407 | Raised reflector bezel |
| 408 | Cutout |
| 437, 438 | Reflector & lens |
| 439-443 | Lens |
| 444 | Micro-lenses |
| 445 | Surface with fan of micro-lenses |
| 450 | Light guide |
| 451, 452 | Internally reflective surface |
| 453, 454 | Light guide surface |
| 455 | Light guide |
| 456 | Internally reflective surface |
| 457 | Collimating lens & reflective surface |
| 458 | Micro-lenses |
| 459 | Light guide surface |
| 460 | Surface with fan of micro-lenses |
| 461 | Lens |
| 462 | Micro-lenses |
| 463 | Upper portion of light guide |
| 464 | Lower portion of light guide |
| 465 | Light guide surface |
| 466 | Surface with parallel row micro-lenses |
| 467 | Parallel row pattern of micro-lenses |
| 468 | Light guide |
| 469, 470 | Internally reflective surface |
| 471 | Light guide surface |
| 472 | Light guide |
| 473 | Internally reflective surface |
| 474 | Light guide surface |
| 475 | Focal line of a lens |
| 476 | Light guide |
| 477 | Internally reflective surface |
| 478 | Light guide surface |
| 479 | Light guide |
| 480 | Internally reflective surface |
| 481 | Light guide surface |
| 482 | Black plastic transmissive element |
| 483 | Light guide |
| 484 | Surface with fan of micro-lenses |
| 485 | Upper portion of light guide |
| 486 | Lower portion of light guide |
| 487 | Surface with parallel row micro-lenses |
| 488, 489 | Optical component |
| 490-492 | Surface of optical component |
| 493 | Multi-faceted reflective surface |
| 494-497 | Optical component |
| 498, 499 | Light guide |
| 500-501 | Emitter optical component block |
| 502-503 | Receiver optical component block |
| 504 | Emitter lenses |
| 505 | Receiver lenses |
| 506, 507 | Emitter optical component |
| 508-510 | Receiver optical component |
| 511 | Emitter optical components |
| 512 | Receiver optical components |
| 513 | Optical component/temporary guide |
| 514 | Long thin light guide |
| 515 | Light guide reflector |
| 516 | Micro-lenses |
| 517 | Light scatterer strip |
| 518, 519 | Light guides |
| 520, 521 | Protruding lips on light guides |

-continued

Elements generally related to light guides

| Element | Description |
|---|---|
| 522, 523 | Relative position of light guide element |
| 524 | Clear, flat glass |
| 525 | Collimating lens |
| 526 | Clear flat glass with micro-lens surface |
| 527 | Lens with pattern of refracting surfaces |
| 528 | Micro-lens pattern |
| 530-534 | Opt element with multi-faceted surface |
| 541 | Optical element surface |
| 542 | Multi-faceted reflective surface |
| 545-549 | Reflective facets |
| 550-552 | Lens section in multi-lens assembly |
| 555, 556 | Air gap |
| 559 | Connector joining lens section |
| 560 | Diffractive surface |
| 561 | Optically clear transfer tape |
| 562 | Reflective facet |
| 563 | Air gap |
| 564, 565 | Light guide |

Elements generally related to displays

| Element | Description |
|---|---|
| 600 | Screen glass |
| 606 | LCD display (prior art) |
| 607 | Screen glass (prior art) |
| 635-637 | Display |
| 638 | Protective glass |
| 639 | Daylight filter sheet |
| 640 | Protective glass |
| 641 | Daylight filter sheet |
| 642, 643 | Display |
| 645 | Cover glass |
| 650 | Resilient flexible layer |

Elements generally related to circuit elements

| Element | Description |
|---|---|
| 700 | Printed circuit board |
| 701 | Controller integrated circuit (pr. art) |
| 702 | AC input signal (prior art) |
| 703 | Output signal (prior art) |
| 720 | Shift register for column activation |
| 730 | Shift register for column activation |
| 731 | Chip package |
| 732, 733 | Signal conducting pins |
| 736 | Input/output pins |
| 737 | Chip select pin |
| 740 | Emitter driver circuitry |
| 742 | Emitter pulse control circuitry |
| 750 | Detector driver circuitry |
| 753 | Detector signal processing circuitry |
| 755 | Detector current filter |
| 756 | Analog-to-digital convertor |
| 759 | Controller circuitry |
| 760, 761 | Electrical pad |
| 762, 763 | Printed circuit board |
| 764 | Guide pin |
| 765 | Solder pad |
| 766 | Component solder pad |
| 767 | Solder pads after heat oven |
| 768, 769 | Notch in optical component/guide |
| 770 | Calculating unit |
| 772 | Host processor |
| 774 | Touch screen controller |
| 775 | Serial Peripheral Interface (SPI) |

Elements generally related to touch-based electronic devices

| Element | Description |
|---|---|
| 800 | Touch screen |
| 801 | Touch overlay (prior art) |
| 802 | Conductive & resistive layers (pr. art) |
| 803 | PET film (prior art) |
| 804 | Top circuit layer (prior art) |
| 805 | Bottom circuit layer (prior art) |
| 806, 807 | Conductive coating (prior art) |
| 808 | Spacer dot (prior art) |
| 809 | Touch surface (prior art) |
| 810 | Coated glass substrate (prior art) |
| 811 | Glass substrate (prior art) |
| 812 | Conductive ITO coating (prior art) |
| 813 | Silicon dioxide hard coating (prior art) |
| 814 | Electrode (prior art) |
| 815 | Etched ITO layers (prior art) |
| 816, 817 | Hard coat layer (prior art) |
| 818 | x-axis electrode pattern (prior art) |
| 819 | y-axis electrode pattern (prior art) |
| 820 | ITO glass (prior art) |
| 826 | Electronic device |
| 827-832 | Device casing |
| 841, 842 | Resilient members |
| 843 | Flex air gap |
| 844-847 | Image sensors |
| 849 | Screen frame |

Elements generally related to user interfaces

| Element | Description |
|---|---|
| 900-902 | Pointer/finger/thumb/stylus |
| 905 | Detected touch area |
| 910-912 | Light signal attenuation area |
| 920, 921 | Light signal attenuation gradient |
| 925-927 | Path across a wide beam |
| 930 | Hand |
| 931 | Stylus |
| 932 | Drawn line |
| 971, 972 | Touch points |
| 973-976 | Light signal attenuation area |
| 977 | Point on lens |
| 980 | Touch point |
| 981, 982 | Point on lens |
| 989, 990 | Pin |
| 991-993 | Active touch area |

DETAILED DESCRIPTION

Aspects of the present invention relate to light-based touch screens.

For clarity of exposition, throughout the present specification the term "touch screen" is used as a generic term to refer to touch sensitive surfaces that may or may not include an electronic display. As such, the term "touch screen" as used herein includes inter alia a mouse touchpad as included in many laptop computers, and the cover of a handheld electronic device. The term "optical touch screen" is used as a generic term to refer to light-based touch screens, including inter alia screens that detect a touch based on the difference between an expected light intensity and a detected light intensity, where the detected light intensity may be greater than or less than the expected light intensity.

For clarity of exposition, throughout the present specification, the term "emitter" is used as a generic term to refer to a light emitting element, including inter alia a light-emitting diode (LED), and the output end of a fiber optic or tubular light guide that outputs light into a lens or reflector that directs the light over a display surface. The term "receiver" is used as a generic term to refer to a light detecting element, including inter alia a photo diode (PD), and the input end of a fiber optic or tubular light guide that receives light beams that traversed a display surface and directs them to a light detecting element or to an image sensor, the image sensor being inter alia a charge coupled device (CCD) or a complementary metal oxide semiconductor (CMOS) image sensor.

A general principle underlying touch detection is that on object such as a finger, when placed on a screen, changes the coupling of light between a transmitter and a receiver. The position of the finger is calculated by determining how a signal changed and which transmitters and receivers are affected. By pulsing transmitters one at a time, it is determined which transmitter sent light to a given receiver. The information necessary for touch detection is a signal indicating whether a finger is touching the screen, and a signal indicating where the touch is located.

Figure 1:
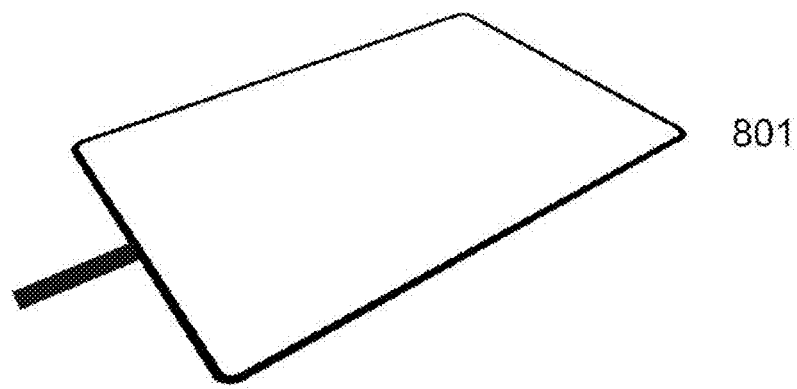
FIG. 1 is a prior art illustration of a conventional touch screen system.
Figure 1:
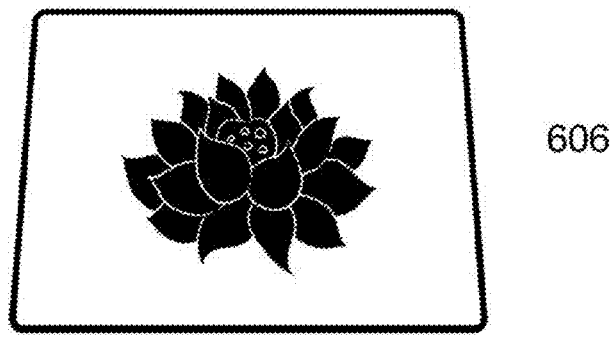
Figure 1:
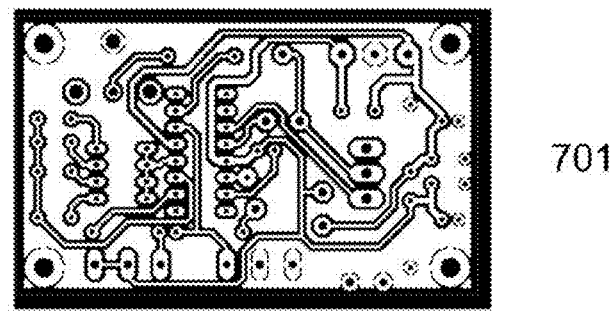
Figure 2:
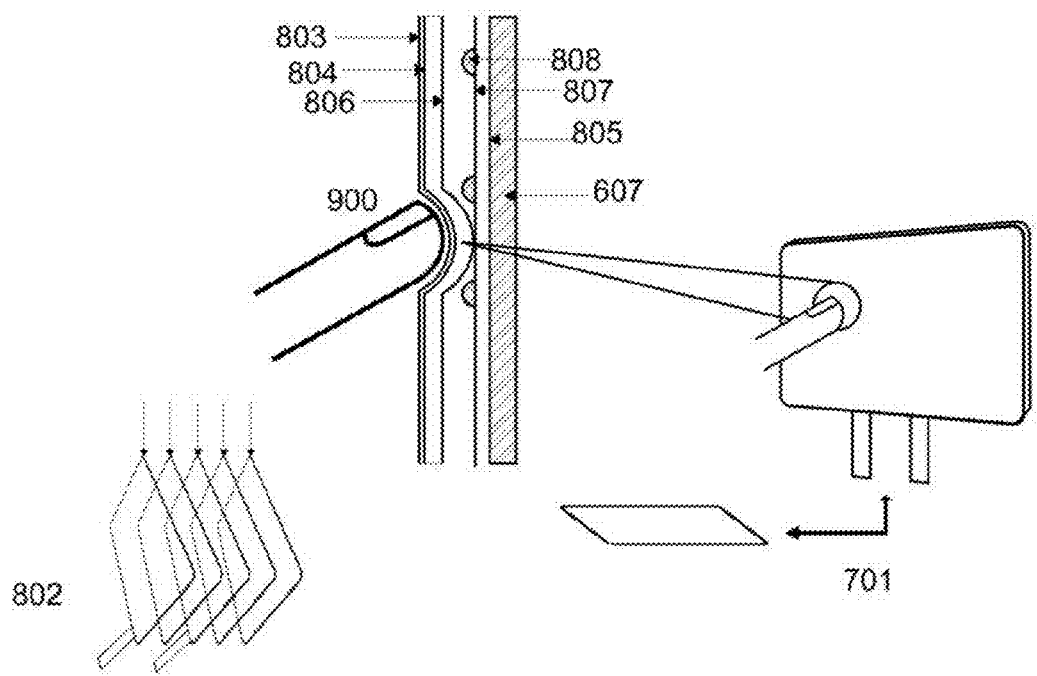
FIG. 2 is a prior art illustration of a conventional resistive touch screen.
Figure 3:
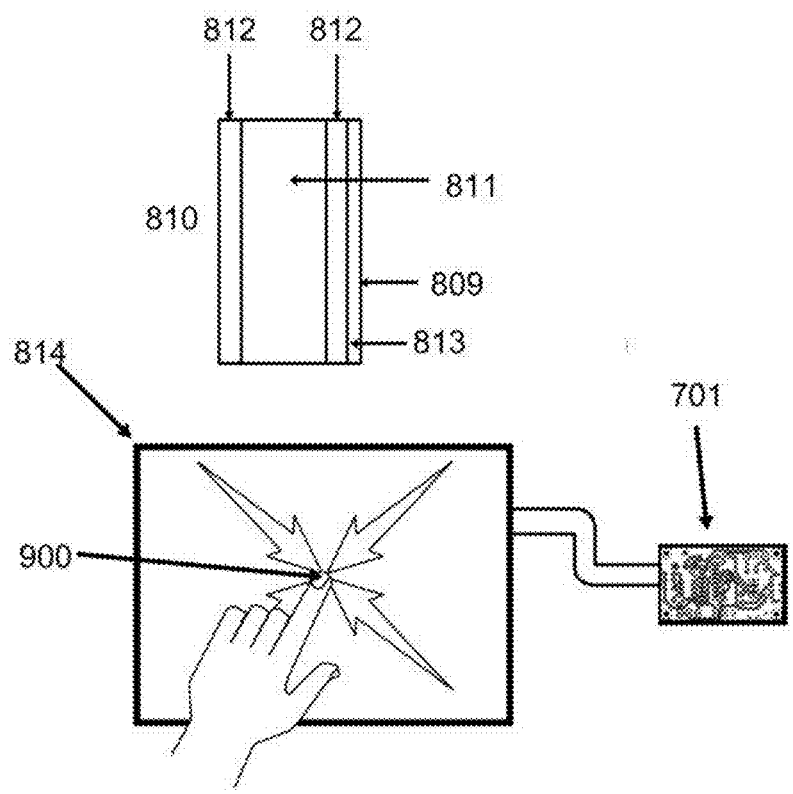
FIG. 3 is a prior art illustration of a conventional surface capacitive touch screen.
Figure 4:
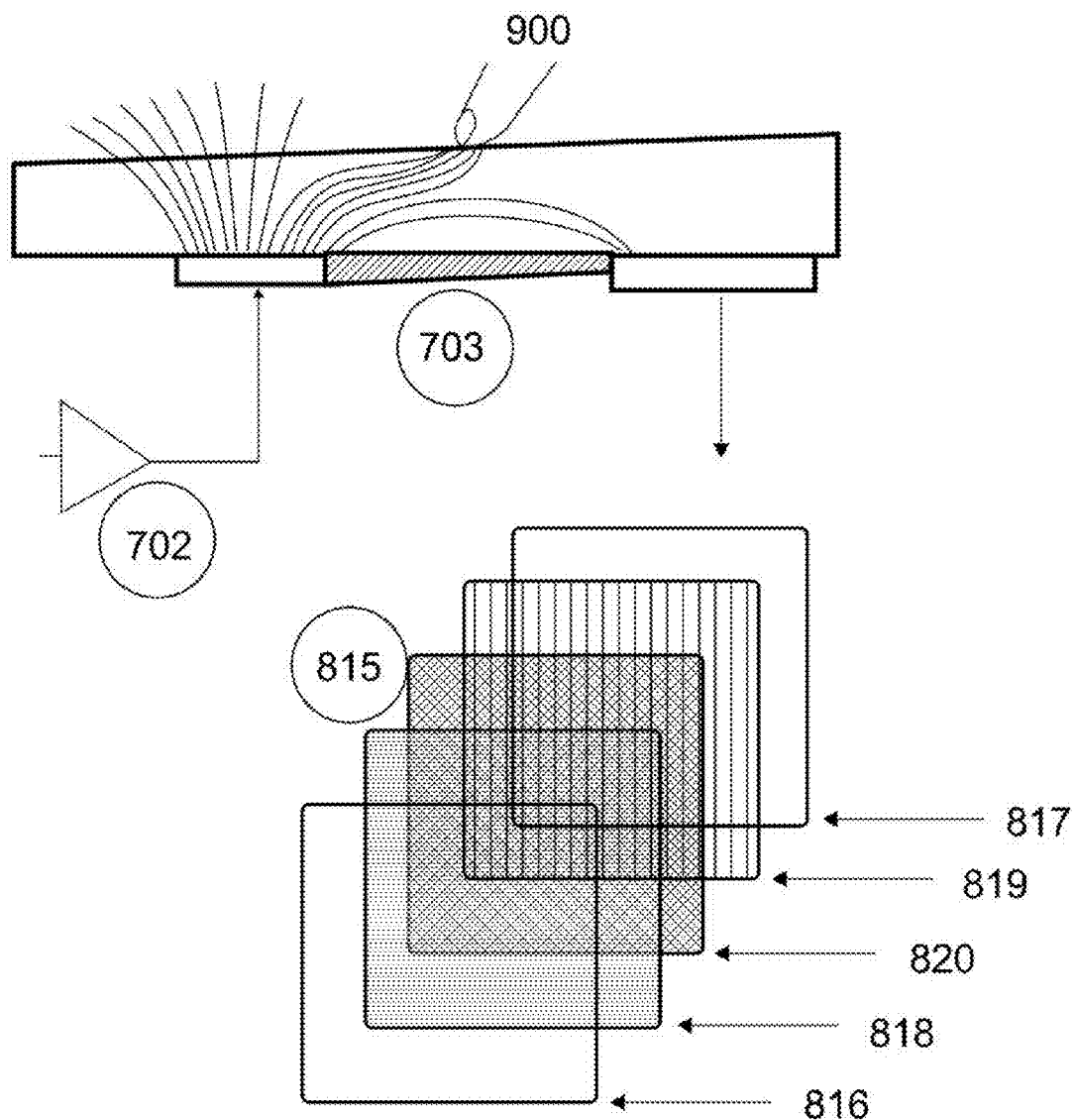
FIG. 4 is a prior art illustration of a conventional projected capacitive touch screen.
Figure 5:
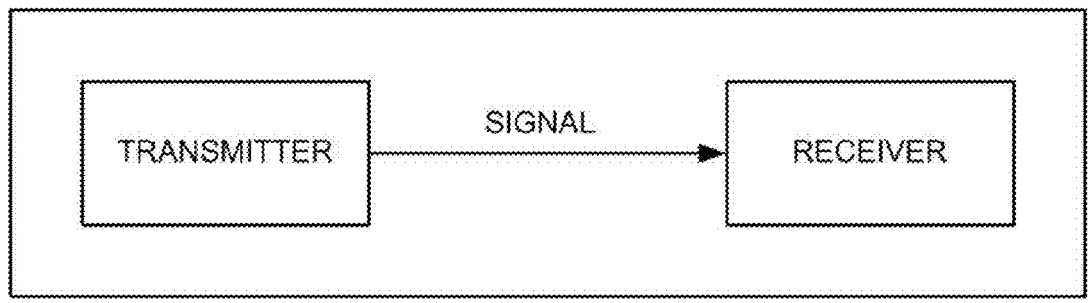
FIG. 5 is a simplified illustration of a touch screen detection channel, in accordance with an embodiment of the present invention.

Reference is made to FIG. 5, which is a simplified illustration of a touch screen detection channel, in accordance with an embodiment of the present invention. As shown in FIG. 5, between each transmitter and each receiver there is a channel for conducting signals. A channel signal indicates if there is a touch or not going through the channel. As explained below, when multiple touches occur at the same time, the signal also encodes the number of touches in the channel. This case is commonly referred to as "mufti-touch". There are two types of channels; namely, A. channels for which a finger activates a signal between the transmitter and the receiver; and
B. channels for which a finger blocks a signal between the transmitter and the receiver.

For channel A, a low signal, near 0, indicates no touch, and a high signal indicates a touch. Channel A extends to a channel A', which detects more than one touch per channel. For channel A', high signal values occur at different levels corresponding to the number of touches, where each touch added to the channel increases the signal by one step.

For channel B, a high signal indicates no touch, and a low signal, near 0, indicates a touch. Channel B extends to a channel B', which divides the signal value into multiple ranges or steps. Each additional touch in the channel decreases the signal by one step.

Figure 6:
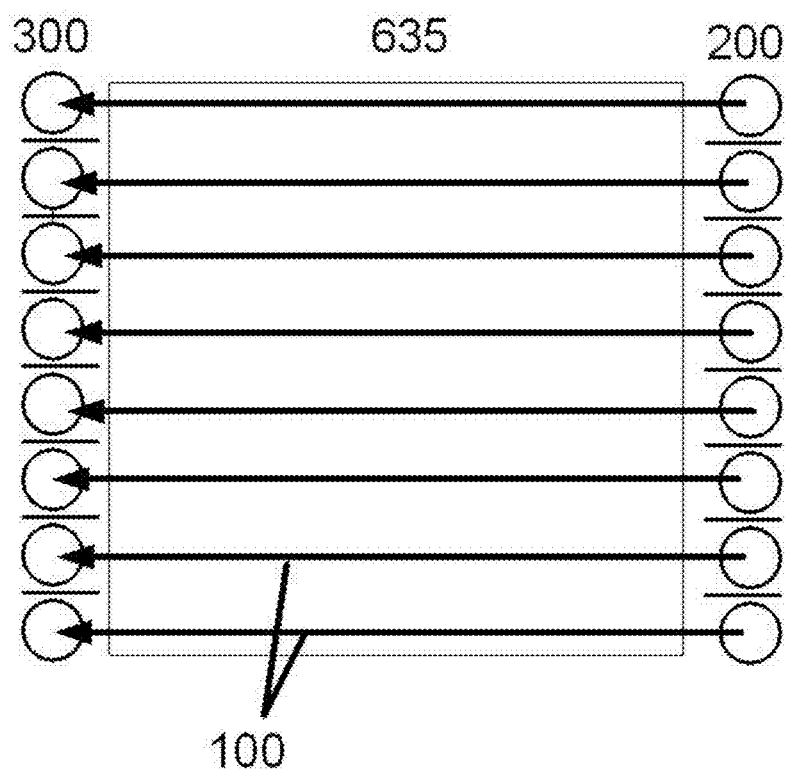
FIG. 6 a simplified illustration of light beams orientated along a screen axis in a touch screen system, in accordance with an embodiment of the present invention.
Figure 7:
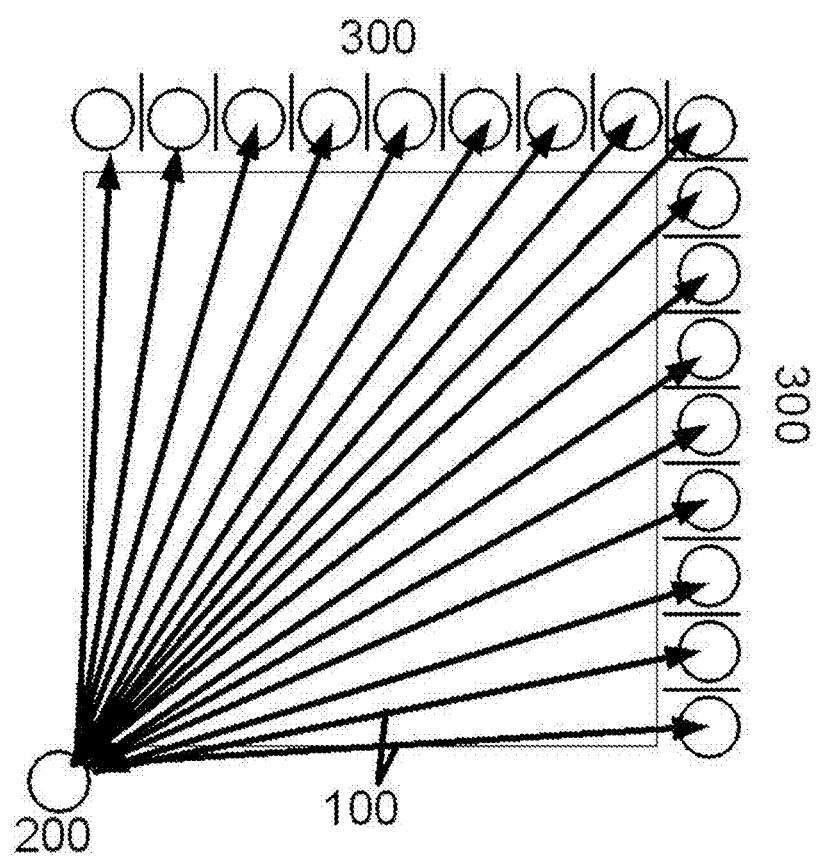
FIG. 7 is a simplified illustration of light beams spread across a screen like a fan in a touch screen system, in accordance with an embodiment of the present invention.
Figure 8:
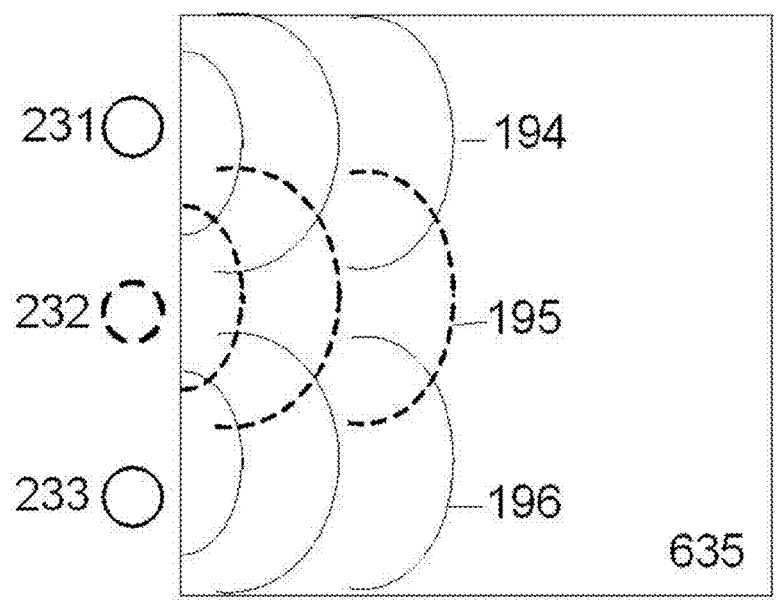
FIG. 8 is a simplified illustration of combined transmitter-receiver elements distributed along a screen edge that create circular, or arc-shaped detection zones, in accordance with an embodiment of the present invention.
Figure 8:
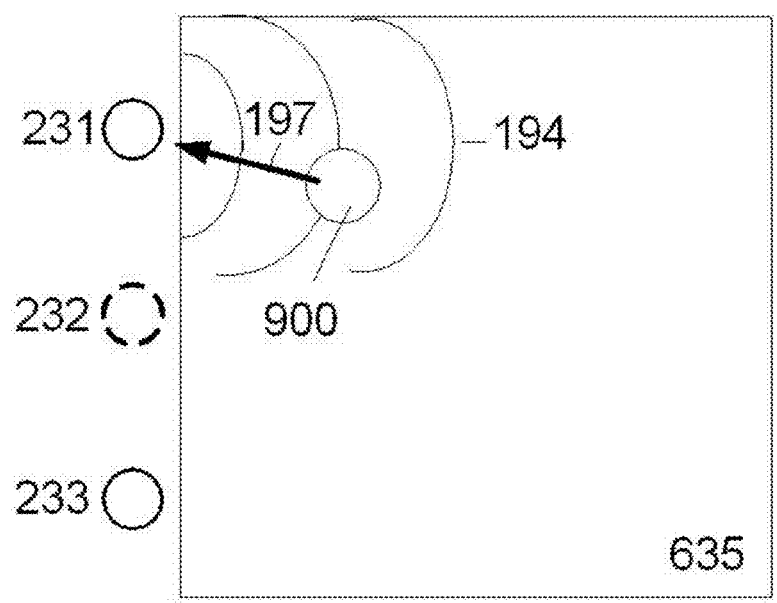

FIGS. 6-8 illustrate different orientations of detection channels covering a screen. Reference is made to FIG. 6, which is a simplified illustration of light beams orientated along a screen axis in a touch screen system, in accordance with an embodiment of the present invention. FIG. 6 shows detection channels 100 along the width of screen 635. Each channel begins at an emitter 200 at one edge of screen 635, and ends at a respective receiver 300 at the opposite edge of screen 635.

Reference is made to FIG. 7, which is a simplified illustration of light beams spread across a screen like a fan in a touch screen system, in accordance with an embodiment of the present invention. FIG. 7 shows detection channels 100 spread out like a fan across a screen. All of the channels begin at a single emitter 200 in one corner of the screen, and each channel ends at a respective receiver 300 at an opposite edge of the screen.

Reference is made to FIG. 8, which is a simplified illustration of combined transmitter-receiver elements distributed along a screen edge that create circular, or arc-shaped detection zones, in accordance with an embodiment of the present invention. FIG. 8(a) shows detection channels as circular zones 194-196 on screen 635. Each detection channel is created by an emitter-receiver element 231-233 that emits an arc of light 194-196 and detects the reflection of an object inserted into the arc of light. The detection is shown in FIG. 8(b), where an object 900 inserted into arc 194 reflects light beam 197 back onto emitter-receiver element 231.

Figure 9:
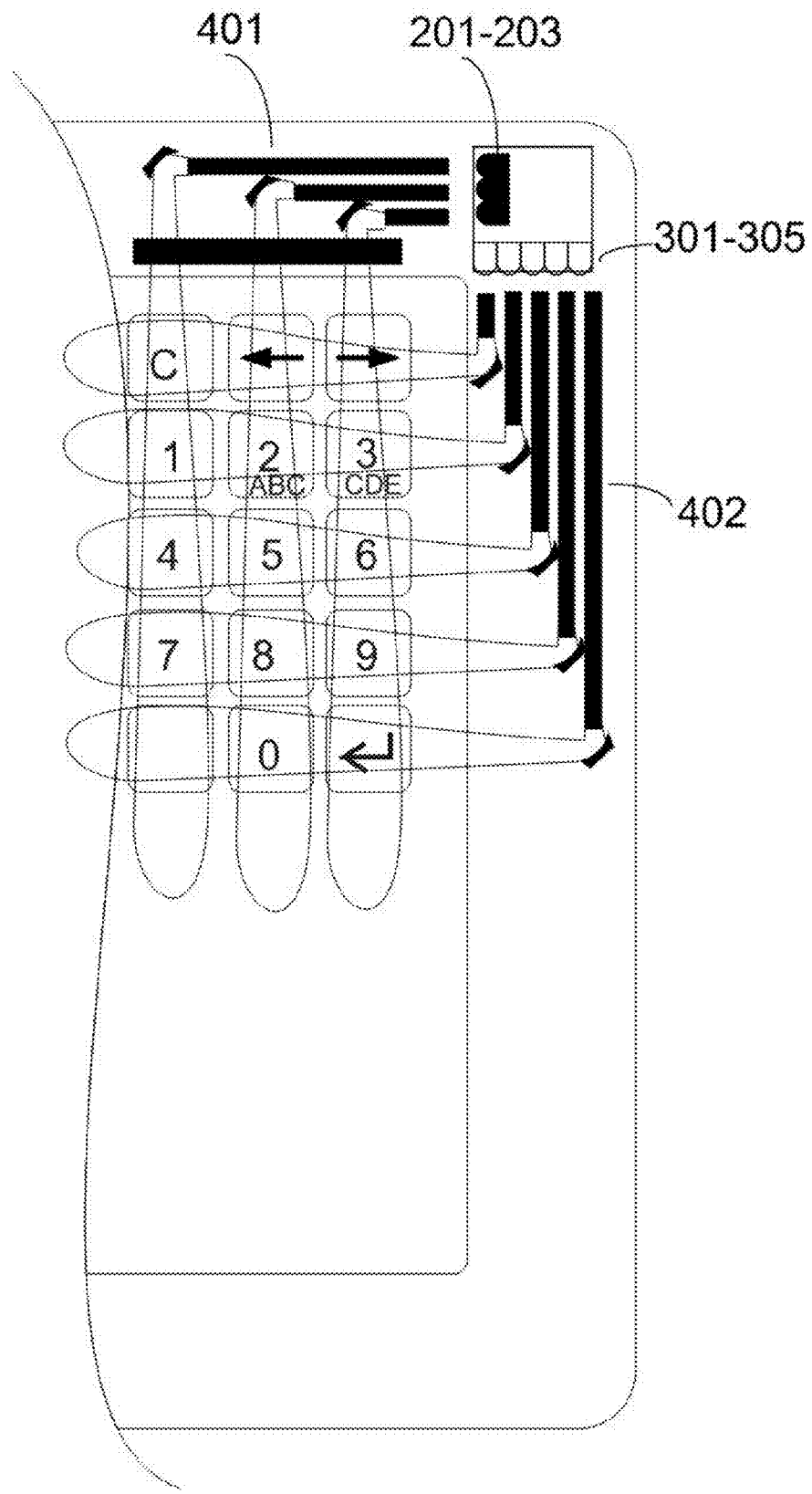
FIG. 9 is an illustration of a portion of a touch screen including a plurality of emitters that are positioned close together, wherein light is guided by fiber optic light guides to locations along a first screen edge, in accordance with an embodiment of the present invention.

Reference is made to FIG. 9, which is an illustration of a portion of a touch screen including a plurality of emitters 201-203 that are positioned close together, wherein light is guided by fiber optic light guides 401 to locations along a first screen edge, in accordance with an embodiment of the present invention. The portion of the touch screen also includes a plurality of receivers 301-305 that are positioned close together, wherein light is guided thereto by fiber optic light guides 402 from locations along a second screen edge.

According to embodiments of the present invention, a light-based touch screen includes one or more emitters, including inter alia infra-red or near infra-red light-emitting diodes (LEDs), and a plurality of receivers, including inter alia photo diodes (PDs), arranged along the perimeter surrounding the touch screen or touch surface. The emitters project light substantially parallel to the screen surface, and this light is detected by the receivers.

In some embodiments, the projected light is transmitted through air above the screen surface. A pointer, such as a finger or a stylus, placed over a portion of the screen blocks some of the light beams, and correspondingly some of the receivers detect less light intensity. In other embodiments, the projected light is transmitted through an optically transmissive layer above the screen surface. The projected light traverses the screen without exiting this layer due to total internal reflection. A pointer, such as a finger or a stylus, that touches this layer, absorbs and/or scatters some of the light beams and, correspondingly, some of the receivers detect less light intensity.

In each of these embodiments, the geometry of the locations of the emitters and receivers, and the detected light intensities, determine the screen coordinates of the pointer. The emitters and receivers are controlled for selective activation and de-activation by a controller. Generally, each emitter and receiver has I/O connectors, and signals are transmitted to specify which emitters and which receivers are activated.

In an embodiment of the present invention, plural emitters are arranged along two adjacent sides of a rectangular screen, and plural receivers are arranged along the other two adjacent sides. In this regard, reference is now made to FIG. 10, which is a diagram of a touch screen 800 having 16 emitters 200 and 16 receivers 300, in accordance with an embodiment of the present invention. Emitters 200 emit infra-red or near infra-red light beams across the top of the touch screen, which are detected by corresponding receivers 300 that are directly opposite respective emitters 200. When a pointer touches touch screen 800, it diminishes the amount of light that reaches some of receivers 300, either by obstructing a portion of the beam, or by absorbing and/or scattering a portion of the beam as described above. By identifying, from the receiver outputs, which light beams have been blocked or reduced by the pointer, the pointer's location can be determined.

Figure 10:
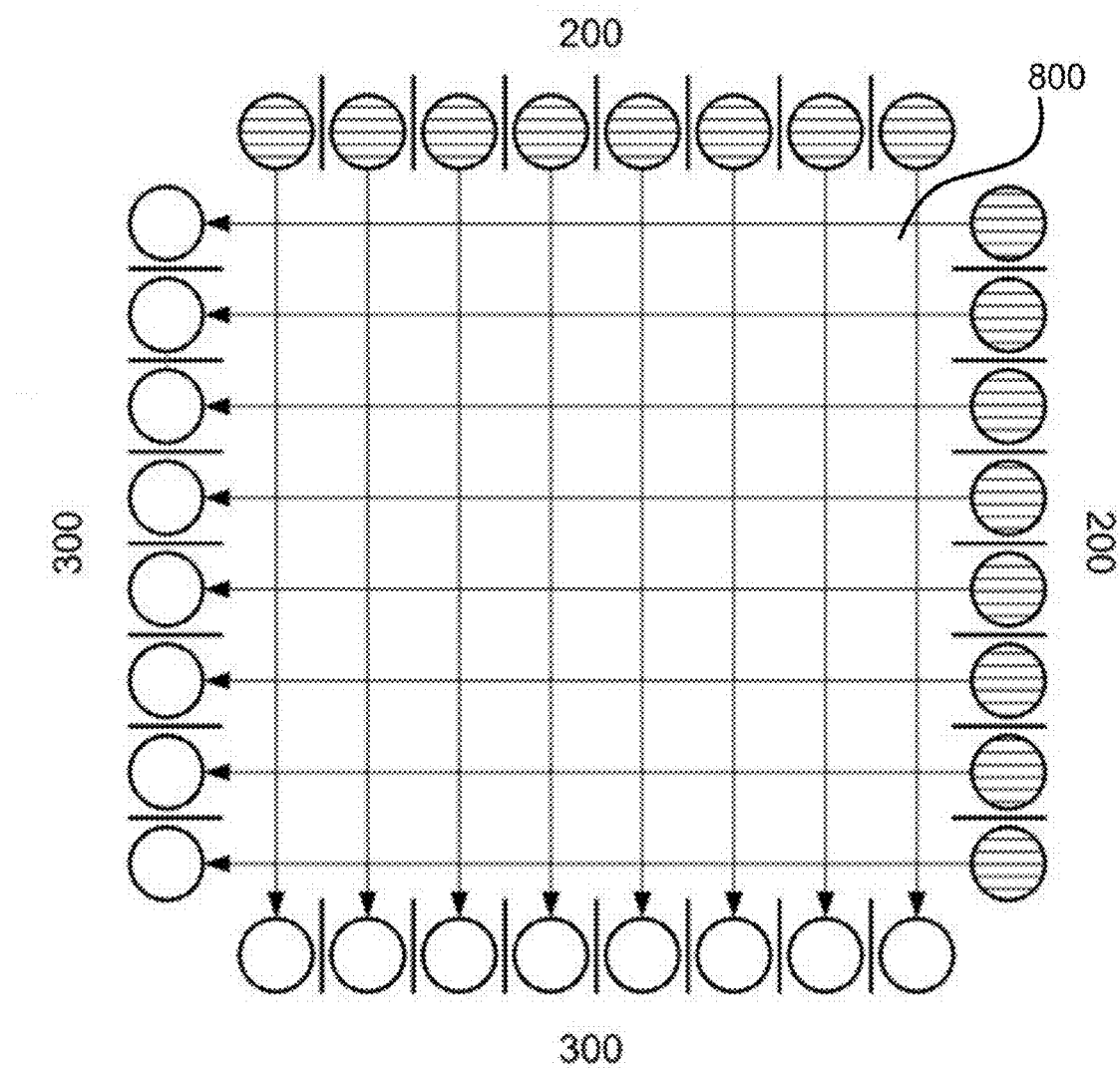
FIG. 10 is a diagram of a touch screen having 16 emitters and 16 receivers, in accordance with an embodiment of the present invention.
Figure 11:
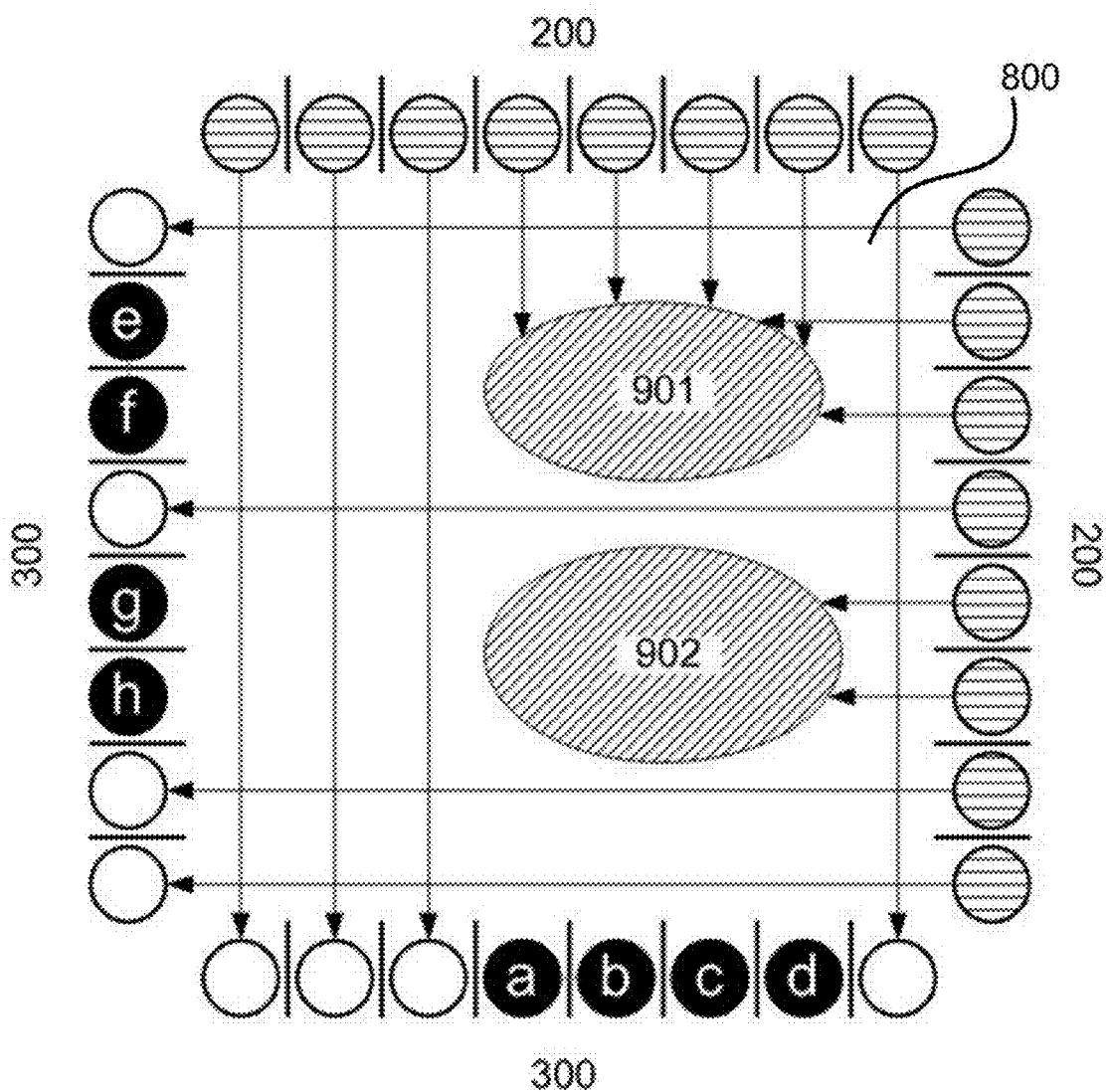
FIGS. 11-13 are diagrams of the touch screen of FIG. 10, showing detection of two pointers that touch the screen simultaneously, in accordance with an embodiment of the present invention.
Figure 12:
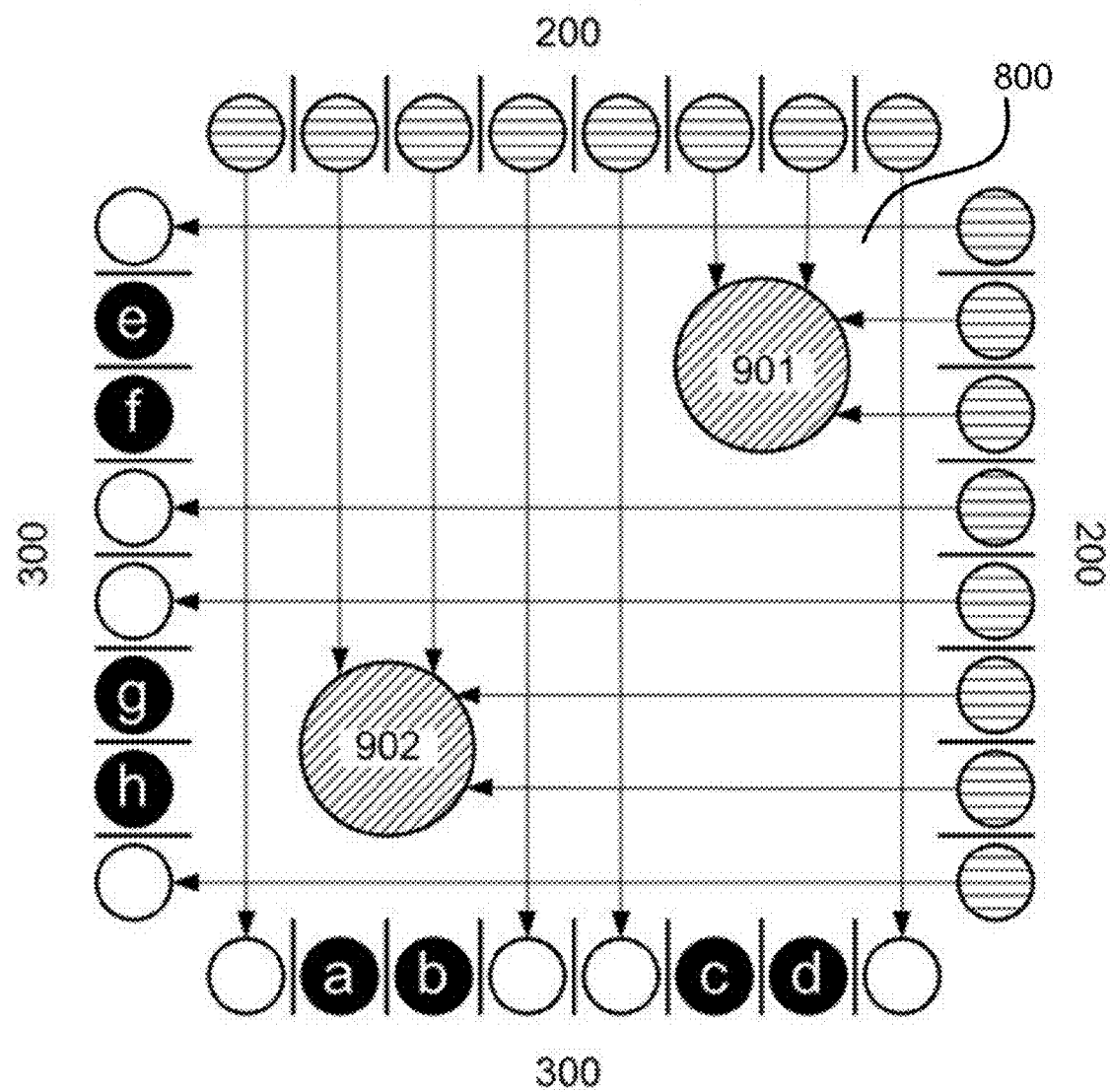
Figure 13:
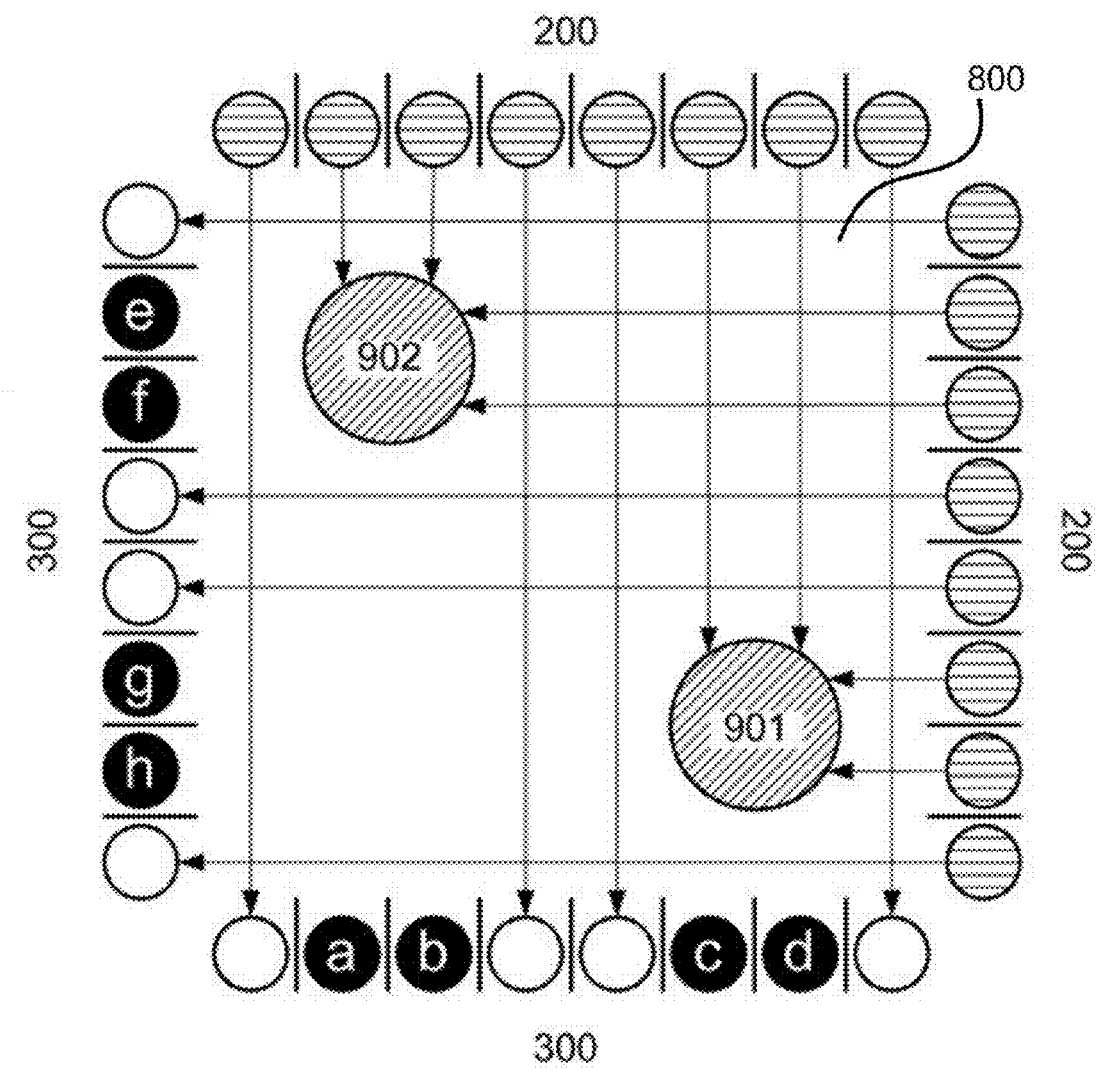

Reference is now made to FIGS. 11-13, which are diagrams of touch screen 800 of FIG. 10, showing detection of two pointers, 901 and 902, that touch the screen simultaneously, in accordance with an embodiment of the present invention. When two or more pointers touch the screen simultaneously, this is referred to as a "multi-touch." Pointers 901 and 902, which are touching the screen, block light from reaching some of receivers 300. In accordance with an embodiment of the present invention, the locations of pointers 901 and 902 are determined from the crossed lines of the infra-red beams that the pointers block. In distinction, prior art resistance-based and capacitance-based touch screens are generally unable to detect a multi-touch.

When two or more pointers touch screen 800 simultaneously along a common horizontal or vertical axis, the positions of the pointers are determined by the receivers 300 that are blocked. Pointers 901 and 902 in FIG. 11 are aligned along a common vertical axis and block substantially the same receivers 300 along the bottom edge of touch screen 800; namely the receivers marked a, b, c and d. Along the left edge of touch screen 800, two different sets of receivers 300 are blocked. Pointer 901 blocks the receivers marked e and f, and pointer 902 blocks the receivers marked g and h. The two pointers are thus determined to be situated at two locations. Pointer 901 has screen coordinates located at the intersection of the light beams blocked from receivers a-d and receivers e and f; and pointer 902 has screen coordinates located at the intersection of the light beams blocked from receivers a-d and receivers g and h.

Pointers 901 and 902 shown in FIGS. 12 and 13 are not aligned along a common horizontal or vertical axis, and they have different horizontal locations and different vertical locations. From the blocked receivers a-h, it is determined that pointers 901 and 902 are diagonally opposite one another. They are either respectively touching the top right and bottom left of touch screen 800, as illustrated in FIG. 8; or else respectively touching the bottom right and top left of touch screen 800, as illustrated in FIG. 13.

For light-based touch screens that use total internal reflection, discriminating between FIG. 12 and FIG. 13 is resolved by analyzing increases in light detection due to scattered light. This analysis is described in detail below with reference to FIG. 122.

Determining locations of a diagonally oriented mufti-touch is further discussed below with reference to shift-aligned arrangements of emitters and receivers, and with reference to light beams directed along four axes. An additional method of resolving ambiguous multi-touches is described with reference to fast scan frequencies enabled by the ASIC controller discussed hereinbelow.

Figure 14:
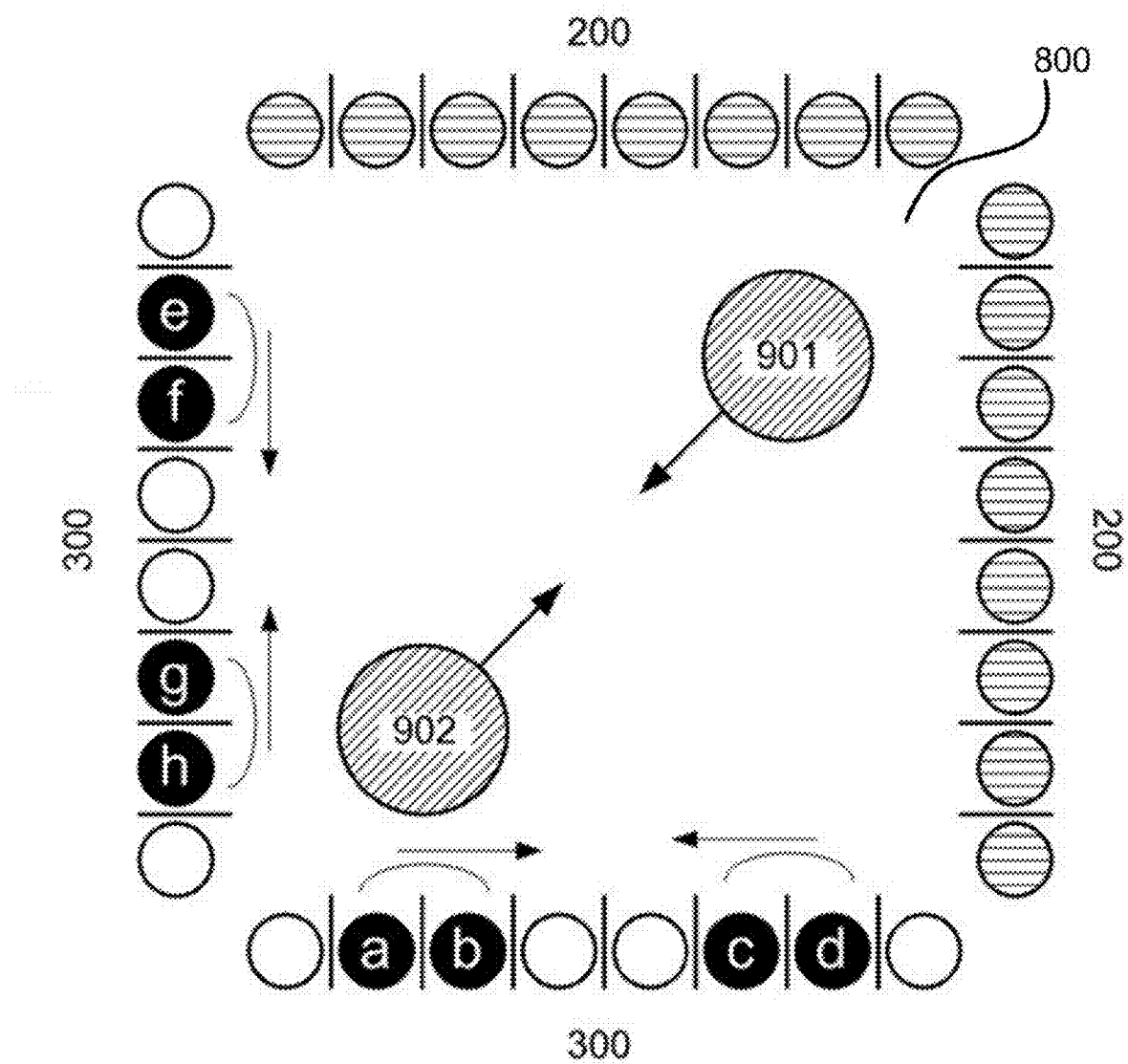
FIGS. 14 and 15 are diagrams of a touch screen that detects a two finger glide movement, in accordance with an embodiment of the present invention.
Figure 15:
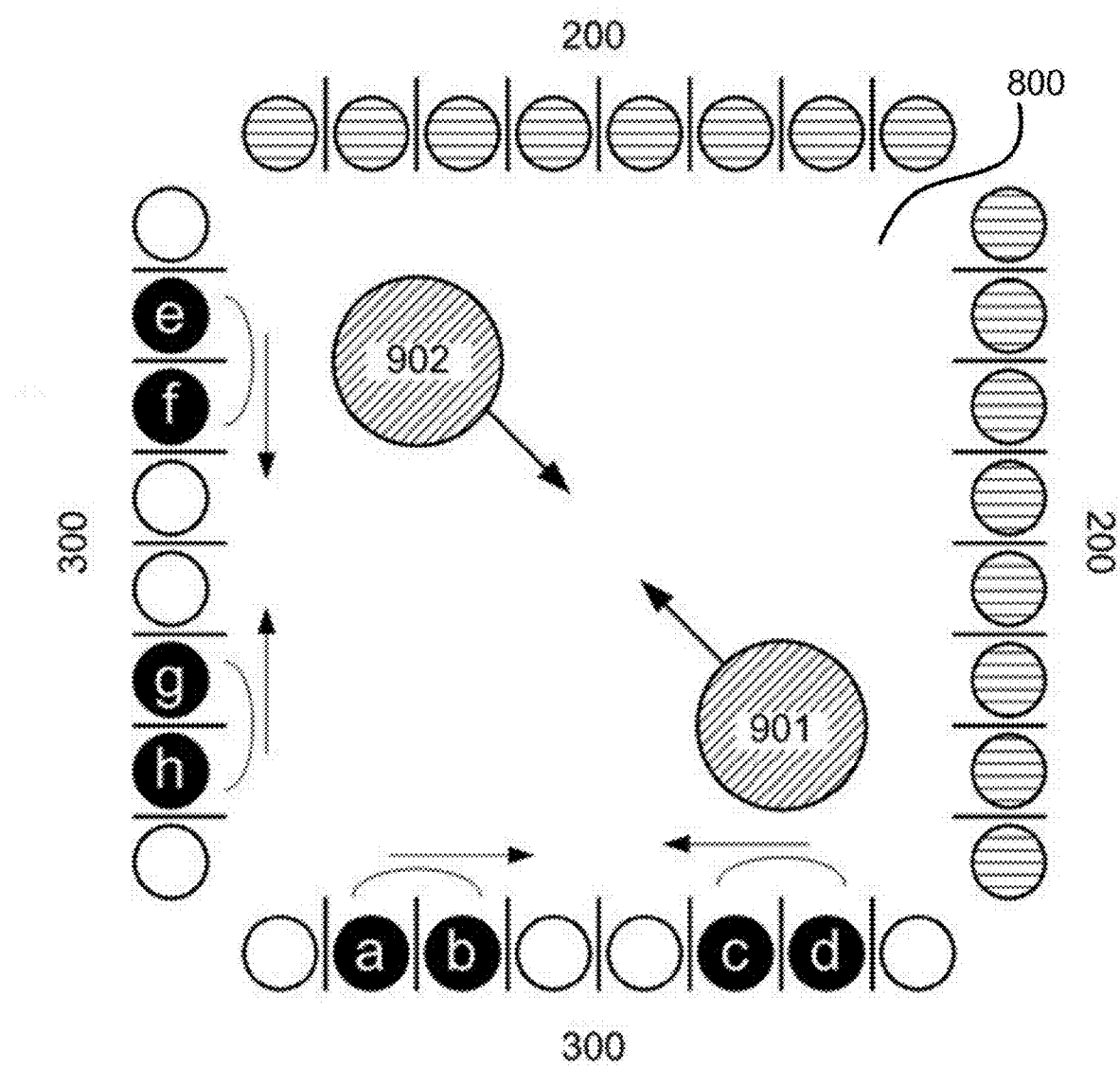
Figure 18:
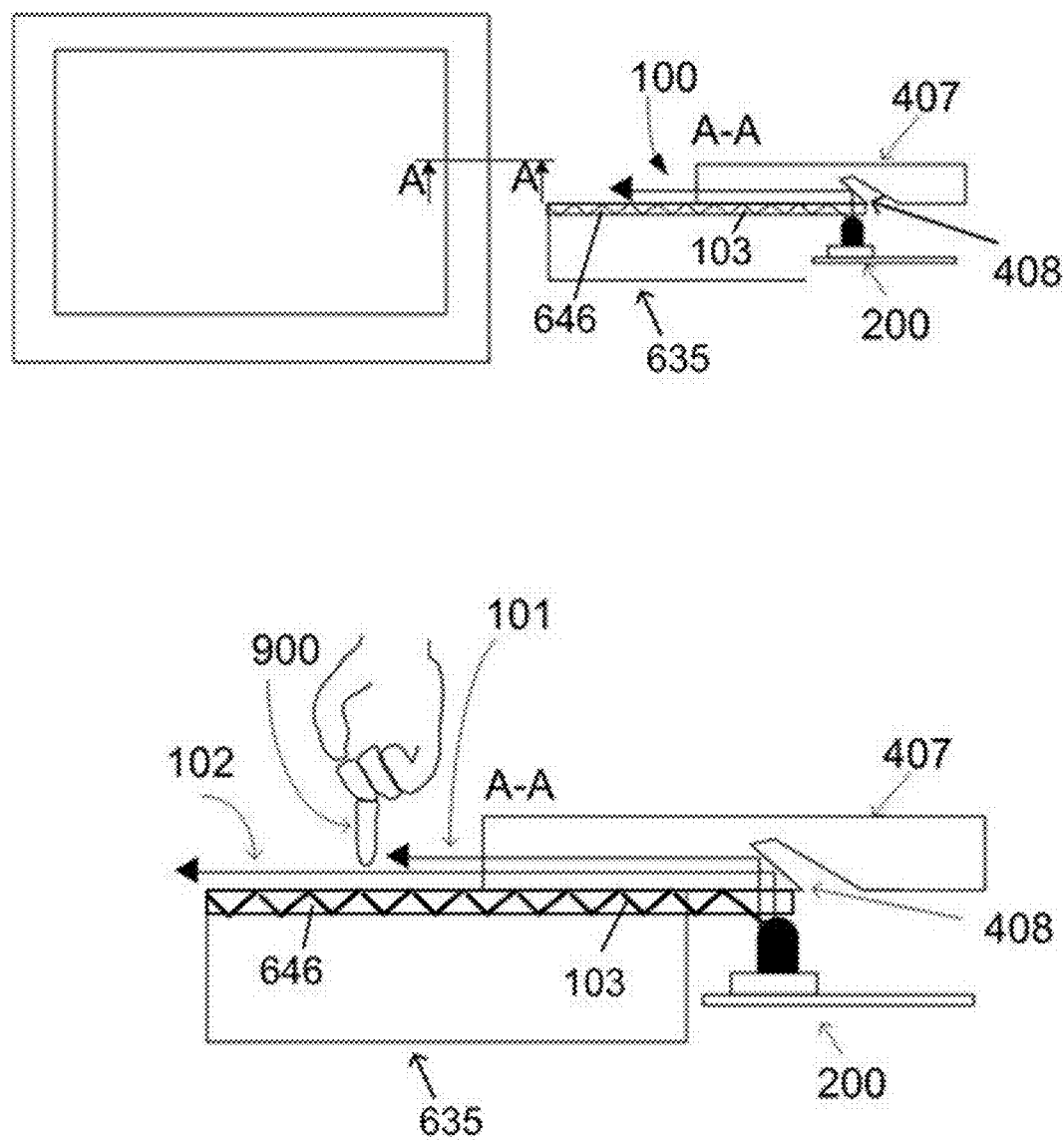
FIG. 18 is a simplified cross-sectional diagram of the touch screen system of FIG. 17, in accordance with an embodiment of the present invention.

Reference is now made to FIGS. 14 and 15, which are diagrams of a touch screen 800 that detects a two-finger glide movement, in accordance with an embodiment of the present invention. The two-finger glide movement illustrated in FIGS. 14 and 15 is a diagonal pinch gesture that brings pointers 901 and 902 closer together. The direction of the glide is determined from changes in which receivers 300 are blocked. As shown in FIGS. 14 and 18, blocked receivers are changing from a and b to receivers 300 more to the right, and from c and d to receivers 300 more to the left. Similarly, blocked receivers are changing from e and f to receivers 300 more to the bottom, and from g and h to receivers 300 more to the top. For a two-finger glide in the opposite direction, i.e., a spread, or reverse-pinch, gesture, that moves pointers 901 and 902 farther apart, the blocked receivers change in the opposite directions.

When pointers 901 and 902 are aligned along a common vertical or horizontal axis, there is no ambiguity in identifying two-finger glide patterns. When pointers 901 and 902 are not aligned in a common vertical or horizontal axis, there may be ambiguity in identifying glide patterns, as illustrated in FIGS. 14 and 15. In case of such ambiguity, and as described hereinabove with reference to FIGS. 12 and 13, discriminating between FIG. 14 and FIG. 15 is resolved by analyzing increases in light detection due to scattered light, as described in detail below with reference to FIG. 122.

Figure 16:
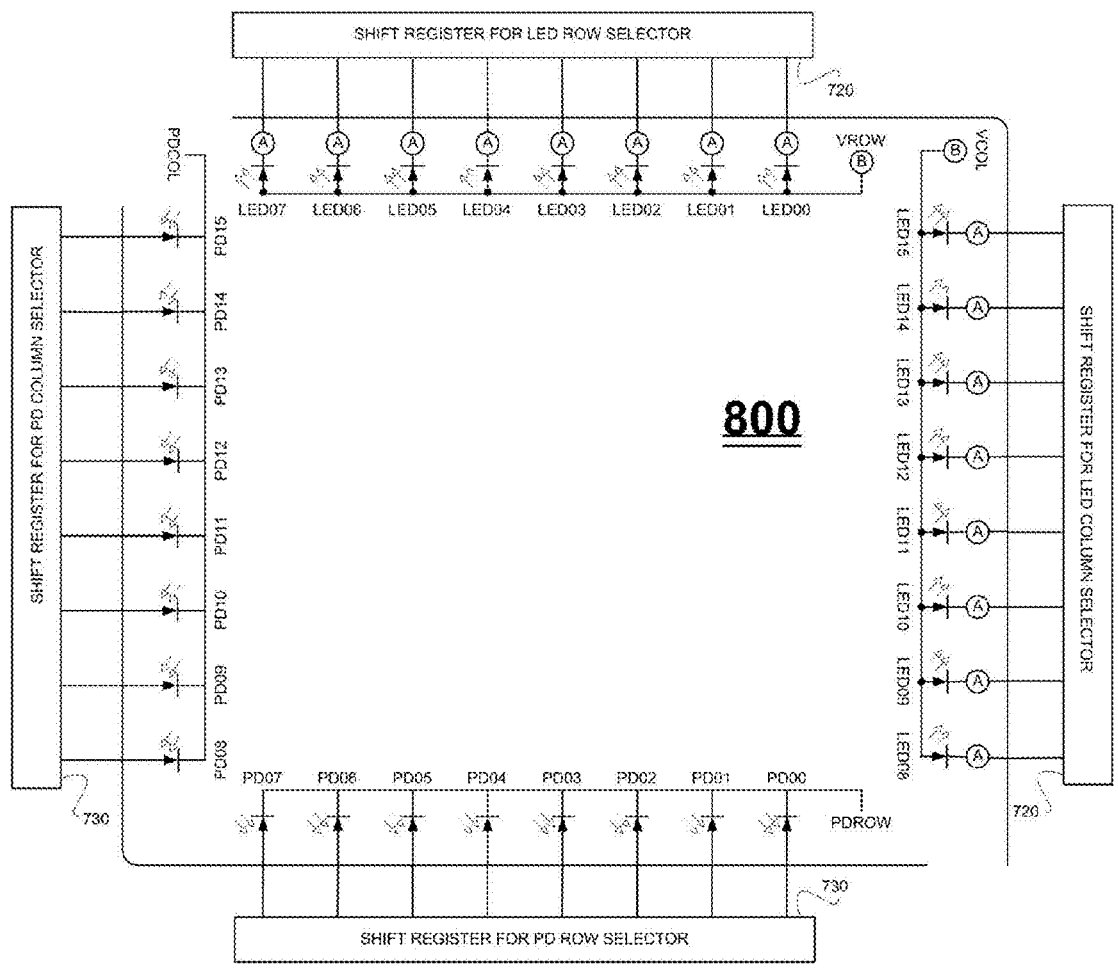
FIG. 16 is a circuit diagram of the touch screen from FIG. 10, in accordance with an embodiment of the present invention.

Reference is made to FIG. 16, which is a circuit diagram of touch screen 800 from FIG. 10, in accordance with an embodiment of the present invention. The emitters and receivers are controlled by a controller (not shown). The emitters receive respective signals LED00-LED15 from switches A, and receive current from VROW and VCOL through current limiters B. The receivers receive respective signals PD00-PD15 from shift register 730. Receiver output is sent to the controller via signals PDROW and PDCOL. Operation of the controller, of switches A and of current limiters B is described in applicant's co-pending application, U.S. application Ser. No. 12/371,609 filed on Feb. 15, 2009, now U.S. Pat. No. 8,339,379, and entitled LIGHT-BASED TOUCH SCREEN, the contents of which are hereby incorporated by reference.

According to an embodiment of the present invention, the emitters are controlled via a first serial interface, which transmits a binary string to a shift register 720. Each bit of the binary string corresponds to one of the emitters, and indicates whether to activate or deactivate the corresponding emitter, where a bit value "1" indicates activation and a bit value "0" indicates deactivation. Successive emitters are activated and deactivated by shifting the bit string within shift register 720.

Similarly, the receivers are controlled by a second serial interface, which transmits a binary string to a shift register 730. Successive receivers are activated and deactivated by shifting the bit string in shift register 730. Operation of shift registers 720 and 730 is described in U.S. application Ser. No. 12/371,609 referenced above.

Figure 17:
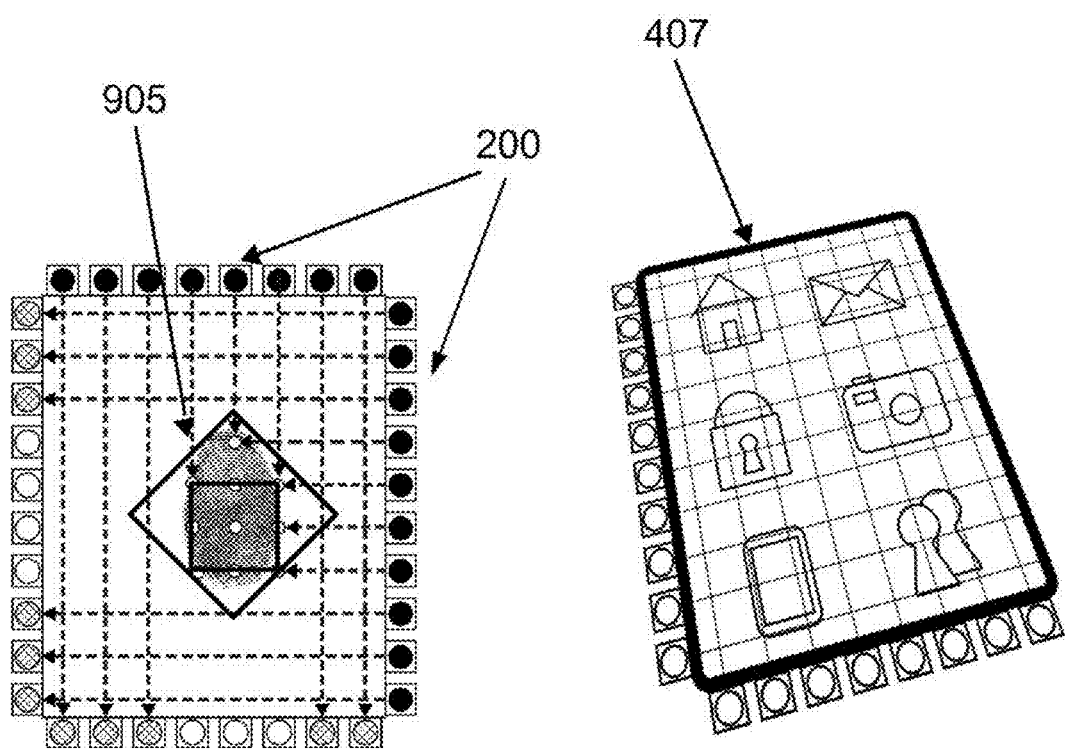
FIG. 17 is a simplified diagram of a light-based touch screen system, in accordance with an embodiment of the present invention.

Reference is made to FIG. 17, which is a simplified diagram of a light-based touch screen system, in accordance with an embodiment of the present invention. A first portion of the light emitted by emitter 200 is directed through air above a cover glass that covers the display. A second portion of the light emitted by emitter 200 is directed into the cover glass. The second portion of the light is guided by total internal reflection. A small infrared transparent frame 407 surrounds the display to reflect the first portion of light beams between emitters 200 and receivers positioned on opposite sides of the screen. When a pointer, such as a finger or a stylus, touches the cover glass at a specific area 905, one or more light beams generated by emitters 200 are obstructed; specifically, the first portion of beams are blocked by the finger, and the second portion of beams are at least partially absorbed by the finger. The obstructed light beams are detected by corresponding decreases in light received by one or more of the receivers, which is used to determine the location of the pointer.

Reference is made to FIG. 18, which is a simplified cross-sectional diagram of the touch screen system of FIG. 17, in accordance with an embodiment of the present invention. Shown in FIG. 18 is a cross-sectional view of a section A-A of an LCD display 635, a cover glass 646, and its surrounding infrared transparent frame 407. The cross-sectional view shows an emitter 200 emitting light 100 that is reflected by a cut-out 408 in frame 407, and directed substantially parallel over the display surface. The cross-sectional view also shows emitted light 103 that is internally reflected in cover glass 646, across the display surface. As a finger 900 approaches cover glass 646, some of the light, 101, emitted by the emitters and directed over the location of the near touch is blocked by the finger, and some of the light, 102, passes between the fingertip and the cover glass. The reduction in detected light is substantially linear as the finger draws closer to the cover glass. The internally reflected portion of the light 103 is unaffected by the approaching finger. When finger 900 touches the display surface, all of the light emitted by the emitters and directed through air above the touch location, e.g., beams 101 and 102, is blocked by finger 900. In addition, a significant portion of the internally reflected light 103 is absorbed and/or scattered by the finger, causing a sudden drop in the amount of detected light when the finger touches the cover glass. This provides an indication as to when contact was first made.

Touch Screen System Configuration No. 1

Figure 19:
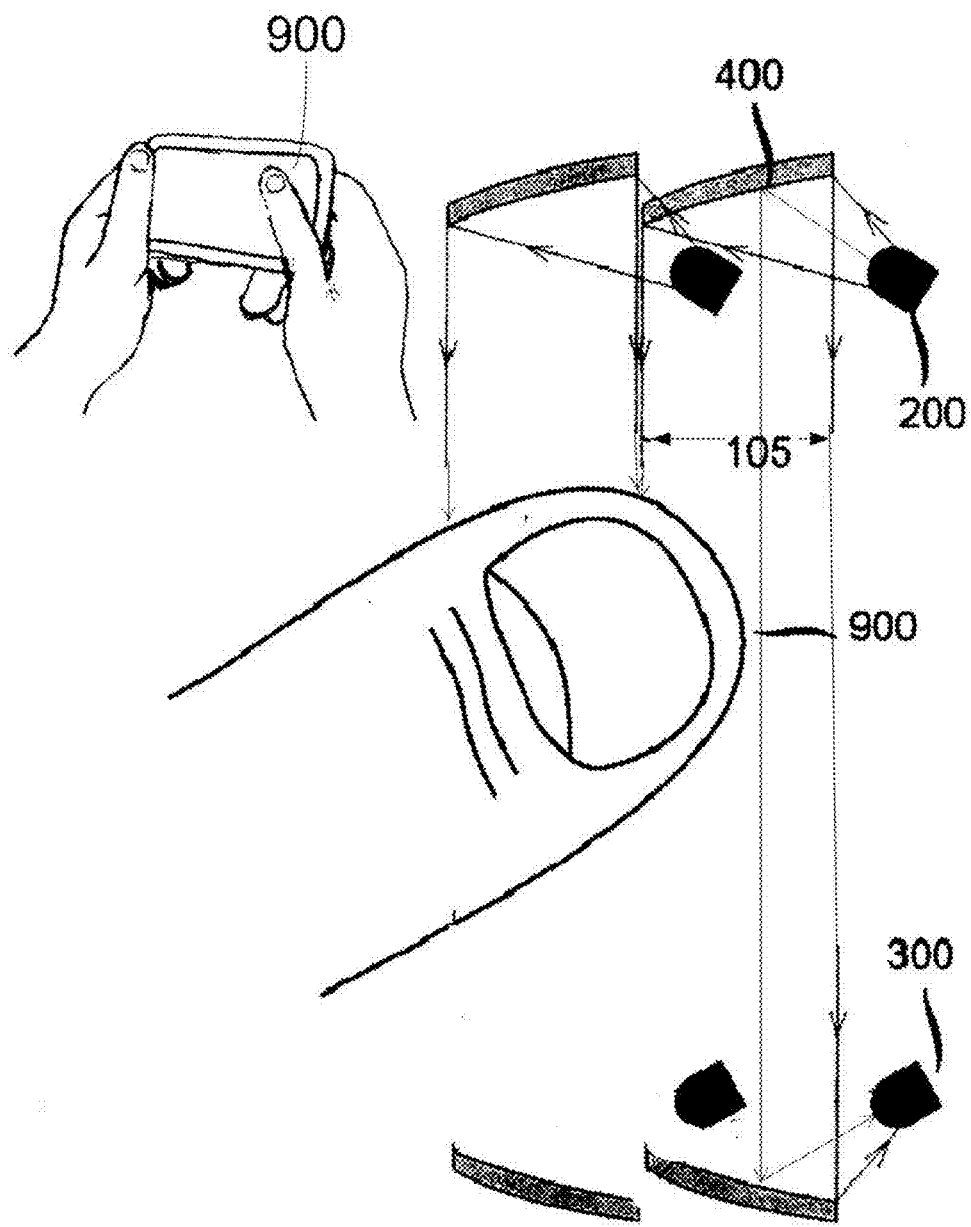
FIG. 19 is a simplified illustration of an arrangement of emitters, receivers and optical elements that enable a touch screen system to determine a precise location of a fingertip touching the screen, in accordance with an embodiment of the present invention.

Reference is made to FIG. 19, which is a simplified illustration of an arrangement of emitters, receivers and optical elements that enable a touch screen system to determine a precise location of a fingertip touching the screen, in accordance with an embodiment of the present invention. Shown in FIG. 19 are a mirror or optical lens 400, an emitter 200, a wide reflected light beam 105, a pointer 900 and a receiver 300. Mirror or optical lens 400 generates a wide light beam that is focused onto receiver 300 by a second mirror or optical lens. The wide beam makes it possible to sense an analog change in the amount of light detected at receiver 300 when a pointer blocks a portion of the wide beam. In some embodiments the mirror or optical lens 400 distributes light at approximately uniform intensity along the width of beam 105. Thus, as a fingertip passes across wide beam 105, it blocks increasing amounts of the beam, and the amount of light blocked is linearly proportional to the width of the blocked portion of the beam. The fingertip is slightly wider than each wide beam, such that the fingertip is detected by at least two adjacent wide beams. The precise location of the finger is determined by interpolating the detection signals in adjacent beams. In systems where wide beam 105 is directed through air over screen 800, pointer 900 in FIG. 19 blocks only a portion of wide beam 105. In systems where beam 105 is directed by total internal reflection through a cover glass placed above screen 800, when pointer 900 touches the cover glass it absorbs and/or scatters a portion of wide beam 105. In addition to enabling precise detection of a fingertip, the wide beam also enables mounting the emitters far apart from one another, and mounting the receivers far apart from one another. Consequently, this reduces the bill of materials by requiring fewer emitters and fewer receivers.

Figure 20:
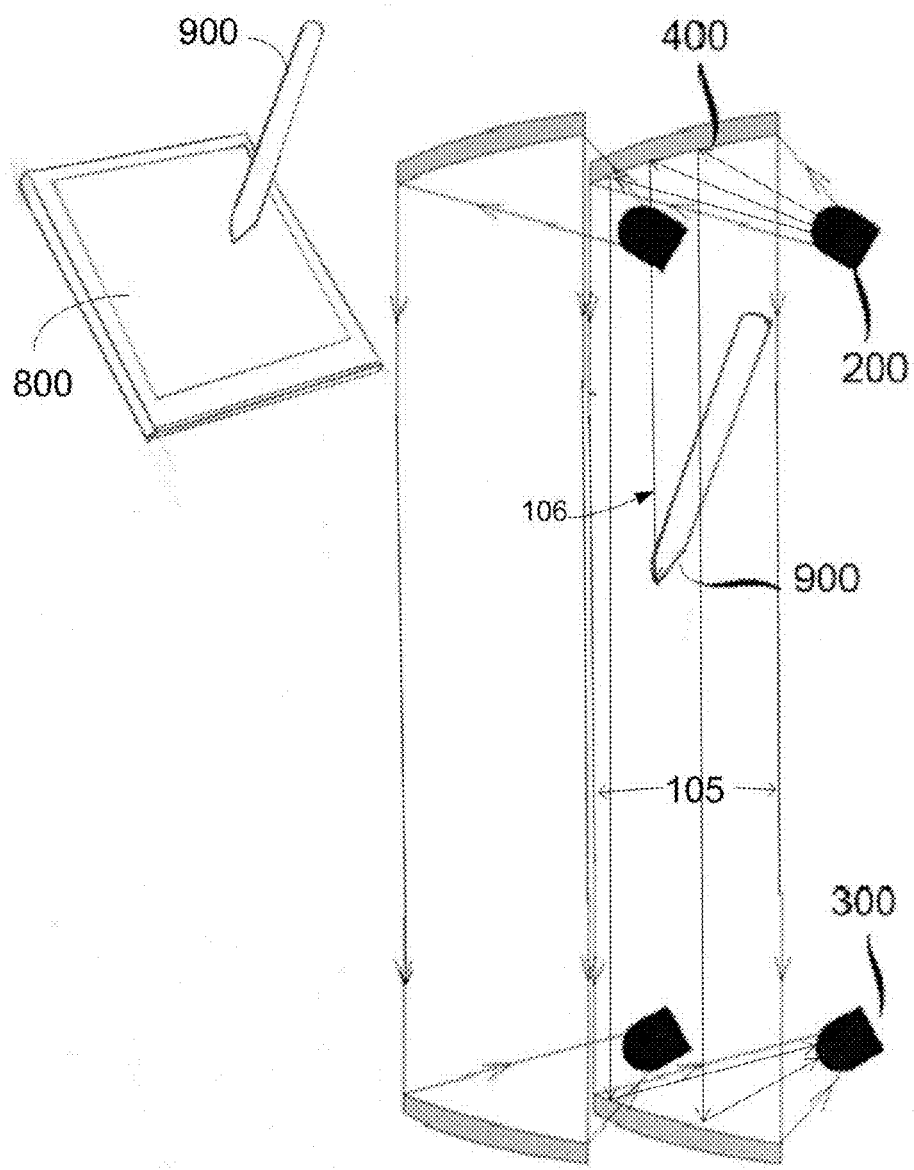
FIG. 20 is a simplified illustration of an arrangement of emitters, receivers and optical elements that enable a touch screen system to detect a pointer that is smaller than the sensor elements, including inter alia a stylus, in accordance with an embodiment of the present invention.

Reference is made to FIG. 20, which is a simplified illustration of an arrangement of emitters, receivers and optical elements that enable a touch screen system to detect a pointer that is smaller than the sensor elements, including inter alia a stylus, in accordance with an embodiment of the present invention. Shown in FIG. 20 are a mirror or optical lens 400, an emitter 200, a wide reflected light beam, 105, a pointer 900 a receiver 300. Mirror or optical lens 400 generates a wide light beam that is focused onto receiver 300 by a second mirror or optical lens. The wide beam enables sensing of an analog change in the amount of light detected at receiver 300 when a pointer 900 blocks a portion of the wide beam, either by directly blocking the beam path when the beam travels through air above the display, or by absorbing a portion of the beam when the beam is guided, by total internal reflection, through a cover glass. A detailed discussion of the absorption using a cover glass is provided below with reference to configuration no. 6. Pointer 900, as shown in FIG. 20, blocks only a portion of wide beam 105, indicated by beam 106 being blocked by the tip of pointer 900. In some embodiments, the mirror or optical lens 400 distributes light at graduating intensities along the width of beam 105, with a weak signal at the edges linearly increasing to a maximum intensity at the center. Thus, as a stylus passes across the wide beam it blocks different amounts of the beam, and the amount of blocked light depends on the location of the stylus within the width of the beam. Such embodiments are described below, with reference to FIGS. 30 and 31, in which beams from two emitter-receiver pairs along one axis overlap and provide two detection signals for the stylus. This enables determination of whether the stylus is in the right half or in the left half of the beam. The wide beam also enables mounting emitters far apart from one another, and mounting receivers far apart from one another. In turn, this reduces the bill of materials by requiring fewer emitters and fewer receivers.

Without the wide beam, there are generally spaces between beams that go undetected, making it impossible to distinguish between a user dragging a fine-point stylus across the beams, and the user tapping on different beams with a fine-point stylus. Moreover, with widely spaced narrow beams the pointer touch must be very precise in order to cross a narrow beam.

Figure 21:
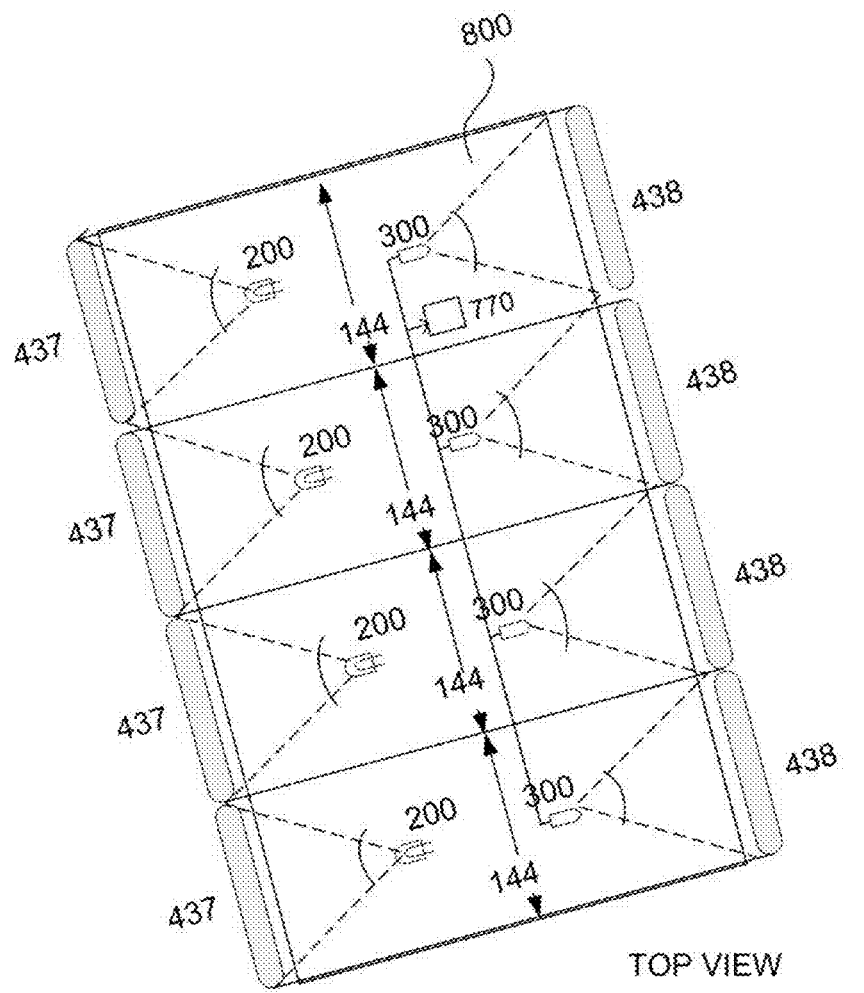
FIG. 21 is a simplified diagram of a touch screen with wide light beams covering the screen, in accordance with an embodiment of the present invention.
Figure 21:
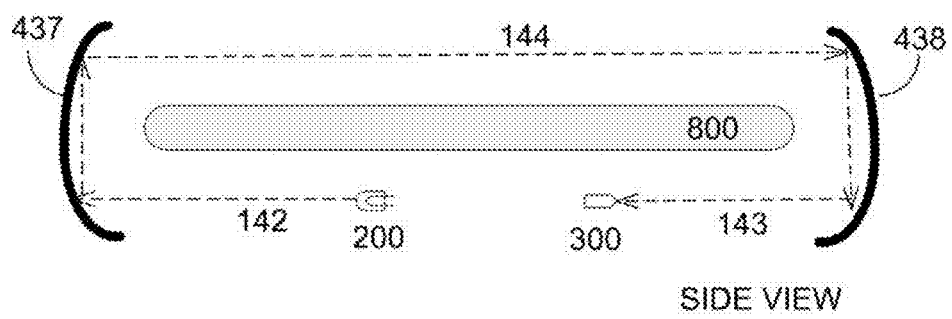

Reference is made to FIG. 21, which is a simplified diagram of a touch screen with wide light beams covering the screen, in accordance with an embodiment of the present invention. Touch screen systems using wide beams are described in applicant's provisional patent application, U.S. Application Ser. No. 61/317,255 filed on Mar. 24, 2010 and entitled OPTICAL TOUCH SCREEN WITH WIDE BEAM TRANSMITTERS AND RECEIVERS, the contents of which are hereby incorporated by reference.

The emitters and receivers shown in FIG. 21 are spaced relatively widely apart. Generally, the emitters are not activated simultaneously. Instead, they are activated one after another, and the coverage areas of their light beams are substantially connected.

FIG. 21 shows a top view and a side view of a touch system having a touch screen or touch surface 800. The touch system provides touch-sensitive functionality to a surface irrespective of whether or not the surface includes a display screen. Moreover, a physical surface is not required; the light beams may be projected though the air, and the location of a pointer in mid-air that breaks the light beams may be detected. In an alternative embodiment, a cover glass is used to guide the light by total internal reflection, and a touch absorbs a portion of the internally reflected light. Absorption using a cover glass is described in detail below with reference to configuration no. 6.

Also shown in FIG. 21 are emitters 200, reflectors 437 and 438, and receivers 300 coupled with a calculating unit 770. Emitters 200 and receivers 300 are positioned beneath screen 800. Emitters 200 project arcs 142 of light under screen 800 onto reflectors 437. The distance between emitters 200 and reflectors 437 is sufficient for an arc to spread into a wide beam at a reflector 437. In various embodiments of the present invention, the distance between emitters 200 and reflectors 437 may be approximately 4 mm, 10 mm, 20 mm or greater, depending on factors including inter alia the widths of the wide beams, the required touch resolution, the emitter characteristics and the optical reflector characteristics.

Reflectors 437 collimate the light as wide beams 144 across a swath of screen surface. As explained above, in systems intended for finger touch, it is of advantage to distribute light uniformly across the width of the beam, whereas in systems intended for stylus touch it is of advantage to distribute light at different intensities across the width of the beam. Nevertheless, systems that distribute light at different intensities along the width of the beam may precisely determine the location of a finger touch based on the portion of the beam that is blocked, if the intensity distribution across the beam is known. A wide beam 144 reaches a reflector 438, which (i) redirects the light beam below screen 800, and (ii) narrows the wide beam 144 into an arc 143. As such, wide beam 144 converges onto the surface of one of receivers 300 below the surface of screen 800. The light intensity detected by each of receivers 300 is communicated to calculating unit 770.

The configuration of FIG. 21 is of advantage in that the wide light beams cover the entire screen surface, thereby enabling touch sensitive functionality anywhere on the screen. Additionally, the cost of materials for the touch screen is reduced, since relatively few emitter and receiver components are required.

Touch Screen System Configuration No. 2

Configurations 2-6 use multiple emitter-receiver pairs to precisely identify a touch position. In some of the configurations described hereinabove there are opposing rows of emitters and receivers, each emitter being opposite a respective receiver. In configurations 2 and 3 the emitters are shift-aligned with the receivers. For example, each emitter may be positioned opposite a midpoint between two opposing receivers. Alternatively, each emitter may be off-axis aligned with an opposite receiver, but not opposite the midpoint between two receivers.

Embodiments of the present invention employ two types of collimating lenses; namely, (i) conventional collimating lenses, and (ii) collimating lenses coupled with a surface of micro-lenses that refract light to form multiple wide divergent beams. When a light source is positioned at the focus of a conventional collimating lens, the lens outputs light in substantially parallel beams, as illustrated inter alia in FIGS. 19-21. When a light source is positioned between a conventional collimating lens and its focus, the lens outputs a wide beam, the outer edges of which are not parallel to each other, as illustrated inter alia in FIGS. 27-30.

Figure 22:
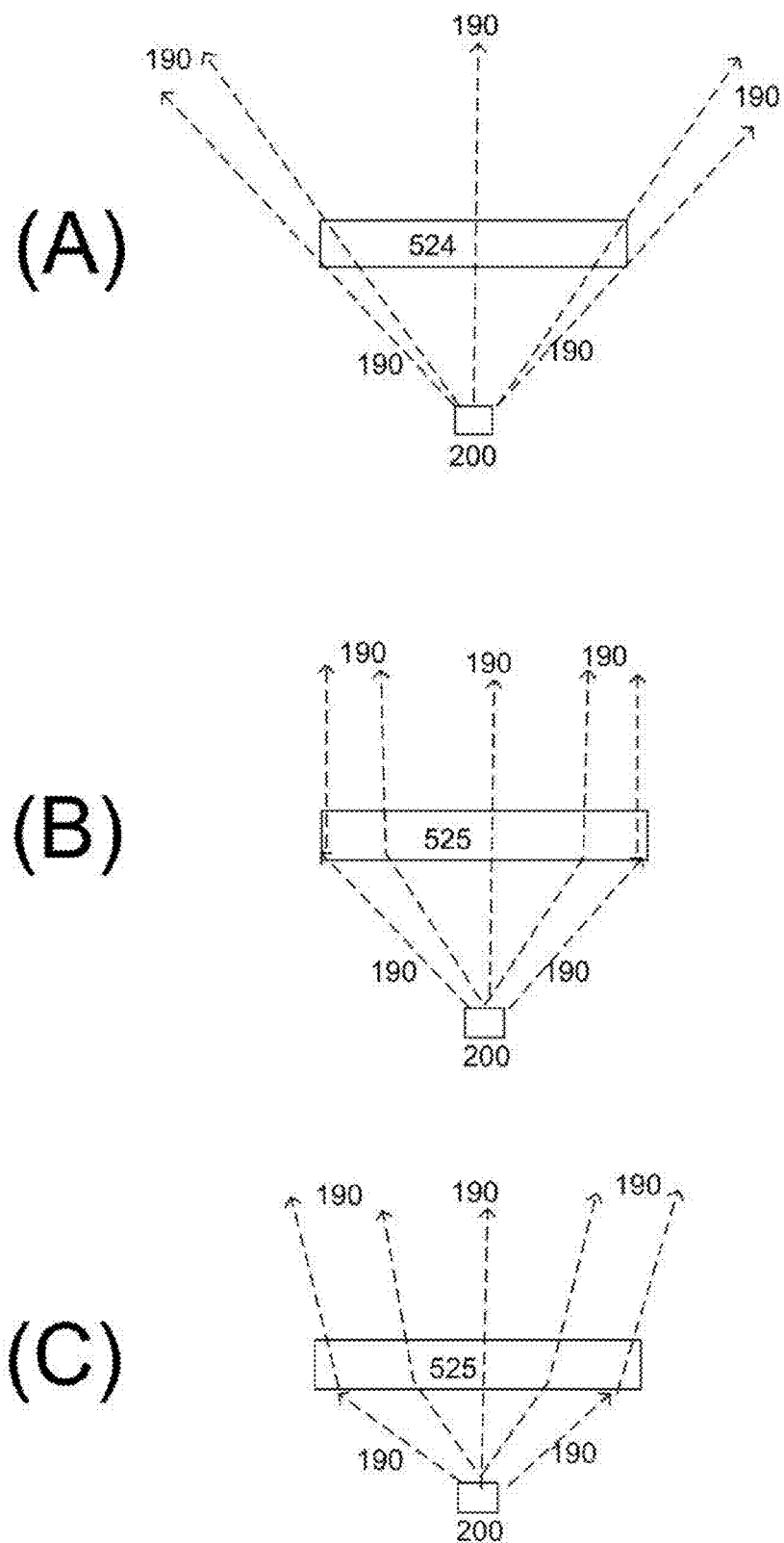
FIG. 22 is a simplified illustration of a collimating lens, in accordance with an embodiment of the present invention.

Reference is made to FIG. 22, which is a simplified illustration of a collimating lens in cooperation with a light emitter, in accordance with an embodiment of the present invention. Shown in FIG. 22 is (A) a light emitter 200 transmitting light beams 190 through a flat clear glass 524. Beams 190 are unaltered by the glass.

Also shown in FIG. 22 is (B) an emitter positioned at the focus of a collimating lens 525. Beams 190 are collimated by lens 525.

Also shown in FIG. 22 is (C) an emitter 200 positioned between collimating lens 525 and the lens' focus. Beams 190 are partially collimated by lens 525; i.e., the output wide beams are not completely parallel.

Figure 23:
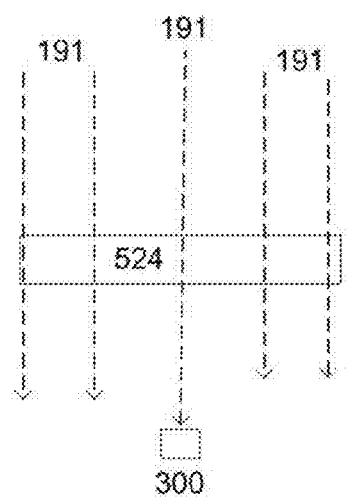
FIG. 23 is a simplified illustration of a collimating lens in cooperation with a light receiver, in accordance with an embodiment of the present invention.
Figure 23:
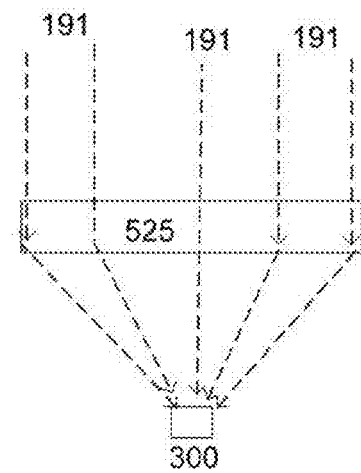
Figure 23:
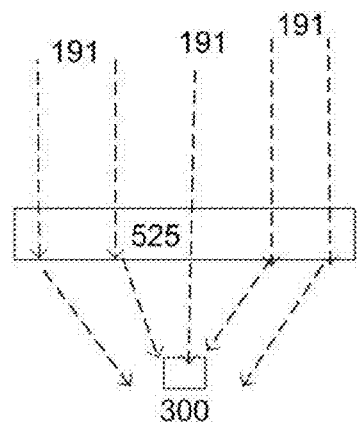

Reference is made to FIG. 23, which is a simplified illustration of a collimating lens in cooperation with a light receiver, in accordance with an embodiment of the present invention. Shown in FIG. 23 is (A) substantially parallel light beams 191 transmitted through a flat clear glass 524. Beams 191 are unaltered by the glass.

Also shown in FIG. 23 is (B) a receiver 300 positioned at the focus of collimating lens 525. Beams 191 are refracted onto receiver 300 by collimating lens 525.

Also shown in FIG. 23 is (C) a receiver 300 positioned between collimating lens 525 and the lens' focus. Beams 191 are collimated by lens 525, but because receiver 300 is not at the lens focus, the beams do not converge thereon.

Figure 37:
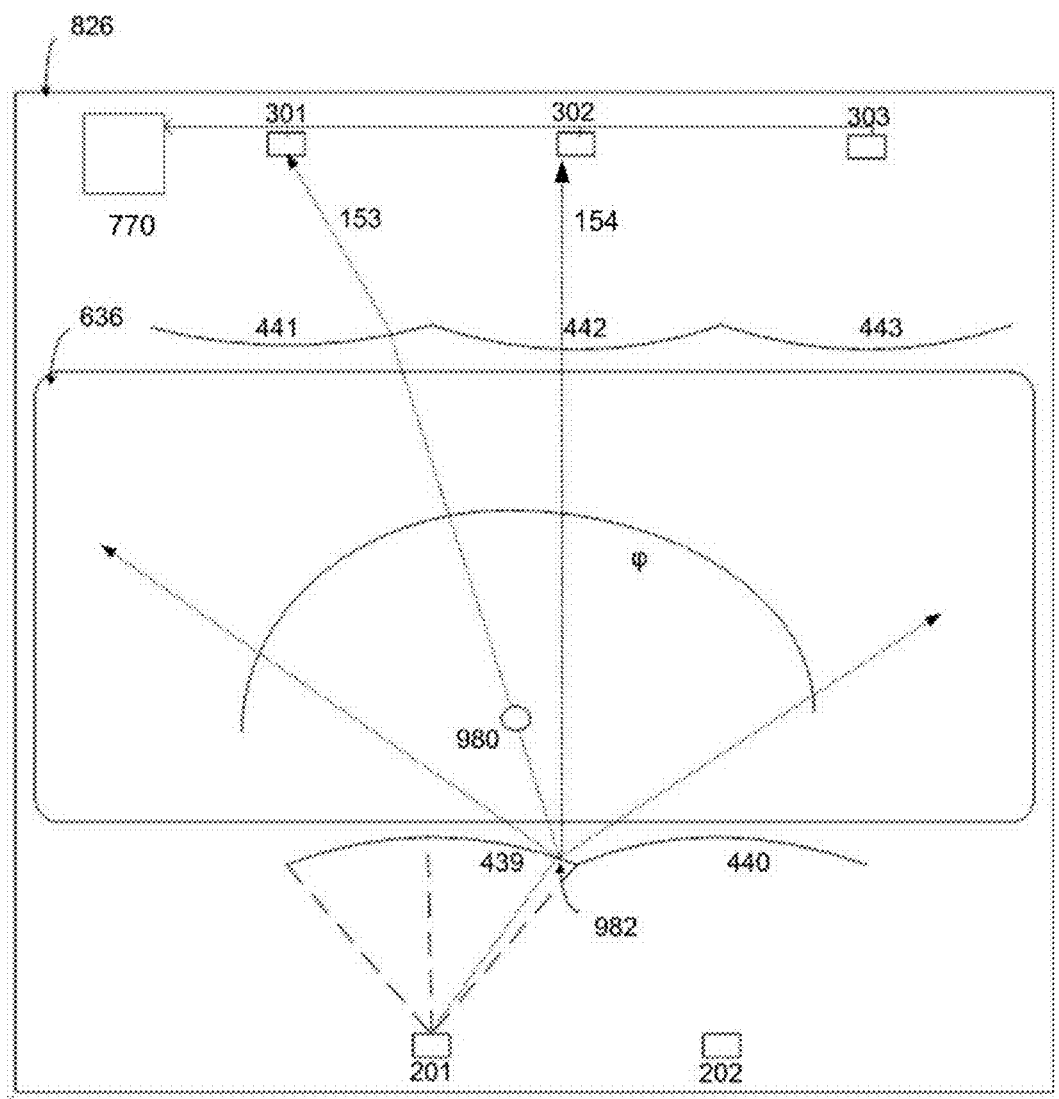
FIG. 37 is a simplified diagram of a wide beam touch screen, with emitter and receiver lenses that have micro-lens patterns, in accordance with an embodiment of the present invention.
Figure 38:
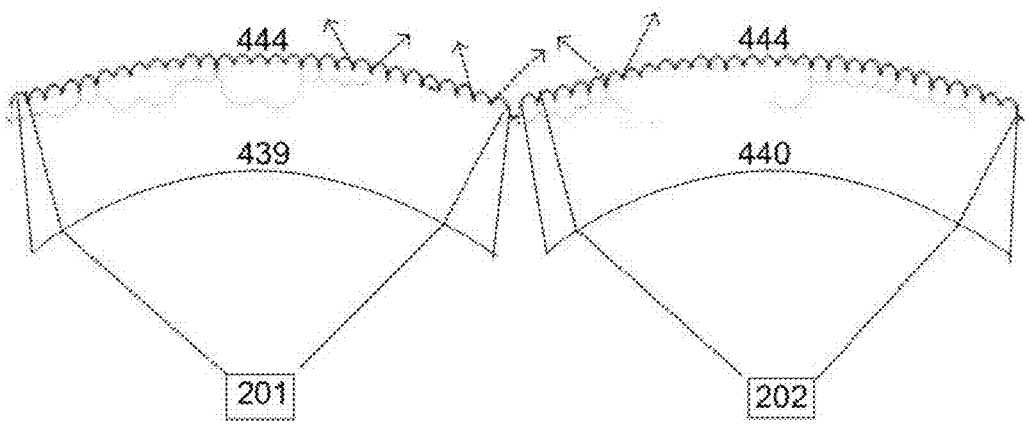
FIG. 38 is a simplified diagram of two emitters with lenses that have micro-lens patterns integrated therein, in accordance with an embodiment of the present invention.
Figure 39:
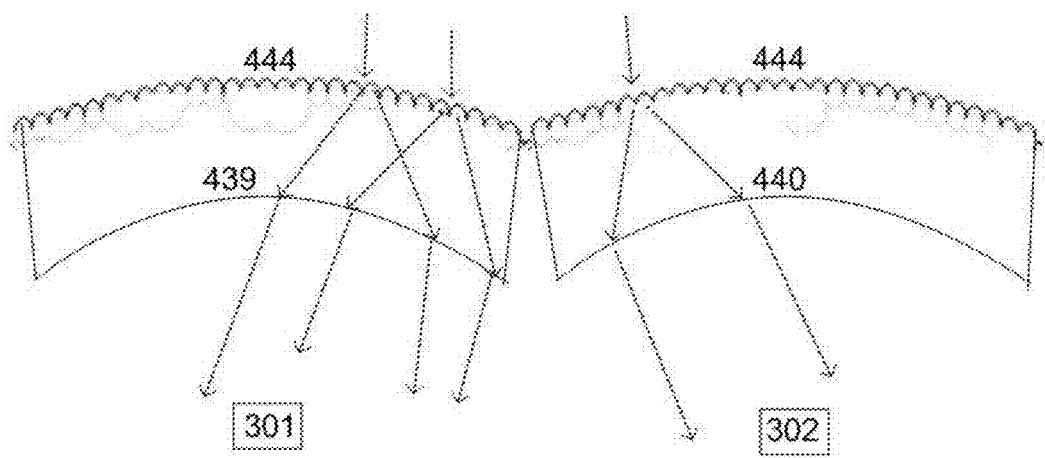
FIG. 39 is a simplified diagram of two receivers with lenses that have micro-lens patterns integrated therein, in accordance with an embodiment of the present invention.

Collimating lenses coupled with an outer surface of micro-lenses, which face away from emitters or receivers, transmit light in two stages. As light passes through the bodies of the lenses, light beams are collimated as with conventional collimating lenses. However, as the light passes through the surface of micro-lenses, the light is refracted into multiple wide divergent beams, as illustrated inter alia in FIGS. 34, 35 and 37-39. In FIGS. 38 and 39, collimating lenses 439 and 440 are shown having micro-lens surfaces 444. In FIG. 38, light emitters 201 and 202 are positioned within the focal distance of collimating lenses 439 and 440, and wide light beams from the emitters are shown entering lenses 439 and 440. Light is collimated as it passes through the lens, as with conventional collimating lenses. When the collimated light passes through micro-lens surface 444, it is refracted into multiple wide divergent beams, three of which are illustrated in FIG. 38. In FIG. 39, light receivers 301 and 302 are positioned within the focal distance of the collimating lenses, and light beams are shown entering lenses 439 and 440 through micro-lens surface 444. The incoming beams are refracted into wide divergent beams inside the lens bodies. The refracted beams are directed by the collimating portions of lenses 439 and 440, which concentrate the beams onto light receivers 301 and 302.

Figure 24:
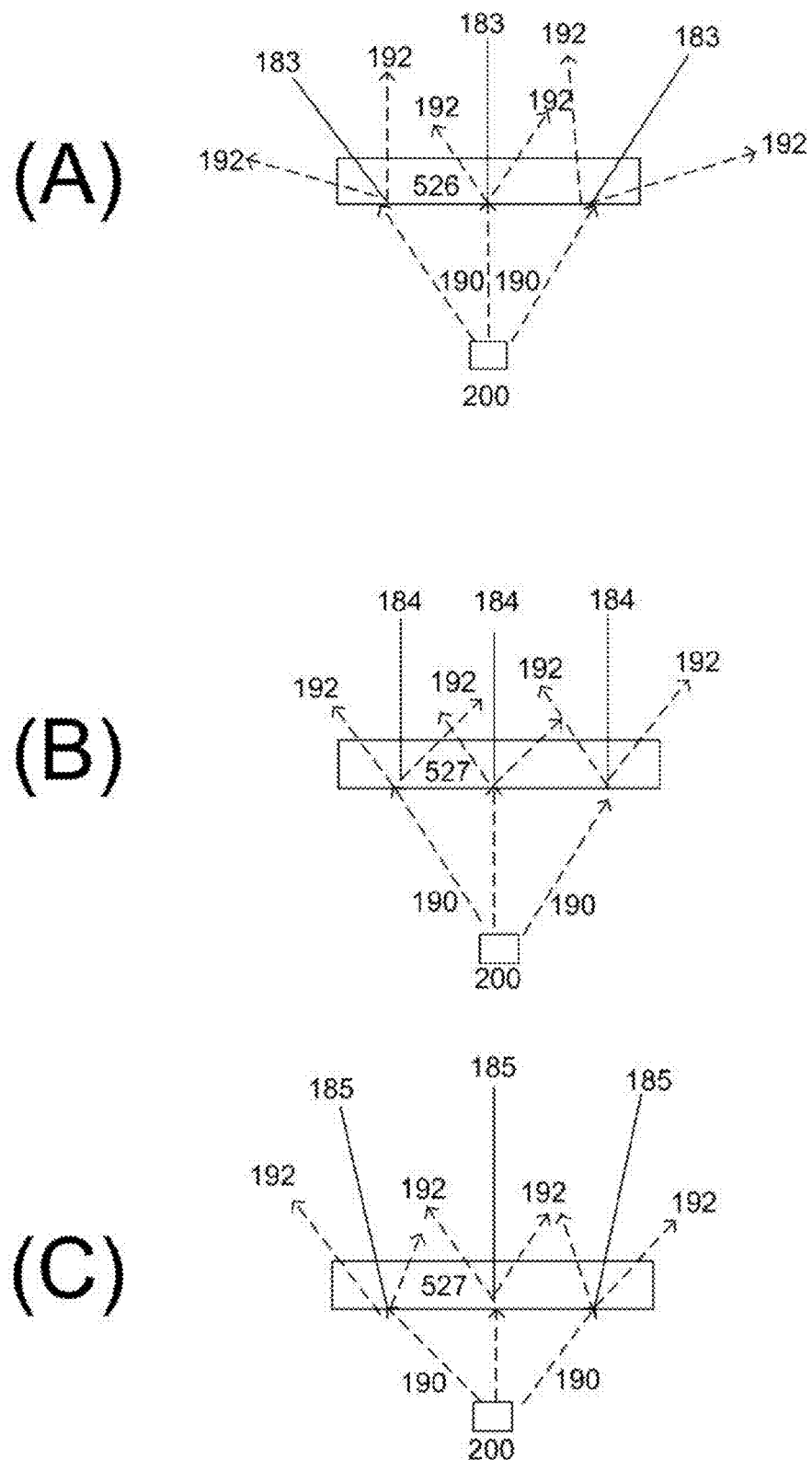
FIG. 24 is a simplified illustration of a collimating lens having a surface of micro-lenses facing an emitter, in accordance with an embodiment of the present invention.

Reference is made to FIG. 24, which is a simplified illustration of a collimating lens having a surface of micro-lenses facing an emitter, in accordance with an embodiment of the present invention. FIG. 24 shows (A) a flat glass 526 having micro-lenses etched on a surface facing an emitter 200. Light beams 190 enter glass 526 at various angles. At each entry point, a micro-lens refracts an incoming beam into a wide arc 192. Lines 183 show how the middle of each arc is oriented in a different direction, depending on the angle of approach of the beam into glass 526.

FIG. 24 also shows (B) a collimating lens 527 having micro-lenses etched on a surface facing an emitter 200. A focus point of the lens, without the micro-lenses, is determined, and emitter 200 is positioned at that point. Light beams 190 enter collimating lens 527 at various angles. At each entry point, a micro-lens refracts the incoming beams into a wide arc 192. Lines 184 show how the middle of each arc is oriented in the same direction, irrespective of the angle of approach of the beams into collimating lens 527. This type of lens is referred to as a "mufti-directional collimating lens", because it outputs arcs of light, not parallel beams, but all of the arcs are substantially uniformly directed.

FIG. 24 also shows (C) the same collimating lens 527, but with emitter 200 positioned between the lens and the focus point. The output arcs 192 are oriented in directions between those of the arcs of (A) and the arcs of (B), indicated by lines 185.

Figure 25:
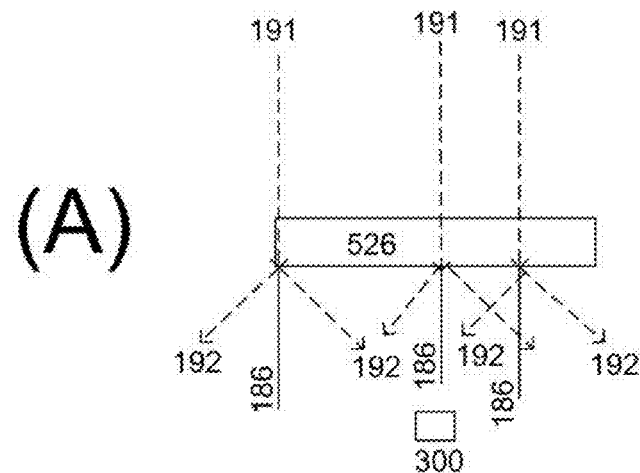
FIG. 25 is a simplified illustration of a collimating lens having a surface of micro-lenses facing a receiver, in accordance with an embodiment of the present invention.
Figure 25:
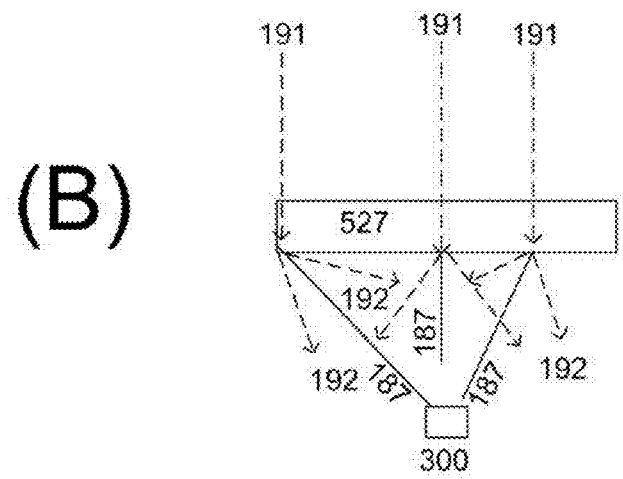
Figure 25:
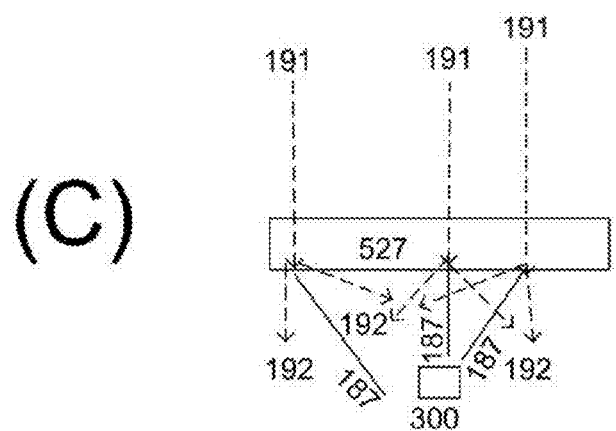

Reference is made to FIG. 25, which is a simplified illustration of a collimating lens having a surface of micro-lenses facing a receiver, in accordance with an embodiment of the present invention. FIG. 25 shows (A) a flat glass 526 having micro-lenses etched on a surface facing a receiver 300. Light beams 191 are shown entering glass 526 as parallel beams. At each exit point, a micro-lens refracts a beam into a wide arc 192. Lines 186 show how the middle of each arc is oriented in the same direction. The arcs do not converge on receiver 300.

FIG. 25 also shows (B) a mufti-directional collimating lens 527 having micro-lenses etched on a surface facing receiver 300. A focus point of the lens, without the micro-lenses, is determined, and receiver 300 is positioned at that point. Light beams 191 enter lens 527 as substantially parallel beams. At each exit point, a micro-lens refracts an incoming beam into a wide arc 192. Lines 187 show how the middle of each arc is oriented towards receiver 300.

FIG. 25 also shows (C) the same lens 527, but with receiver 300 positioned between the lens and the focus point.

As used through the present specification, the term "collimating lens" includes a mufti-directional collimating lens.

Figure 26:
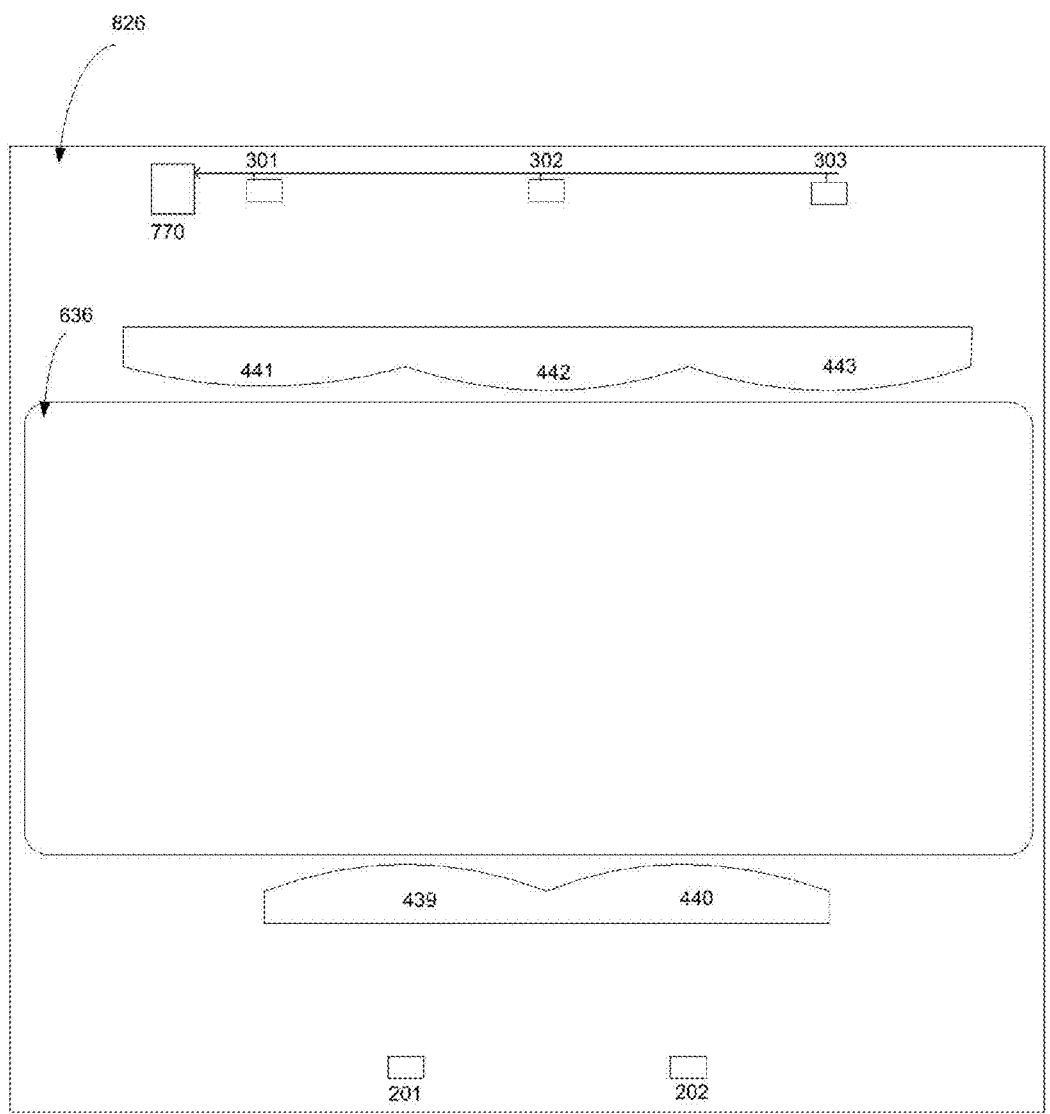
FIG. 26 is a simplified diagram of an electronic device with a wide-beam touch screen, in accordance with an embodiment of the present invention.

Reference is made to FIG. 26, which is a simplified diagram of an electronic device with a wide-beam touch screen, in accordance with an embodiment of the present invention. Shown in FIG. 26 is an electronic device 826 with two emitters, 201 and 202, and three receivers, 301, 302 and 303, the emitters and receivers being placed along opposite edges of a display 636. Light intensities detected at each of receivers 301, 302 and 303, are communicated to a calculating unit 770. Each emitter and receiver uses a respective primary lens, labeled respectively 441, 442, 443, 439 and 440. Emitters and receivers use the same lens arrangement, to ensure that light emitted by an emitter and re-directed by an emitter lens, is reverse-directed by an opposing lens onto a receiver.

It is desirable that the light beam from each emitter covers its two opposite receiver lenses. Such a condition is achieved by positioning each emitter between its lens and its lens' focal point. As such, the emitter is not in focus and, as a result, its light is spread, instead of being collimated, by its lens. Each receiver is similarly positioned between its lens and its lens' focal point.

Figure 27:
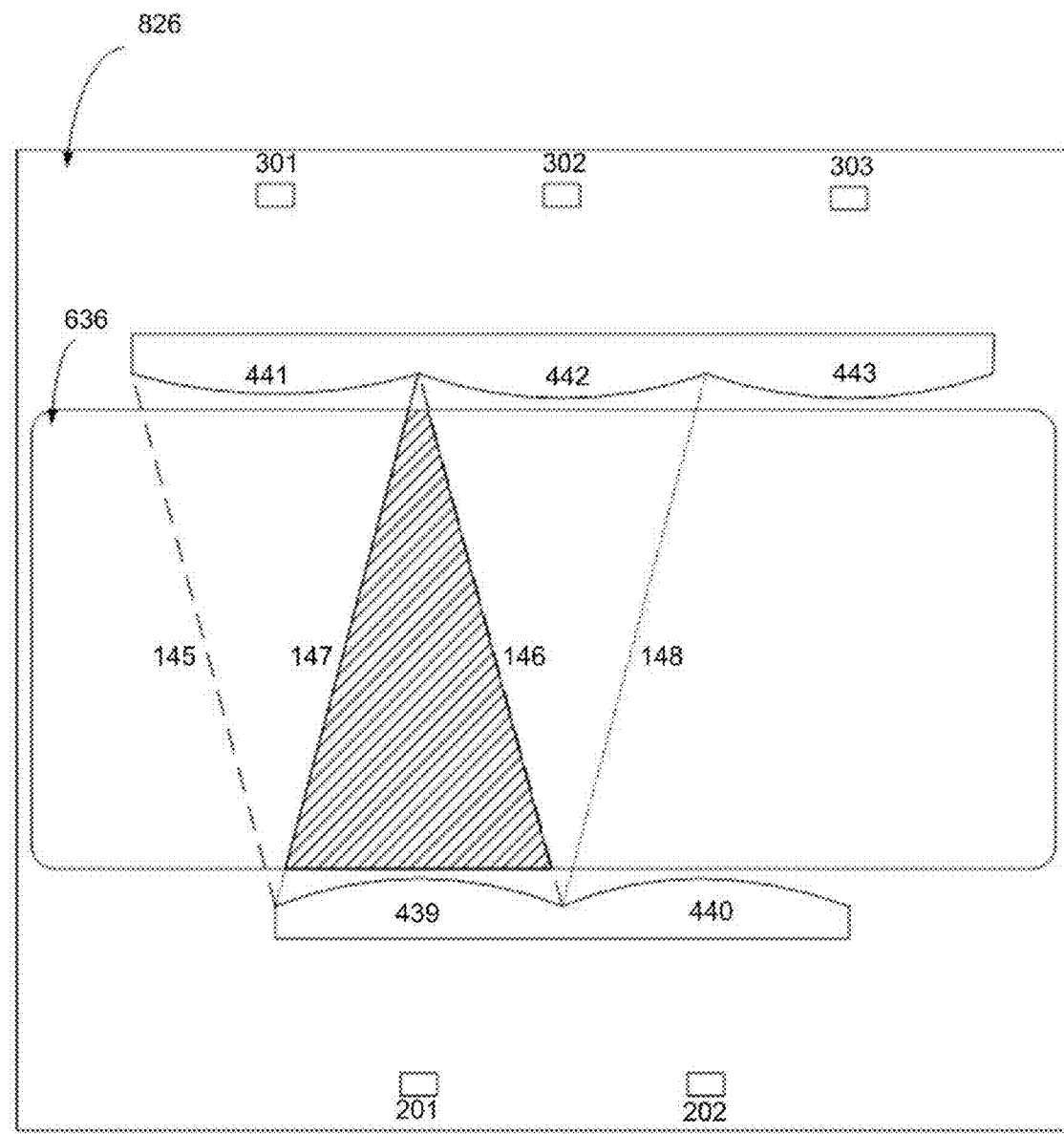
FIG. 27 is a diagram of the electronic device of FIG. 26, depicting overlapping light beams from one emitter detected by two receivers, in accordance with an embodiment of the present invention.

Reference is made to FIG. 27, which is a diagram of electronic device 826 of FIG. 26, depicting overlapping light beams from one emitter detected by two receivers, in accordance with an embodiment of the present invention. Shown in FIG. 27 are two wide light beams from emitter 201, one of which is detected at receiver 301 and another of which is detected at receiver 302, respectively. The left and right sides of the one beam are marked 145 and 146, respectively, and the left and right sides of the other beam are marked 147 and 148, respectively. The shaded area in FIG. 27 indicates the area on display 636 at which a touch blocks a portion of both wide beams. As such, a touch in this area is detected by two emitter-receiver pairs; namely, 201-301 and 201-302. The touch blocks a portion of both wide beams, either by directly blocking the beam path when the beam travels through air above the display, or by absorbing a portion of the beam if guided by total internal reflection through a cover glass. Absorption using a cover glass is described in detail below with reference to configuration no. 7.

Figure 28:
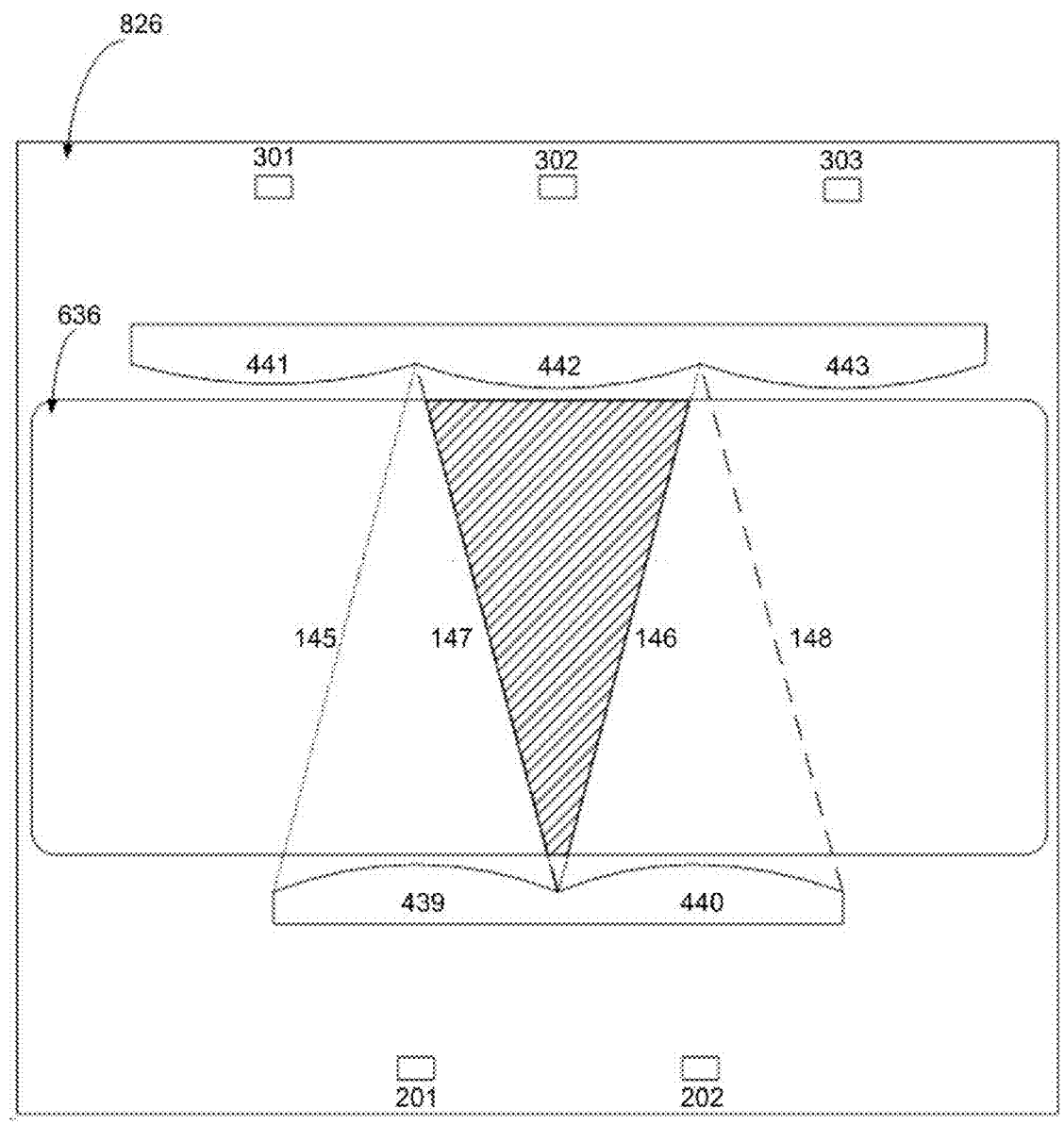
FIG. 28 is a diagram of the electronic device of FIG. 26, depicting overlapping light beams from two emitters detected by one receiver, in accordance with an embodiment of the present invention.

Reference is made to FIG. 28, which is a diagram of electronic device 826 of FIG. 26, depicting overlapping light beams from two emitters detected by one receiver, in accordance with an embodiment of the present invention. Shown in FIG. 28 are wide beams, one from emitter 201 and another from emitter 202, that are both detected at receiver 302. The left and right sides of the one beam are marked 145 and 146, respectively, and the left and right sides of the other beam are marked 147 and 148, respectively. The shaded area in FIG. 28 indicates the area on display 636 at which a touch blocks a portion of both wide beams. As such, a touch in this area is detected by two emitter-receiver pairs; namely, 201-302 and 202-302.

Figure 29:
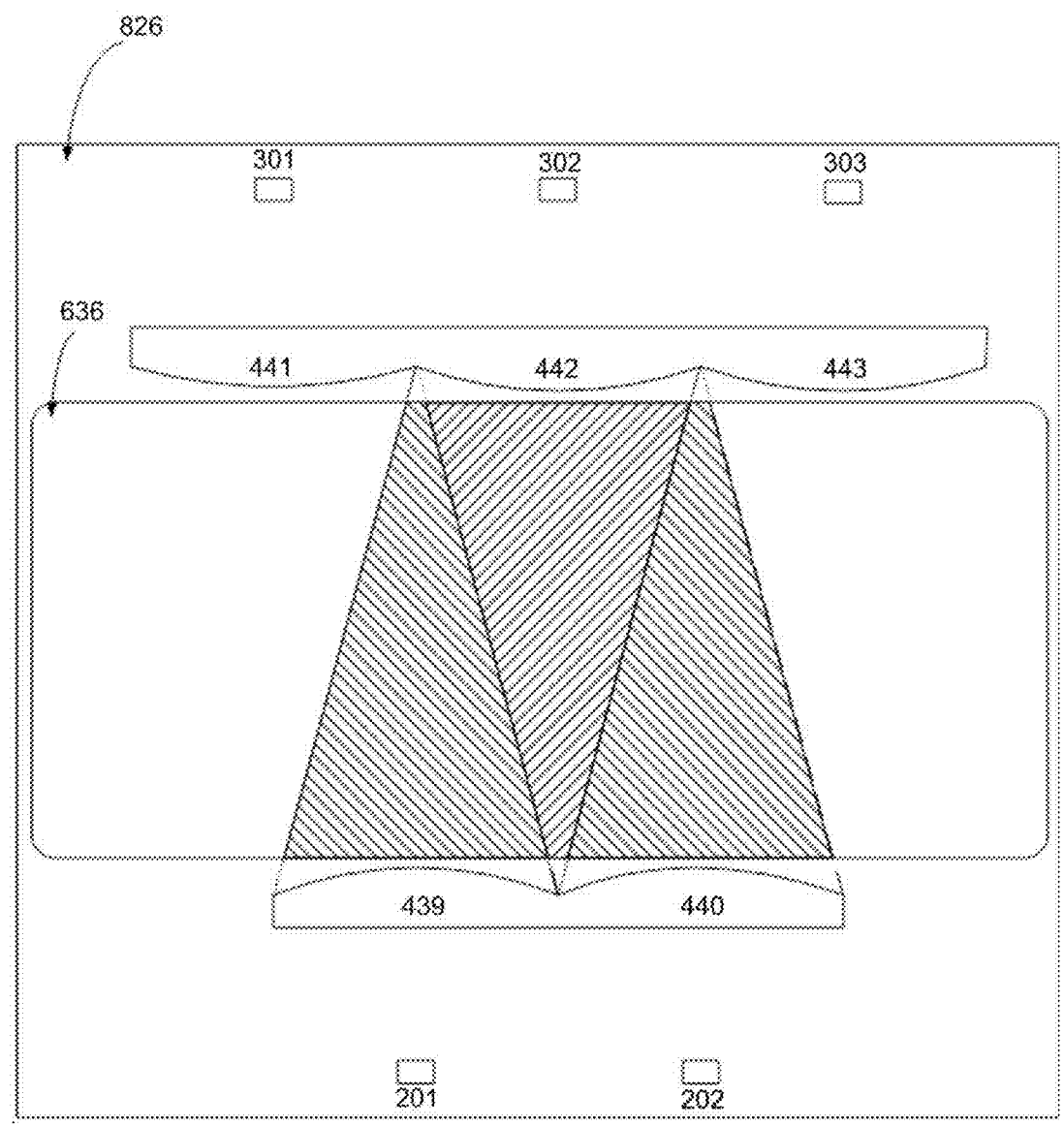
FIG. 29 is a diagram of the electronic device of FIG. 26, showing that points on the screen are detected by at least two emitter-receiver pairs, in accordance with an embodiment of the present invention.

Reference is now made to FIG. 29, which is a diagram of the electronic device 826 of FIG. 26, showing that points on the screen are detected by at least two emitter-receiver pairs, in accordance with an embodiment of the present invention. FIG. 29 shows the wide beams of FIGS. 27 and 28, and illustrates that touches in the shaded wedges on display 636 are detected by at least two emitter-receiver pairs. The two emitter-receiver pairs are either one emitter with two receivers, as in FIG. 27, or two emitters with one receiver, as in FIG. 28. More specifically, touches that occur near the row of emitters are generally detected by the former, and touches that occur near the row of detectors are generally detected by the latter. By surrounding the screen with similarly arranged emitters, lenses and receivers, any point may be similarly detected by two emitter-receiver pairs.

Figure 30:
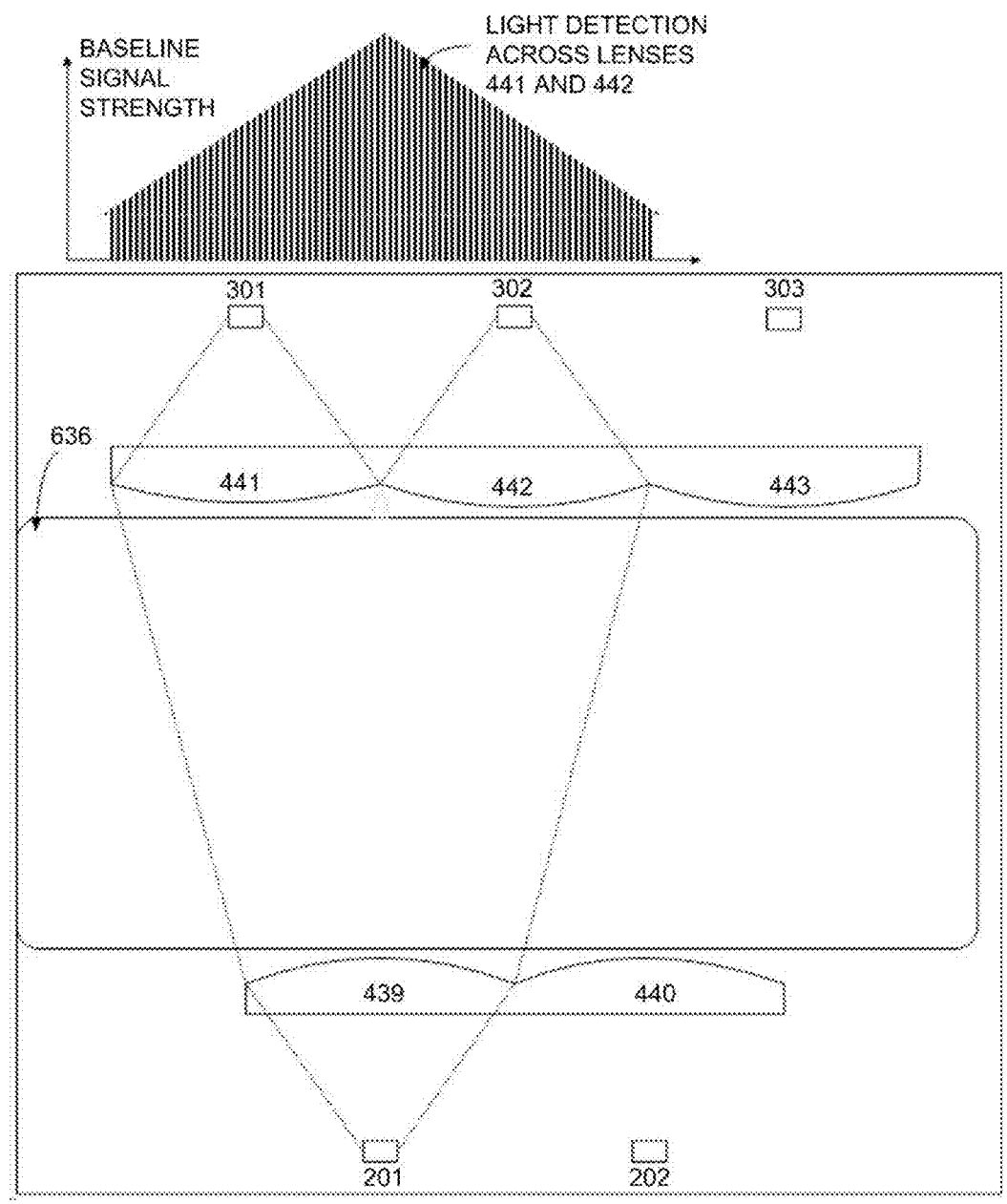
FIG. 30 is a simplified diagram of a wide-beam touch screen, showing an intensity distribution of a light signal, in accordance with an embodiment of the present invention.

Reference is made to FIG. 30, which is a simplified diagram of a wide-beam touch screen, showing an intensity distribution of a light signal, in accordance with an embodiment of the present invention. Shown in FIG. 30 is a wide angle light beam emitted by emitter 201 into lens 439. The light beam crosses over display 636 and substantially spans lenses 441 and 442. The light is detected at receivers 301 and 302.

Shown in FIG. 30 is a graph of detected light intensity. Total detected light corresponds to a shaded area under the graph. An object touching the screen blocks a portion of this light. If the object touching the screen moves across the wide beam, from left to right, the amount of blocked light increases, and correspondingly the total detected light decreases, as the object progresses from the left edge of the beam to the center of the beam. Similarly, the amount of blocked light decreases, correspondingly the total detected light increases, as the object progresses from the center of the beam to the right edge of the beam.

It is noted that the detected light intensities at the edges of the light beam are strictly positive, thus ensuring that a touch at these edges is detected.

Figure 31:
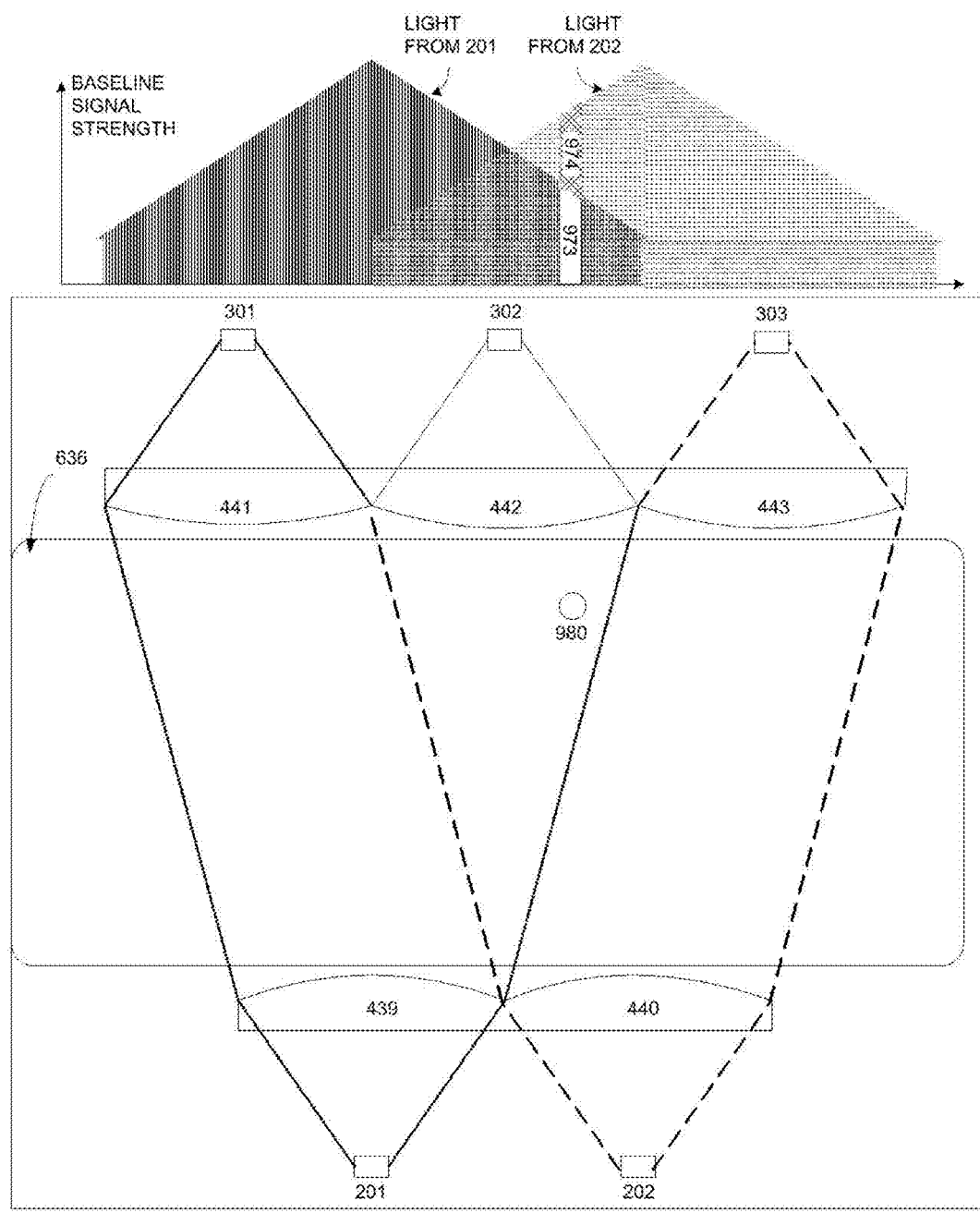
FIG. 31 is a simplified diagram of a wide-beam touch screen, showing intensity distributions of overlapping light signals from two emitters, in accordance with an embodiment of the present invention.

Reference is made to FIG. 31, which is a simplified diagram of a wide-beam touch screen, showing intensity distributions of overlapping light signals from two emitters, in accordance with an embodiment of the present invention. FIG. 31 shows light detected from emitters 201 and 202. A touch point 980 on display 636 blocks light from these emitters differently. Area 973 indicates attenuation of light from emitter 201 by touch point 980, and the union of areas 973 and 974 corresponds to the attenuation of light from emitter 202 by point 980. By comparing the light attenuation the two emitter-receiver pairs, 201-302 and 202-302, a precise touch coordinate is determined.

Figure 32:
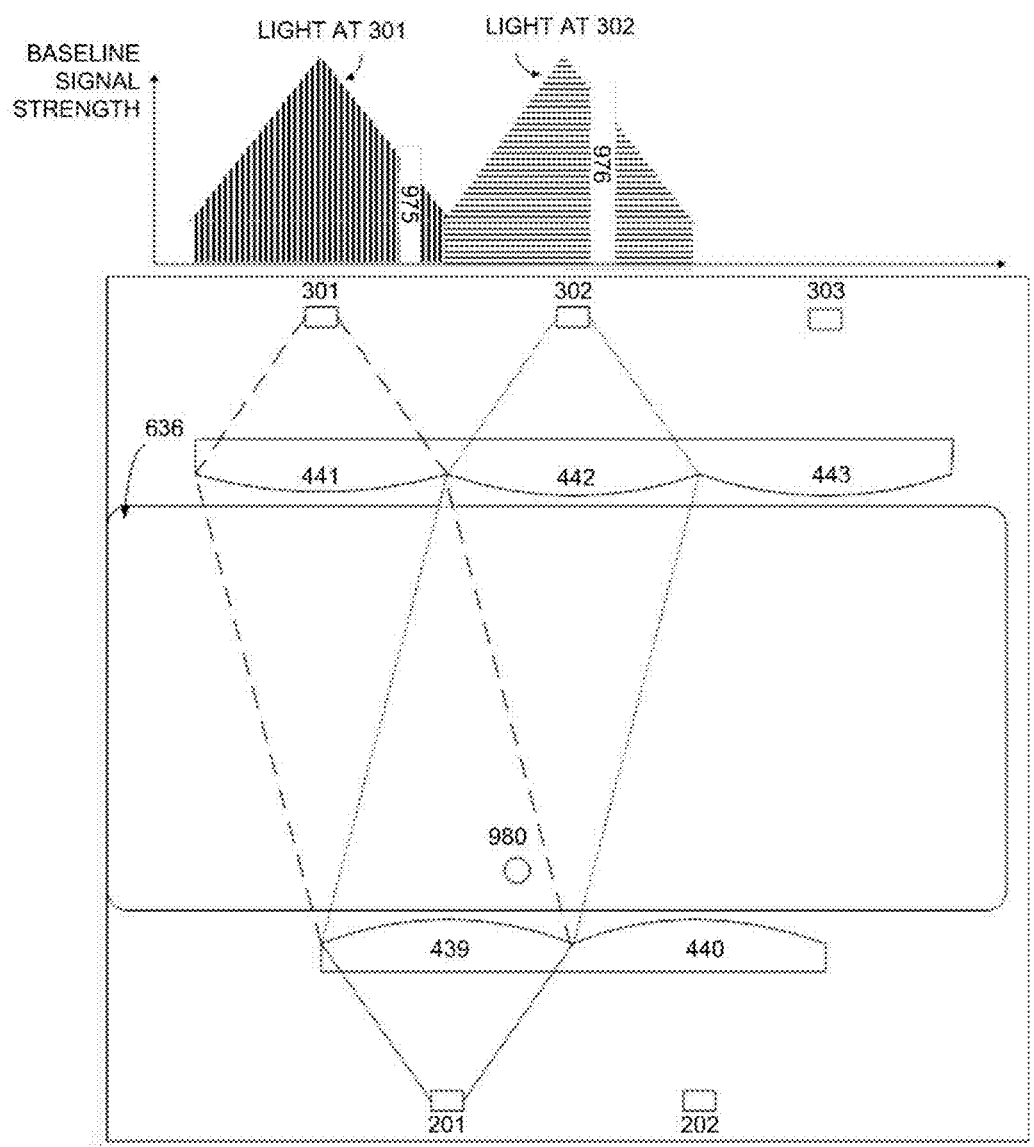
FIG. 32 is a simplified diagram of a wide-beam touch screen, showing intensity distributions of two sets of overlapping light signals from one emitter, in accordance with an embodiment of the present invention.

Reference is made to FIG. 32, which is a simplified diagram of a wide-beam touch screen, showing intensity distributions of two sets of overlapping light signals from one emitter, in accordance with an embodiment of the present invention. As shown in FIG. 32, touch point 980 is inside the area detected by emitter-receiver pair 201-301 and emitter-receiver pair 201-302. The attenuation of the light signal at receiver 302, depicted as area 976, is greater than the attenuation at receiver 301, depicted as area 975. By comparing the light attenuation in the two emitter-receiver pairs, 201-301 and 201-302, a precise touch coordinate is determined.

Determining the position of touch point 980 requires determining a position along an axis parallel to the edge along which the emitters are positioned, say, the x-axis, and along an axis perpendicular to the edge, say, the y-axis. In accordance with an embodiment of the present invention, an approximate y-coordinate is first determined and then, based on the expected attenuation values for a point having the thus determined y-coordinate and based on the actual attenuation values, a precise x-coordinate is determined. In turn, the x-coordinate thus determined is used to determine a precise y-coordinate. In cases where the touch point 980 is already touching the screen, either stationary or in motion, previous x and y coordinates of the touch point are used as approximations to subsequent x and y coordinates. Alternatively, only one previous coordinate is used to calculate a first subsequent coordinate, with the second subsequent coordinate being calculated based on the first subsequent coordinate. Alternatively, previous coordinates are not used.

Figure 33:
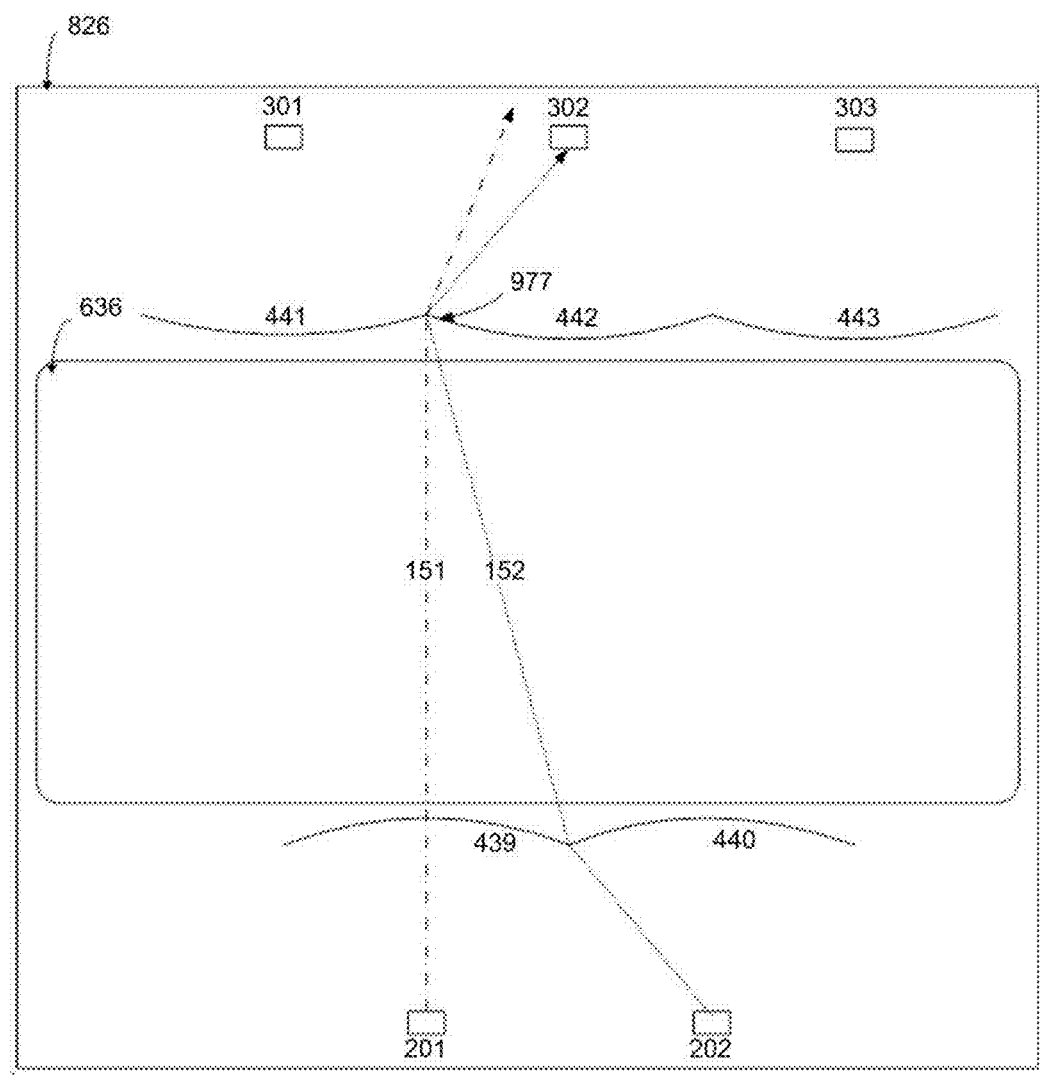
FIG. 33 is a simplified diagram of a wide beam touch screen with emitter and receiver lenses that do not have micro-lens patterns, in accordance with an embodiment of the present invention.

Reference is made to FIG. 33, which is a simplified diagram of a wide-beam touch screen with emitter and receiver lenses that do not have micro-lens patterns, in accordance with an embodiment of the present invention. Shown in FIG. 33 is an electronic device 826 with a display 636, emitters 201 and 202, corresponding emitter lenses 439 and 440, receivers 301, 302 and 303, and corresponding receiver lenses 441, 442 and 443. Two light beams, 151 and 152, from respective emitters 201 and 202, arrive at a point 977 that is located at an outer edge of lens 442. Since beams 151 and 152 approach point 977 at different angles of incidence, they do not converge on receiver 302. Specifically, light beam 152 arrives at receiver 302, and light beam 151 does not arrive at receiver 302.

Figure 34:
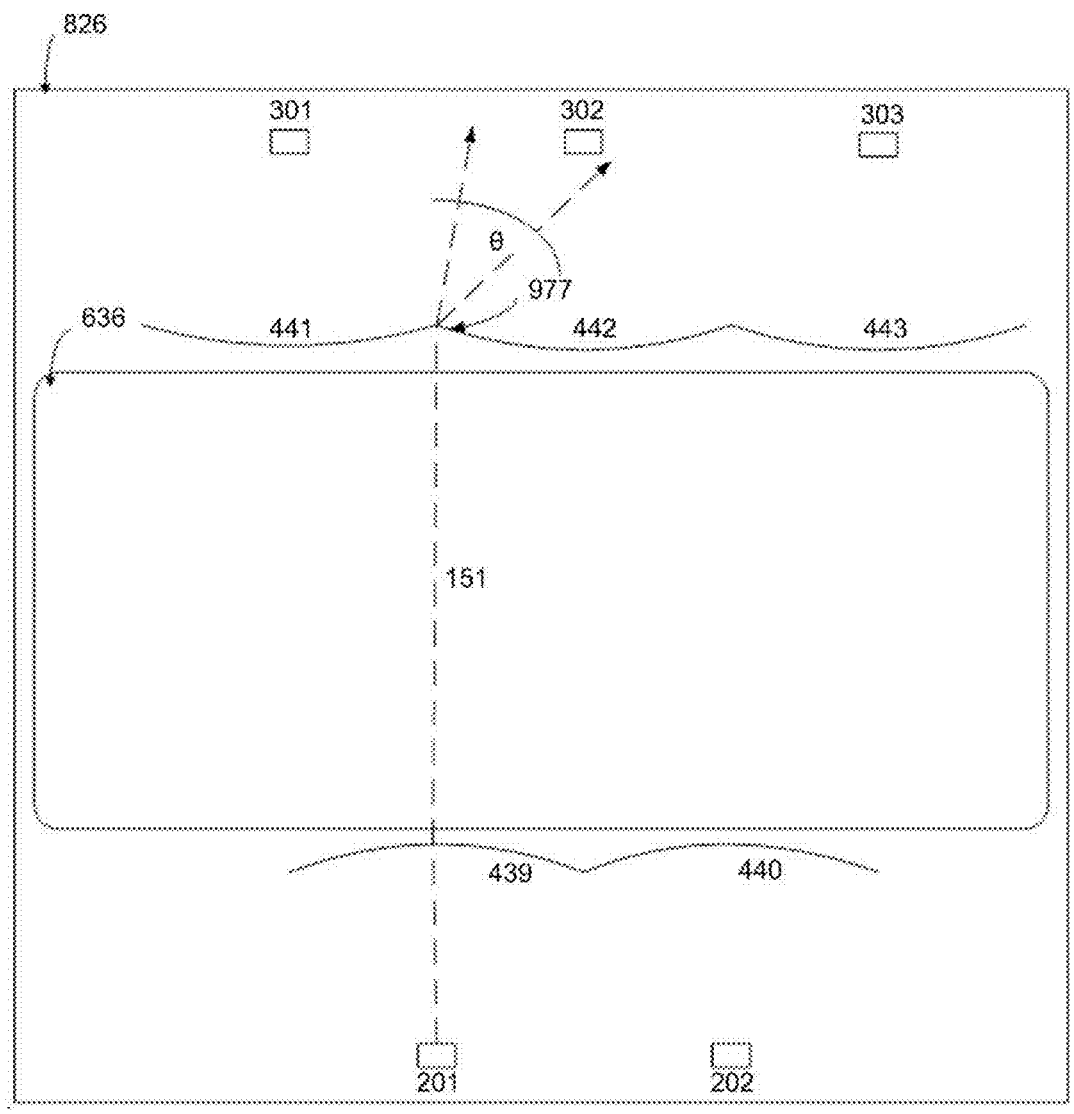
FIGS. 34 and 35 are simplified diagrams of a wide-beam touch screen with emitter and receiver lenses that have micro-lens patterns, in accordance with an embodiment of the present invention.
Figure 35:
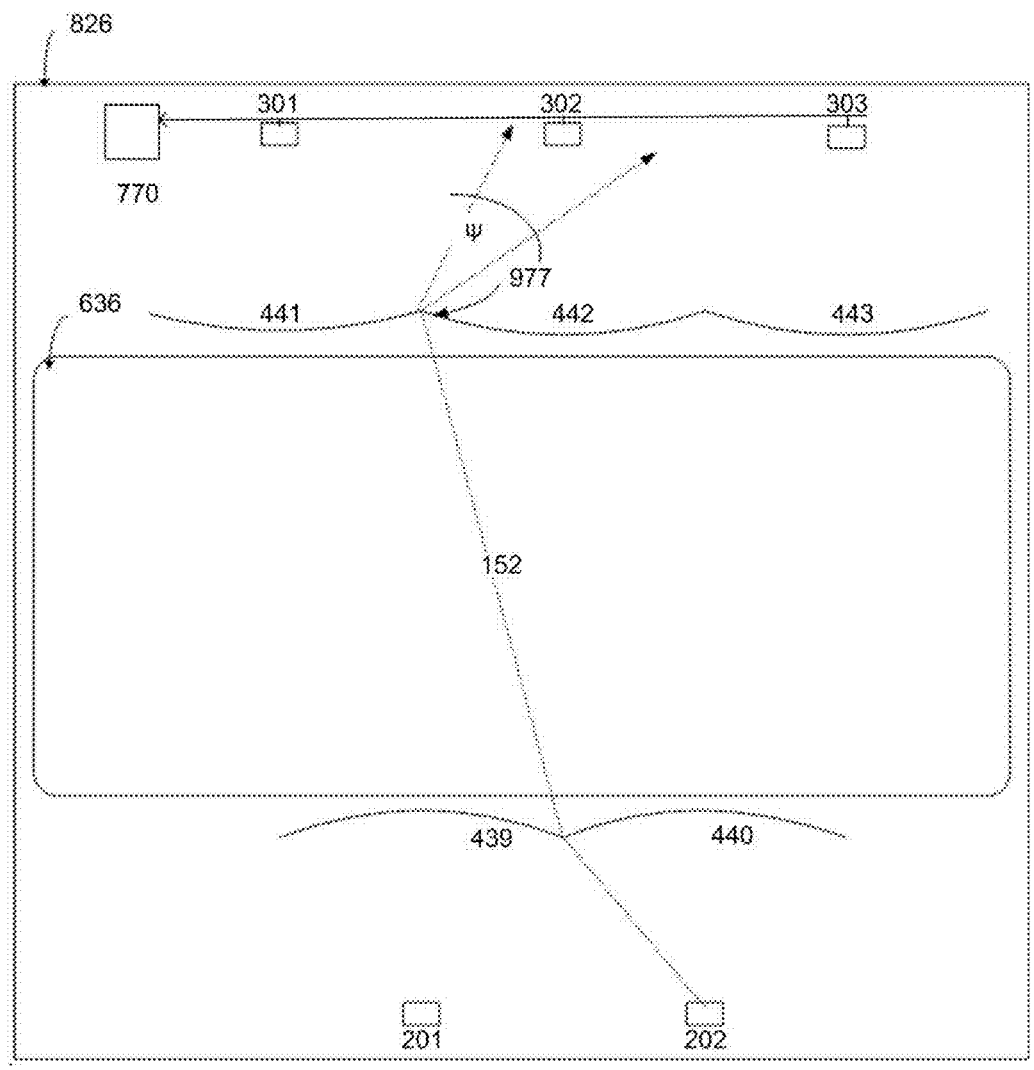

In order to remedy the non-convergence, a fine pattern of micro-lenses is integrated with the receiver lenses, at many points long the surfaces of the lenses. The micro-lenses distribute incoming light so that a portion of the light arriving at each micro-lens reaches the receivers. In this regard, reference is made to FIGS. 34 and 35, which are simplified diagrams of a wide-beam touch screen with emitter and detector lenses that have micro-lens patterns, in accordance with an embodiment of the present invention. FIG. 34 shows incoming beam 151 being spread across an angle θ by a micro-lens at location 977, thus ensuring that a portion of the beam reaches receiver 302. FIG. 35 shows incoming beam 152 being spread across an angle ψ by the same micro-lens at location 977, thus ensuring that a portion of this beam, too, reaches receiver 302. By arranging the micro-lenses at many locations along each receiver lens, light beams that enter the locations from different angles are all detected by the receiver. The detected light intensities are communicated to a calculating unit 770 coupled with the receivers.

Figure 36:
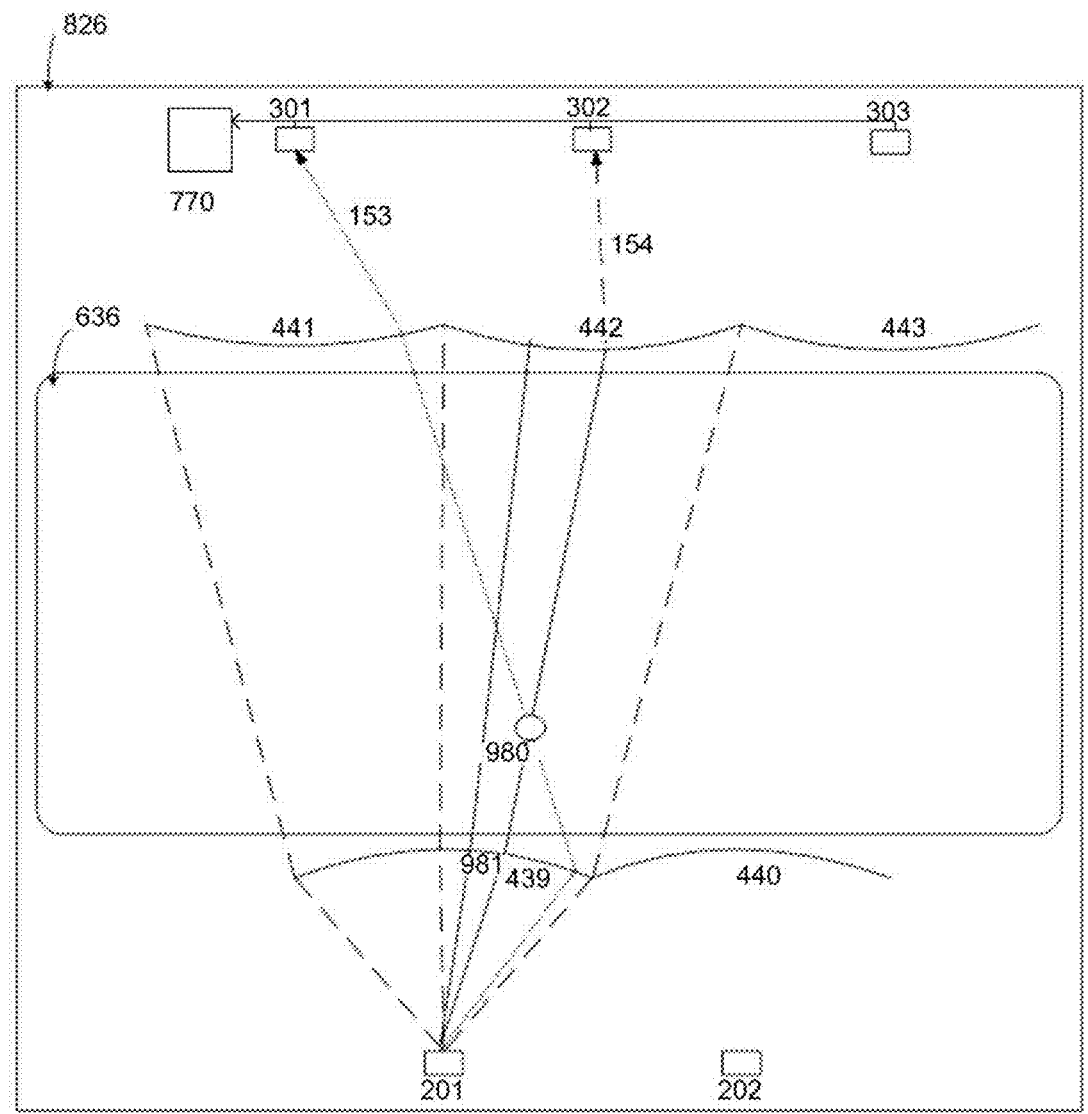
FIG. 36 is a simplified diagram of a wide-beam touch screen with emitter and receiver lenses that do not have micro-lens patterns, in accordance with an embodiment of the present invention.

Reference is made to FIG. 36, which is a simplified diagram of a wide-beam touch screen with emitter and receiver lenses that do not have micro-lens patterns, in accordance with an embodiment of the present invention. Shown in FIG. 36 is an electronic device 826 with a display 636, emitters 201 and 202, corresponding emitter lenses 439 and 440, receivers 301, 302 and 303, and corresponding receiver lenses 441, 442 and 443. Two light beams emitted by emitter 201 and detected by respective receivers 301 and 302, are desired in order to determine a precise location of touch point 980. However, lens 439, without micro-lens patterns, cannot refract a beam crossing point 980 to receiver 301. I.e., referring to FIG. 36, lens 439 cannot refract beam 153 as shown. Only the beam shown as 154, crossing point 980, is detected.

In order to remedy this detection problem, micro-lenses are integrated with the emitter lenses at many points along the surface of the lenses. The micro-lenses distribute outgoing light so that a portion of the light reaches the desired receivers. In this regard, reference is made to FIG. 37, which is a simplified diagram of a wide beam touch screen, with emitter and receiver lenses that have micro-lens patterns, in accordance with an embodiment of the present invention. FIG. 37 shows that a portion of light exiting from micro-lens location 982 reaches multiple receivers. As such, a touch at point 980 is detected by receivers 301 and 302. It will be noted from FIGS. 36 and 37 that the beams passing through point 980 are generated by micro-lenses at different locations 981 and 982. Light intensity values detected by the receivers of FIGS. 36 and 37 are communicated to a calculating unit 770.

Micro-lens patterns integrated with emitter and receiver lenses thus generate numerous overlapping light beams that are detected. Each point on the touch screen is traversed by multiple light beams from multiple micro-lenses, which may be on the same emitter lens. The micro-lenses ensure that the multiple light beams reach the desired receivers. Reference is made to FIG. 38, which is a simplified diagram of two emitters, 201 and 202, with respective lenses, 439 and 440, that have micro-lens patterns 444 integrated therein, in accordance with an embodiment of the present invention. Reference is also made to FIG. 39, which is a simplified diagram of two receivers, 301 and 302, with respective lenses, 439 and 440, that have micro-lens patterns 444 integrated therein, in accordance with an embodiment of the present invention.

When the light beams are guided across the screen through a cover glass by total internal reflection, as described below with reference to configuration no. 7, the lenses are not exposed to the user. However, when the light beams are directed above the screen through air, the outermost surfaces of the lenses are visible to the user, and it may be less aesthetic to have the micro-lenses on these exposed surfaces, in order that the visible surfaces appear smooth. Moreover, outermost surfaces are susceptible to scratching and to accumulation of dust and dirt, which can degrade performance of the micro-lenses. As such, in embodiments of the present invention, the micro-lenses are integrated on surfaces that are not exposed to the user, as shown below in FIGS. 40, 41 and 44. Although these lenses have particular advantages for through-air beams, the lenses described in FIGS. 40, 41 and 44 may also be connected to a cover glass and used when light beams are guided across the screen through the cover glass by total internal reflection.

Figure 40:
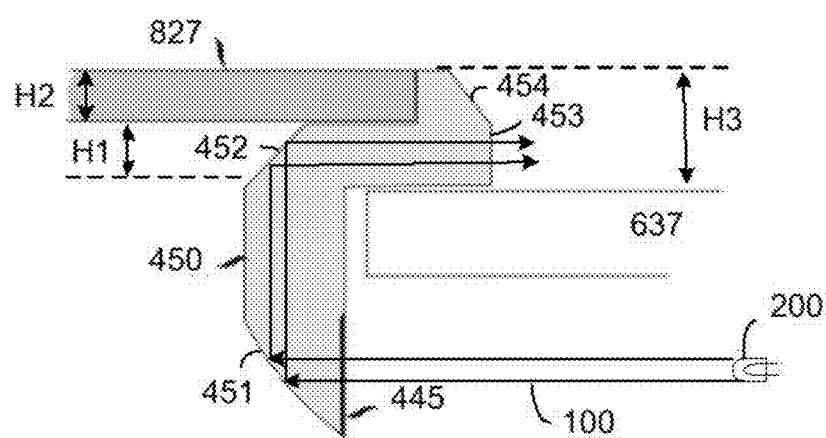
FIG. 40 is a simplified diagram of a side view of a single-unit light guide, in the context of an electronic device with a display and an outer casing, in accordance with an embodiment of the present invention.

Reference is made to FIG. 40, which is a simplified diagram of a side view of a single-unit light guide, in the context of an electronic device having a display and an outer casing, in accordance with an embodiment of the present invention. Shown in FIG. 40 is a cut-away of a portion of an electronic device with a display screen 637, an outer casing 827 above screen 637, and an emitter 200 below screen 637. A light guide 450 receives light beams 100 and reflects them above screen 637 so that they travel across the surface of screen 637 for detection. Light guide 450 includes internal reflective surfaces 451 and 452 for projecting light beams 100 above the surface of screen 637. A section 445 of light guide 450 serves as a primary lens to collimate light beams 100 when they are received. The surface of section 445 that faces emitter 200, indicated in bold, has patterns of micro-lenses etched thereon. As such, the micro-lenses are not visible to a user, and are protected from damage and dirt.

The surface of section 445 has a feather pattern for scattering incoming light beams 100 from an emitter 200. Reflective surfaces 451 and 452 reflect light beams 100. Reflective surface 451 is concave, and reflective surface 452 is a flat reflector oriented at a 45° angle with respect to incoming light beams 100.

Light beams 100 exit light guide 450 through flat surface 453. Surface 454 serves to connect light guide 450 to outer casing 827. Surface 454 is located above the plane of active light beams used by the touch system, and is angled for aesthetic purposes.

The reflective characteristics of surface 452 require that dust and dirt not accumulate on surface 452, and require that outer casing 827, which may be made inter alia of metal or plastic, not make contact with surface 452; otherwise, reflectivity of surface 452 may be impaired. As such, outer casing 827 is placed above surface 452, thereby protecting surface 452 from dust and dirt, and outer casing 827 is not flush with surface 452, so that casing material does not touch surface 452. Being a flat reflector at a 45° angle relative to incoming light beams, surface 452 is positioned above the upper surface of display 637. As such, the device height, H3, above display 637 due to light guide 450, comprises the height, H1, of surface 452 plus the thickness, H2, of outer casing 827.

At the receiving side, a light guide similar to 450 is used to receive light beams 100 that are transmitted over screen 637, and to direct them onto corresponding one or more receivers. Thus, light beams enter light guide 450 at surface 453, are re-directed by surface 452 and then by surface 451, and exit through the micro-lens patterned surface of section 445 to one or more receivers. At the receiving side, the surface of section 445 has a pattern that scatters the light beams as described hereinabove.

Figure 41:
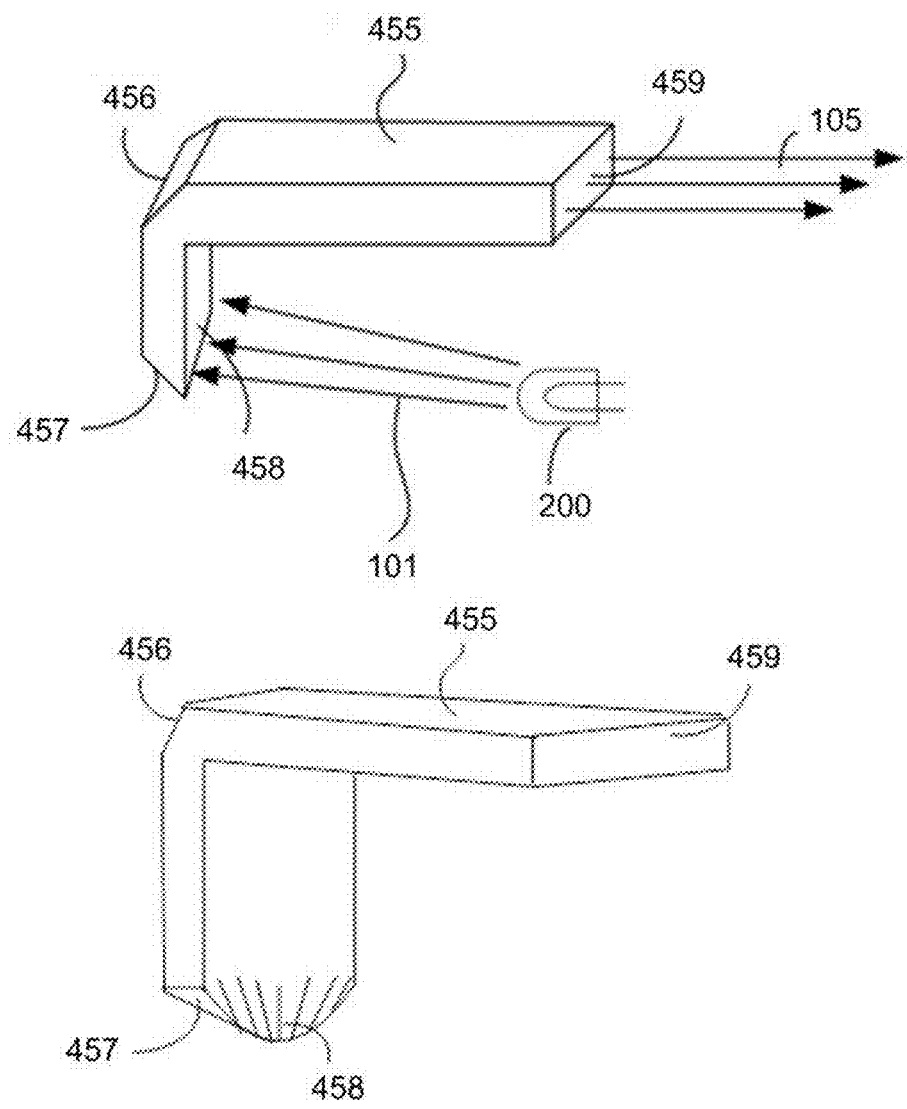
FIG. 41 is a simplified diagram of side views, from two different angles, of a lens with applied feather patterns on a surface, in accordance with an embodiment of the present invention.

Reference is made to FIG. 41, which is a simplified diagram of side views, from two different angles, of a lens with applied feather patterns on a surface, in accordance with an embodiment of the present invention. Shown in FIG. 41 is a light guide 455 having an internal reflective section 456, an internal collimating lens 457, and etched micro-lenses 458. Light beams 101 entering light guide 455 at lens 457 exit the light guide through a surface 459 as light beams 105.

Similar light guides are used for receiving beams that have traversed the screen, to focus them onto receivers. In this case, light beams enter at surface 459, are reflected below the screen surface by internal reflective section 456, are re-focused onto a receiver by collimating lens 457, and re-distributed by micro-lenses 458. In general, the same lens and micro-lenses are used with an emitter and a detector, in order that the light beam be directed at the receiving side in reverse to the way it is directed at the emitting side.

Collimating lens 457 has a rounded bottom edge, as shown at the bottom of FIG. 41. In order to properly refract incoming light on the emitter side, the micro-lenses 458 are formed in a feather pattern, spreading as a fan, as shown at the bottom of FIG. 41 and in FIG. 42.

Figure 42:
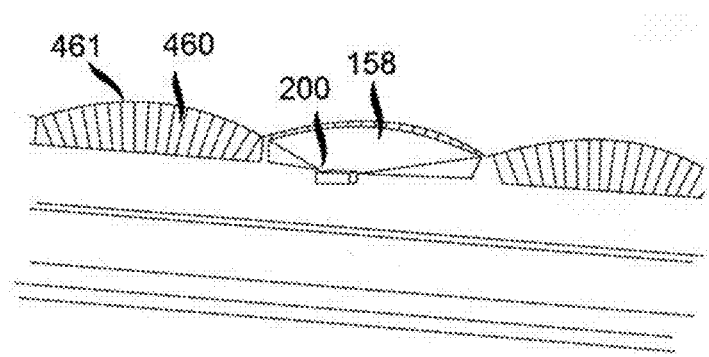
FIG. 42 is a simplified diagram of a portion of a wide-beam touch screen, in accordance with an embodiment of the present invention.

Reference is made to FIG. 42, which is a simplified diagram of a portion of a wide-beam touch screen, in accordance with an embodiment of the present invention. A feather pattern 460 is shown applied to the surface of a lens 461. A similar neighboring lens is associated with an emitter 200 emitting a wide beam 158.

Figure 43:
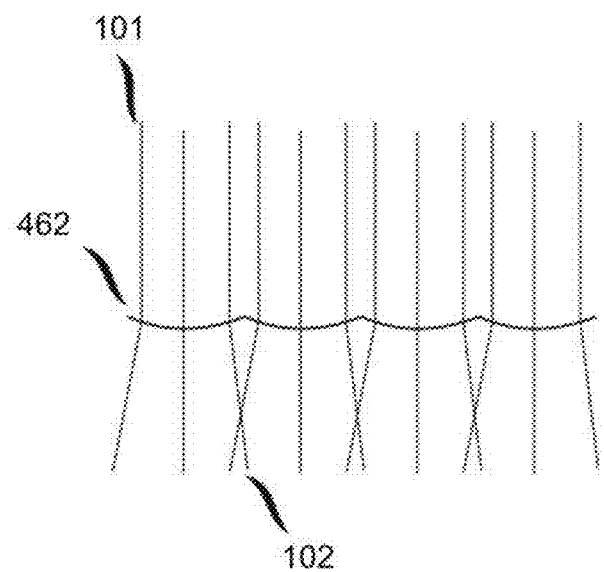
FIG. 43 is a top view of a simplified diagram of light beams entering and exiting micro-lenses etched on a lens, in accordance with an embodiment of the present invention.

Reference is made to FIG. 43, which is a top view of light beams entering and exiting micro-lenses etched on a lens, in accordance with an embodiment of the present invention. Substantially collimated light beams 101 are shown in FIG. 43 entering micro-lenses 462 and being refracted to light beams 102, such that each micro-lens acts as a light source spreading a wide beam across a wide angle.

Touch Screen System Configuration No. 3

Several challenges arise in the manufacture of the micro-lenses in configuration no. 2. One challenge is the difficulty of accurately forming the fan-shaped feather pattern of micro-lenses. It is desirable instead to use micro-lenses arranged parallel to one another, instead of the fan/feather pattern.

A second challenge relates to the mold used to manufacture the light guide in configuration no. 2. Referring to FIG. 40, it is desirable that the outer surface of section 445, facing emitter 200, be vertical, so that the front surface of section 445 is parallel with the straight back surface portion of light guide 450. However, it is difficult to manufacture exactly parallel surfaces. Moreover, if the light guide 450 were to be wider at its bottom, then it would not be easily removable from its mold. As such, the two surfaces generally form a wedge, and the surface of section 445 facing emitter 200 is not perfectly vertical. To compensate for this, the micro-lenses are arranged so as to be perpendicular to a plane of incoming light beams.

A third challenge is the constraint that, for optimal performance, the micro-lenses be positioned accurately relative to their corresponding emitter or receiver. The tolerance for such positioning is low. As such, it is desirable to separate section 445 of the light guide so that it may be positioned accurately, and to allow more tolerance for the remaining portions of the light guide as may be required during assembly or required for robustness to movement due to trauma of the electronic device.

Configuration no. 3, as illustrated in FIGS. 44-46 and 54, serves to overcome these, and other, challenges.

Figure 44:
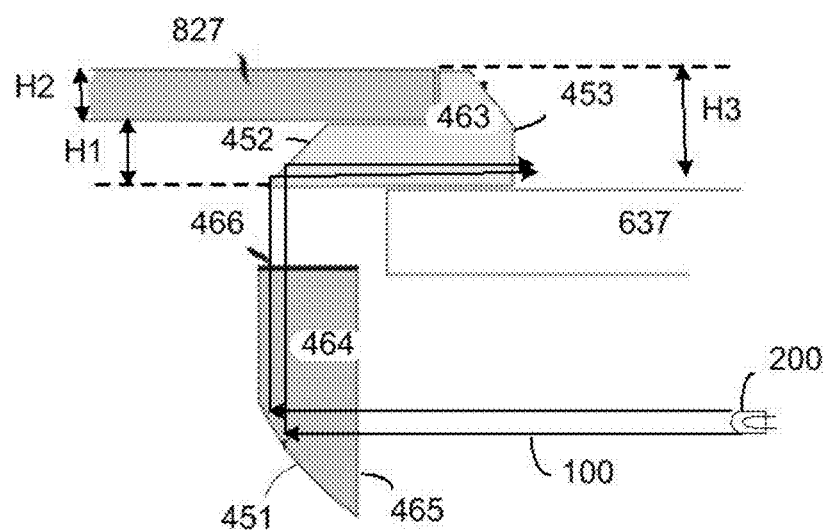
FIG. 44 is a simplified diagram of a side view of a dual-unit light guide, in the context of a device having a display and an outer casing, in accordance with an embodiment of the present invention.

Reference is made to FIG. 44, which is a simplified diagram of a side view of a dual-unit guide, in the context of an electronic device having a display 637 and an outer casing 827, in accordance with an embodiment of the present invention. Shown in FIG. 44 is an arrangement similar to that of FIG. 40, but with light guide 450 split into an upper portion 463 and a lower portion 464. The micro-lenses are located at an upper surface 466 of lower portion 464. As such, the micro-lenses are not embedded in the collimating lens portion of light guide 464.

Figure 46:
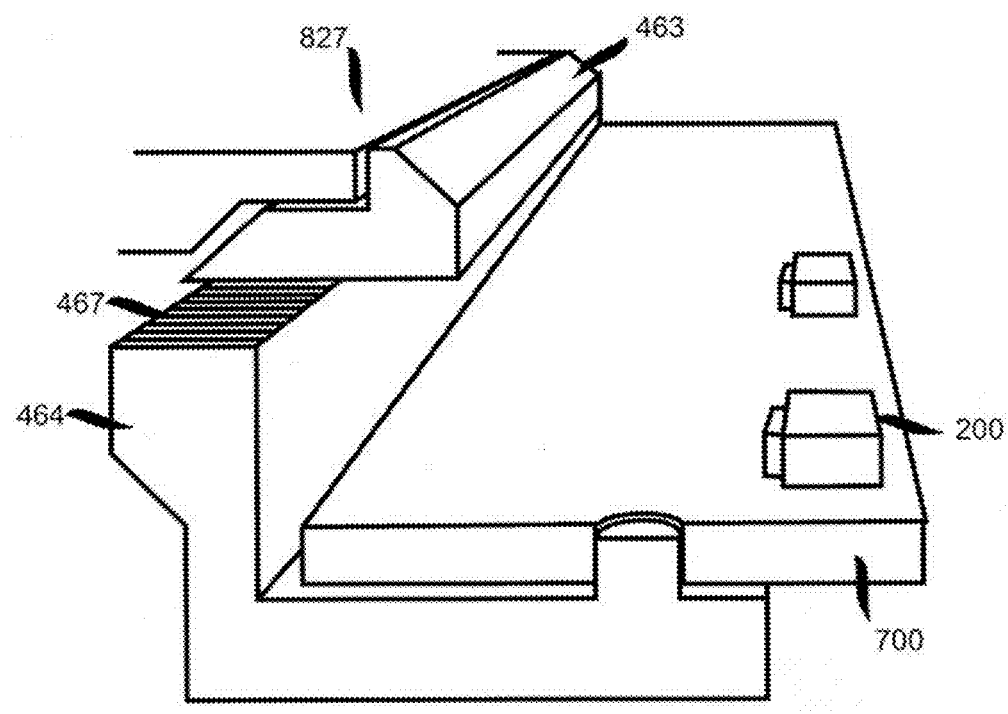
FIG. 46 is a top view of the light guide units of FIG. 45, in accordance with an embodiment of the present invention.

In configuration no. 2, the curved shape of the collimating lens necessitated a fan/feather pattern for the micro-lenses etched thereon. In distinction, in configuration no. 3 the micro-lenses are etched on rectangular surface 466, and are arranged as parallel rows. Such a parallel arrangement, referred to herein as a "tubular arrangement", is shown in FIG. 46. Specifically, a parallel series of micro-lenses 467 are shown along an upper surface of light guide 464 in FIG. 46.

An advantage of configuration no. 3 is that the flat upper surface of the light guide may be molded as nearly parallel with the screen surface as possible, since the mold is one flat surface that lifts off the top of light guide 464. Furthermore, in configuration no. 3, only portion 464 of the light guide has a low tolerance requirement for positioning. Portion 463 has a higher tolerance, since its surfaces are not placed at a focal point of an element.

As shown in FIG. 44, light beams 100 emitted by emitter 200 enter light guide unit 464 at surface 465, are reflected by reflective surface 451 through surface 466, and into light guide unit 463. Inside light guide unit 463, light beams 100 are reflected by surface 452, and exit through surface 453 over display 637.

FIG. 44 indicates that the height, H3, added by the light guide over display 637 comprises the sum of the height, H1, of internal reflective surface 452, and the height, H2, of the thickness of outer casing 827.

Figure 45:
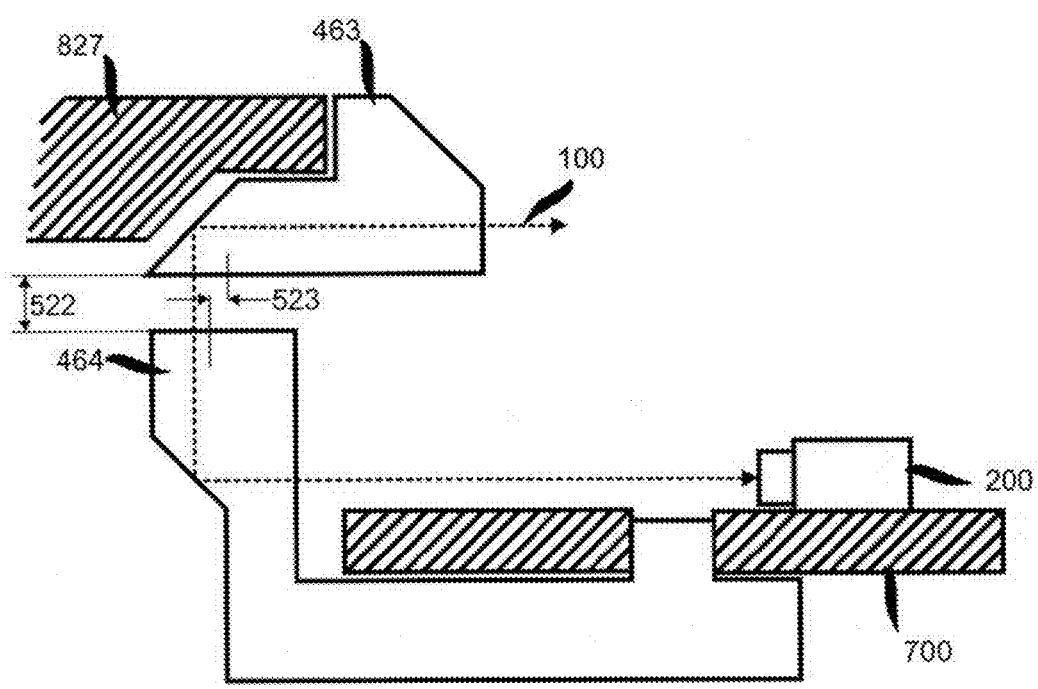
FIG. 45 is a picture of light guide units, within the context of a device having a PCB and an outer casing, in accordance with an embodiment of the present invention.

Reference is made to FIG. 45, which is a picture of light guide units 463 and 464, within the context of a device having a PCB 700 and an outer casing 827, in accordance with an embodiment of the present invention. The tubular pattern on the upper surface of light guide unit 464 is a fine pattern. In order for this pattern to distribute the light beams correctly, light guide 464 is placed precisely relative to its respective LED or PD. By contrast, light guide unit 463 has a flat reflective surface and, as such, does not require such precision placement. FIG. 45 indicates the relative positioning of light guide units 463 and 464. Their alignment is represented by a distance 523, and has a tolerance of up to 1 mm. A distance 522 represents the height between the light guide units.

Reference is made to FIG. 46, which is a top view of light guide units 463 and 464 of FIG. 45, in accordance with an embodiment of the present invention. Tubular pattern 467 appears on the upper surface of light guide unit 464.

Touch Screen System Configuration No. 4

Configuration nos. 2 and 3 relate to detection of a small touch area 980 in FIGS. 31, 32, 36 and 37. A typical use case for such touch area size is stylus input. However when the expected use generates a relatively large touch area, such as the area of a fingertip, a precise touch location may be determined without the micro-lenses used in configurations 2 and 3.

Figure 47:
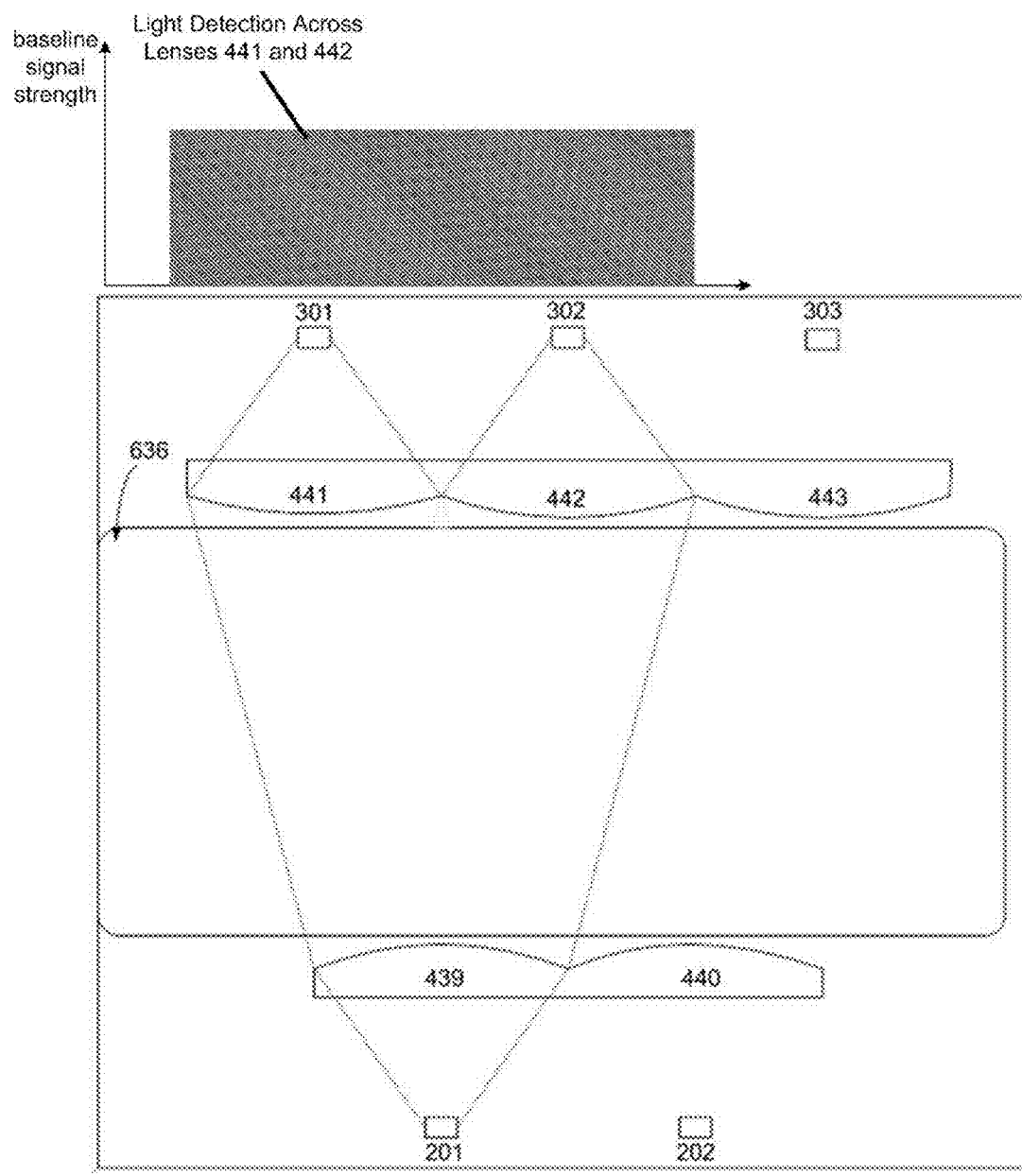
FIG. 47 is a simplified diagram of shift-aligned emitters and detectors for a light-based touch screen, for detecting finger touches, in accordance with an embodiment of the present invention.

Reference is made to FIG. 47, which is a simplified diagram of shift-aligned emitters and detectors for a light-based touch screen, for detecting finger touches, in accordance with an embodiment of the present invention. FIG. 47 shows a system intended for finger touch. Light from an emitter 210 is distributed uniformly across the wide beam that spans lenses 441 and 442. Aside from the uniform distribution of light, the system of FIG. 47 is the same as the system of FIG. 30.

Figure 48:
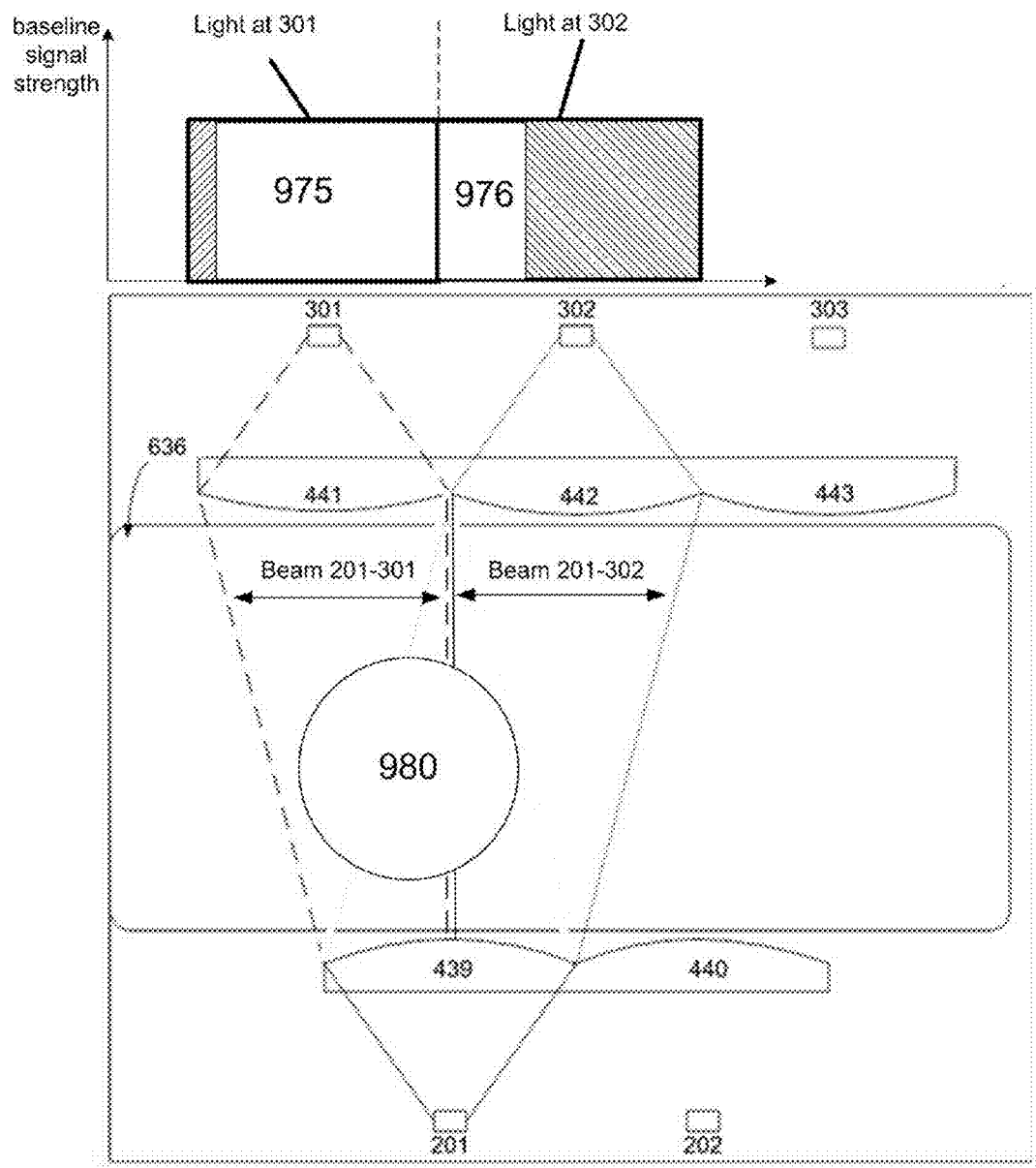
FIG. 48 is a simplified illustration of finger touch detection on the screen of FIG. 47, in accordance with an embodiment of the present invention.

Reference is made to FIG. 48, which is a simplified illustration of finger touch detection on the screen of FIG. 47, in accordance with an embodiment of the present invention. FIG. 48 shows a large touch object 980 detected by two detection channels, 201-301 and 201-302. Light from emitter 201 is substantially collimated, such that the left half of the beam from emitter 201 reaches detector 301, and the right half of the beam from emitter 201 reaches detector 302. A significant portion of each channel is blocked by pointer 980. The amount of light blocked from each detector is shown as portions 975 and 976. The center of the blocking pointer 980 is determined by interpolating these two amounts. In addition, because neighboring light beams 201-301 and 201-302 detect the touch, pointer 980 lies on the border between these two beams. Thus, the leftmost edge of pointer 980 is determined based on the portion of beam 201-301 that is blocked. Similarly, the rightmost edge of pointer 980 is determined based on the portion of beam 201-302 that is blocked. As such, the segment, or in two dimensions—the area, covered by the pointer is determined.

Touch Screen System Configuration No. 5

Configuration no. 5 uses a reflective light guide and lens that reduce the height of a light guide above a display. The reflective light guide and lens of configuration no. 5 are suitable for use with the feather pattern lenses of configuration no. 2, with the tubular pattern lenses of configuration no. 3, with the collimating lenses of configuration no. 4, and also with the alternating reflective facets of configuration no. 6. Many electronic devices are designed with a display surface that is flush with the edges of the devices. This is often an aesthetic feature and, as such, when integrating light-based touch screens with electronic devices, it is desirable to minimize or eliminate the raised rims. Less visibly prominent rims result in sleeker, more flush outer surfaces of the devices.

Moreover, in light-based touch screens, the raised rim occupies a width around the display, beyond the edges of the display. Many electronic devices are designed with display surfaces that seamlessly extend to the edges of the devices. This is often an aesthetic feature and, as such, when integrating light-based touch screens with electronic devices, it is desirable to design the reflective raised rims in such a way that they appear as seamless extensions of the display.

Configuration no. 5 achieves these objectives when light beams are projected over air above the touch surface, by reducing bezel height and providing a seamless transition between a display edge and an outer border of a device, resulting in a more appealing aesthetic design. The light guide of configuration no. 5 integrates with an outer casing having an elongated rounded edge, thereby softening sharp angles and straight surfaces.

Configuration no. 5 employs two active mirror surfaces; namely, a parabolic reflective surface that folds and focuses incoming light to a focal location, and an elliptical refractive surface that collects light from the focal location and collimates the light into beams across the screen.

Figure 49:
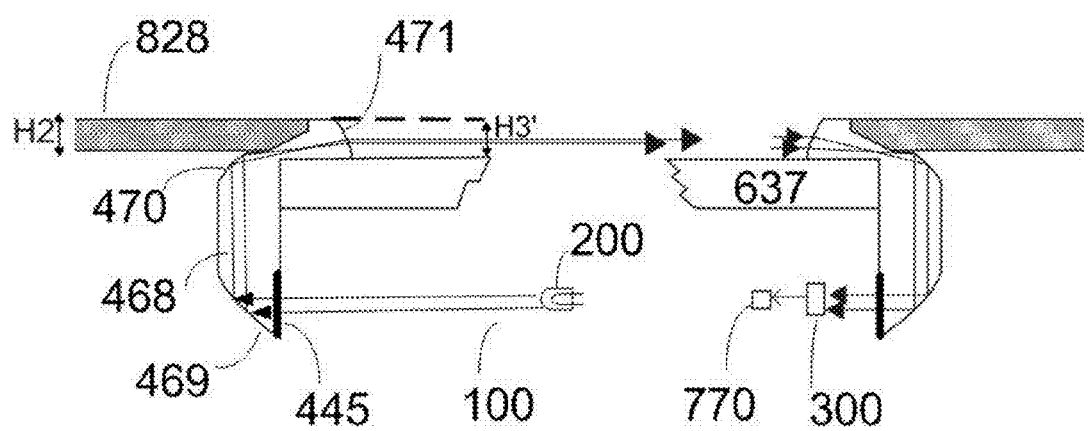
FIG. 49 is a simplified diagram of a side view cutaway of a light guide within an electronic device, in accordance with an embodiment of the present invention.

Reference is made to FIG. 49, which is a simplified diagram of a side view of a light guide within an electronic device, in accordance with an embodiment of the present invention. Shown in FIG. 49 is a light guide 468 between an outer casing 828 and a display 637. Light beams from an emitter 200 enter light guide 468 through a surface 445. A feather pattern of micro-lenses is present on a lower portion of surface 445, in order to scatter the light beams 100. Light beams 100 are reflected by an internal concave reflective surface 469 and by a parabolic reflective surface 470, and exit light guide 468 through an elliptical refractive surface 471. Elliptical refractive surface 471 redirects at least a portion of light beams 100 in a plane parallel with the surface of display 637. Light beams 100 are received at the other end of display 637, by a similar light guide that directs the beams onto a light receiver 300. The light intensity detected by light receiver 300 is communicated to a calculating unit 770.

Figure 50:
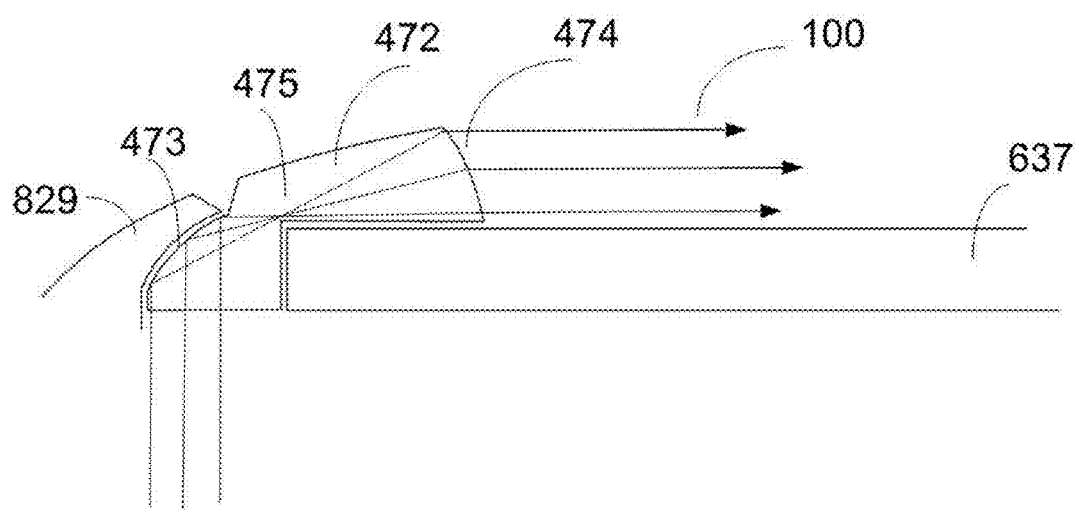
FIG. 50 is a simplified diagram of a side view cutaway of a portion of an electronic device and an upper portion of a light guide with at least two active surfaces for folding light beams, in accordance with an embodiment of the present invention.

Reference is made to FIG. 50, which is a simplified diagram of a side view cutaway of a portion of an electronic device and an upper portion of a light guide with at least two active surfaces for folding light beams, in accordance with an embodiment of the present invention. Shown in FIG. 50 is an upper portion of a light guide 472. Surface 473 is part of a parabola, or quasi-parabola, or alternatively is a free form, having a focal line 475. Focal line 475, and surfaces 473 and 474 extend along the rim of display 637. Surface 474 is part of an ellipse, or quasi-ellipse, or alternatively a free form, having focal line 475.

On the emitter side, light beams enter the light guide, and parabolic mirror 473 reflects the beams to a focal point inside the light guide. Refracting elliptical lens 474 has the same focal point as parabolic mirror 473. Elliptical lens 474 refracts the light from the focal point into collimated light beams over display 637. On the receiver side, collimated light beams enter the light guide, and are refracted by elliptical lens 474 into a focal point. Parabolic mirror 473 reflects the beams from the focal point inside the light guide, to collimated output beams.

Surface 469 in FIG. 49 folds light beams 100 upwards by 90°. Surface 469 is formed as part of a parabola. In one embodiment of the present invention, surface 469 is corrected for aberrations due to input surface 445 being slightly inclined rather than perfectly vertical, and also due to the light source being wider than a single point.

Surfaces 469 and 470 use internal reflections to fold light beams. Thus these surfaces need to be protected from dirt and scratches. In FIG. 50, surface 473 is protected by outer casing 829. The lower portion (now shown) of light guide 472 is deep within the electronic device, and is thus protected.

Using configuration no. 5, substantially all of reflective surface 473 is located below the upper surface of display 637. Thus, this configuration adds less height to an electronic device than does configuration no. 2, when projecting light beams through the air above the touch surface. Referring back to FIG. 49, the height, H3', added by the light guide in the present configuration is approximately the thickness, H2, of the outer casing, which is less than the corresponding height, H3, in configuration no. 2. Moreover, the convex shape of surface 471 of FIG. 40 and surface 474 of FIG. 50 is easier for a user to clean than is the perpendicular surface 453 of FIG. 40. Thus a user can easily wipe away dust and dirt that may accumulate on display 637 and on surface 471. It is noted that configuration no. 5 eliminates the need for surface 454 of FIG. 40, since outer casing 828 is flush with the height of surface 471, instead of being above it.

The convex shape of surface 471 of FIG. 49 makes the bezel less visibly prominent than does the perpendicular surface 453 of FIG. 40.

Some electronic devices are covered with a flat sheet of glass that extends to the four edges of the device. The underside of the glass is painted black near the devices edges, and the display is viewed through a clear rectangular window in the middle of the glass. Examples of such devices include the IPHONE®, IPOD TOUCH and IPAD®, manufactured by Apple Inc. of Cupertino, Calif., and also various models of flat-panel computer monitors and televisions. In some cases, the light guides surrounding the various touch screens described herein may appear non-aesthetic, due to (a) the light guide being a separate unit from the screen glass and thus the border between them is noticeable, and (b) the light guide extending below the screen and thus, even if the underside of the light guide is also painted black, the difference in heights between the bottom of the light guide and the screen glass is noticeable. Embodiments of the present invention employ a two-unit light guide to overcome this problem.

Figure 51:
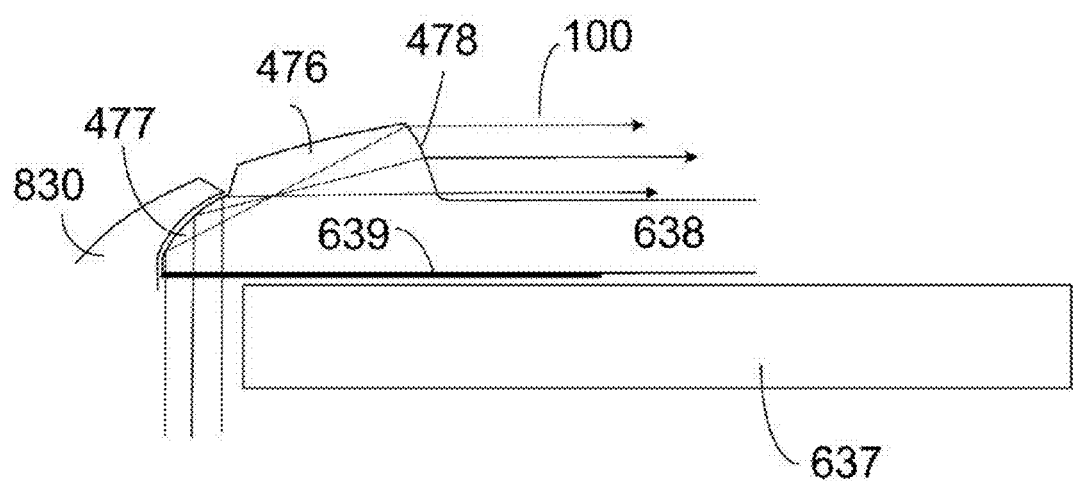
FIG. 51 is a simplified drawing of a section of a transparent optical touch light guide, formed as an integral part of a protective glass covering a display, in accordance with an embodiment of the present invention.

In one such embodiment, the upper unit of the light guide is merged with the screen glass. In this regard, reference is made to FIG. 51, which is a simplified drawing of a section of a transparent optical touch light guide 476, formed as an integral part of a protective glass 638 covering a display 637, in accordance with an embodiment of the present invention. A daylight filter sheet 639 on the underside of protective glass 638 serves, instead of black paint, to hide the edge of display 637, without blocking light beams 100. Light guide 476 has an outer elliptical surface 478 and an inner parabolic surface 477, and merges smoothly with an outer casing 830. Light beams 100 pass through light guide 476 as in FIG. 50.

Figure 52:
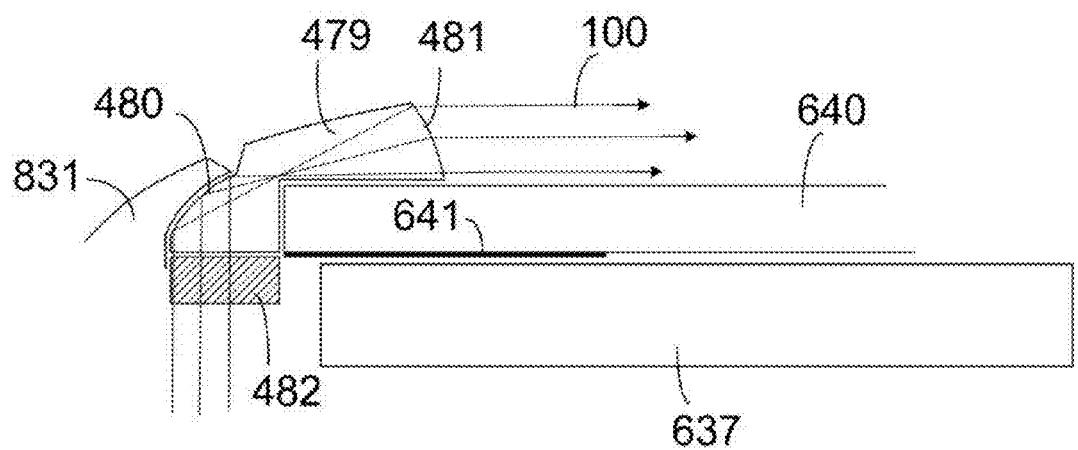
FIG. 52 is a simplified illustration of the electronic device and light guide of FIG. 50, adapted to conceal the edge of the screen, in accordance with an embodiment of the present invention.

In some cases, the cost of manufacturing a protective glass cover with an integrated reflective lens may be expensive. As such, in an alternative embodiment of the present invention, a black object is placed between the upper and lower units of the light guide. The height of the black object is aligned, within the electronic device, with the height of the black paint on the underside of the protective glass. In this regard, reference is made to FIG. 52, which is a simplified illustration of the electronic device and light guide of FIG. 50, adapted to conceal the edge of the screen, in accordance with an embodiment of the present invention. Shown in FIG. 52 is black paint, or alternatively a daylight filter sheet 641, on the underside of protective glass 640, covering display 637. A black plastic element 482 is aligned with black paint/daylight filter sheet 641, so that the edge of protective glass 640 is not discernable by a user. Black plastic element 482 transmits infra-red light to allow light beams 100 to pass through.

Figure 53:
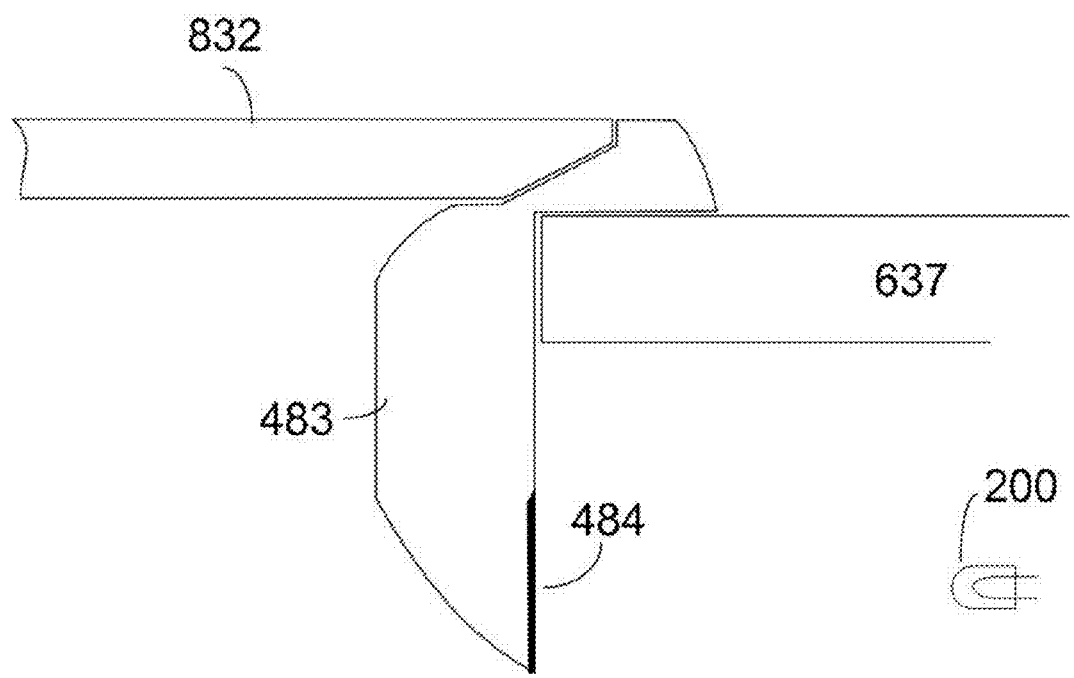
FIG. 53 is a simplified diagram of a light guide that is a single unit extending from opposite an emitter to above a display, in accordance with an embodiment of the present invention.

Reference is made to FIG. 53, which is a simplified diagram of a light guide 483 that is a single unit extending from opposite an emitter 200 to above a display 637, in accordance with an embodiment of the present invention. A portion of an outer casing 832 is shown flush with the top of light guide 483. The lower portion of light guide 483 has a feather pattern of micro-lenses 484 to scatter the light beams arriving from emitter 200. At the receiving side, the light beams exit through the bottom of a light guide similar to light guide 483, towards a receiver. The same feather pattern 484 breaks up the light beams en route to the receiver.

Figure 54:
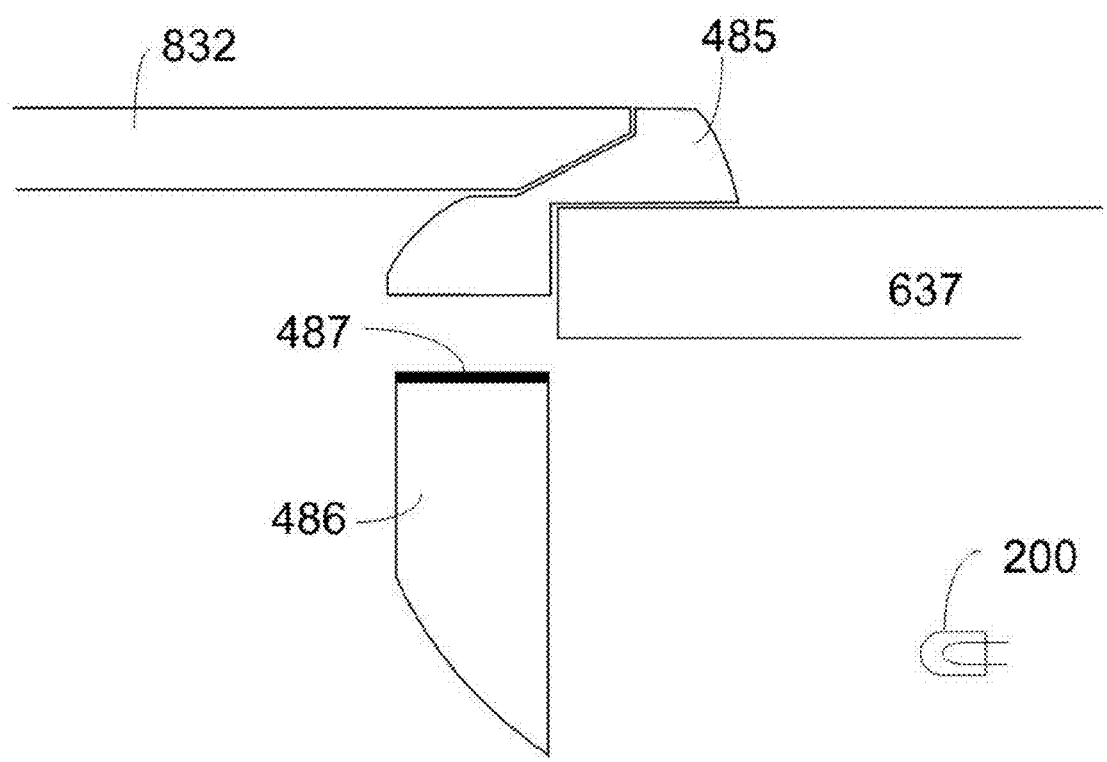
FIG. 54 is a simplified diagram of a dual-unit light guide, in accordance with an embodiment of the present invention.

Reference is made to FIG. 54, which is a simplified diagram of a dual-unit light guide, in accordance with an embodiment of the present invention. Shown in FIG. 54 is a light guide with an upper unit 485 and a lower unit 486. A portion of an outer casing 832 is flush with the top of light guide unit 485. A display 637 is shown to the right of light guide unit 485. The top surface of light guide unit 486 has a tubular pattern of micro-lenses 487 to break up light beams arriving from an emitter 200. At the receiving side, the light beams exit through the bottom of a light guide similar to the light guide shown in FIG. 54, towards a receiver. The same tubular pattern 487 breaks up the light beams en route to the receiver.

As explained hereinabove with reference to FIGS. 40 and 49, the positioning of light guide unit 486 with tubular pattern 487 requires high precision, whereas the positioning of light guide unit 485 does not require such precision. The effect of tubular pattern 487 on the light beams depends on its precise placement relative to its respective emitter or receiver. The active surfaces in light guide unit 485 are more tolerant, since they are largely self-contained; namely, they are both focused on an internal focal line, such as focal line 475 of FIG. 50.

It is noted that placement of emitters and receivers underneath a device screen, and placement of a collimating reflective element opposite each emitter or receiver, imposes restrictions on the thickness of the device. A first restriction is that the thickness of the device be at least the sum of the screen thickness and the emitter or receiver thickness. A second restriction is that in order to properly collimate light that is reflected upward above the screen, the reflective element opposite the emitter or receiver be curved into a convex "smile" shape, as shown inter alia in FIGS. 41 and 42. The convex shape adds to the total thickness of the device.

Designers of tablets and e-book readers strive to achieve as slim a form factor as possible. As such, according to an embodiment of the present invention, the receivers and collimating lenses are placed inside a border surrounding the screen, instead of being placed underneath the screen. This is particularly feasible for tablets and e-book readers that provide a non-screen border area for holding the device.

Figure 55:
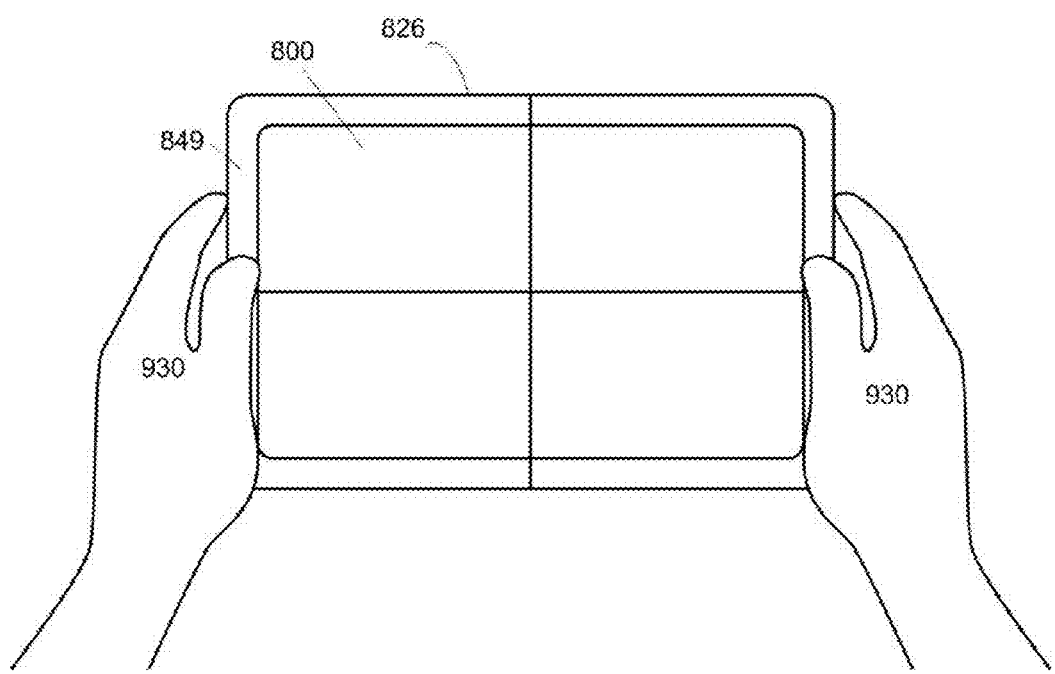
FIG. 55 is a simplified diagram of a touch screen device held by a user, in accordance with an embodiment of the present invention.

Reference is made to FIG. 55, which is a simplified diagram of a touch screen device held by a user, in accordance with an embodiment of the present invention. Shown in FIG. 55 is a device 826 with a touch screen 800 surrounded by a frame 840 held by hands 930.

Figure 56:
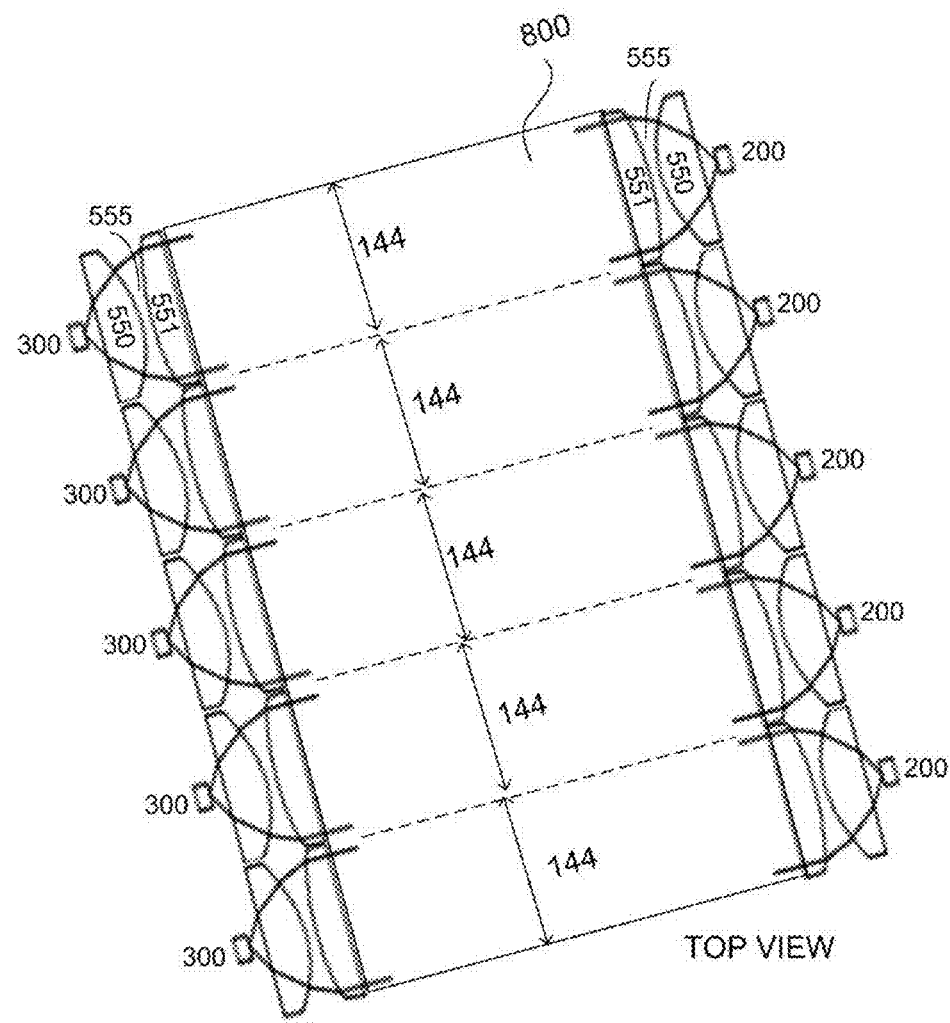
FIG. 56 is a simplified diagram of a touch screen with wide light beams covering the screen, in accordance with an embodiment of the present invention.
Figure 56:
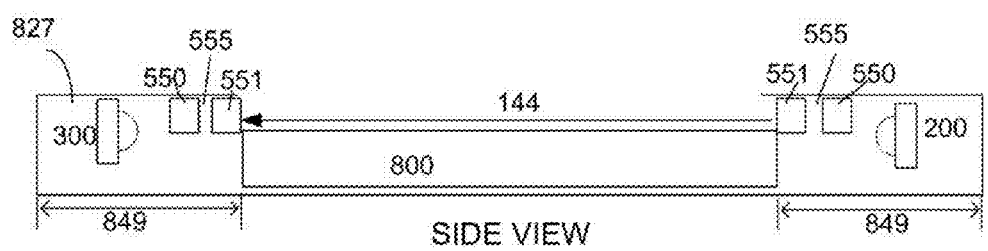

Reference is made to FIG. 56, which is a simplified diagram of a touch screen with wide light beams covering the screen, in accordance with an embodiment of the present invention. FIG. 56 shows a top view and a side view of a touch system with a touch screen 800, in the context of an electronic device such as a tablet or an e-book reader. FIG. 56 also shows emitters 200 and receivers 300, each coupled with a pair of lenses 550 and 551, separated by an air gap 555, for collimating light. The side view shows a device casing 827 and a frame 849 surrounding touch screen 800. Frame 849 provides a grip for a user to hold the device, and is wide enough to encase elements 200, 300, 550 and 551.

Light is more efficiently collimated over a short distance using multiple air-to-plastic interfaces than with a solid lens. The emitter, receiver and lenses are substantially coplanar with the surface of touch screen 800. The flat non-curved profile of lenses 500 and 551 along the height of the device is lower than the profile of the lenses of FIGS. 41 and 38, due to the fact that in the case of lenses 500 and 551 light is projected only along the plane of the screen surface. The only height added to the device form factor is the height of the bezel, or lens 551, above touch screen 800 for directing light across the screen. If micro-lens patterns are used, e.g., to create overlapping beams, then a third lens is added that includes the micro-lens patterns. Alternatively, the micro-lens patterns may be formed on one of the two lenses 500 and 551.

Figure 57:
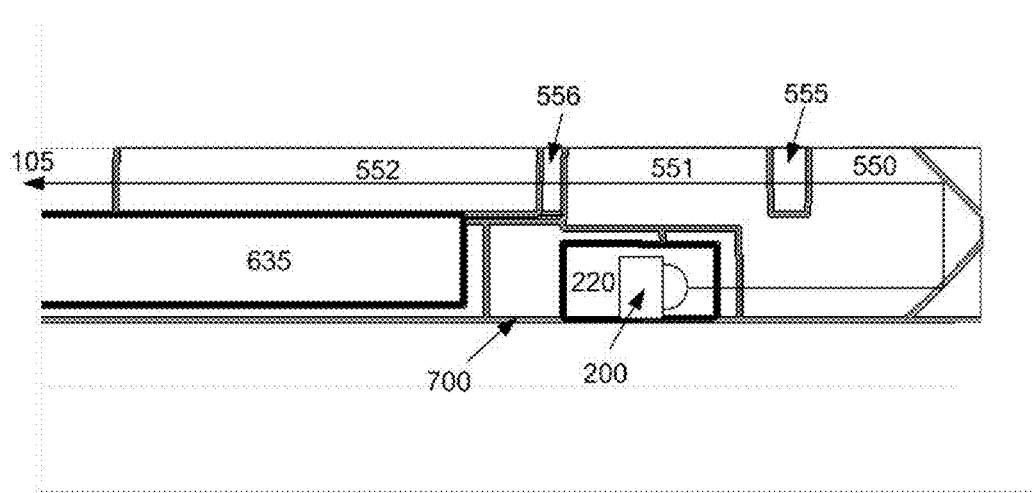
FIGS. 57-59 are respective simplified side, top and bottom views of a light guide in the context of a device, in accordance with an embodiment of the present invention.
Figure 58:
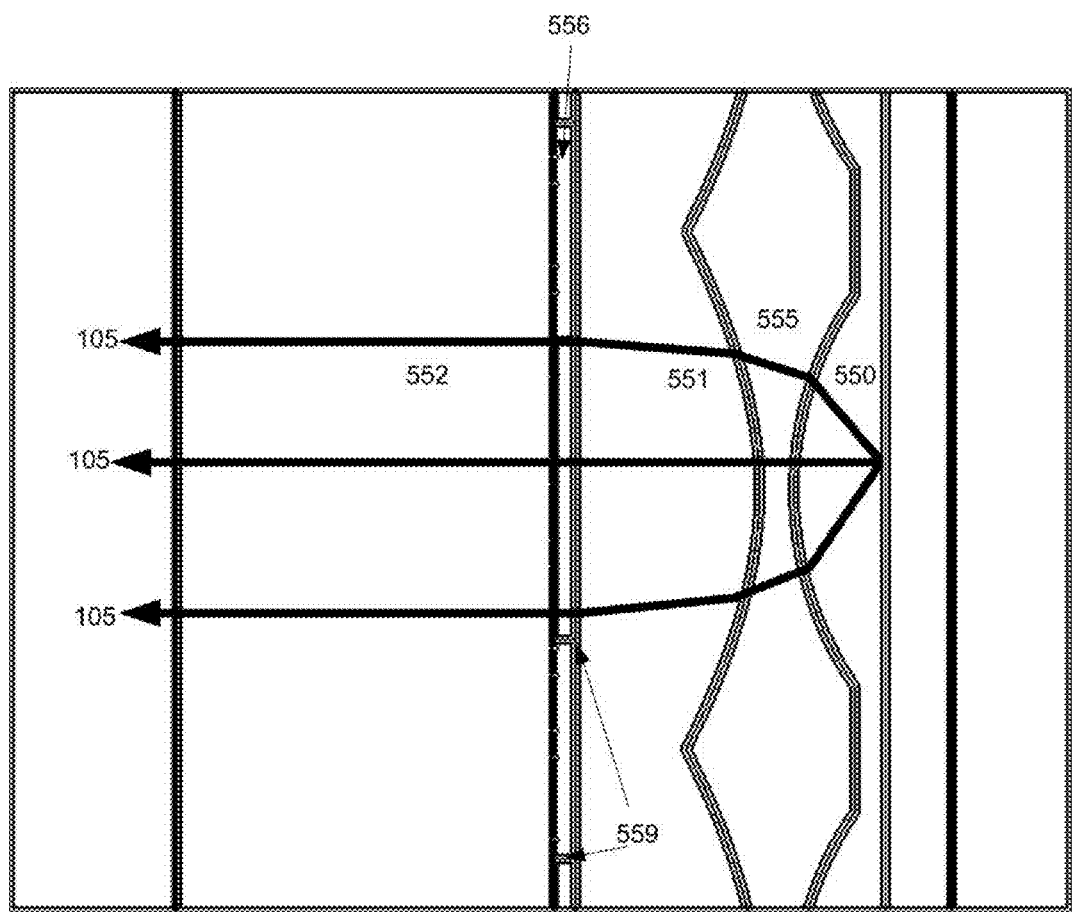
Figure 59:
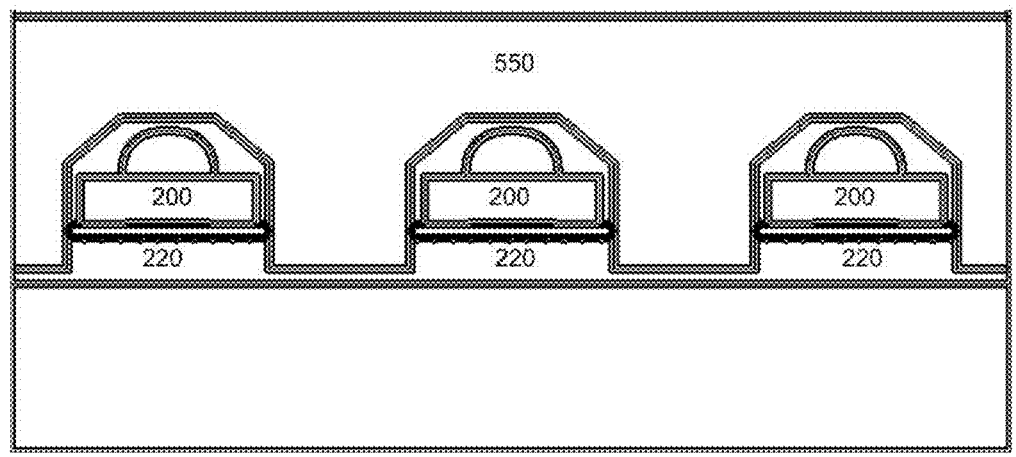

Reference is made to FIGS. 57-59, which are respective simplified side, top and bottom views of a light guide in the context of a device, in accordance with an embodiment of the present invention. FIG. 57 is a side view showing a display 635 and a side-facing emitter 200 that is substantially coplanar with display 635. A mufti-lens assembly reflects light above display 635 and outputs a wide beam. FIG. 57 shows the mufti-lens assembly with three sections 550-552 separated by air gaps 555 and 556. Sections 550 and 551 are connected beneath air gap 555 and form part of a rigid frame that surrounds display 635. The frame includes a cavity 220 for accommodating side-facing emitter 200 or a similar shaped receiver. Lens sections 550 and 551 together produce a wide collimated beam as described hereinabove. Lens section 552 includes a tubular pattern of micro-lenses as described hereinabove with reference to FIGS. 45 and 46. FIG. 57 shows rays of a beam 105 crossing above display 635. A PCB 700 forms a substrate for supporting emitters 200, display 635, and the light guide frame.

FIG. 58 is a top view showing lens sections 550-552 separated by air gaps 555 and 556. FIG. 58 shows three collimated beams 105, to illustrate how lens sections 550 and 551 collimate a wide light beam. FIG. 58 also shows small connectors 559 that connect lens section 552 to the rigid frame formed by lens sections 550 and 551. As such, all three sections 550-552 may be formed from a single piece of plastic.

FIG. 59 is a bottom view showing lens section 500 with emitter/receiver cavities 220 containing three emitters 200.

Touch Screen System Configuration No. 6

In accordance with an embodiment of the present invention, high resolution touch sensitivity is achieved by combining two or more emitter-receiver pair signals that span a common area, as described hereinabove with reference to configurations nos. 2 and 3. Configuration no. 6 provides alternative optical elements and alternative arrangements of emitters and receivers for providing overlapping detection.

Various approaches may be used to provide overlapping detection beams. One approach is to provide two separate wide beams that are projected at slightly different heights across the screen. Both beams cover a common screen area, and thus provide multiple detection signals for touches in that area. Another approach is to provide optical elements that interleave rays of two wide beams when both beams are activated at once, which can be achieved using diffractive structures to interleave minute rays from two beams, or using slightly larger alternating facets to interleave beams on the order of 0.1-0.6 mm from two sources. Generally, the two beams are activated separately. As such, they cover a common screen area but are not actually interleaved. This latter alternative is described in what follows.

Figure 60:
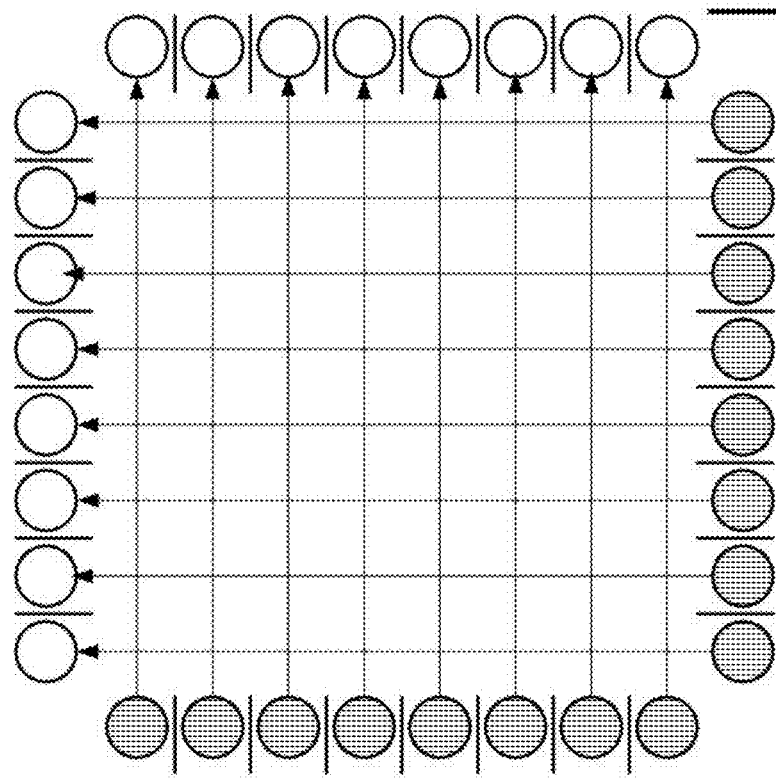
FIG. 60 is a simplified illustration of a touch screen surrounded by emitters and receivers, in accordance with an embodiment of the present invention.
Figure 60:
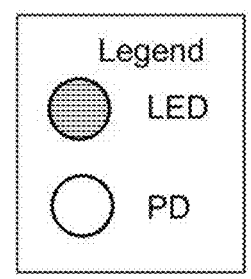
Figure 61:
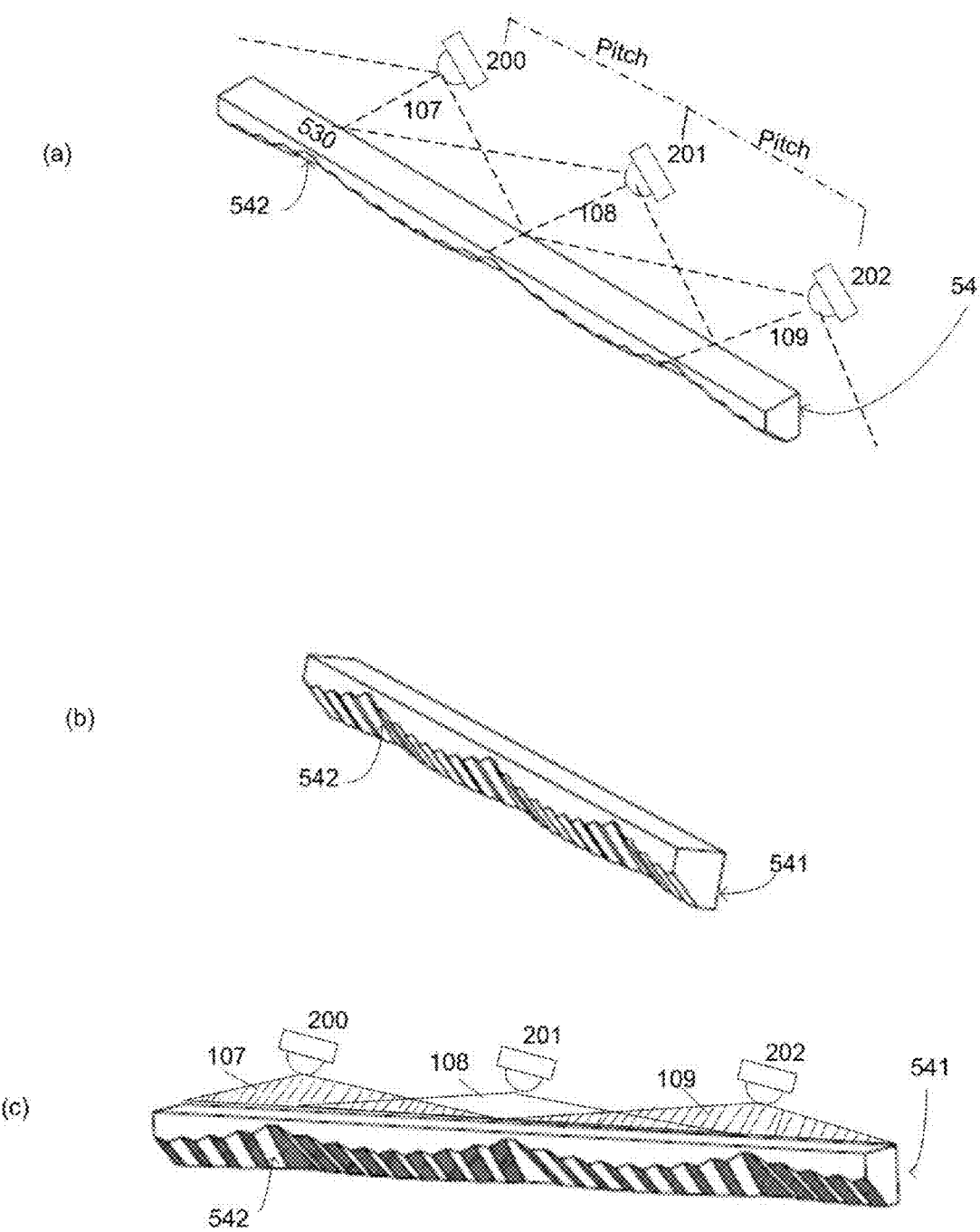
FIG. 61 is a simplified illustration of an optical element with an undulating angular pattern of reflective facets, shown from three angles, in accordance with an embodiment of the present invention.

Reference is made to FIG. 60, which is a simplified illustration of a touch screen 800 surrounded by emitters and receivers, in accordance with an embodiment of the present invention. Reference is also made to FIG. 61, which is a simplified illustration of an optical element 530 with an undulating angular pattern of reflective facets, shown from three angles, in accordance with an embodiment of the present invention. Shown in FIG. 61 are three views, (a), (b) and (c), of optical element 530. Light from the emitters enters optical element 530 as wide angled overlapping beams. FIG. 61 shows emitters 200-202 facing a surface 541 of element 530. Wide beams 107-109 from respective emitters 200-202 enter element 530 through surface 541. FIG. 61 also shows the distance, or pitch, between neighboring emitter elements.

Each of wide beams 107-109 spans two pitches and, as such, the wide beams overlap in the area between neighboring emitters. A surface 542 of element 530 is formed as a wave-like pattern of facets, alternatingly directed at neighboring emitters. FIG. 61(c) shows alternating shaded and non-shaded facets on surface 542. In element 530 between emitters 200 and 201, shaded facets aimed at emitter 200 are interleaved with non-shaded facets aimed at emitter 201. In element 530 between emitters 201 and 202, shaded facets aimed at emitter 202 are interleaved with non-shaded facets aimed at emitter 201.

Figure 62:
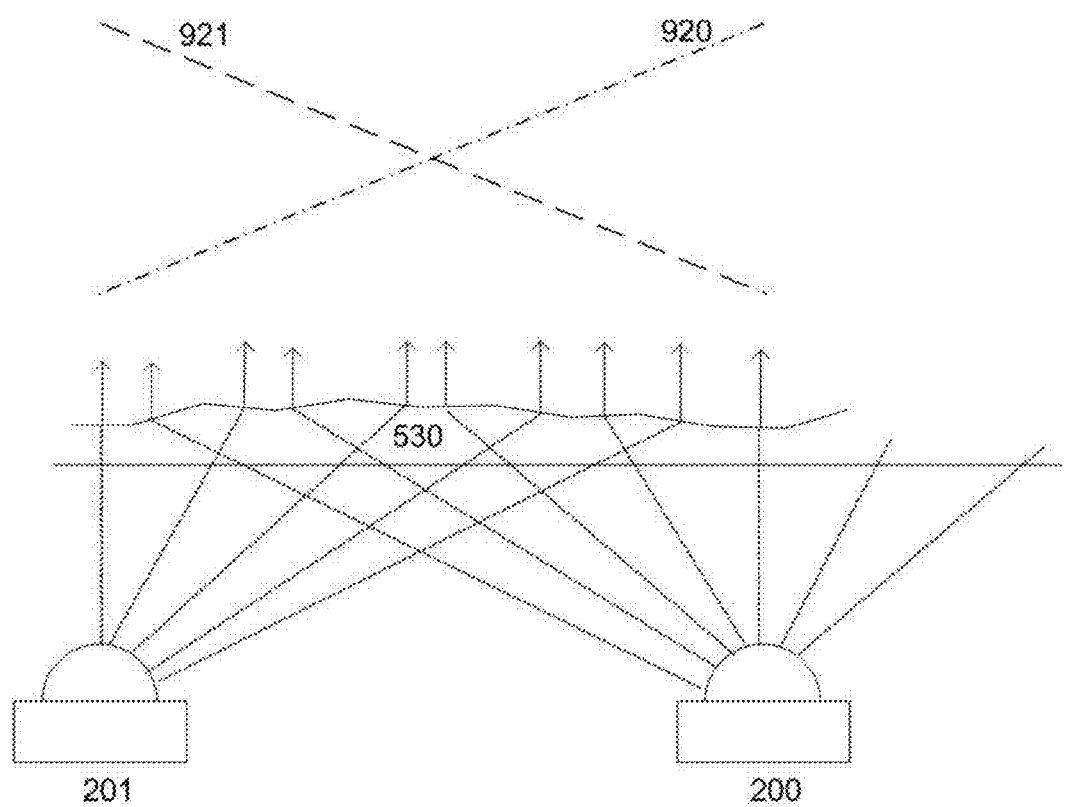
FIG. 62 is a simplified illustration of an optical element reflecting, collimating and interleaving light from two neighboring emitters, in accordance with an embodiment of the present invention.

Reference is made to FIG. 62, which is a simplified illustration of an optical element reflecting, collimating and interleaving light from two neighboring emitters, in accordance with an embodiment of the present invention. As shown in FIG. 62, each reflective facet of element 530 collimates rays from its corresponding emitter, thereby interleaving collimated rays from two emitters. FIG. 62 shows optical element 530 reflecting and collimating light from two neighboring emitters 200 and 201. Alternating facets of element 530 focus on these two elements. By interleaving collimated rays, element 530 collimates light from two emitters across the screen in overlapping wide beams. Elements 530 at an opposite screen edge direct the wide beams onto respective receivers.

Each facet on surface 542 is precisely angled to focus on its element. The surface areas of each facet are also configured so that sufficient amounts of light are provided for detection.

Alternative embodiments of optical element 530 collimate and interleave incoming wide beams through refraction instead of reflection. In such case, the wave-like mufti-faceted surface is situated at an input or output surface of optical element 530. In the case of reflecting facets, the facets redirect light inside the optical element.

At times, it is desirable to run a touch screen in a low frequency mode, e.g., in order to save power. Configuration no. 6 enables an accurate low-frequency scan mode. In accordance with an embodiment of the present invention, two detection signals along a screen axis are provided for each touch location. In low frequency mode, during a first scan every other emitter-receiver pair is activated, thus activating only half of the pairs along only one screen axis, but nevertheless covering the entire screen. During a second scan, the remaining emitter-receiver pairs along this axis are activated. As such, odd emitter-receive pairs are first activated, then even emitter-receiver pairs, thus providing two full screen scans and spreading usage evenly across all emitter and receiver elements. In order to keep power consumption at a minimum, only emitter-receiver pairs along the shorter edge of a rectangular screen are activated.

In an alternative embodiment of the present invention both axes of a screen are scanned, and each scanned axis provides initial touch information about the screen. As such, instead of sequentially activating multiple scans of a single axis, in the alternative embodiment sequential activation of scans of separate axes are activated. A sequence of four scans are activated at four sampling intervals; namely, (i) a first half of the emitter-receiver pairs along a first screen axis are scanned; (ii) a first half of the emitter-receiver pairs along a second screen axis are activated, (iii) the second half of the emitter-receiver pairs along the first screen axis are activated, and (iv) the second half of the emitter-receiver pairs along the second screen axis are activated.

Design of Reflective Elements

A goal in designing alternating reflective or refractive facets of an optical element, is to generate a light distribution that provides good gradients as a basis for interpolation, by way of a linear signal gradient, $S(x)$, from an emitter to a receiver. A number of parameters affect the light distribution.

Figure 63:
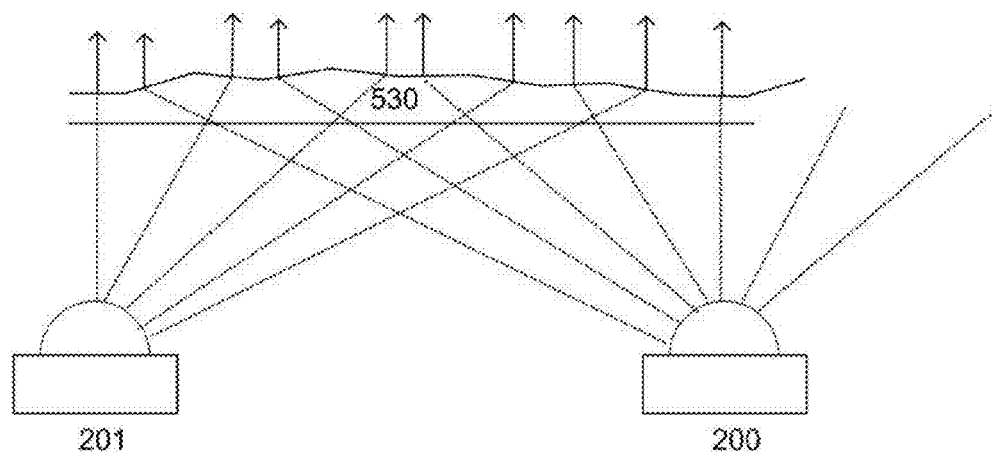
FIG. 63 is a simplified diagram of a mufti-faceted optical element, in accordance with an embodiment of the present invention.
Figure 63:
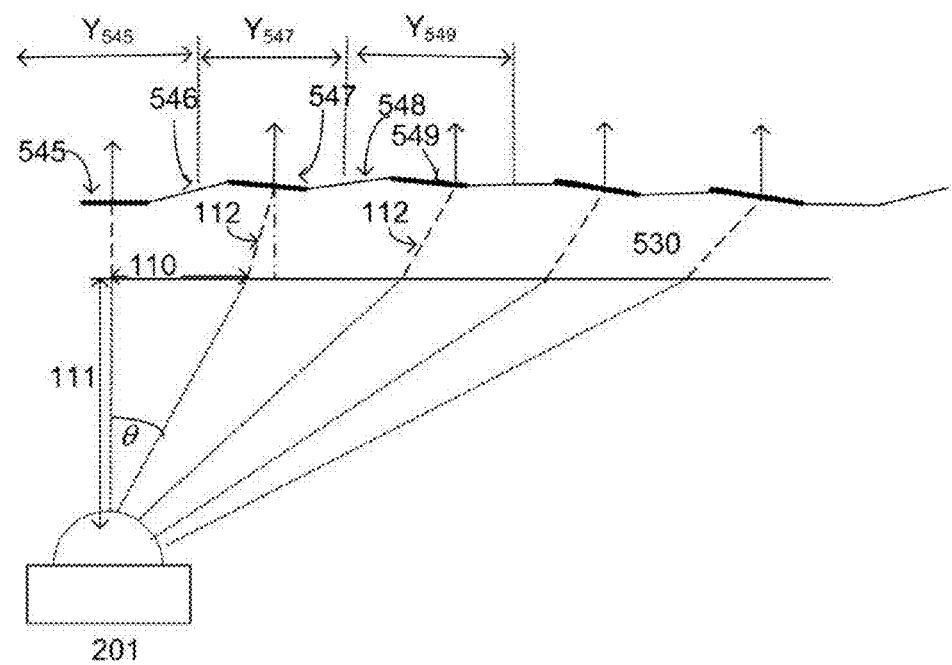

Reference is made to FIG. 63, which is a simplified diagram of a mufti-faceted optical element 530, in accordance with an embodiment of the present invention. Shown in FIG. 63 are parameters that control light from each facet of the optical element, as described in what follows.

The light intensity distribution depends on a polar angle, $\theta$, in accordance with the third power, $\cos^3 \theta$. The angle $\theta$ is a function of distance 110 between beams of a single emitter or receiver element that go to different facets, and of distance 111 between the emitter or receiver element and element 530.

The facet width, B, is a readily adjustable parameter.

The Fresnel loss, F, is the amount of light lost due to reflection caused by the refractive index of element 530, when a beam enters optical element 530. Variation of Fresnel loss F between different angles θ under Brewster's angle is less than 1%, and is therefore negligible.

Facet beam width, Y, is the total width covered by a single facet beam. The alternating facets generate gaps in the light from emitter 201, as neighboring facets are focused on neighboring emitter 202. Light from each facet covers the gaps. Facet beam width, Y, depends on facet width B and on the widths of neighboring facets. FIG. 63 shows facets 545, 547 and 549 aimed at emitter 201 and respective facet-beam widths $Y_{545}$, $Y_{547}$ and $Y_{549}$ that together cover the neighboring facets 548 and 546 aimed at emitter 202.

Figure 64:
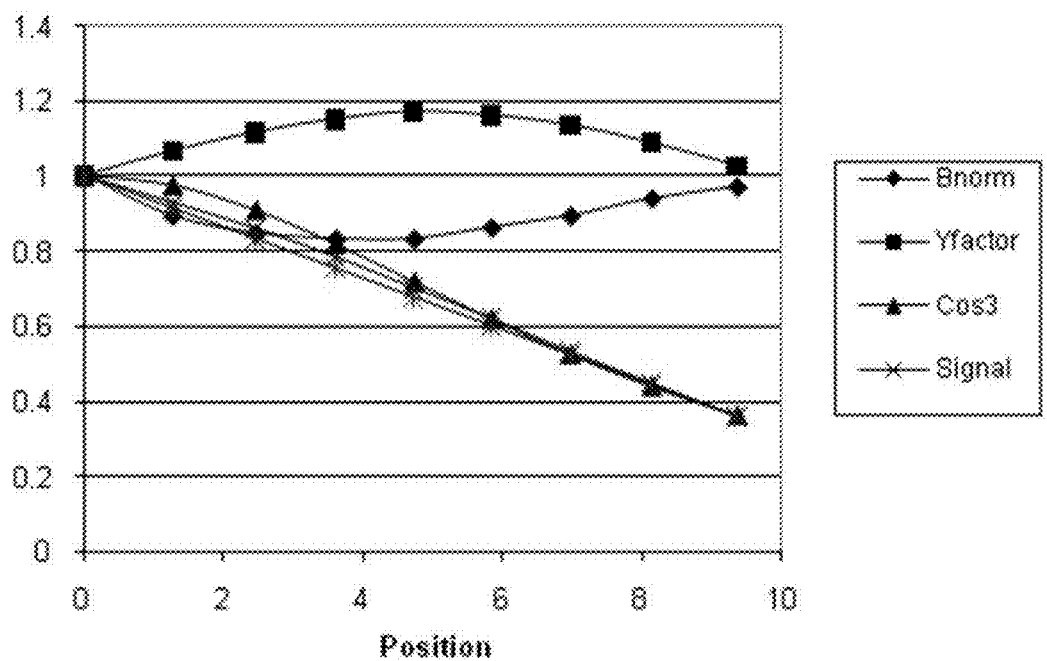
FIG. 64 is a simplified graph showing the effect of various reflective facet parameters on light distribution for nine facets, in accordance with an embodiment of the present invention.

Reference is made to FIG. 64, which is a simplified graph showing the effect of reflective facet parameters θ, Y and B on light distribution for nine facets, in accordance with an embodiment of the present invention. The graph of FIG. 64 also shows actual light distribution, and a reference linear function. As seen in FIG. 64, the actual light distribution signal is approximately linear. The data in the graph is normalized based on the central facet, located at location 0 on the x-axis, being assigned a value of 1 in all aspects. As such, the facet width B is labeled Bnorm in the graph, and facet widths are normalized relative to the width of the central facet. Generally, the angular parameter θ provides a sloped curve, which is flat for small values of θ, as seen in FIG. 64 in the flat portion of the θ curve, labeled cos 3, between positions 0 and 2 along the x-axis. The gradient for small θ is increased by adjusting parameter B, which in turn affects parameter Y, labeled Yfactor. The complete signal is labeled signal in the graph, and it is approximately linear.

Light intensity for facet k, as a function of parameters θ, B, F and Y, is described in accordance with $$\frac{s_k}{s_1} = \frac{\cos^3(\theta_k)}{\cos^3(\theta_1)} \cdot \frac{B_k}{B_1} \cdot \frac{F_k}{F_1} \cdot \frac{Y_k}{Y_1}, \quad (1)$$

where the lighting of facet k is normalized based on θ=0 for the central facet.

TABLE I lists parameters for each facet in a series of nine facets that are focused on one emitter or receiver element. In TABLE I, x-pos denotes the distance in millimeters from the central facet, B denotes the facet width in millimeters, B-norm denotes the normalized facet width, based on the central facet having a width of 1, Yfactor denotes the facet beam width, normalized to the width of the central facet beam, Signal denotes the normalized signal value for each facet, and Line denotes signal values for a reference straight line.

TABLE I

Facet parameters for nine facets

| Facet no. | x-pos | B | B-norm | Yfactor | cos³θ | Signal | Line |
|---|---|---|---|---|---|---|---|
| 1 | 0 | 0.66 | 1 | 1 | 1 | 1 | 1 |
| 2 | 1.265 | 0.59 | 0.893939 | 1.065574 | 0.973981 | 0.927774 | 0.913516 |
| 3 | 2.46 | 0.56 | 0.848485 | 1.11588 | 0.907237 | 0.858978 | 0.831817 |
| 4 | 3.605 | 0.55 | 0.833333 | 1.150442 | 0.817261 | 0.78351 | 0.753537 |
| 5 | 4.725 | 0.55 | 0.833333 | 1.171171 | 0.717801 | 0.700557 | 0.676966 |
| 6 | 5.835 | 0.57 | 0.863636 | 1.160714 | 0.618698 | 0.620205 | 0.601079 |
| 7 | 6.965 | 0.59 | 0.893939 | 1.135371 | 0.524528 | 0.532371 | 0.523824 |
| 8 | 8.13 | 0.62 | 0.939394 | 1.087866 | 0.438568 | 0.448188 | 0.444177 |
| 9 | 9.3510 | 0.64 | 0.969697 | 1.027668 | 0.362027 | 0.360769 | 0.360769 |

TABLE II lists parameters for a series of alternating facets focused on two neighboring elements, such as an emitter and a neighboring receiver. In TABLE II, facets nos. 1-5 are focused on an emitter, and facets nos. 6-9 are focused on a neighboring receiver. Three values are listed for each facet; namely, its width, B, its location, x-pos, along the x-axis relative to the center of the central facet for the emitter, and the location, border_pos, of the facet's outer edge. All facet values are specified in millimeters.

TABLE II

Nine alternating facets

| Facet no. | B | x-pos | border pos |
|---|---|---|---|
| 1 | 0.66 | 0 | 0.33 |
| 9 | 0.64 | 0.65 | 0.97 |
| 2 | 0.59 | 1.265 | 1.56 |
| 8 | 0.62 | 1.87 | 2.18 |
| 3 | 0.56 | 2.46 | 2.74 |
| 7 | 0.59 | 3.035 | 3.33 |
| 4 | 0.55 | 3.605 | 3.88 |
| 6 | 0.57 | 4.165 | 4.45 |
| 5 | 0.55 | 4.725 | 5 |

Signals Generated by Element 530

Figure 65:
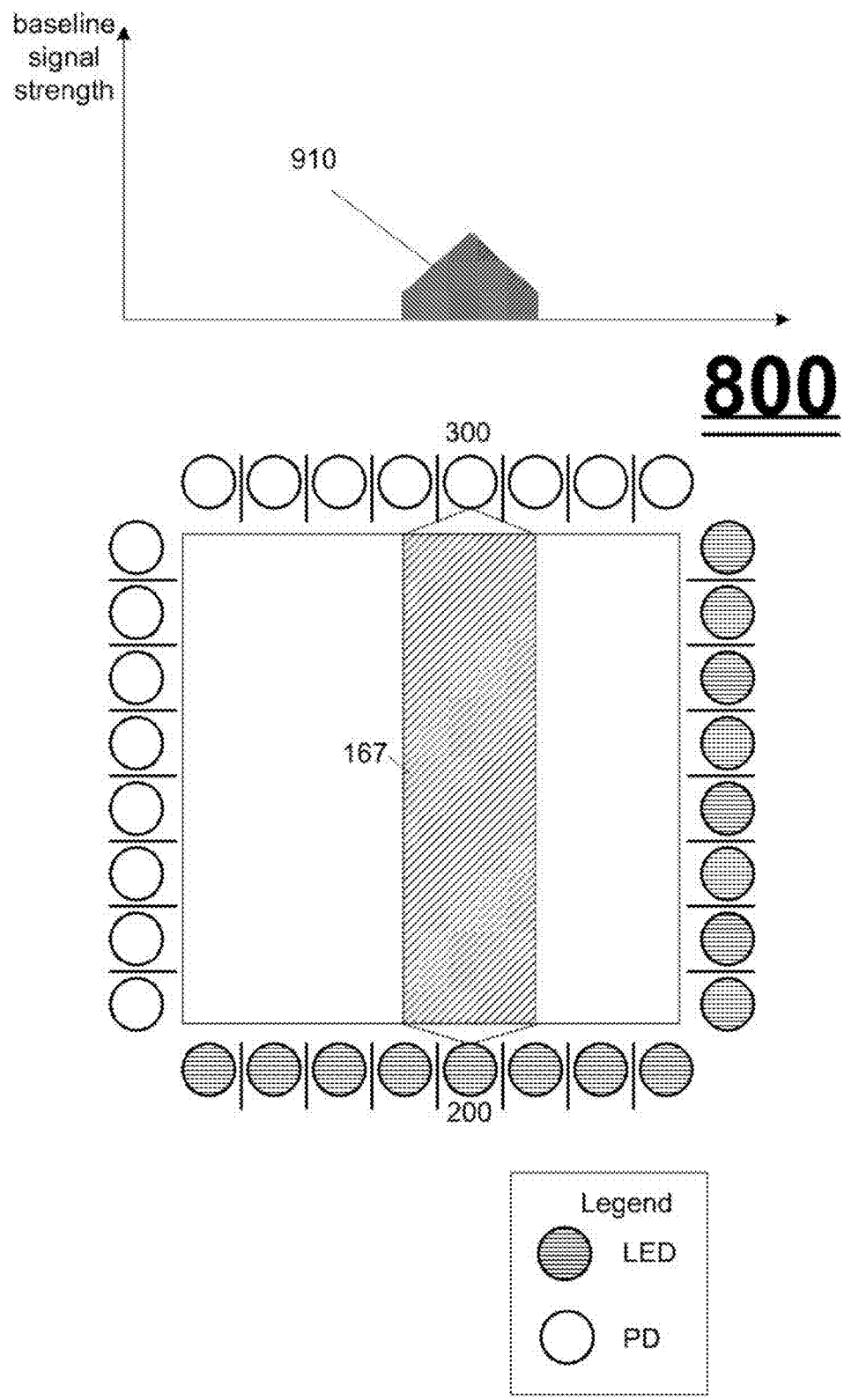
FIG. 65 is a simplified illustration of a touch screen with a wide light beam crossing the screen, in accordance with an embodiment of the present invention.
Figure 66:
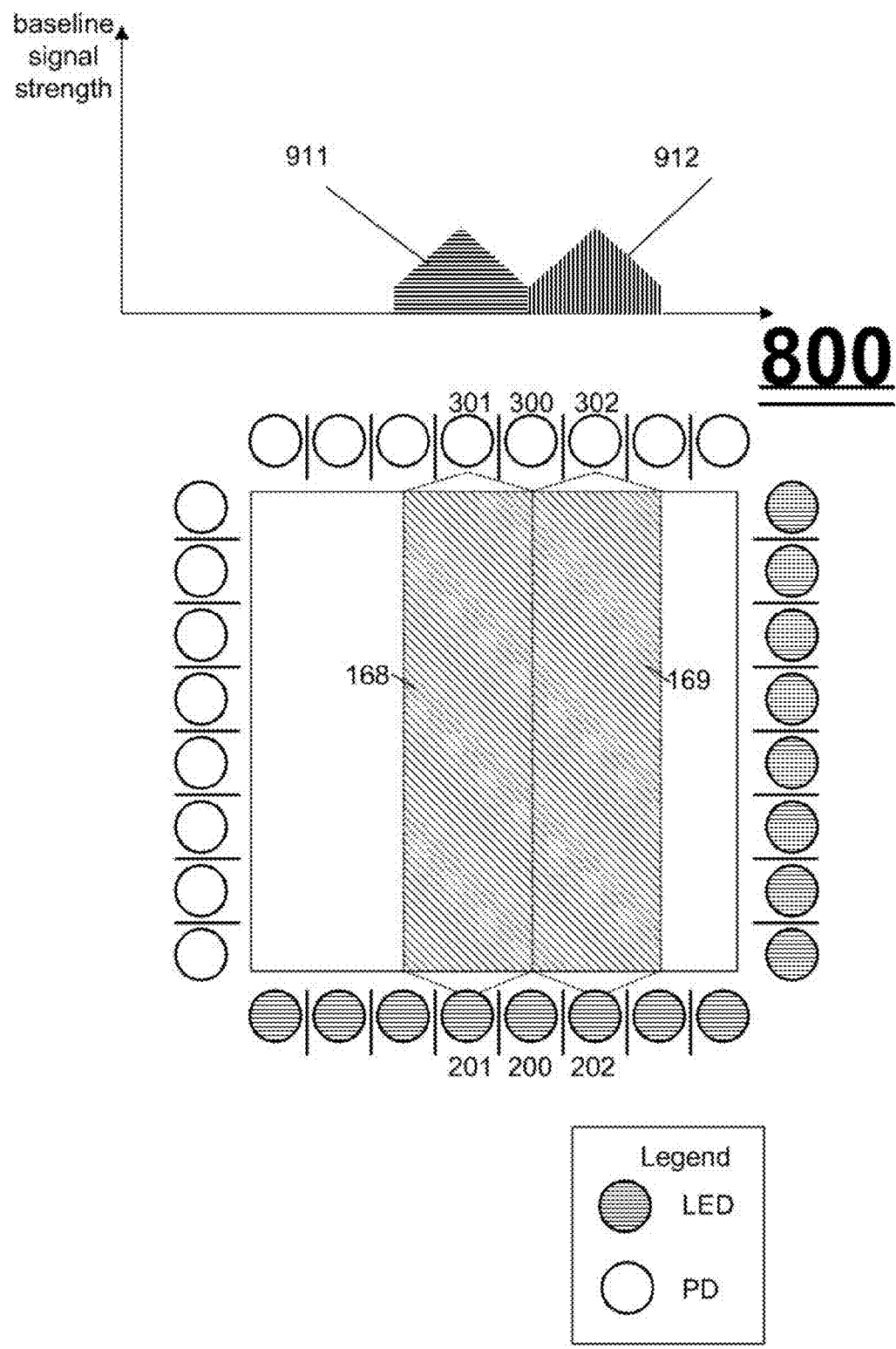
FIG. 66 is a simplified illustration of a touch screen with two wide light beams crossing the screen, in accordance with an embodiment of the present invention.
Figure 67:
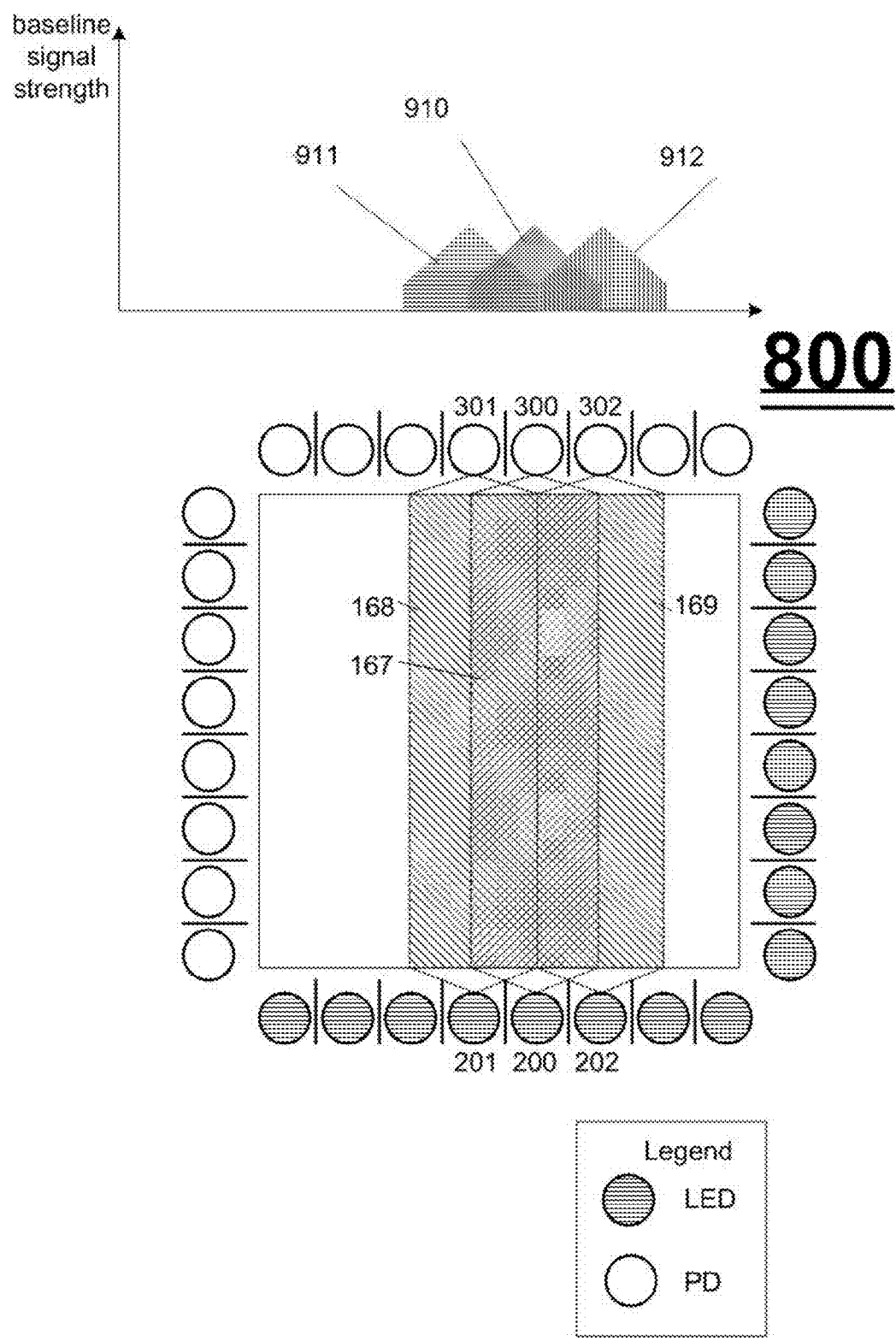
FIG. 67 is a simplified illustration of a touch screen with three wide light beams crossing the screen, in accordance with an embodiment of the present invention.

Reference is made to FIG. 65, which is a simplified illustration of a touch screen with a wide light beam crossing the screen, in accordance with an embodiment of the present invention. Reference is also made to FIG. 66, which is a simplified illustration of a touch screen with two wide light beams crossing the screen, in accordance with an embodiment of the present invention. Reference is also made to FIG. 67, which is a simplified illustration of a touch screen with three wide light beams crossing the screen, in accordance with an embodiment of the present invention. As shown in FIG. 65, a screen 800 is surrounded with emitters and receivers. A wide beam 167 is shown representing a wide detection area on screen 800, that is detected by an emitter-receiver pair 200-300. Wide beam 167 is generated by optical elements, such as element 530 described hereinabove but not shown in FIGS. 65-67. A first element 530 collimates light from emitter 200, and a second element 530 focuses wide beam 167 onto receiver 300. A graph 910 shows the gradient of signal intensities detected across the width of wide beam 167.

FIG. 66 shows neighboring wide beams 168 and 169, representing wide detection areas on screen 800 detected by respective emitter-receiver pairs 201-301 and 202-302. Respective graphs 911 and 912 illustrate the gradient of signal intensities detected across the widths of wide beams 168 and 169.

FIG. 67 shows the three wide beams of FIGS. 5 and 66. As seen in FIG. 67, the left half of beam 167 is overlapped by half of beam 168, and the right half of beam 167 is overlapped by half of beam 169. The intensity gradients in graphs 910-912 indicate that a touch at any location along the width of beam 167 is detected along two gradients of two overlapping wide beams. Similarly, a touch at any location on the screen is detected in both the vertical and the horizontal axis along two gradients of two overlapping wide beams on each axis. A precise touch coordinate is calculated by interpolating touch locations of the two signals based on the detection signal gradients. FIG. 62 shows the light signal attenuation gradients 920 and 921 across the widths of the two overlapping beams. Light signal attenuation gradient 920 corresponds to the beam emitted from emitter element 200, and light signal attenuation gradient 921 corresponds to the beam emitted from emitter element 201. As such, the beam has maximum intensity directly above the element, and tapers off at either side. Having two different sloping gradients for the overlapping beams is of advantage for calculating a precise touch location, as described hereinbelow.

Figure 68:
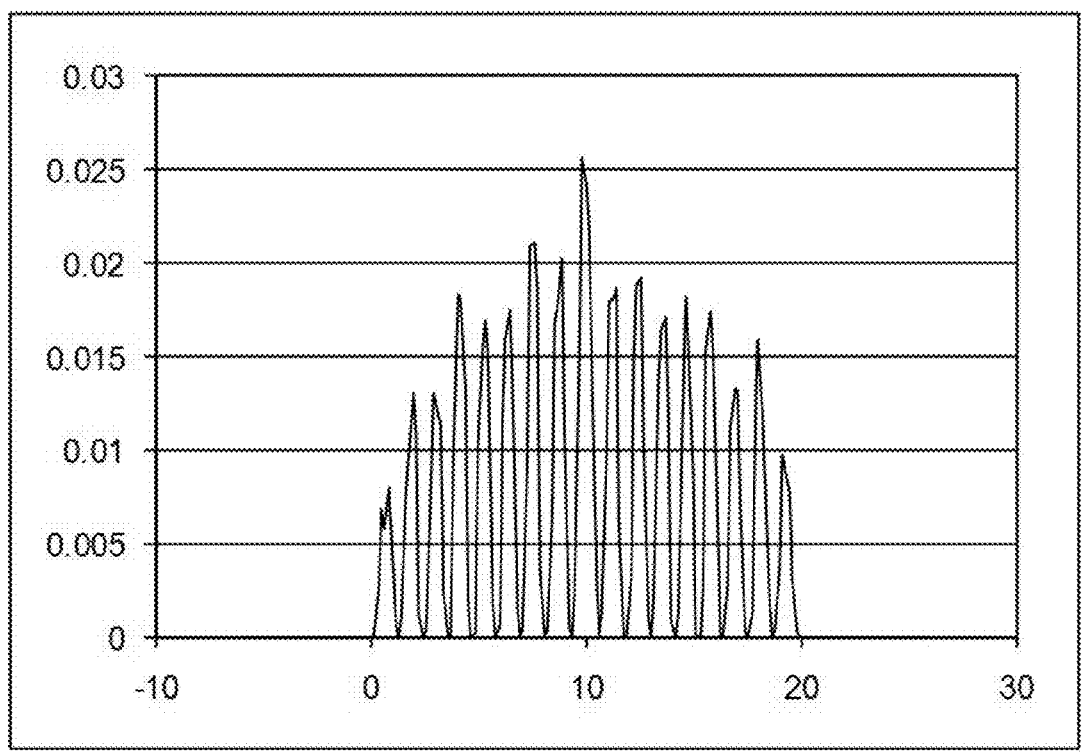
FIG. 68 is a simplified graph of light distribution of a wide beam in a touch screen, in accordance with an embodiment of the present invention.
Figure 68:
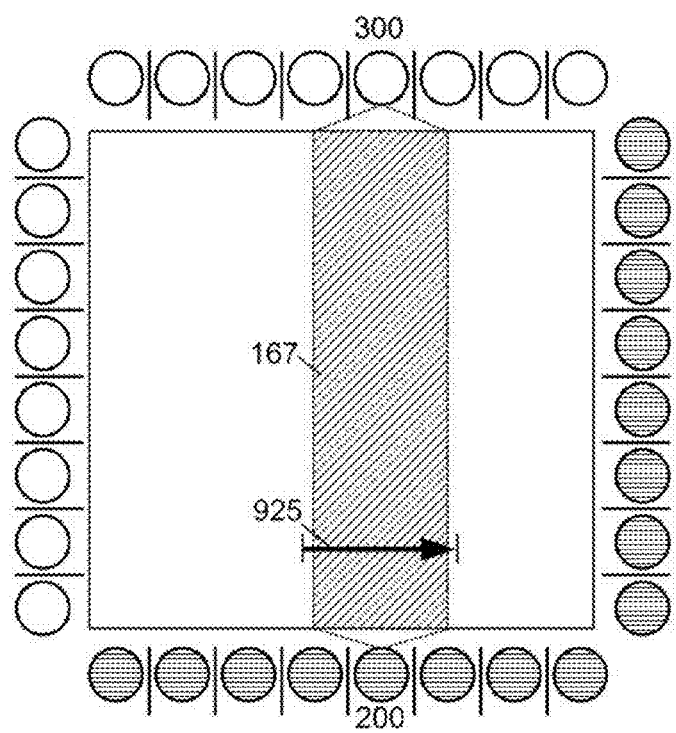

Reference is made to FIG. 68, which is a simplified graph of light distribution of a wide beam in a touch screen, in accordance with an embodiment of the present invention. The lower portion of FIG. 68 shows a path across wide beam 167, and the upper portion of FIG. 68 is a graph depicting signal intensity distribution along this path. The graph's x-axis represents the horizontal screen dimension in units of millimeters. The graph's y-axis represents the baseline signal intensity detected by emitter-receiver pair 200-300 situated at 10 mm along the screen axis. The signal corresponds to a screen with emitter and receiver elements arranged at a pitch of 10 mm. As such, the detected wide beam spans 20 mm. The spikes in the graph are caused by the alternating facets of optical element 530 describe above, which alternately focus rays at neighboring elements. As such, spikes correspond to facets belonging to the measured emitter-receiver pair, and the neighboring troughs correspond to facets belonging to a neighboring emitter-receiver pair. Despite these spikes, detection signals of a finger or another object along the measured screen axis have a relatively smooth gradient along the entire 20 mm span of the beam since the finger is wider than the narrow spike and trough channels. As such, a finger blocks a series of spikes which remain substantially uniform as the finger slides long the screen axis. E.g., a fingertip is approximately 6 mm wide, whereas there are 8-9 spikes in 10 mm in the graph of FIG. 68.

Figure 69:
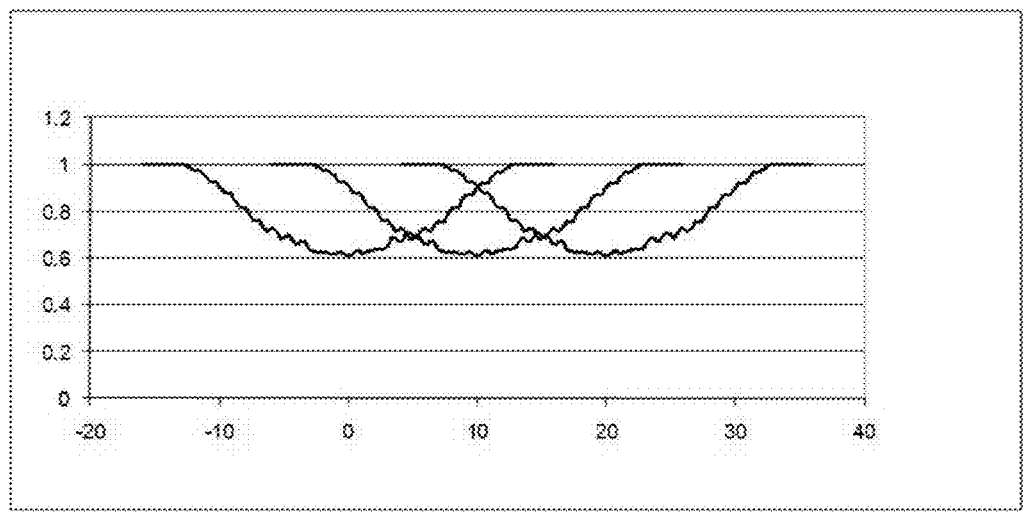
FIG. 69 is a simplified illustration of detection signals from three wide beams as a fingertip moves across a screen, in accordance with an embodiment of the present invention.

Reference is made to FIG. 69, which is a simplified illustration of detection signals from three wide beams as a fingertip moves across a screen, in accordance with an embodiment of the present invention. Shown in FIG. 69 are three detection signals of a fingertip as it moves across three neighboring wide beams along a screen axis. From each of the signals it is apparent that as the finger enters a wide beam, the finger blocks a small portion of the beam. As the finger moves along the axis toward the center of the beam, it blocks progressively more of the beam until it blocks roughly 40% of the beam intensity, indicated in the graph by a minimum detection of 60% of the expected baseline signal. As the finger moves further along, it blocks progressively less of the beam. The shape of the detection curve is relatively smooth, despite the peaks and troughs in the light beam shown in FIG. 68. There are slight fluctuations along the detection curves of FIG. 69 that are at least partially due to the peaks, but these fluctuations are minimal and do not significantly distort the trend of the signal.

Figure 70:
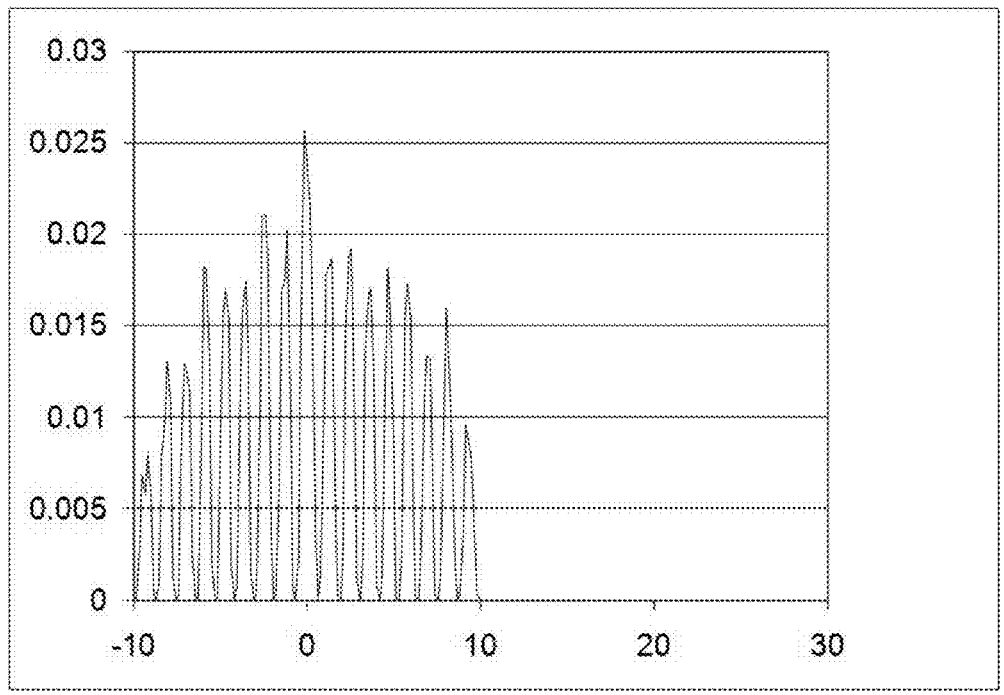
FIGS. 70-72 are simplified graphs of light distribution in overlapping wide beams in a touch screen, in accordance with an embodiment of the present invention.
Figure 71:
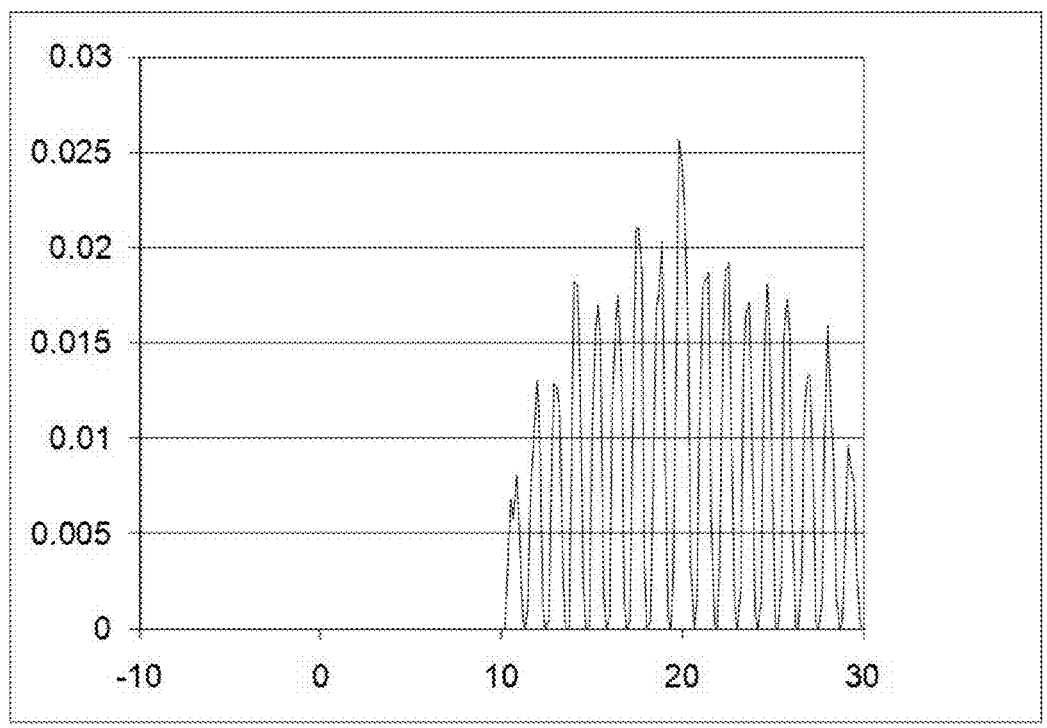
Figure 72:
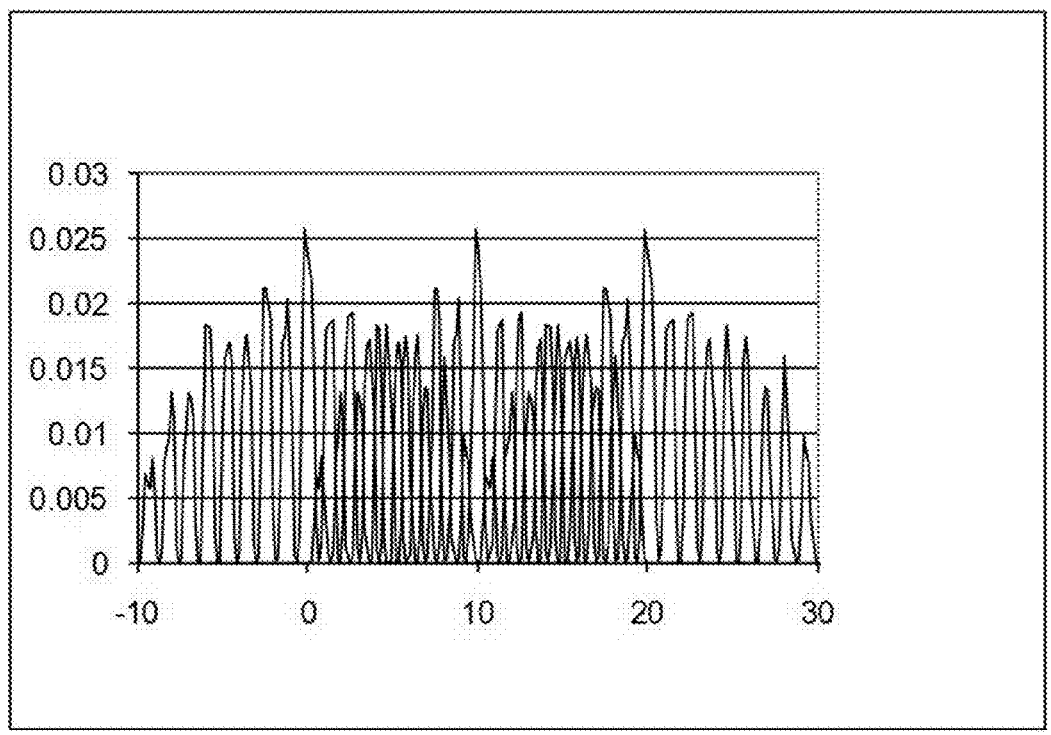

Reference is made to FIGS. 70-72, which are simplified graphs of light distribution in overlapping wide beams in a touch screen, in accordance with an embodiment of the present invention. Taken together, FIGS. 68 and 70-72 show a light distribution across three neighboring wide light beams on a screen with emitter-receiver pairs spaced 10 mm apart. As seen in these figures, the facets of optical element 530 provide overlapping touch detection by two emitter-receiver pairs. FIG. 70 shows the light signal from an emitter-receiver pair situated at location 0 along the measured screen axis. FIG. 71 shows the light signal from an emitter-receiver pair situated at a location 20 mm along the measured screen axis. FIG. 72 shows the light signals from the three emitter-receiver pairs of FIGS. 68, 70 and 71, and shows how these light beams cover overlapping areas of the screen surface. FIG. 69 shows three detection signals for the three emitter-receiver pairs of FIG. 72, as a fingertip moves along the screen axis.

Touch detection signals are less smooth when using a fine-point stylus than when using a finger. E.g., a 2 mm stylus tip moving across a screen generates more fluctuations in a detection signal than does a 6 mm finger, since the stylus tip covers fewer peaks in the light signal and, therefore, moving in and out of a signal peak changes a larger part of the blocked signal. Nevertheless, embodiments of the present invention overcome this drawback and determine stylus touch locations with a high level of accuracy, by interpolating multiple detection signals.

Figure 73:
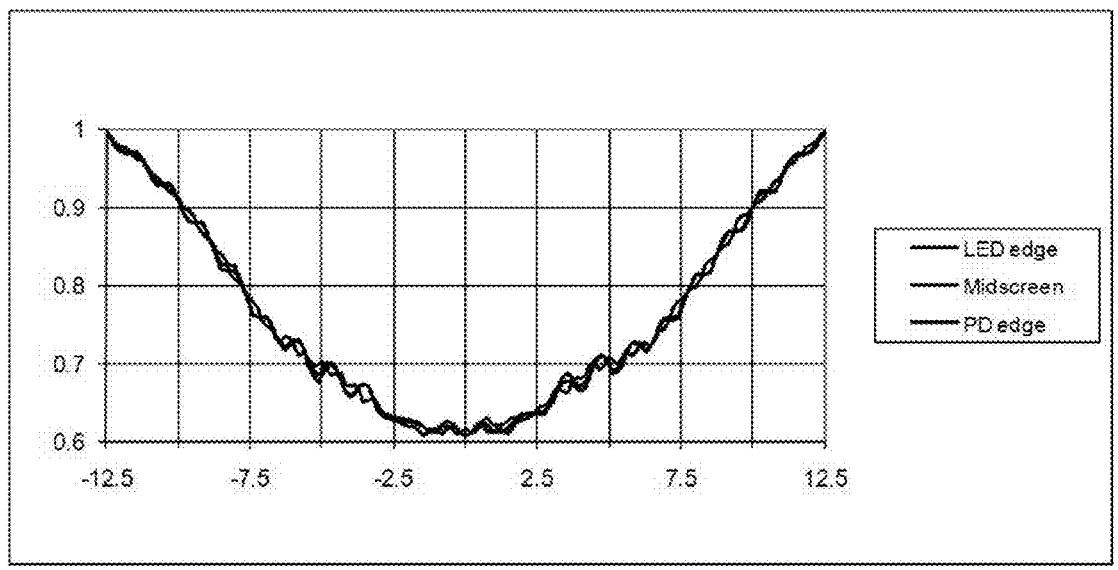
FIG. 73 is a simplified graph of detection signals from a wide beam as a fingertip moves across a screen at three different locations, in accordance with an embodiment of the present invention.
Figure 73:
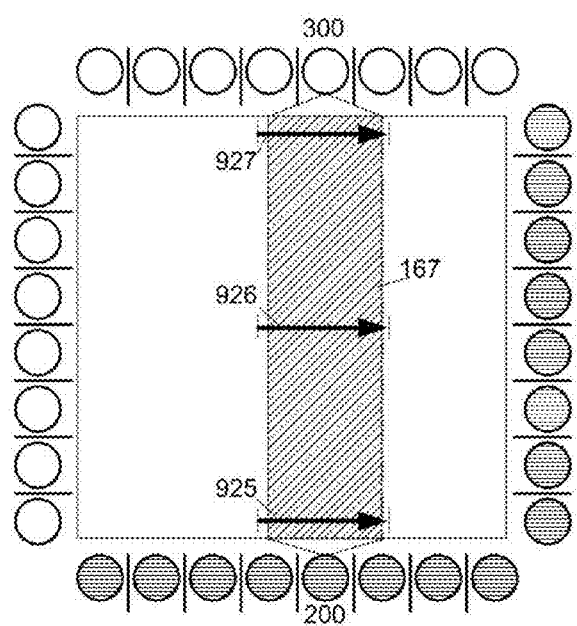

Reference is made to FIG. 73, which is a simplified graph of detection signals from a wide beam as a fingertip moves across a screen at three different locations, in accordance with an embodiment of the present invention. Shown at the bottom of FIG. 73 are three paths 925-927 traced by a finger across a wide beam 167. Path 925 is near LED 200, path 926 is mid-screen, and path 927 is near a PD 300. The graph in the upper portion of FIG. 73 shows three detection signals of a fingertip as it traverses the three paths 925-927, labeled in the graph legend as LED edge, Midscreen and PD edge, respectively. The three detection signals in the graph are substantially overlapping. As such, the signal is uniformly detected along its depth, and the signal varies as a function of the touch along only one axis of the screen. Thus determining a touch location along a first axis is independent of the detection signal along a second axis. Moreover, the intensity of the signal is uniform along the second axis, making the signal robust.

Supporting Various Screen Sizes

Some embodiments of configuration no. 6 include optical elements with alternating facets that are focused on two neighboring light emitting or receiving elements. When such an optical element is separate from the light emitters or receivers, the emitters or receivers are generally spaced at a particular pitch. When such an optical element is formed as a rigid module together with an emitter or a receiver, the embedded emitter or receiver is precisely positioned with respect to the reflective facets. The facets aimed at a neighboring module, are aimed in accordance with the embedded emitter or receiver in the neighboring module that is similarly situated in its module. Such positioning potentially restricts the size of a screen to integral multiples of the pitch. E.g., with a pitch of 10 mm between emitters, the screen dimensions must be integral multiples of 10 mm. Embodiments of the present invention are able to overcome this restriction, as described in what follows.

Figure 74:
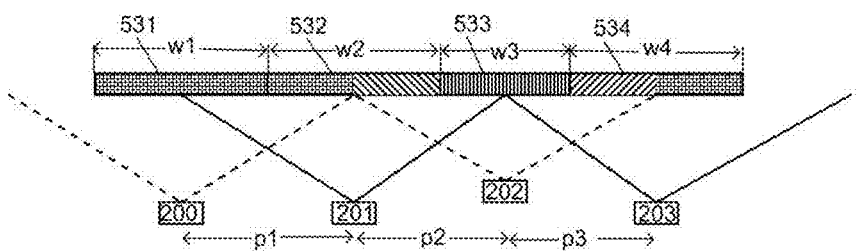
FIG. 74 is a simplified diagram of four optical elements and four neighboring emitters, in accordance with an embodiment of the present invention.

Reference is made to FIG. 74, which is a simplified diagram of four optical elements and four neighboring emitters, in accordance with an embodiment of the present invention. Shown in FIG. 74 are four optical elements 531-534 arranged in a row. Each element is positioned opposite a respective one of emitters 200-203. The same configuration is assembled for receivers, or for alternating emitters and receivers. In the case of receivers, emitters 200-203 are replaced by receivers; and in the case of alternating emitters and receivers, emitters 200 and 202 are replaced by receivers.

Optical elements 531, 532 and 534 are all of the same width, e.g., 10 mm; i.e., w1=w=w4. The pitch, P1, between emitters 200 and 201 is a standard distance, e.g., 10 mm. The facets of optical element 531 are constructed for emitters that are at a standard pitch of 10 mm. Pitches P2 and P3 may be nonstandard. By enabling a device manufacturer to insert a single emitter at a non-standard pitch, the manufacturer can accommodate any screen size. The width, w3, of optical element 533 is customized for a non-standard screen size; e.g., for a screen length of 96 mm, w3 is 6 mm instead of 10 mm, and pitches P2 and P3 are each 8 mm. Optical element 532 is a hybrid element—the left half of element 532 has facets aimed at emitters 200 and 201, which are positioned according to a standard 10 mm pitch, and the right half of element 532 is special having facets aimed at emitters 201 and 202, where emitter 202 has a non-standard placement. Optical element 534 is also a hybrid element, as its left half has facets aimed at emitters 202 and 203, whereas its right half is aimed at two standard pitch emitters. Optical element 533 is non-standard throughout—it is not as wide as the standard elements and has every other of its facets aimed at emitter 202. In this example, the width of the beam from emitter 202 is roughly 16 mm, as compared to the standard 20 mm width. As such, emitter 202 is placed slightly closer to optical element 533.

Diffractive Surfaces

Figure 75:
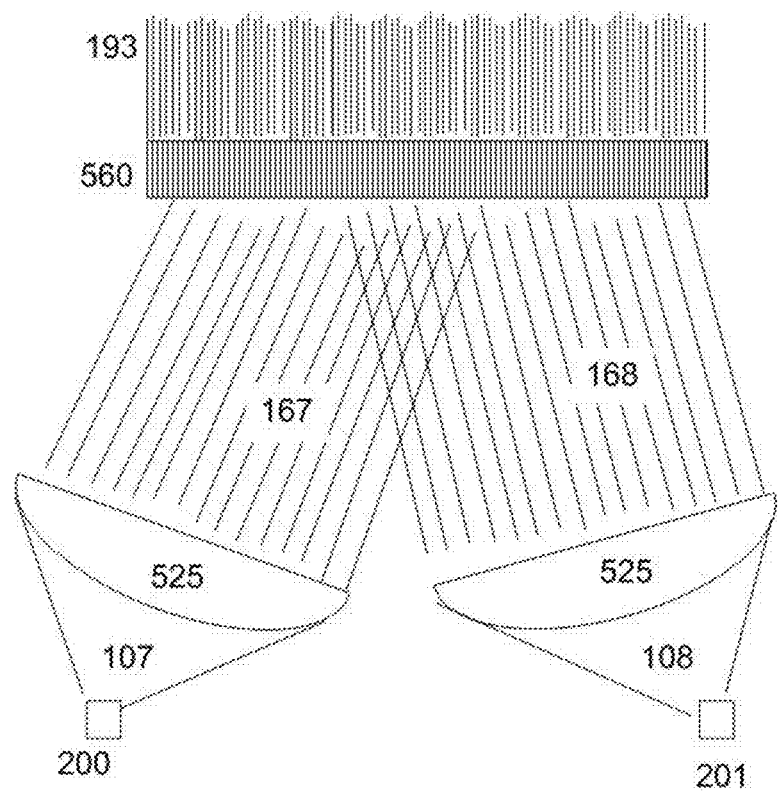
FIG. 75 is a simplified diagram of a diffractive surface that directs beams from two emitters along a common path, in accordance with an embodiment of the present invention.

As described hereinabove, diffractive surfaces are used in embodiments of the present invention to direct beams from two emitters along a common path. Reference is made to FIG. 75, which is a simplified diagram of a diffractive surface that directs beams from two emitters along a common path, in accordance with an embodiment of the present invention. Shown in FIG. 75 are emitters 200 and 201 emitting arcs of light 107 and 108 into two collimating lenses 525. Wide beams 167 and 168 exit lenses 525 and enter refractive surface 560, which directs both beams 167 and 168 into a wide beam 193 that crosses the screen. A similar optical arrangement splits wide beam 193 onto two receivers at the opposite screen edge. Each emitter is activated separately with a respective opposite receiver. Beams from the two emitters have different signal gradients along the width of beam 193, as explained hereinabove. The two detection signals are used to calculate a touch location from EQS. (2) and (3) provided hereinbelow.

Parallel Overlapping Beams

As described hereinabove, parallel wide beams projected at slightly different heights over a screen are used in alternative embodiments of the present invention, to provide multiple detection signals for a touch event on the screen.

Alternating Emitters and Receivers

Figure 76:
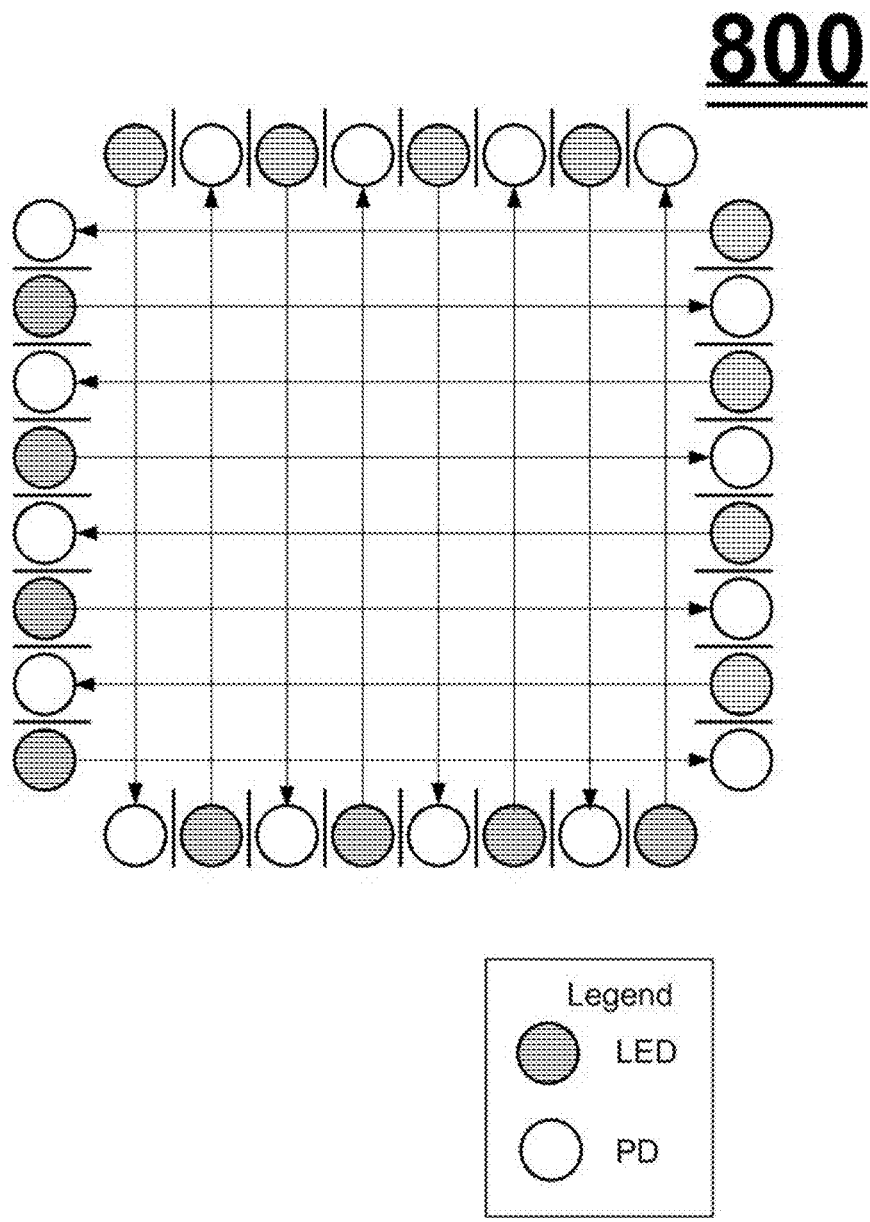
FIG. 76 is a simplified diagram of a touch screen surrounded with alternating emitters and receivers, in accordance with an embodiment of the present invention.
Figure 77:
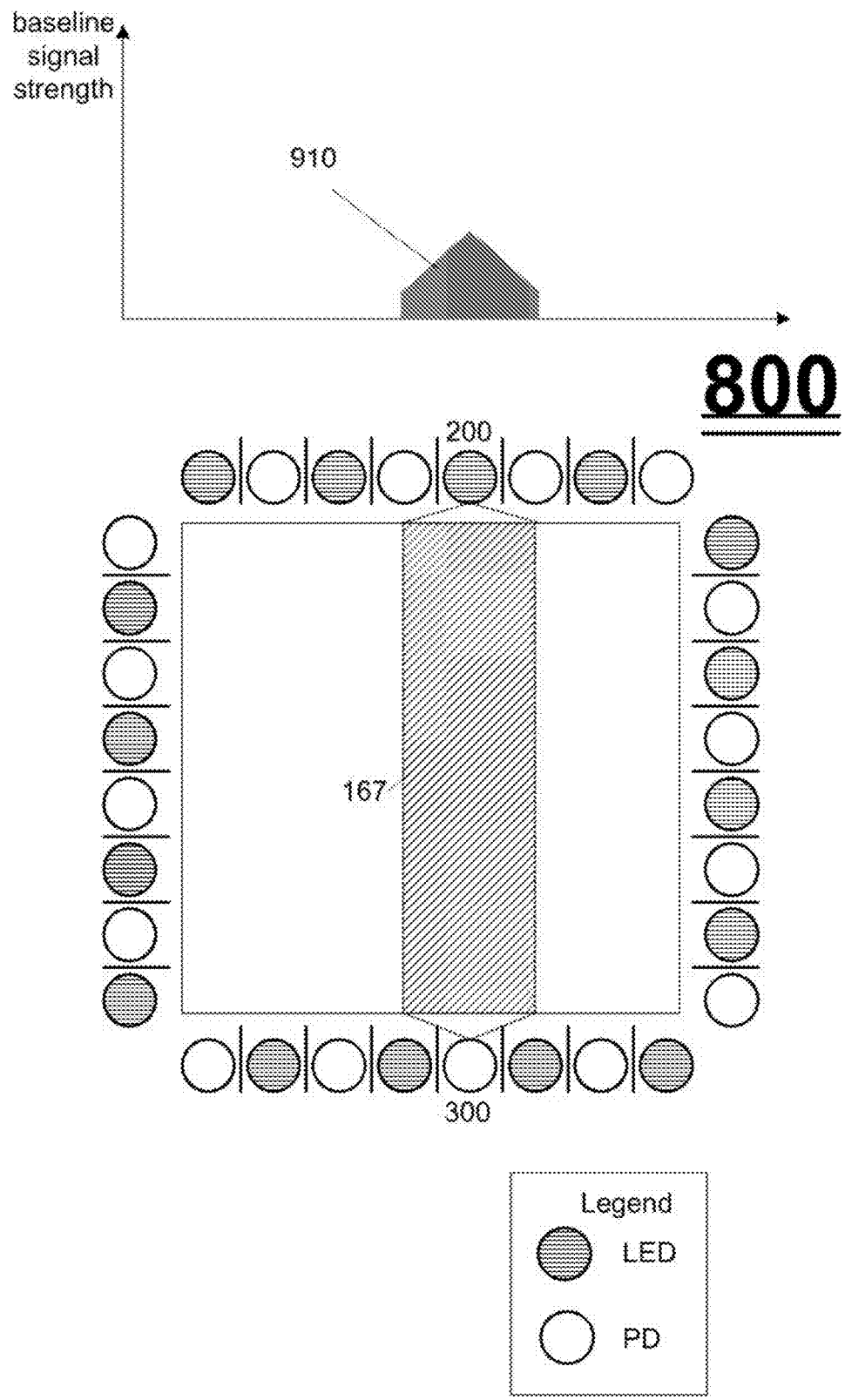
FIG. 77 is a simplified illustration of a touch screen surrounded with alternating emitters and receivers, and a wide beam crossing the screen, in accordance with an embodiment of the present invention.
Figure 78:
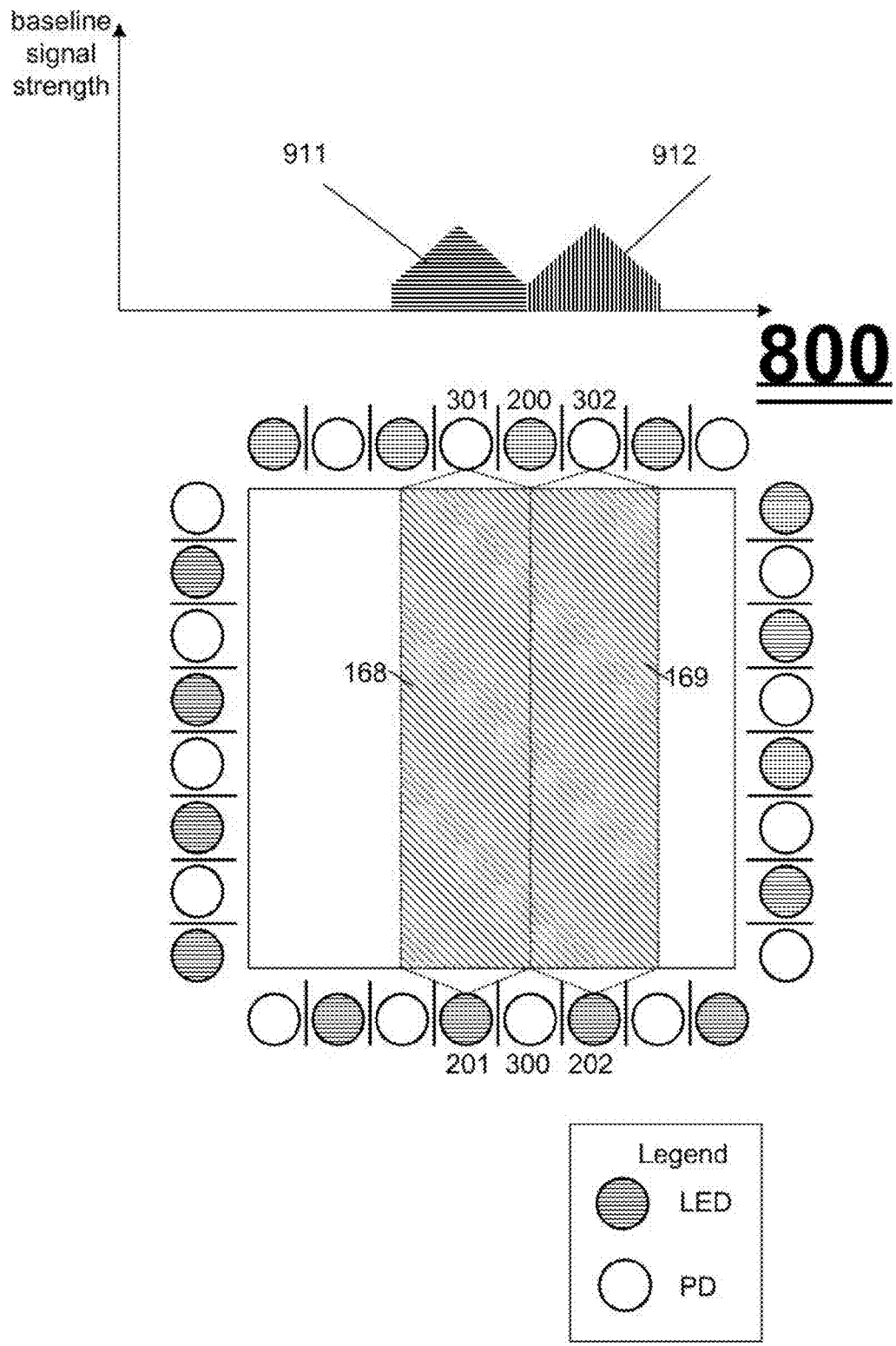
FIG. 78 is a simplified illustration of a touch screen surrounded with alternating emitters and receivers and two wide beams crossing the screen, in accordance with an embodiment of the present invention.
Figure 79:
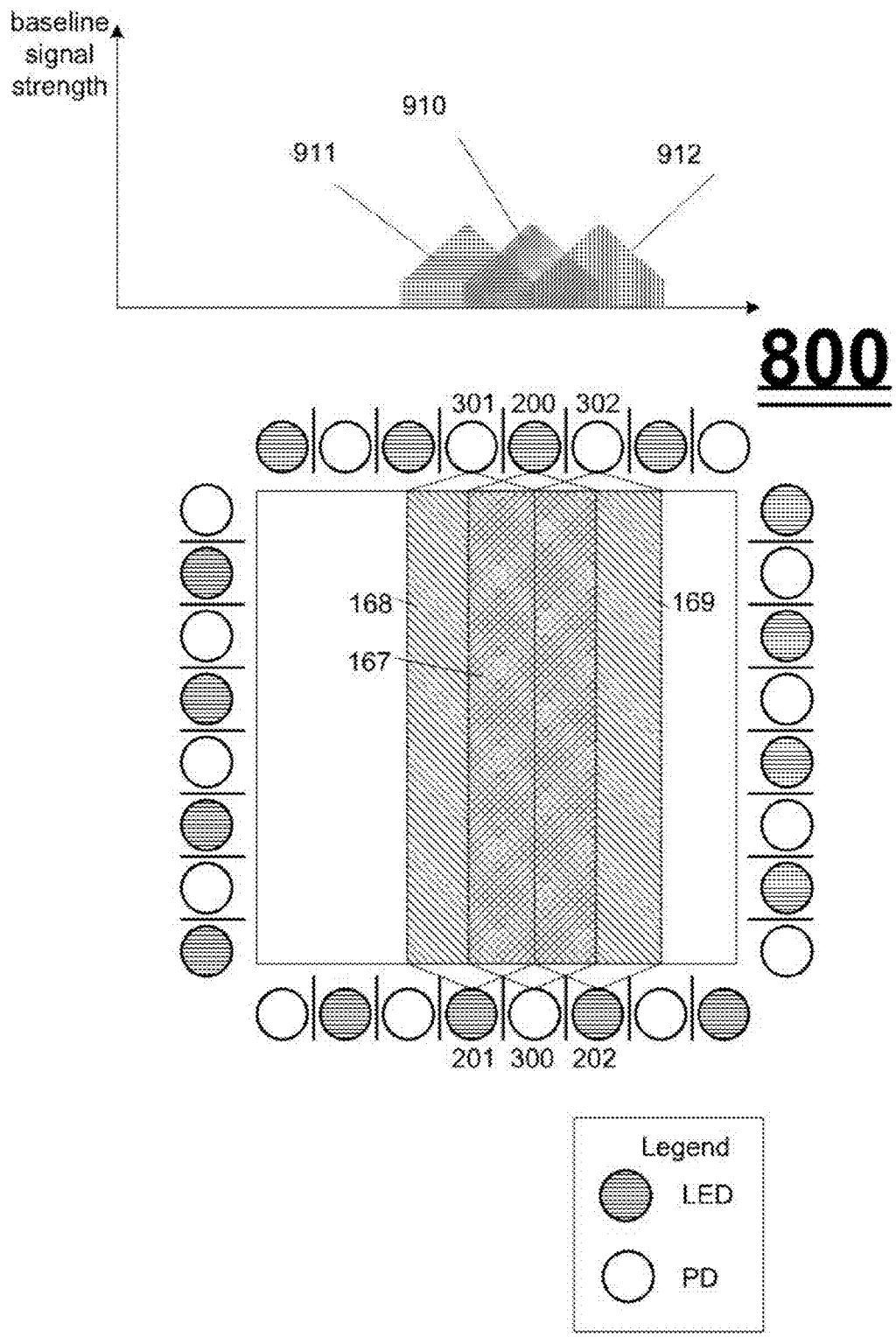
FIG. 79 is a simplified illustration of a touch screen surrounded with alternating emitters and receivers and three wide beams crossing the screen, in accordance with an embodiment of the present invention.

In an alternative embodiment of the present invention, emitters and receivers are positioned alternately along each screen edge. Reference is made to FIG. 76, which is a simplified diagram of a touch screen surrounded with alternating emitters and receivers, in accordance with an embodiment of the present invention. Reference is also made to FIG. 77, which is a simplified illustration of a touch screen surrounded with alternating emitters and receivers, and a wide beam crossing the screen, in accordance with an embodiment of the present invention. Reference is also made to FIG. 78, which is a simplified illustration of a touch screen surrounded with alternating emitters and receivers and two wide beams crossing the screen, in accordance with an embodiment of the present invention. Reference is also made to FIG. 79, which is a simplified illustration of a touch screen surrounded with alternating emitters and receivers and three wide beams crossing the screen, in accordance with an embodiment of the present invention. FIGS. 77-79 show overlapping wide beams, similar to those of FIGS. 65-67 described hereinabove.

Figure 80:
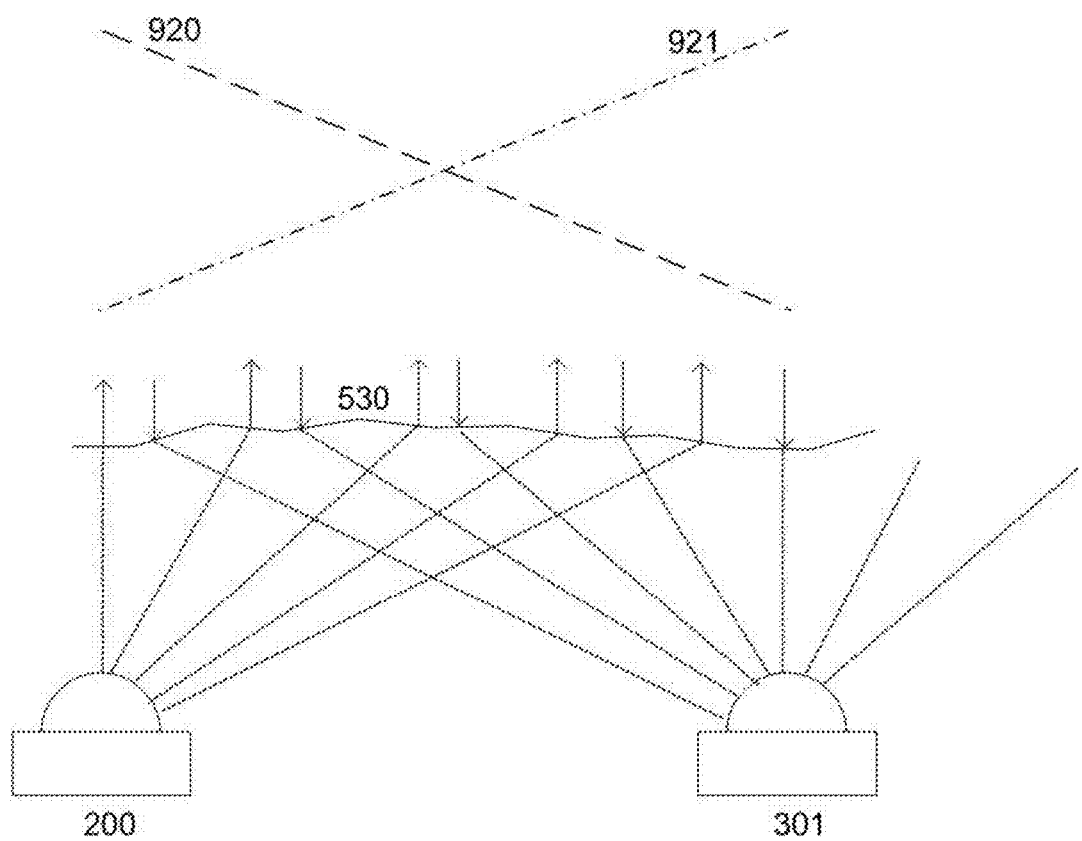
FIG. 80 is a simplified illustration of a collimating optical element reflecting and interleaving light for an emitter and a neighboring receiver, in accordance with an embodiment of the present invention.

Reference is made to FIG. 80, which is a simplified illustration of a collimating optical element reflecting and interleaving light for an emitter and a neighboring receiver, in accordance with an embodiment of the present invention. FIG. 80 shows optical element 530 interleaving neighboring light beams, wherein a first beam is outgoing from emitter 200 and a second beam is incoming to neighboring receiver 301. FIG. 80 also shows signal gradient 920 for the first beam and signal gradient 921 for the second beam. When a touch is detected on both beams, the sloping gradients enable determination of a precise touch location by interpolation, as described hereinbelow.

As indicated hereinabove with reference to FIG. 73, the detection signal does not vary with depth of touch location within a wide beam. Therefore, the opposing directions of the adjacent overlapping wide beams do not affect the touch detection signal. In turn, this enables interpolating signals from overlapping beams without regard for direction of each beam.

As explained above with reference to configuration no. 4, when a touch pointer is expected to be wide, such as a finger, the wide beams need not overlap, since it is expected that the finger span at least a portion of two neighboring beams, assuming the beams are slightly less wide than the finger. Moreover, the finger covers each beam beginning at one of the beam's edges. Therefore, even when the beam distributes light evenly across the beam's width, the system is able to determine the blocked portion of each beam. E.g., if 50% of the beam is blocked, the finger is blocking half of the beam; and if 25% of the beam is blocked, the finger is blocking one quarter of the beam. This is different than the attenuated signal gradients 920 and 921 of FIG. 80. The location of the finger is then determined by interpolating signals from two or more neighboring beams.

Multi-Touch Detection

Figure 81:
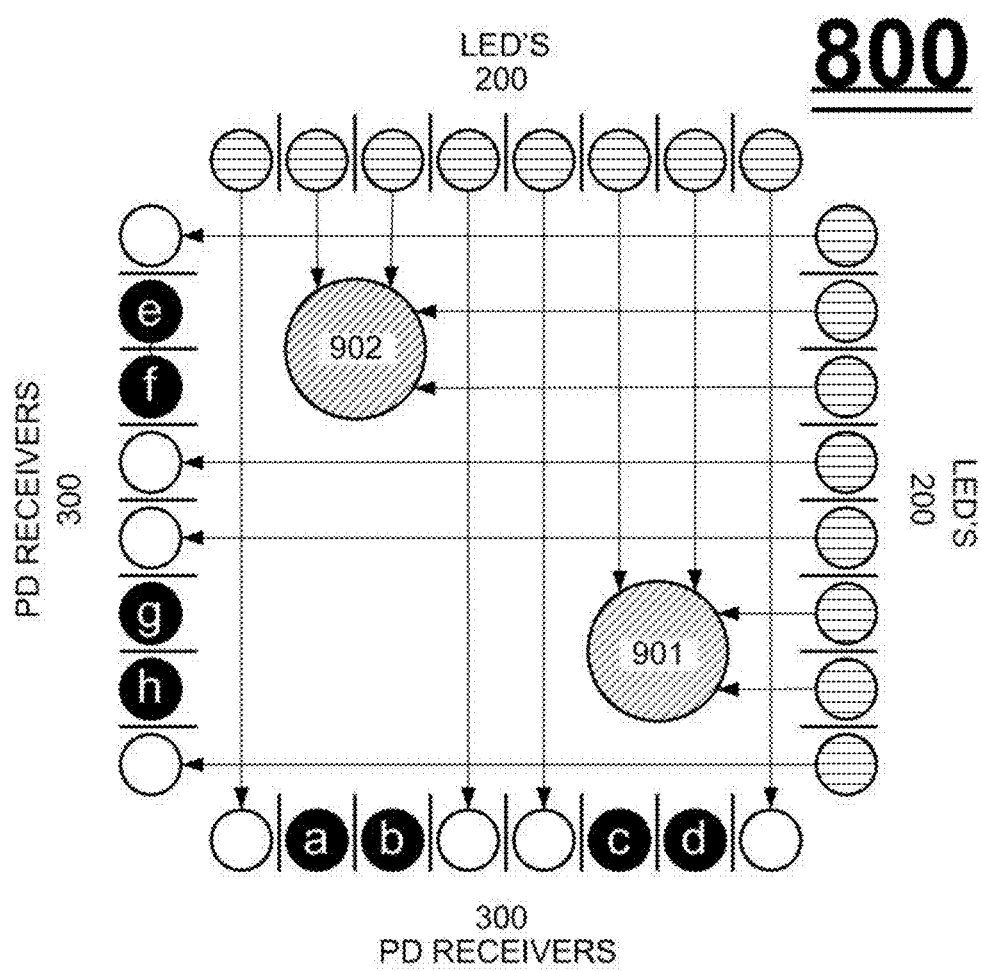
FIGS. 81-84 are illustrations of mufti-touch locations that are ambiguous vis-à-vis a first orientation of light emitters, in accordance with an embodiment of the present invention.
Figure 82:
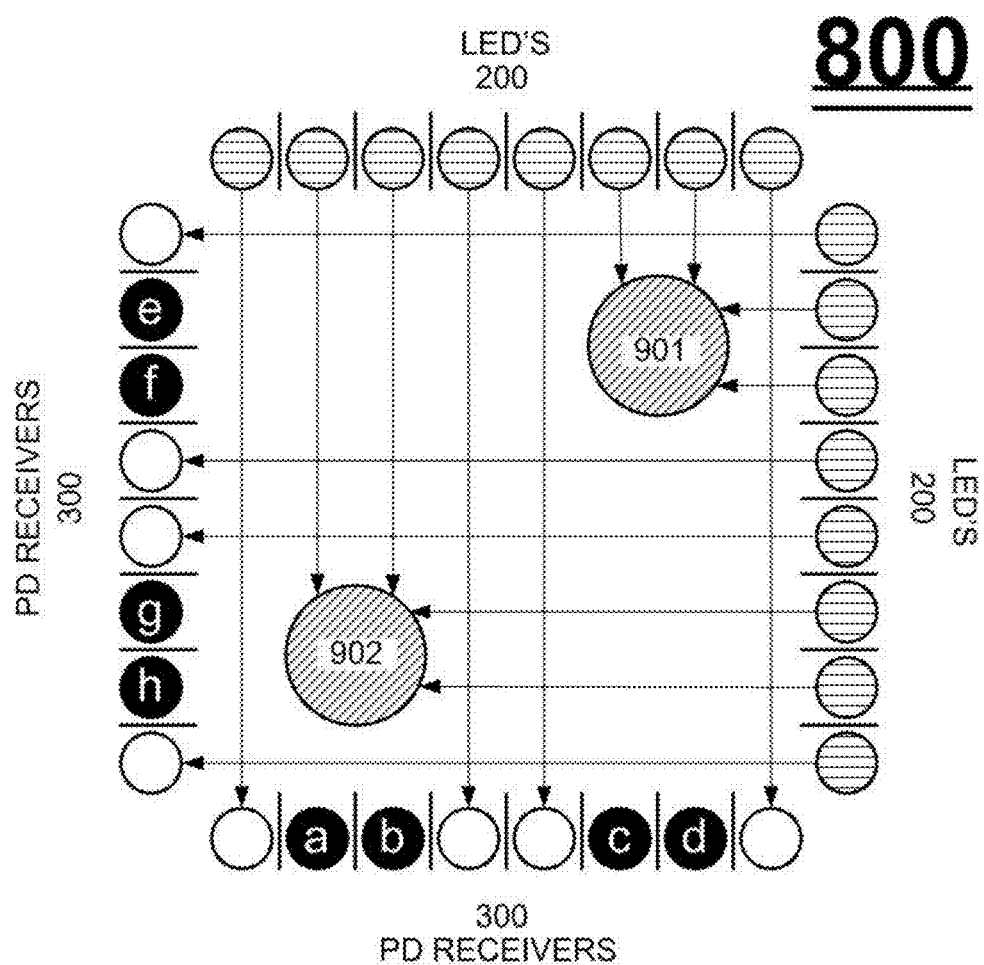

Multi-touch locations are often difficult to identify unambiguously via light emitters that emit light in directions parallel to two axes. Reference is made to FIGS. 81-84, which are illustrations of mufti-touch locations that are ambiguous vis-à-vis a first orientation of light emitters, in accordance with an embodiment of the present invention. As shown in FIGS. 81 and 82, there is ambiguity in determining the locations of a diagonally oriented mufti-touch. There is further ambiguity if a multi-touch includes more than two pointers. For example, the two-touch cases shown in FIGS. 81 and 82 are also ambiguous vis-à-vis the three-touch case shown in FIG. 83 and vis-à-vis the four-touch case shown in FIG. 84. In each of these cases, row and column indicators a-h show an absence of light in the same locations. Such ambiguity is caused by "ghosting", which refers to an effect where the shadow of one pointer obscures a portion of another pointer.

In accordance with an embodiment of the present invention, ghosting is resolved by use of two sets of grid orientations for touch detection.

Figure 83:
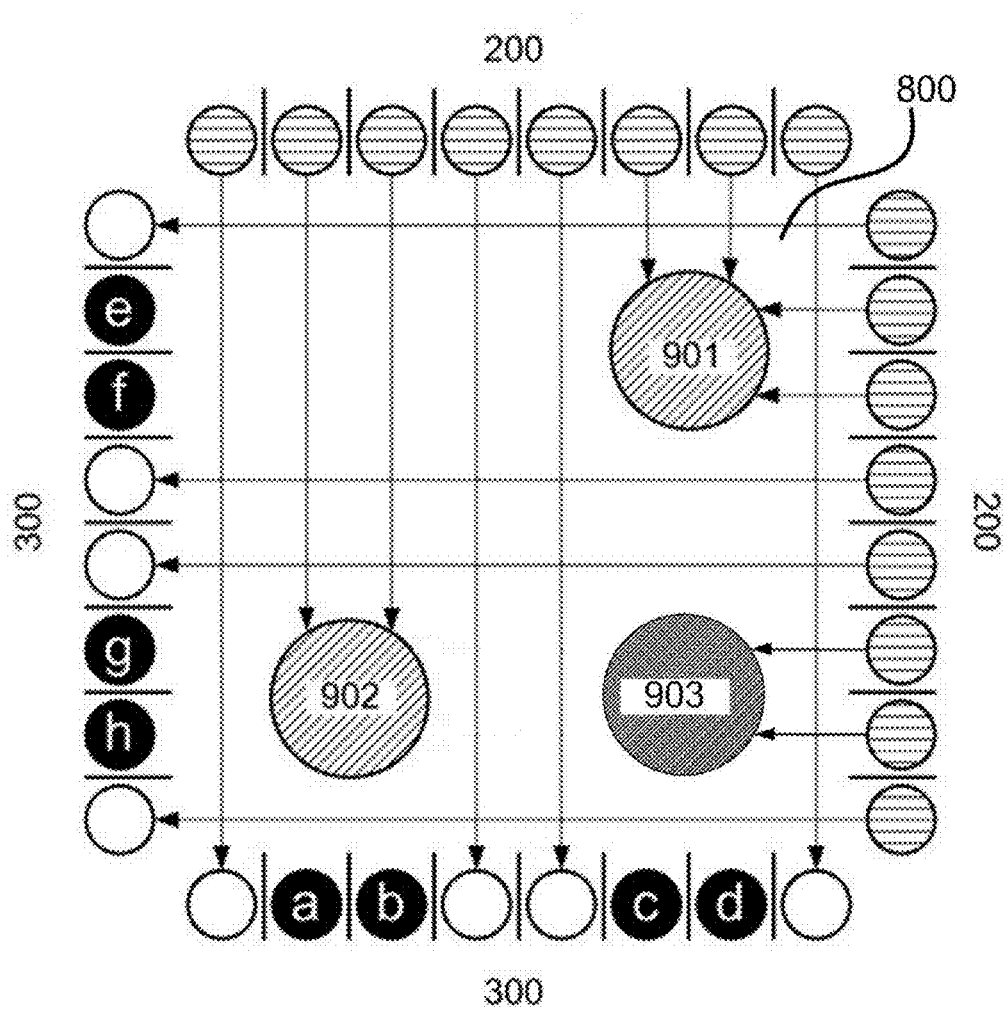
Figure 84:
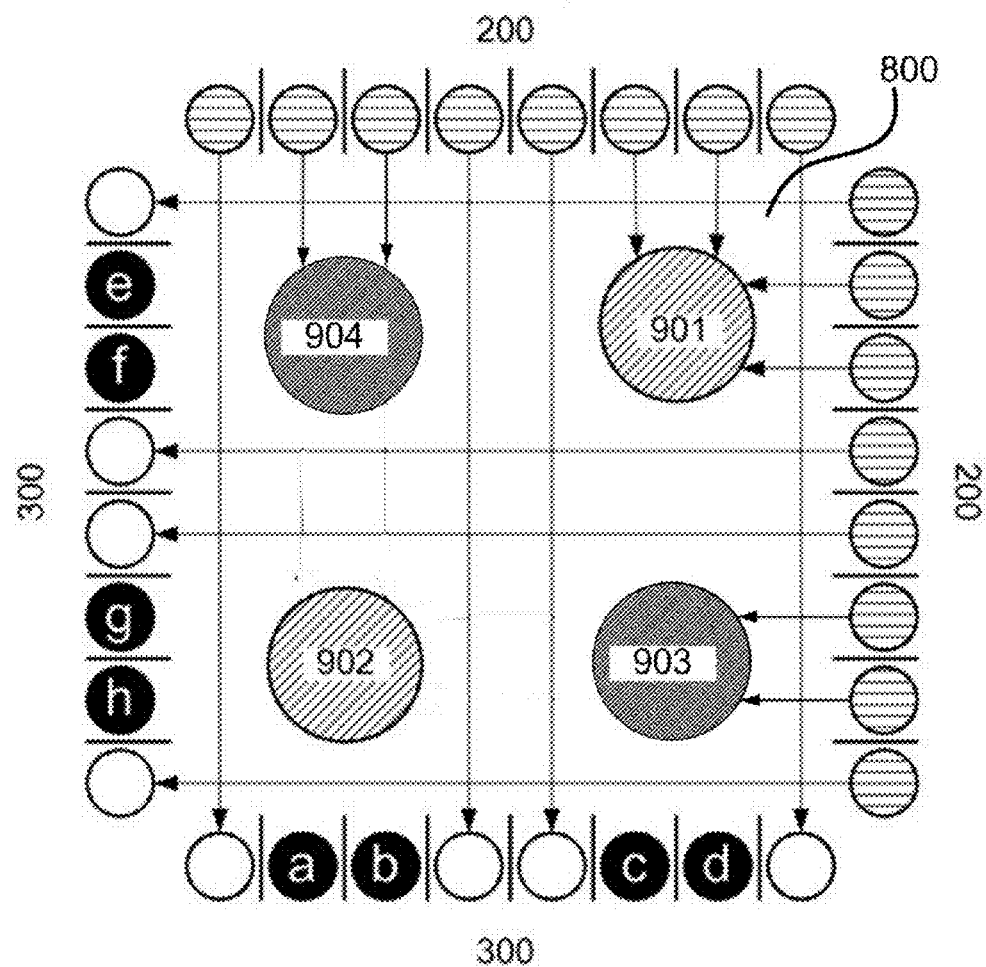
Figure 85:
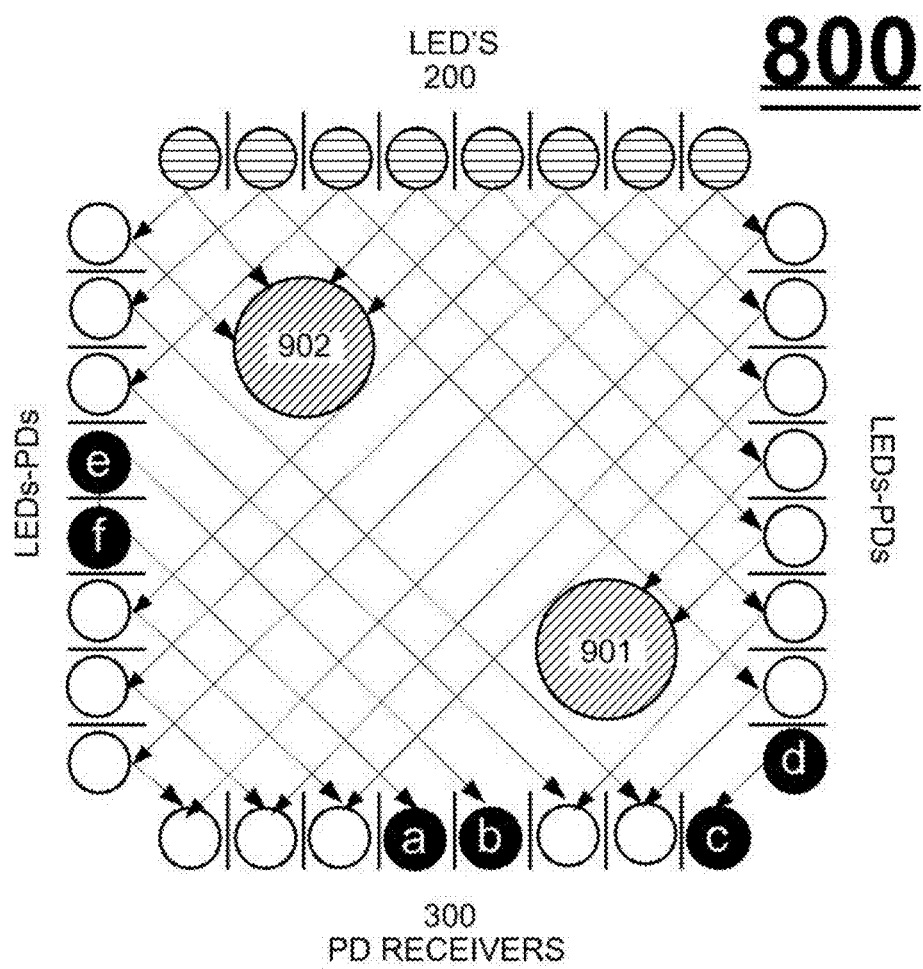
FIGS. 85-87 are illustrations of the mufti-touch locations of FIGS. 81-83 that are unambiguous vis-à-vis a second orientation of light emitters, in accordance with an embodiment of the present invention.
Figure 86:
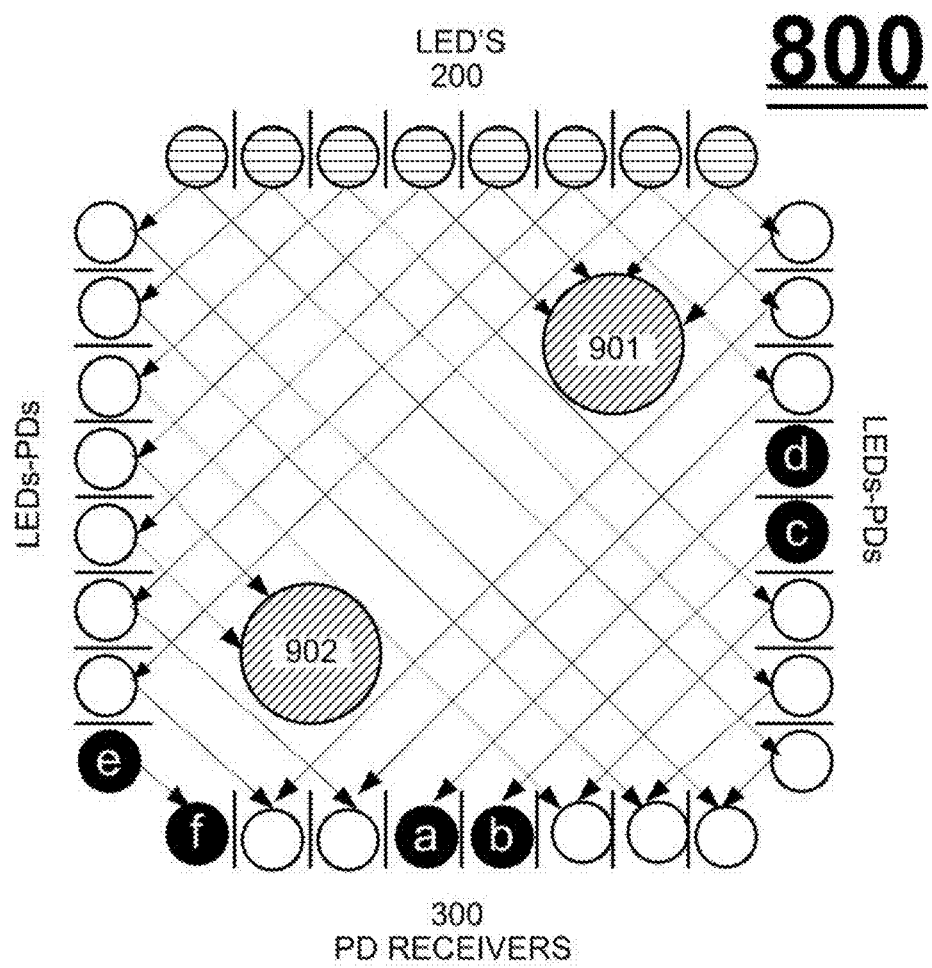
Figure 87:
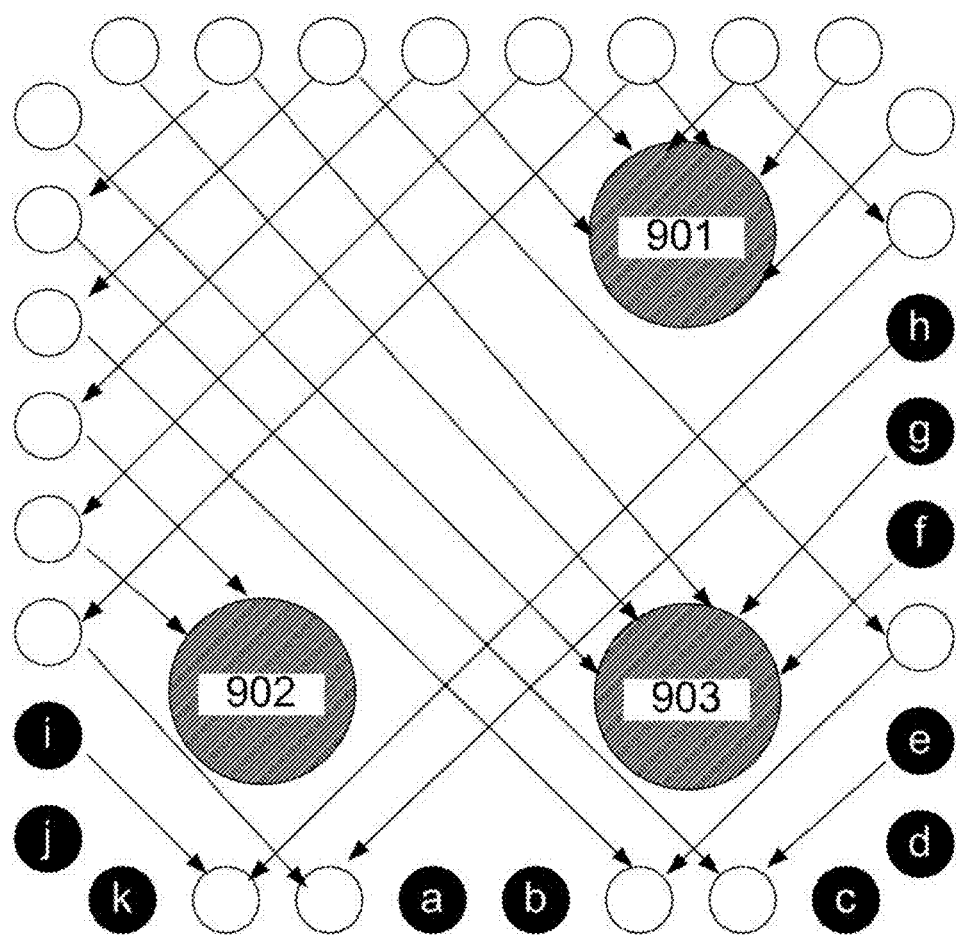

Reference is made to FIGS. 85-87, which are illustrations of the multi-touch locations of FIGS. 81-83 that are unambiguous vis-à-vis a second orientation of light emitters, in accordance with an embodiment of the present invention. Use of an arrangement of alternating emitters and receivers, as described hereinabove with reference to FIGS. 76 and 77, and use of additional optical elements to generate two sets of detection axes, provide important advantages. One advantage is generating a robust set of overlapping wide beams, whereby multiple detection signals may be interpolated in order to determine touch coordinates with high precision. Another advantage is generating overlapping wide beams on the second axis set, such that touch detection on the second axis set is also precise.

A dual-unit light guide is described hereinabove with reference to FIGS. 45 and 46. As described there, the lower portion 464 of the light guide contains reflective facets or lenses that are focused on the emitters and receivers, and the upper portion 463 includes reflective surface and lenses that do not require precision placement vis-à-vis the emitters and receivers. In configuration no. 6, the alternating reflective or refractive facets form part of the lower portion. A three-sided refractive cavity for distributing light beams in three directions is formed as part of the upper portion. In configuration no. 6, use of micro-lenses 467 is not required. Alternatively, the alternating facets are formed in transparent plastic modules that include an emitter or receiver, as described hereinbelow with reference to FIG. 112. An arrangement of these modules replaces lower portion 464, and upper portion 463 remains.

Figure 88:
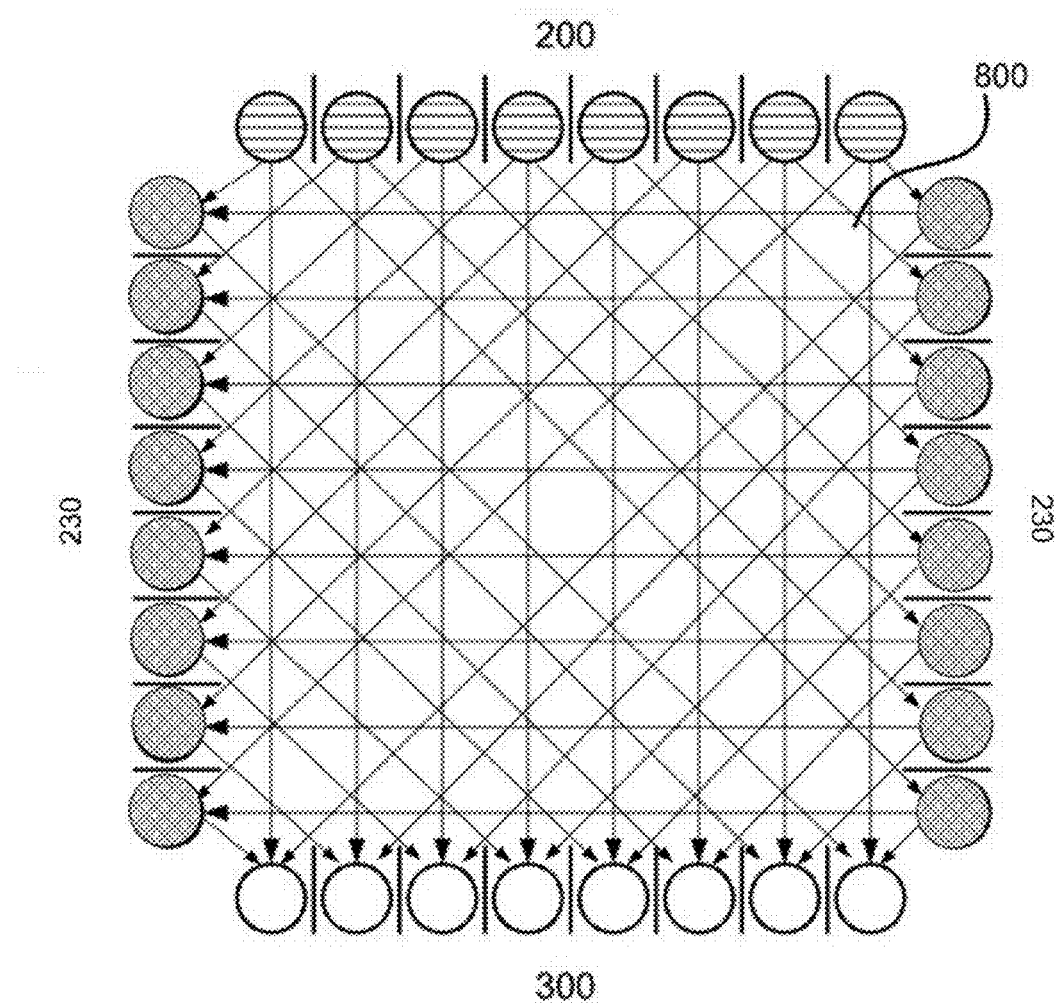
FIG. 88 is a simplified illustration of a touch screen with light beams directed along four axes, in accordance with an embodiment of the present invention.

Reference is made to FIG. 88, which is a simplified illustration of a touch screen with light beams directed along four axes, in accordance with an embodiment of the present invention. Shown in FIG. 88 is a row of light emitters 200 along the top edge of a screen 800, and a row of light receivers 300 along the bottom edge of screen 800. The left and right edges of screen 800 include opposing rows of combined emitter-receiver elements 230. Elements 230 act as emitters and as receivers. In an embodiment of the present invention, an emitter and a receiver are combined in a single unit, such as the reflective and transmissive sensor manufactured by Vishay Corporation of Malvern, Pa. In another embodiment of the present invention, an LED is used for both light emission and detection. An integrated circuit that both emits and detects light using an LED and a current limiting resistor, is described in Dietz, P. H., Yerazunis, W. S. and Leigh, D. L., "Very low cost sensing and communication using bidirectional LEDs", International conference on Ubiquitous Computing (UbiComp), October, 2003.

Figure 89:
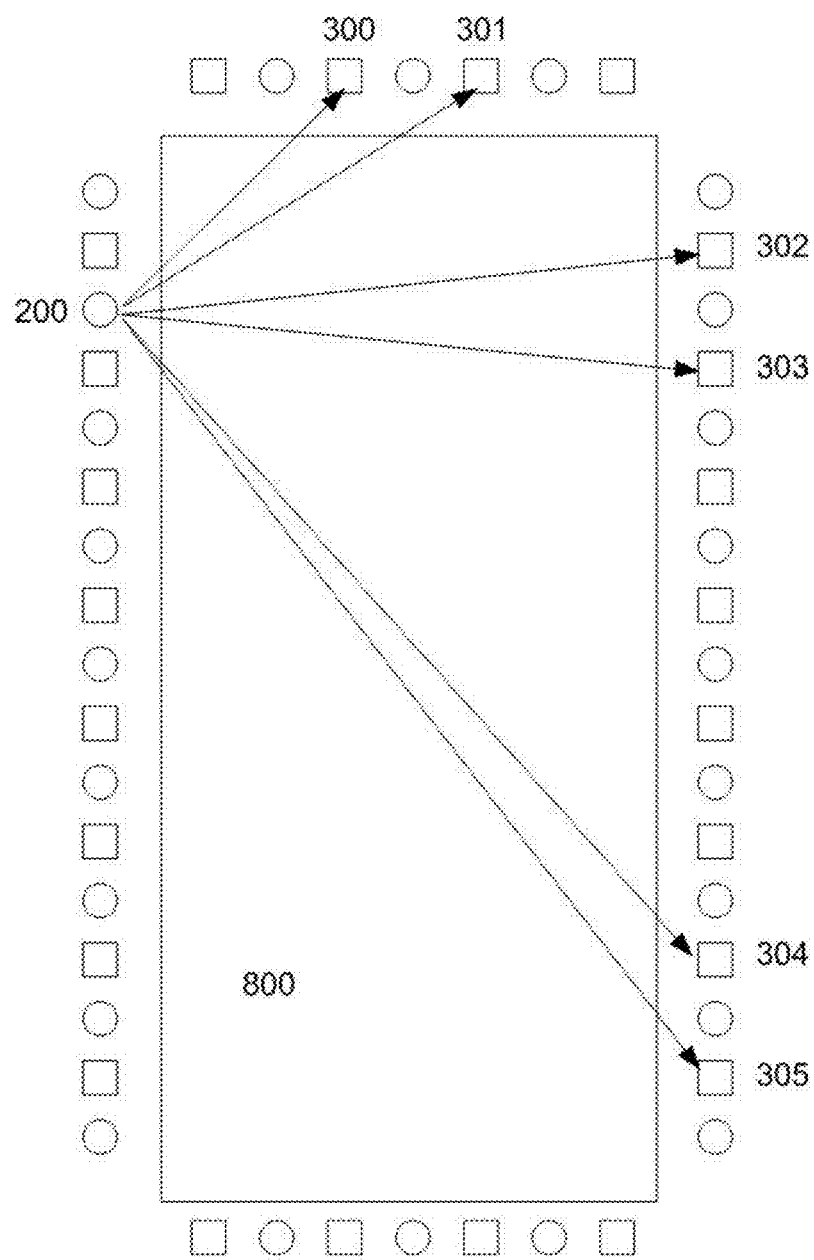
FIG. 89 is a simplified illustration of an alternate configuration of light emitters and light receivers with two grid orientations, in accordance with an embodiment of the present invention.

Reference is made to FIG. 89, which is a simplified illustration of an alternate configuration of light emitters and light receivers with two grid orientations, in accordance with an embodiment of the present invention. Shown in FIG. 89 are light emitters 200 in an alternating pattern with light receivers 300 around a screen perimeter. Light emitted by each emitter is detected by two receivers at an opposite screen edge, the two receivers being separate by an emitter therebetween.

In order that the light from an emitter arrive at the outer edges of two opposite receivers, the wide beams emitted from each emitter must span a distance of three optical lenses. This is in contrast to the configuration described above with shift-aligned emitters and receivers, where the two receivers that detect light from a common emitter are positioned adjacent one another, and thus the wide beams emitted from each emitter need only span a distance of two optical lenses.

Figure 90:
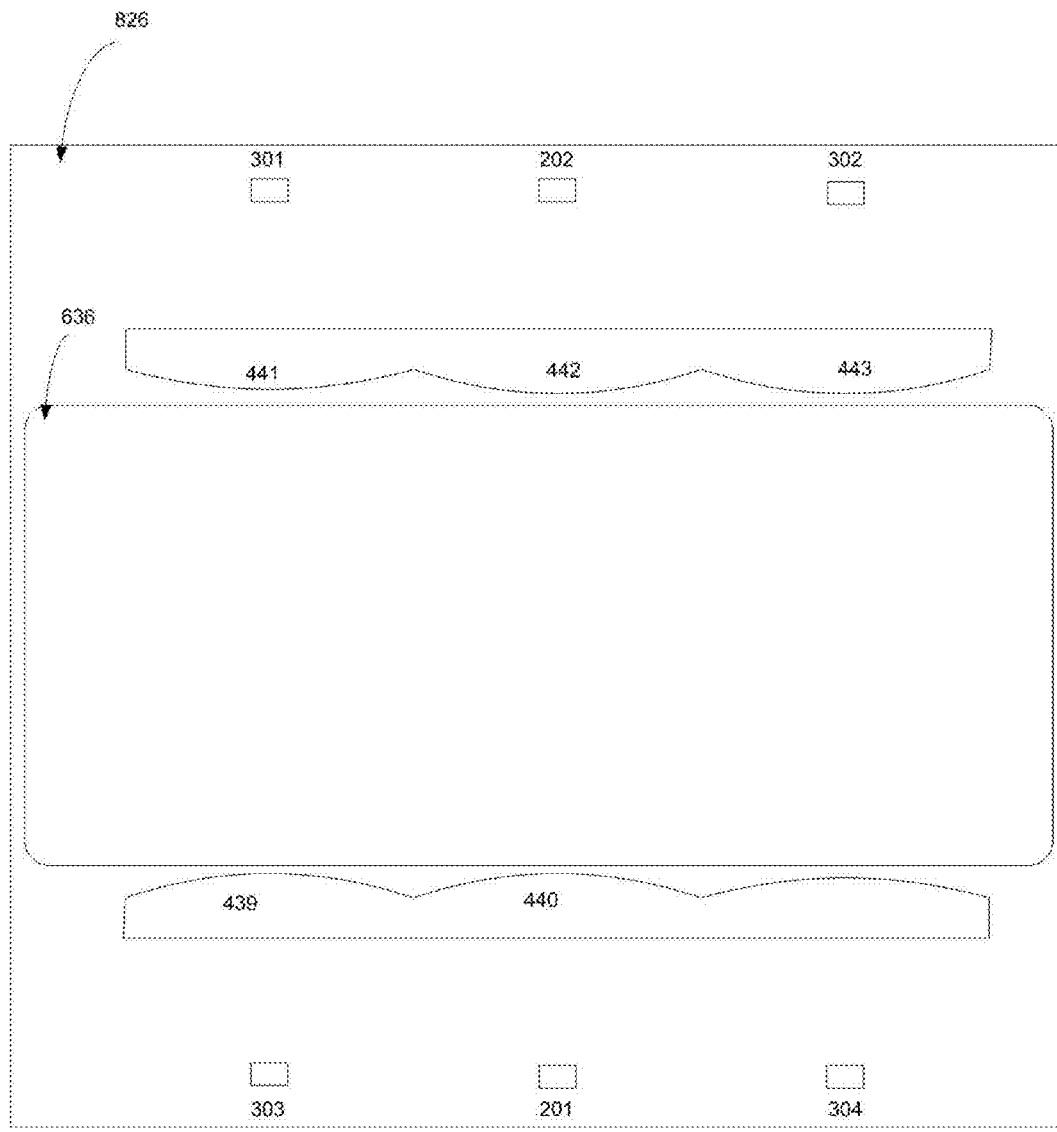
FIG. 90 is a simplified illustration of a configuration of alternating light emitters and light receivers, in accordance with an embodiment of the present invention.

Reference is made to FIG. 90, which is a simplified illustration of a configuration of alternating light emitters and light receivers, in accordance with an embodiment of the present invention. As shown in FIG. 90, emitter 201 is situated between receivers 303 and 304 along the bottom screen edge, and emitter 202 is situated between receivers 301 and 302 along the top screen edge. Light from emitter 201 is detected by receivers 301 and 302, and light from emitter 202 is detected by receivers 303 and 304.

Figure 91:
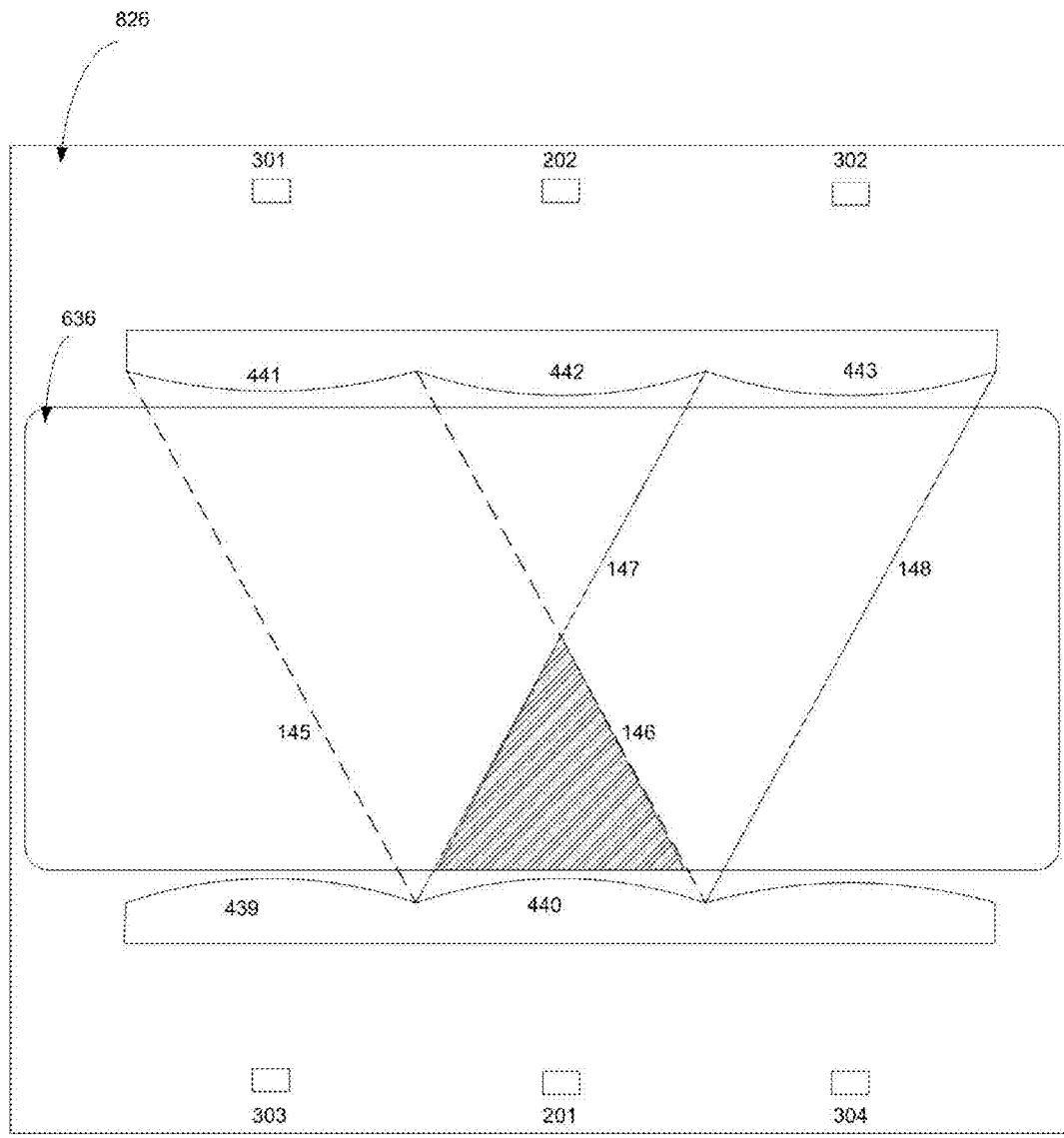
FIG. 91 is a simplified illustration of two wide light beams from an emitter being detected by two receivers, in accordance with an embodiment of the present invention.

Reference is made to FIG. 91, which is a simplified illustration of two wide light beams from an emitter being detected by two receivers, in accordance with an embodiment of the present invention. Shown in FIG. 91 are two wide beams from emitter 201 that exit lens 440 and arrive at lenses 441 and 443 for detection by receivers 301 and 302, respectively. One wide beam is bordered by edges 145 and 146, and the other wide beam is bordered by edges 147 and 148. A cross-hatched triangular area indicates an overlap where a touch is detected at receivers 301 and 302.

Figure 92:
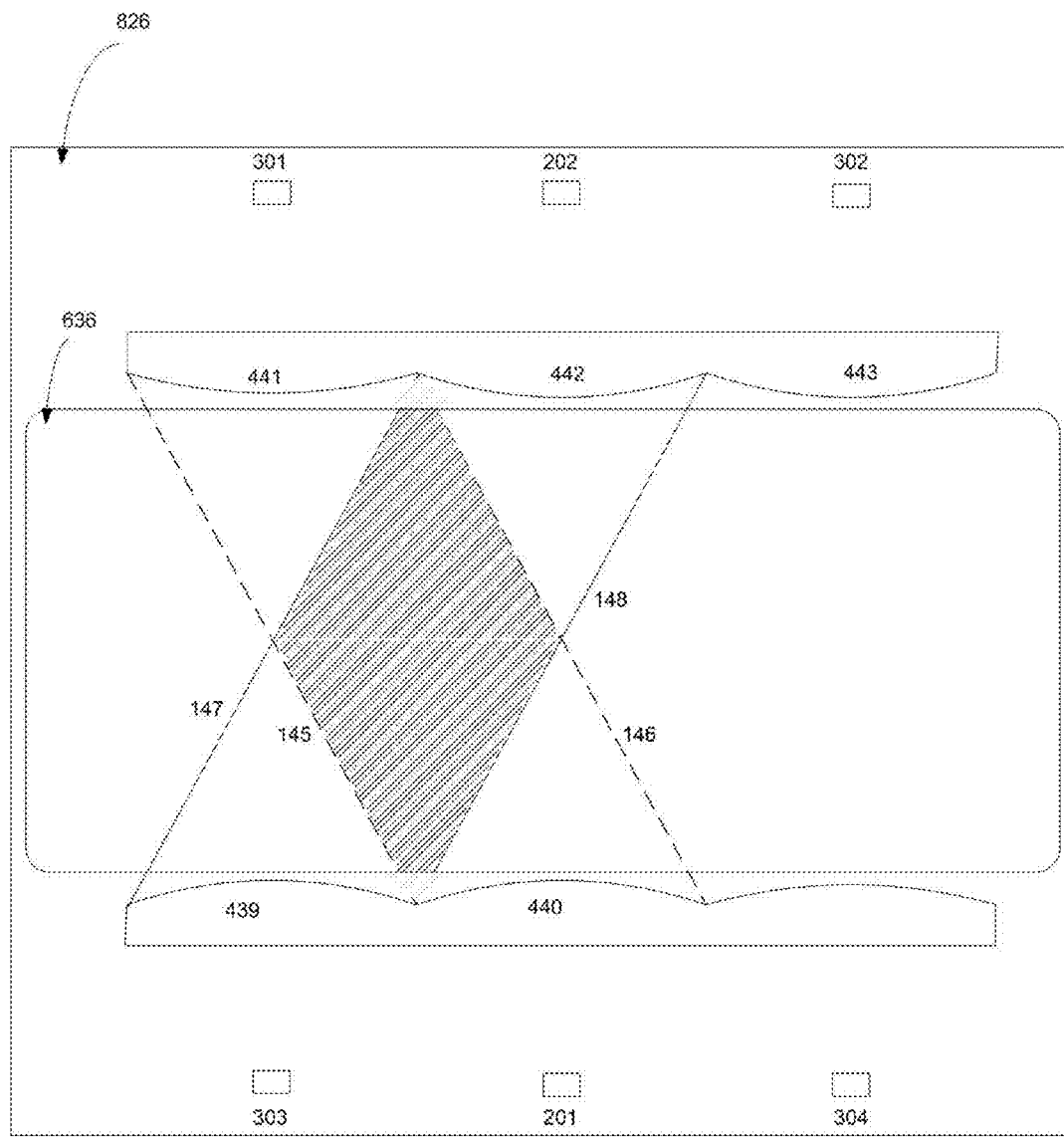
FIG. 92 is a simplified illustration of two wide beams and an area of overlap between them, in accordance with an embodiment of the present invention.

Reference is made to FIG. 92, which is a simplified illustration of two wide beams and an area of overlap between them, in accordance with an embodiment of the present invention. One wide beam, from emitter 201, exits lens 440 and arrives at lens 441 for detection by receiver 301. The wide beam is bordered by edges 145 and 146. Another wide beam, from emitter 202 to receiver 303, is bordered by edges 147 and 148. A cross-hatched diamond-shaped area indicates an overlap where a touch is detected at receivers 301 and 303.

It will thus be appreciated by those skilled in the art that any location on the screen is detected by two emitter-detector pairs, when the emitter-detector pairs are situated at opposite screen edges and, as such, an accurate touch location may be calculated as described hereinabove.

Figure 93:
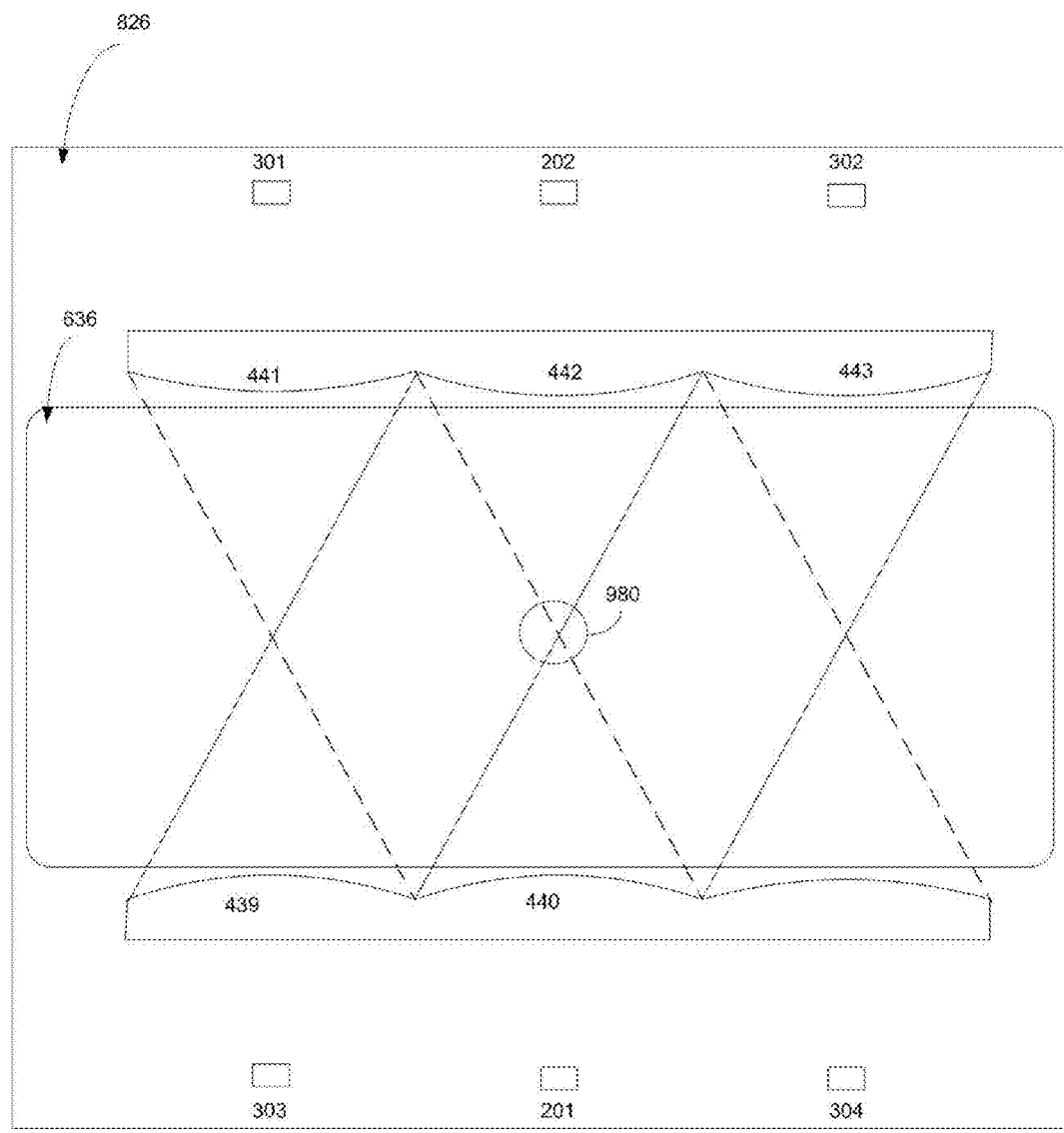
FIG. 93 is a simplified illustration of a touch point situated at the edges of detecting light beams, in accordance with an embodiment of the present invention.

Reference is made to FIG. 93, which is a simplified illustration of a touch point 980 situated at the edges of detecting light beams, in accordance with an embodiment of the present invention. FIG. 93 shows that it is desirable that the light beams extend to the edges of the emitter and receiver lenses, in order to accurately determine the location of touch point 980.

Figure 94:
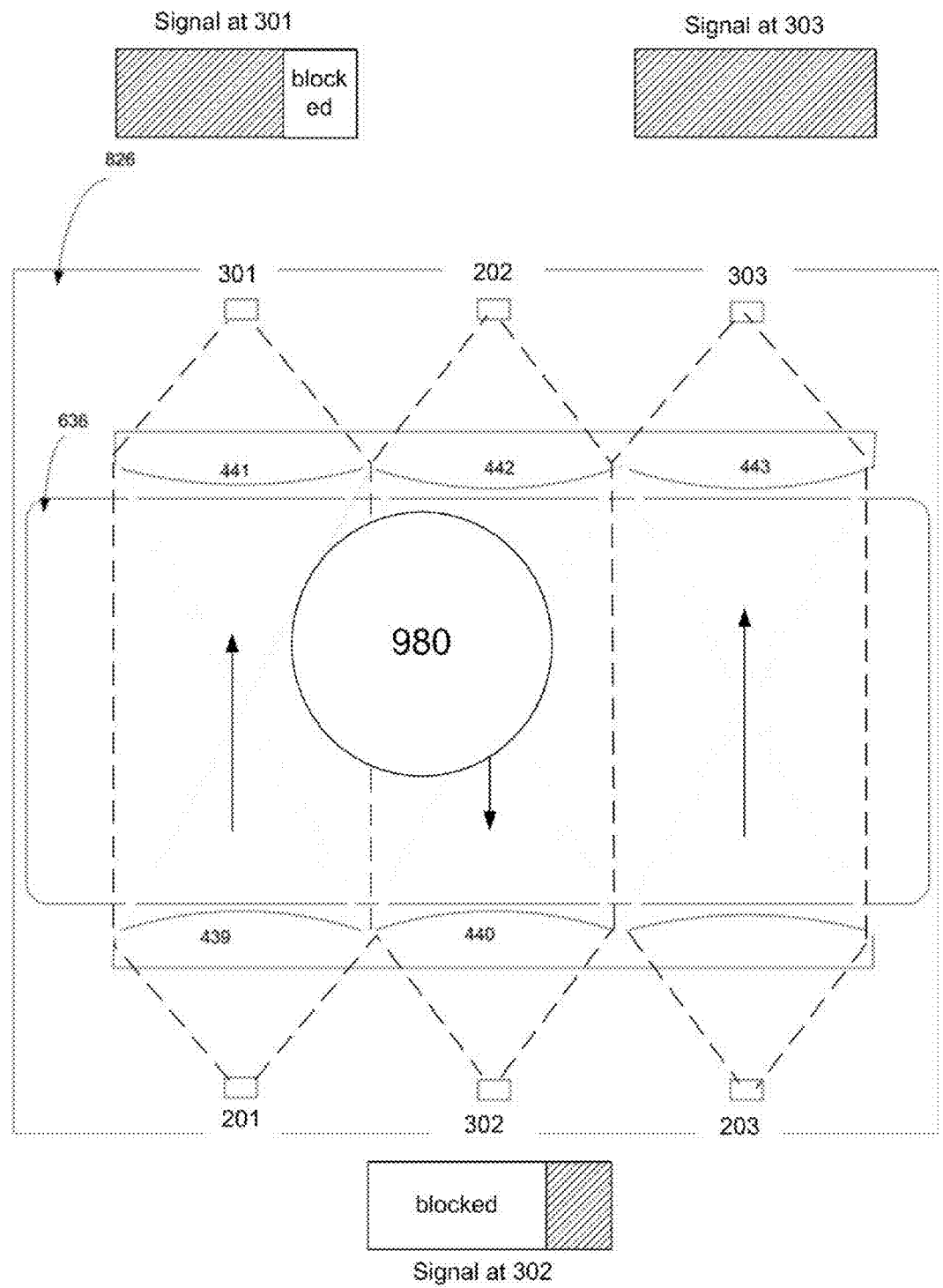
FIG. 94 is a simplified illustration of a finger-sized touch point in a screen designed for finger touch detection, in accordance with an embodiment of the present invention.

Reference is made to FIG. 94, which is a simplified illustration of a finger-sized touch point in a screen designed for finger touch detection, in accordance with an embodiment of the present invention. FIG. 94 shows a large touch point 980, such as a finger touch, and alternating beams 201-301, 202-302 and 203-303. A detection signal is shown next to each detector in the form of a rectangle, indicating a uniform light distribution along the width of the beam. Beams 201-301 and 202-302 have portions blocked by pointer 980. The location of pointer 980 is determined based on the blocked portions of beams 201-301 and 202-302. In this case, the beams are neatly collimated and span only one lens, not three.

Figure 95:
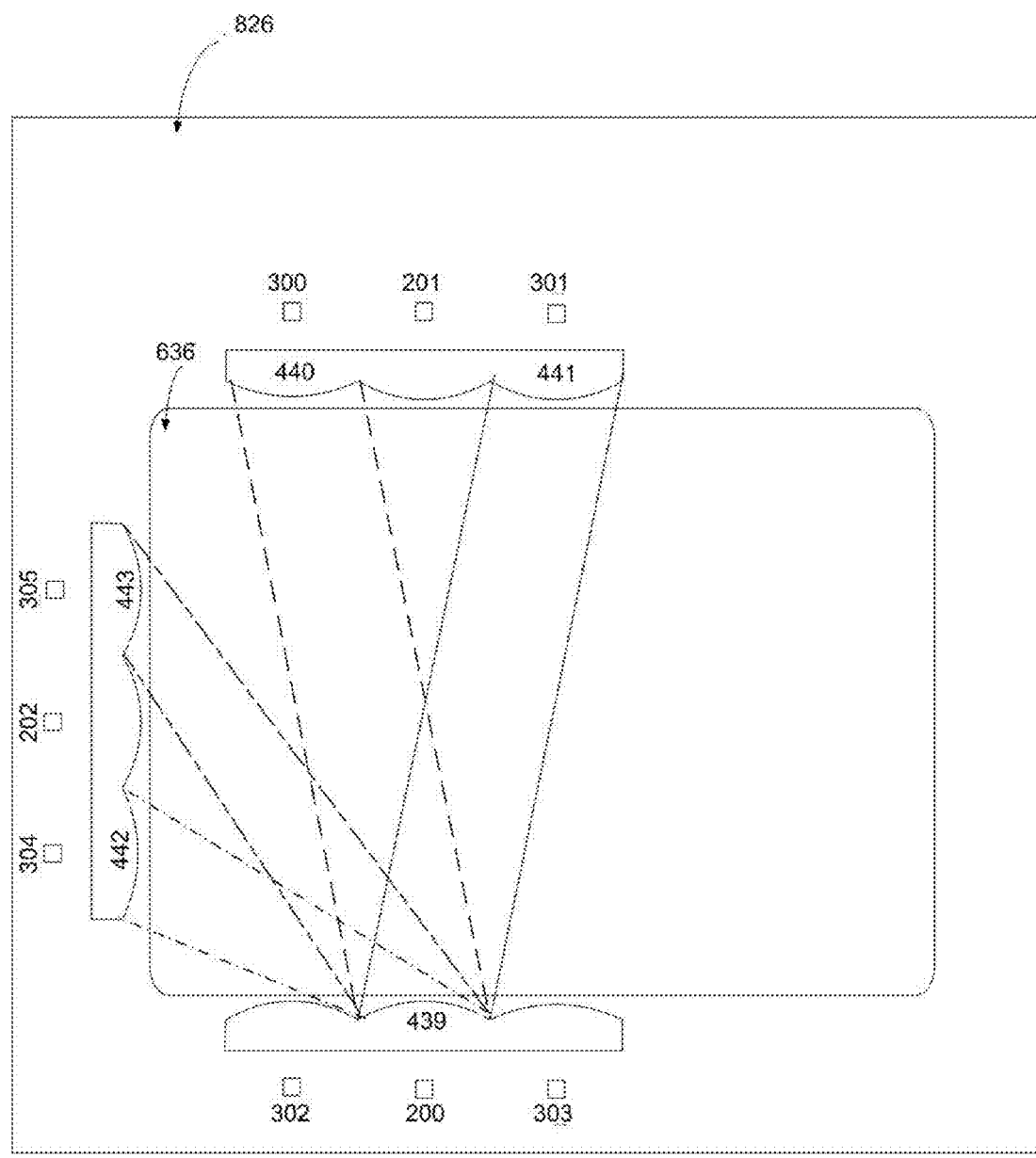
FIG. 95 is a simplified illustration of an emitter along one edge of a display screen that directs light to receivers along two edges of the display screen, in accordance with an embodiment of the present invention.

Reference is made to FIG. 95, which is a simplified illustration of an emitter along one edge of a display screen that directs light to receivers along two edges of the display screen, in accordance with an embodiment of the present invention. Shown in FIG. 95 are a first pair of light beams emitted from an emitter 200 at one edge of a display screen to receivers 300 and 301 along the opposite edge of the display screen, and a second pair of light beams emitted from emitter 200 to receivers 302 and 303 along the adjacent left edge of the display screen. A third pair of light beams (not shown) is emitted from emitter 200 to receivers at the adjacent right edge of the display screen. The second and third pairs of light beams are each oriented at an angle of approximately 45° relative to the first pair of light beams.

Also shown in FIG. 95 is a lens 439, used to refract light from emitter 200 to lenses 442 and 443, which are oriented at approximately 45° to the left of lens 439. In an embodiment of the present invention, lens 439 is made of a plastic material, which has an index of refraction on the order of 1.4-1.6. As such, an angle of incidence of approximately 84° is required in order for the light to be refracted at an angle of 45°.

However, for such a large angle of incidence, the amount of light lost due to internal reflection is large. In order to improve throughput, two air/plastic interfaces are used to achieve an angle of refraction of approximately 45°, as described hereinabove.

Tri-Directional Micro-Lenses

Figure 96:
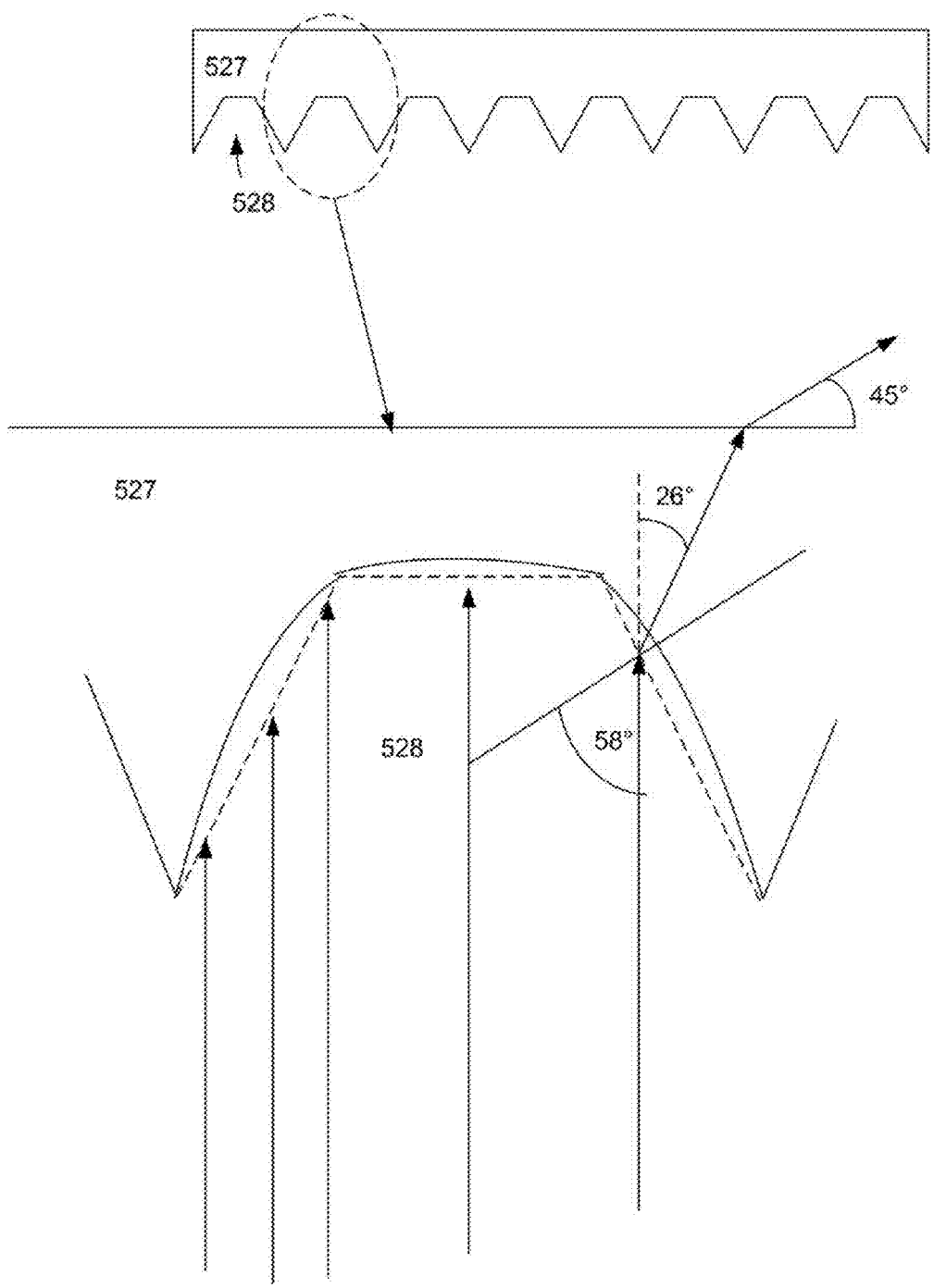
FIGS. 96 and 97 are simplified illustrations of a lens for refracting light in three directions, having a lens surface with a repetitive pattern of substantially planar two-sided and three-sided recessed cavities, respectively, in accordance with embodiments of the present invention.
Figure 97:
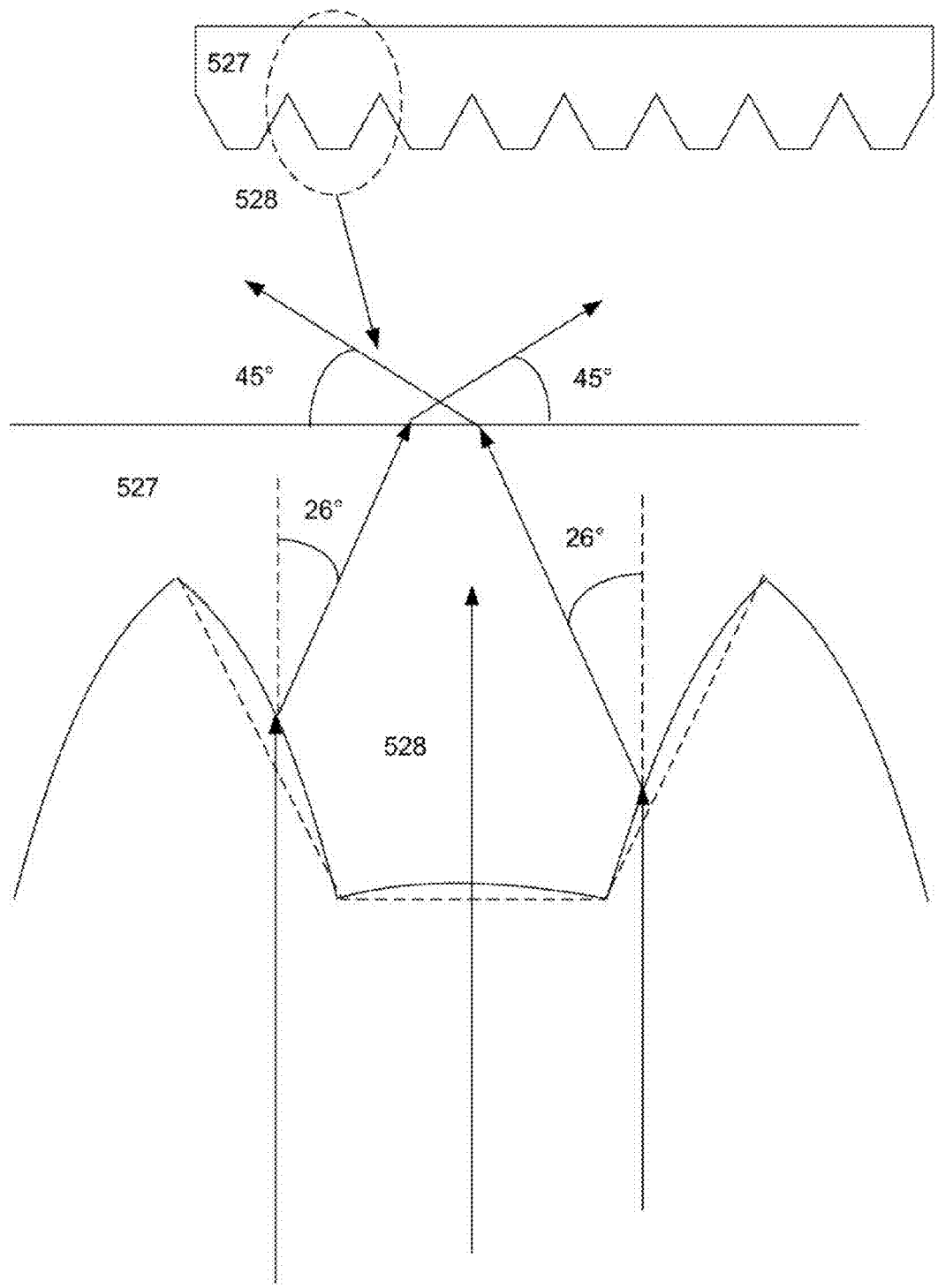

Reference is made to FIGS. 96 and 97, which are simplified illustrations of a lens for refracting light in three directions, having a lens surface with a repetitive pattern of substantially planar two-sided and three-sided recessed cavities, respectively, in accordance with embodiments of the present invention. The flat surface opposite the emitter or receiver is distal to the emitter or receiver in FIG. 96 forming a three-sided cavity, and is proximal thereto in FIG. 97 separating two two-sided cavities.

Such three-sided lenses are used in several embodiments. In a first embodiment, the lens is used without an additional optical component with alternating facets for interleaving neighboring beams. In this embodiment, wide beams cover the screen but do not necessarily overlap to provide two or more detection signals for interpolation. A typical use case for this embodiment is finger input, but not stylus input. The tri-directional lens enables detection on four different axes, to eliminate ambiguity and ghosting in multi-touch cases. The tri-directional lens also provides additional touch location information; namely, four axes instead of two, and the additional information increases the precision of the touch location, even for a single touch.

In a second embodiment, the lens is used with an additional optical component with alternating facets for interleaving neighboring beams, or with an alternative arrangement providing overlapping detection signals. In this embodiment, overlapping wide beams provide two or more detection signals for interpolation. Typical use cases for this embodiment are finger and stylus input. The tri-directional lenses and the interleaving facets may be formed in two distinct components. The interleaving facets component is positioned closer to its emitter or receiver than the tri-directional component, since the tolerance for imprecise placement of the interleaving facets component is low, whereas the tolerance for imprecise placement of the tri-directional lens component is high. Alternatively, the tri-directional lenses and the interweaving facets may be formed in a single rigid component. For example, a diffractive grating interleaves signals from two sources and also splits the beams in three directions.

Shown in FIG. 96 is a lens 527 with a pattern of micro-lenses 528 on its bottom surface. The micro-lens pattern shown in FIG. 96 has three substantially planar sides, each side refracting light in a different direction. The pattern of micro-lenses 528 form a saw-tooth repetitive pattern along the bottom edge of the upper section of the lens. The three walls of each micro-lens 528 are slightly curved, in order to spread the light in a wider arc as it exits the lens toward an intended receiver.

A collimating lens section (not shown) is situated beneath lens 527, to direct the light in parallel beams into micro-lenses 528.

In some embodiments of the present invention, lens 527 is part of a two-lens arrangement, with lens 527 forming the upper of the two lenses, farther from the emitter or receiver, and nearer to the screen surface. In distinction, the two-section lens shown in FIG. 45 has a micro-lens pattern on the top of the lower section.

In order to properly interleave collimated beams from the alternating facets component, the pitch of the three-sided cavities needs to be much smaller than the pitch of the alternating facets. Ideally, the pitch of the cavities should be made as small as possible. With alternating facets of about 0.6 mm, the cavities should be 0.2 mm or smaller. The dihedral angle between each pair of adjacent planes is approximately 122°, to achieve a 45° refraction using plastic having a refractive index of 1.6. However, different angles may be desired for a different set of diagonal axes, or plastic having a different refractive index may be desired, in which case the dihedral angle will be different.

As shown in FIG. 96, incoming collimated light is refracted through two air/plastic interfaces, to emerge at an angle of refraction that is approximately 45°. The first interface, along an inner plane of the micro-lens, refracts the incoming light to an angle of refraction that is approximately 58°, and the second interface refracts the light to emerge at an angle of refraction that is approximately 45°.

Figure 98:
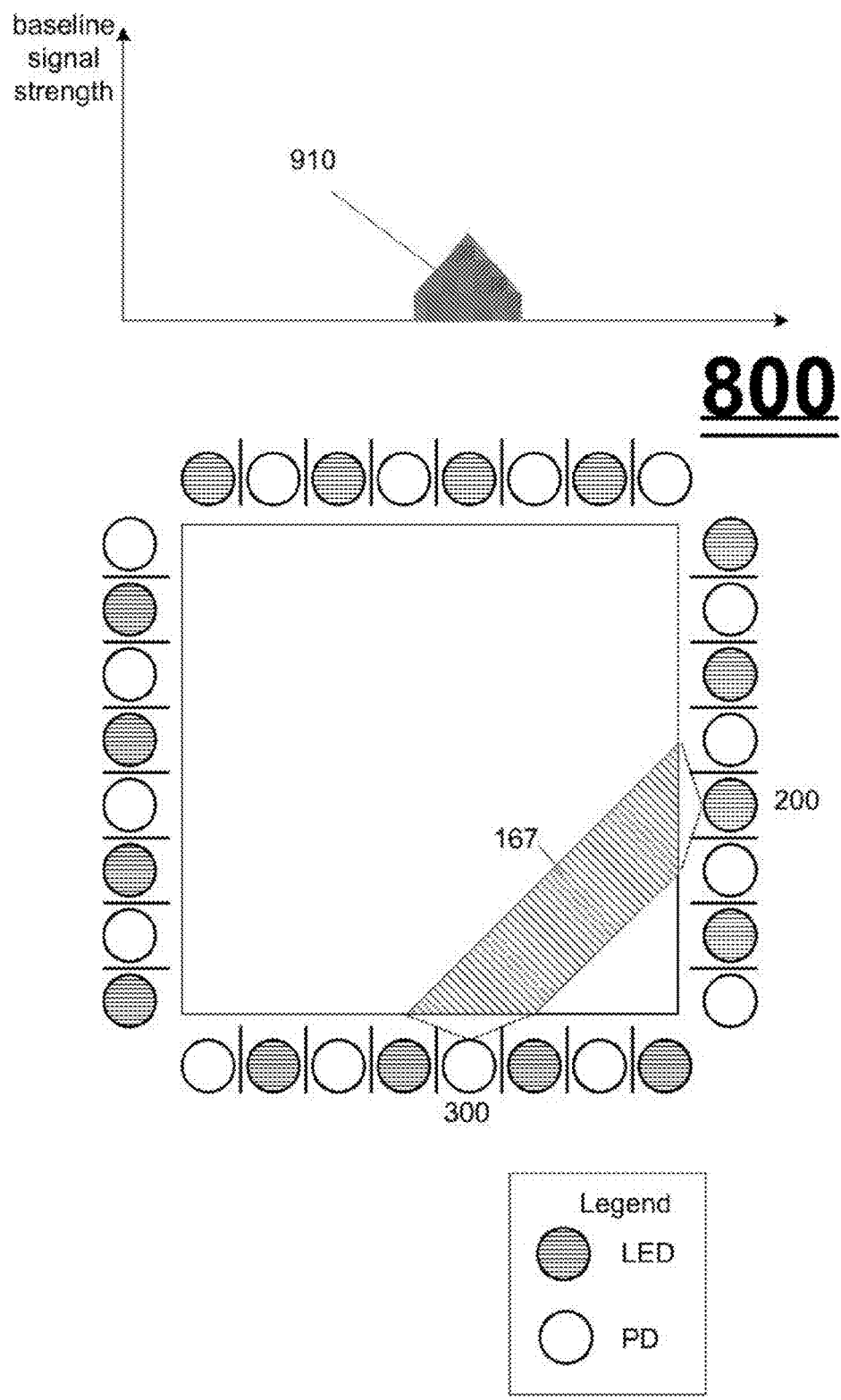
FIGS. 98-100 are simplified illustrations of a touch screen surrounded with alternating emitters and receivers and diagonal wide beams crossing the screen, in accordance with an embodiment of the present invention.
Figure 99:
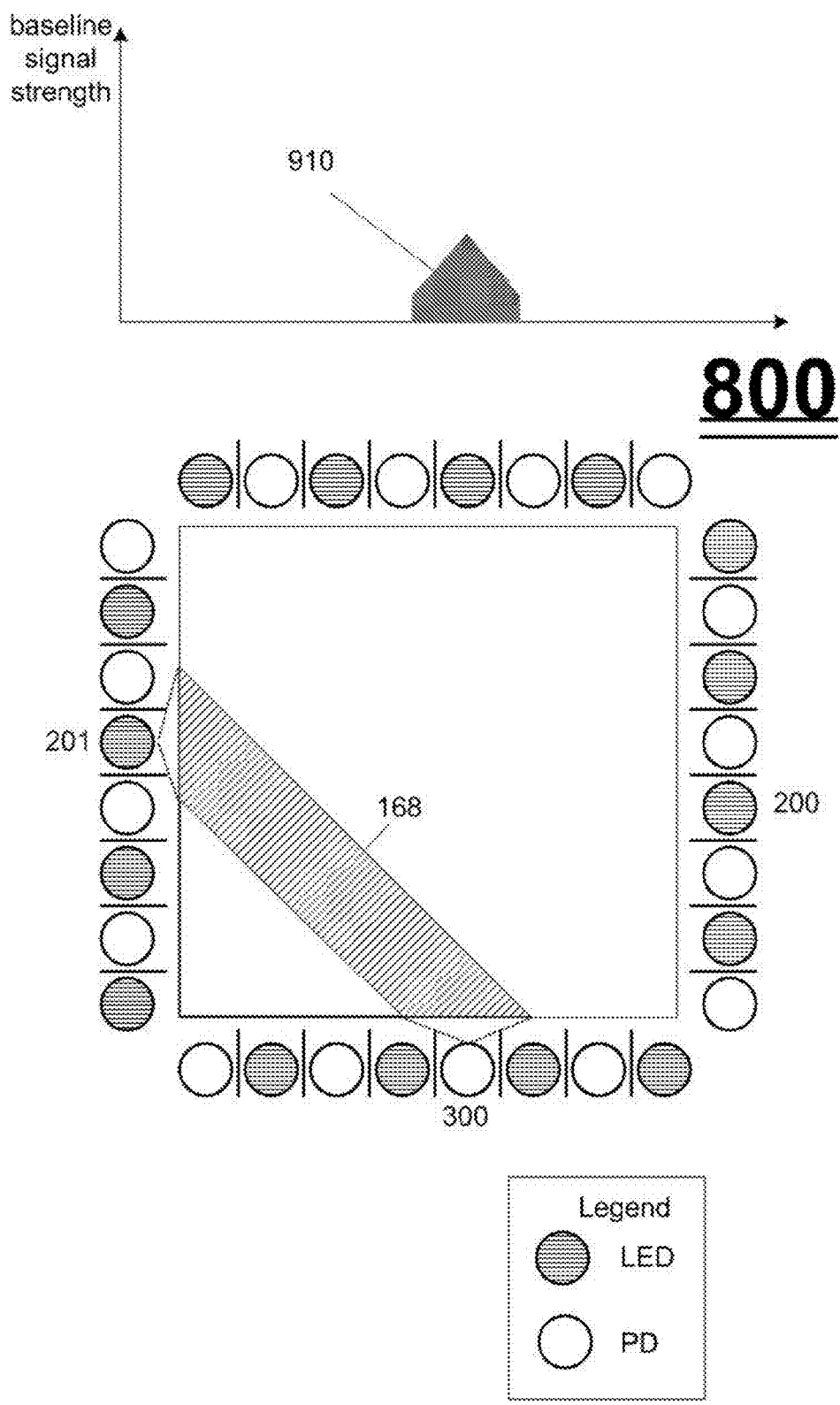
Figure 100:
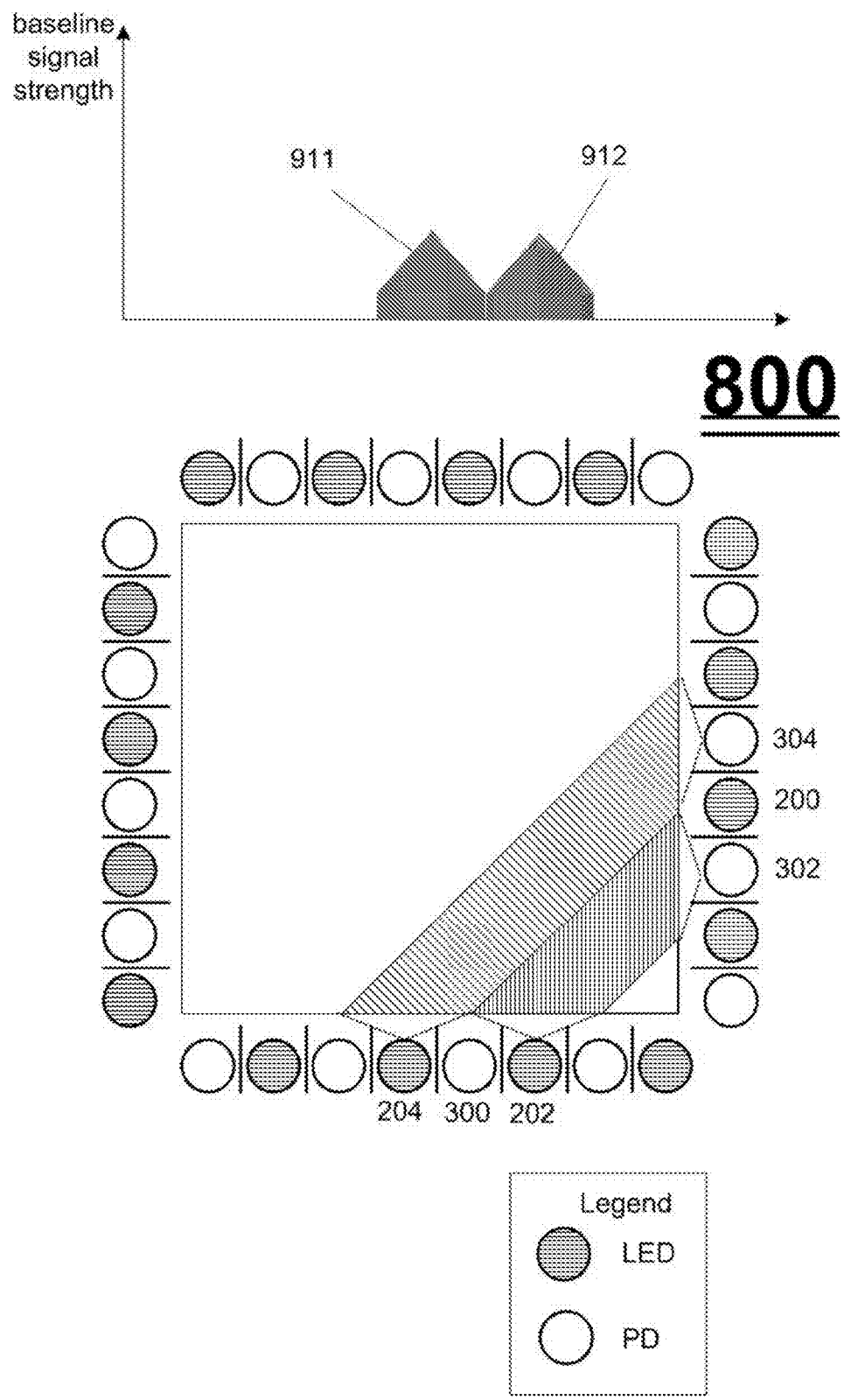

Reference is made to FIGS. 98-100, which are simplified illustrations of a touch screen surrounded with alternating emitters and receivers and diagonal wide beams crossing the screen, in accordance with an embodiment of the present invention. FIGS. 98 and 99 show diagonal wide beams from emitter 200 and 201 to receiver 300, and a corresponding signal gradient 910. FIG. 100 shows diagonal wide beams from emitters 202 and 204 to receivers 302 and 304, and corresponding signal gradients 911 and 912. These wide beams overlap wide beam 167 of FIG. 95, thereby providing multiple touch detections for interpolation.

Figure 101:
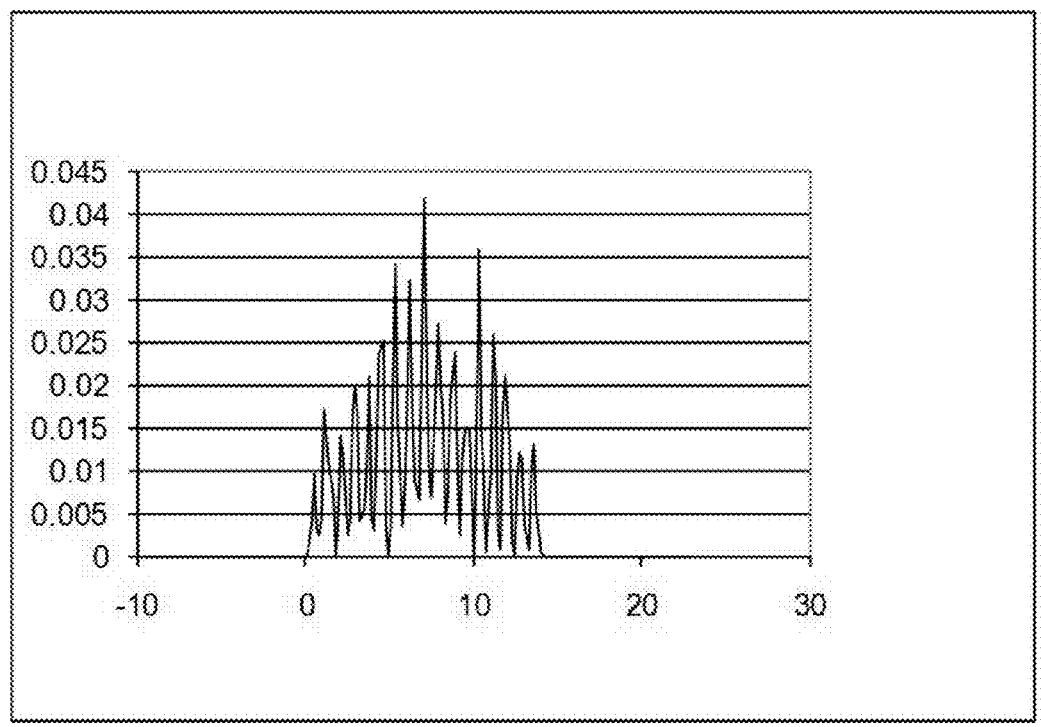
FIG. 101 is a simplified graph of light distribution across a diagonal wide beam in a touch screen, in accordance with an embodiment of the present invention.
Figure 101:
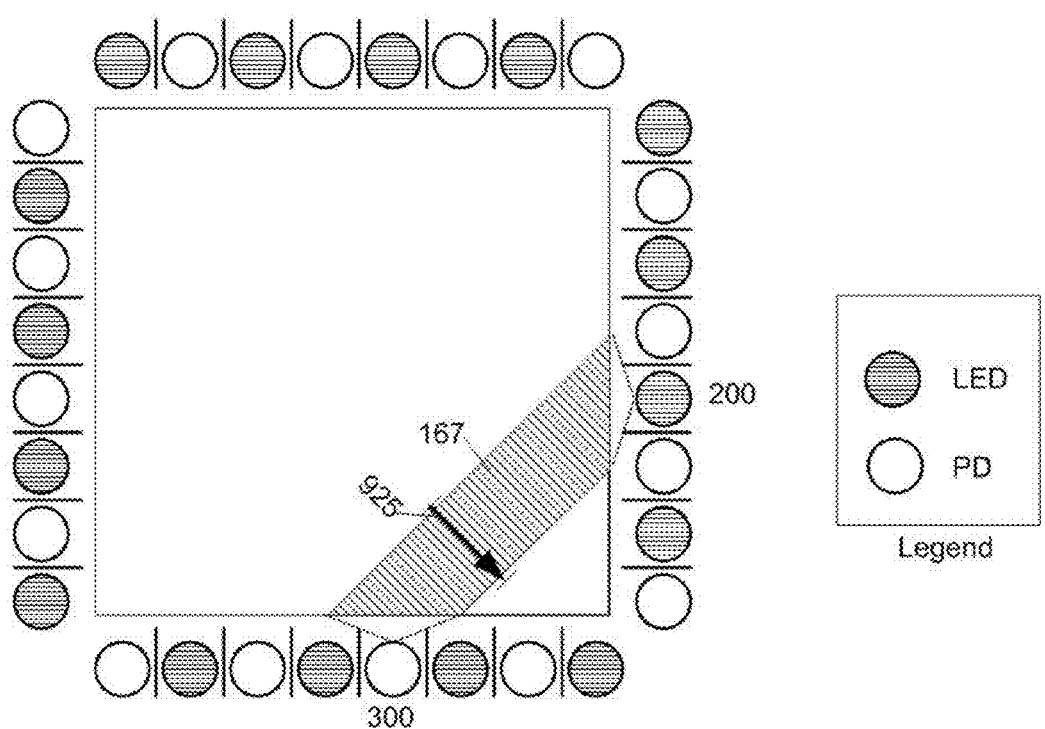

Reference is made to FIG. 101, which is a simplified graph of light distribution across a diagonal wide beam in a touch screen, in accordance with an embodiment of the present invention. The lower portion of FIG. 101 shows a wide beam 167 and a path 925 crossing this beam according to a second axis system. If the pitch between elements is 1 unit, then the width of this beam is $1/\sqrt{2}$ units. Thus if the pitch between elements is 10 mm, then the beams along the diagonal axes are approximately 7 mm across. The upper portion of FIG. 101 shows the distribution of light across wide beam 167. The signal spans across approximately 14 mm of the diagonal beam, as compared with 20 mm of the vertical beam in FIG. 69. As described above with reference to FIG. 68, the signal gradient across the width of the beam enables interpolating multiple detection signals to determine a precise touch position.

Figure 102:
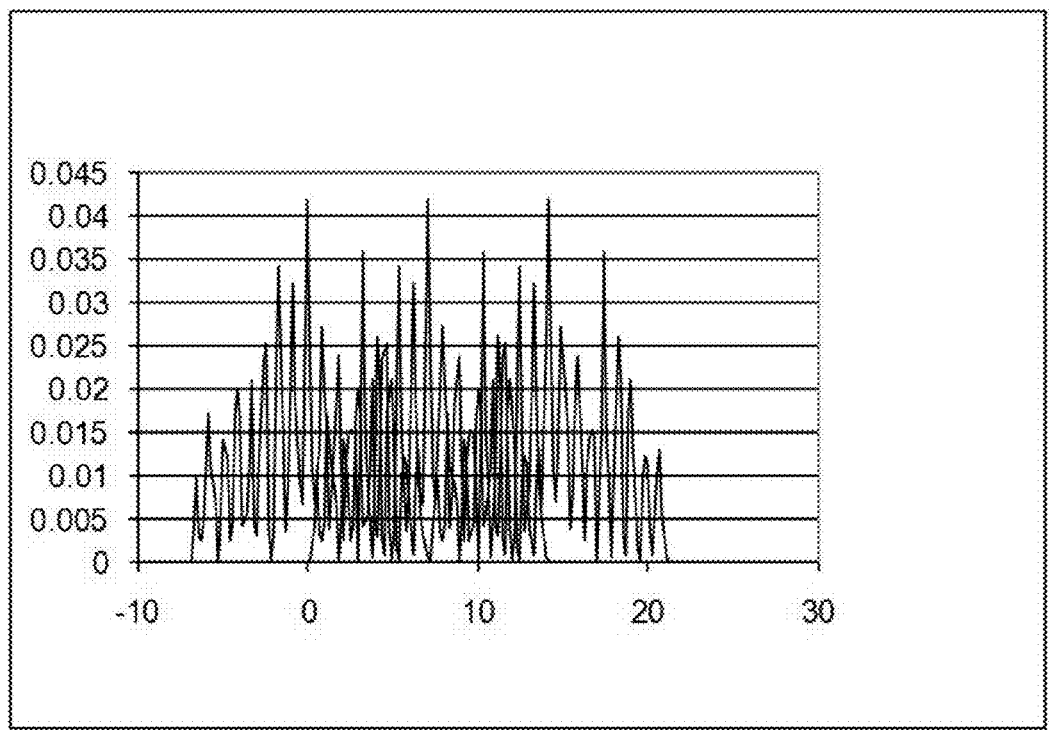
FIG. 102 is a simplified graph of light distribution across three overlapping diagonal wide beams in a touch screen, in accordance with an embodiment of the present invention.

Reference is made to FIG. 102, which is a simplified graph of light distribution across three overlapping diagonal wide beams in a touch screen, in accordance with an embodiment of the present invention. FIG. 102 shows a signal distribution across three overlapping beams in a second axis system, similar to FIG. 72. Different widths are covered by these two sets of beams.

Figure 103:
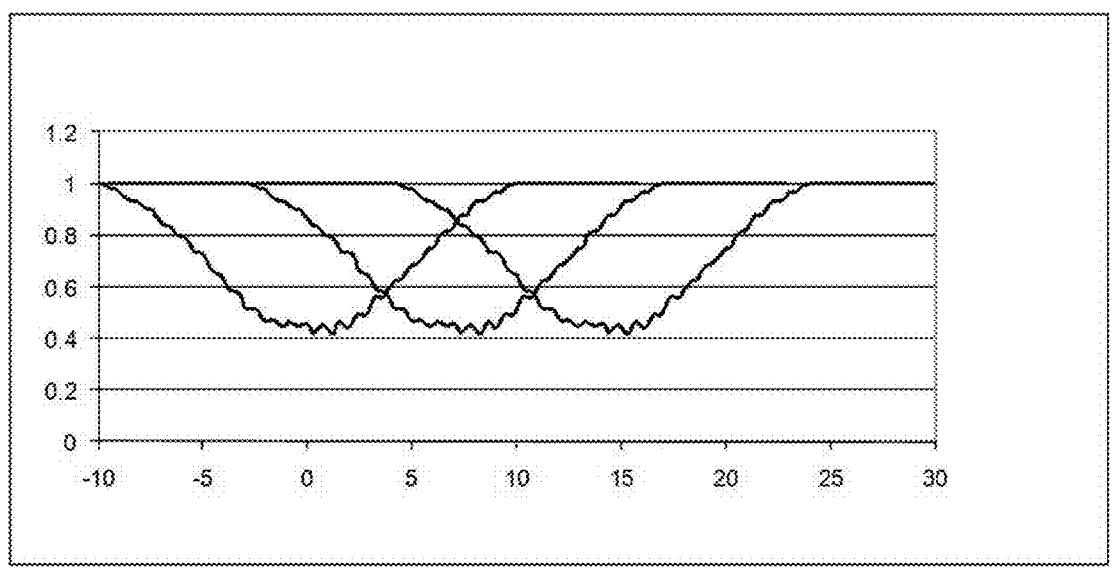
FIG. 103 is a simplified graph of touch detection as a finger glides across three overlapping diagonal wide beams in a touch screen, in accordance with an embodiment of the present invention.

Reference is made to FIG. 103, which is a simplified graph of touch detection as a finger glides across three overlapping diagonal wide beams in a touch screen, in accordance with an embodiment of the present invention. FIG. 103 shows how reception of a finger passing across three adjacent overlapping beams is detected by each beam. The maximum detection signal is approximately 40% of the baseline signal intensity, and this occurs when the finger is in the middle of the beam. In this case, the finger blocks approximately 60% of the total light of the beam. This is greater than the amount of light blocked by the same finger in FIG. 69; namely, 40%. The difference is due to the diagonal beam being narrower than the vertical beam. Therefore a 6 mm fingertip blocks a greater portion of light in the beam. The detection signals are substantially smooth and robust for determining touch locations.

Figure 104:
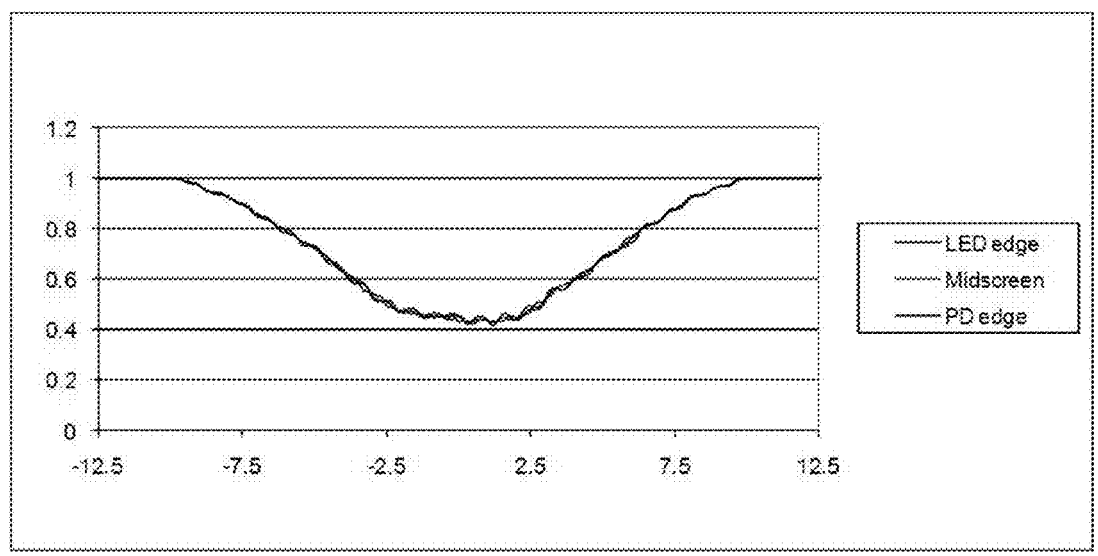
FIG. 104 is a simplified graph of detection signals from a diagonal wide beam as a fingertip moves across the screen at three different locations, in accordance with an embodiment of the present invention.

Reference is made to FIG. 104, which is a simplified graph of detection signals from a diagonal wide beam as a fingertip moves across the screen at three different locations, in accordance with an embodiment of the present invention. FIG. 104 shows that touch detection remains stable along depth of a wide beam, and varies only according to its location across the width of the beam, as described hereinabove with reference to FIG. 73.

Figure 105:
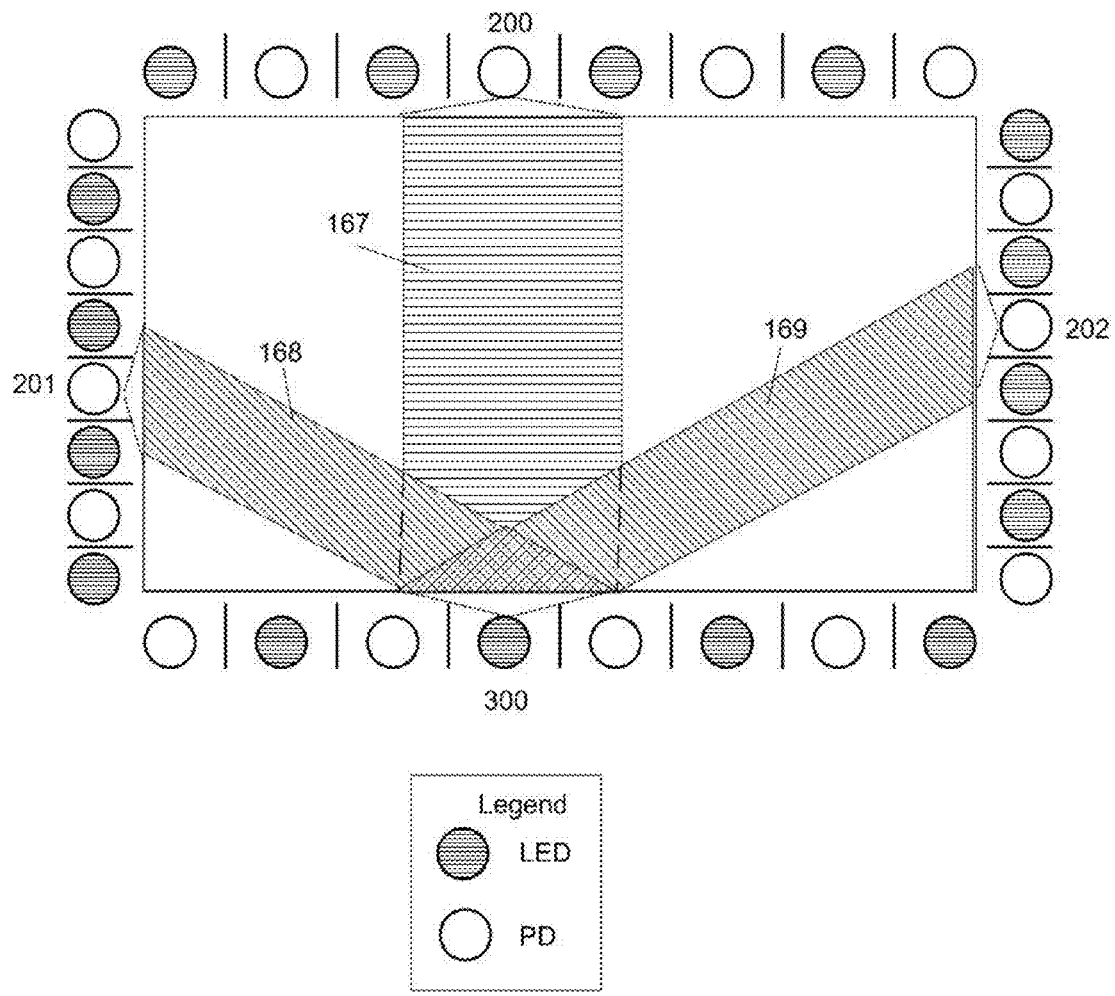
FIG. 105 is a simplified illustration of a first embodiment for a touch screen surrounded with alternating emitters and receivers, whereby diagonal and orthogonal wide beams crossing the screen are detected by one receiver, in accordance with an embodiment of the present invention.

Reference is made to FIG. 105, which is a simplified illustration of a first embodiment for a touch screen surrounded with alternating emitters and receivers, whereby diagonal and orthogonal wide beams crossing the screen are detected by one receiver, in accordance with an embodiment of the present invention. FIG. 105 shows an embodiment with an equal number of elements positioned along each screen edge. Three beams 167-169 are shown for one receiver 300; namely, one directed to an opposite emitter 200 and the other two directed to emitters 201 and 202 on adjacent screen edges. The diagonal beams generate two axes that are not perpendicular to one another.

Figure 106:
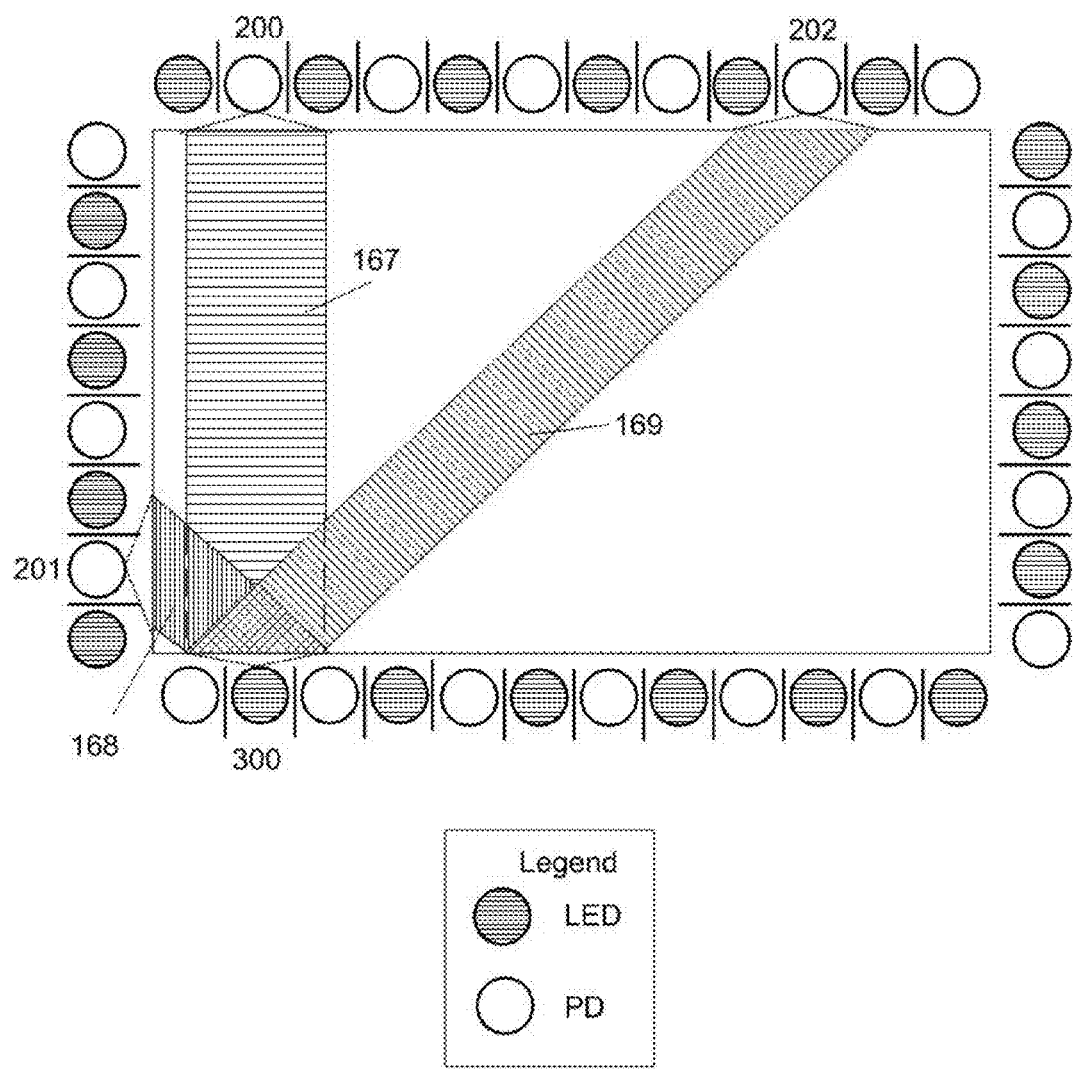
FIG. 106 is a simplified illustration of a second embodiment for a touch screen surrounded with alternating emitters and reciters, whereby diagonal and orthogonal wide beams crossing the screen are detected by one receiver, in accordance with an embodiment of the present invention.

Reference is made to FIG. 106, which is a simplified illustration of a second embodiment for a touch screen surrounded with alternating emitters and reciters, whereby diagonal and orthogonal wide beams crossing the screen are detected by one receiver, in accordance with an embodiment of the present invention. FIG. 106 shows an embodiment with different numbers of elements positioned along adjacent screen edges. Three beams 167-169 are shown for one receiver 300; namely, one directed to an opposite emitter 200, and the other two directed at substantially 45° angles to emitters 201 and 202, one of which is on an opposite edge and another of which is positioned on an adjacent edge. These diagonal beams generate two axes that are perpendicular to one another.

Palm Rejection

When a user rests his hypothenar muscles, located on the side of his palm beneath his little finger, on a touch screen when writing with a stylus, ghosting generally occurs. This part of the palm blocks a large area of the touch screen, and often blocks a series of light beams along the screen's vertical axis, thereby hiding the stylus' touch position along the vertical axis.

Figure 107:
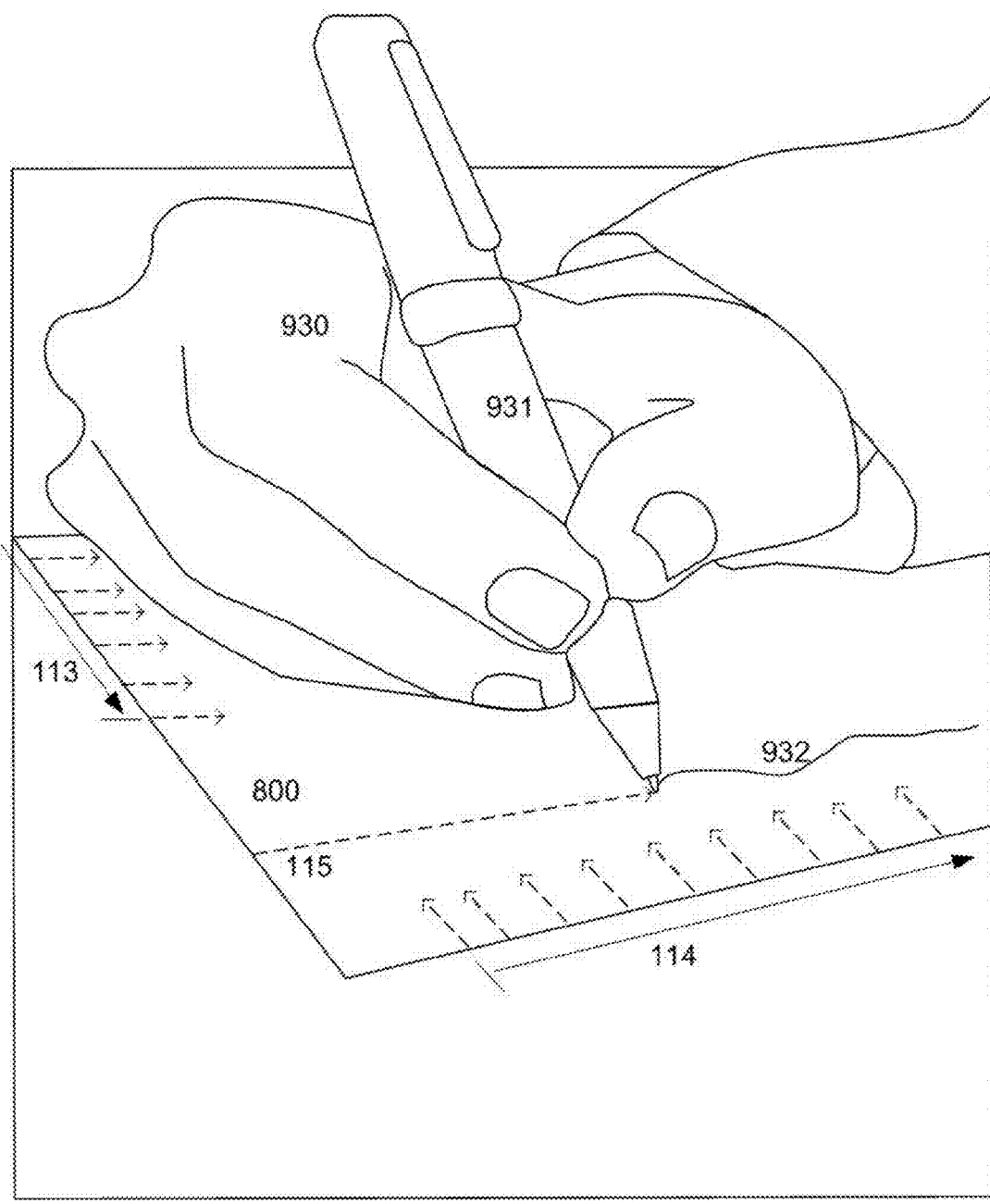
FIG. 107 is a simplified illustration of a user writing on a prior art touch screen with a stylus.

Reference is made to FIG. 107, which is a simplified illustration of a user writing on a prior art touch screen with a stylus. Shown in FIG. 107 is a hand 930 holding a stylus 931, and drawing a line 932 on a touch screen 800. The user's palm is resting on screen 800, blocking two series of light beams depicted as dotted lines; namely, a series 113 along the screen's horizontal axis, and a series 114 along the screen's vertical axis. The location of the stylus tip on the vertical axis is within series 114. Beam 115 does detect the tip of the stylus, but it only provides a horizontal axis location.

Figure 108:
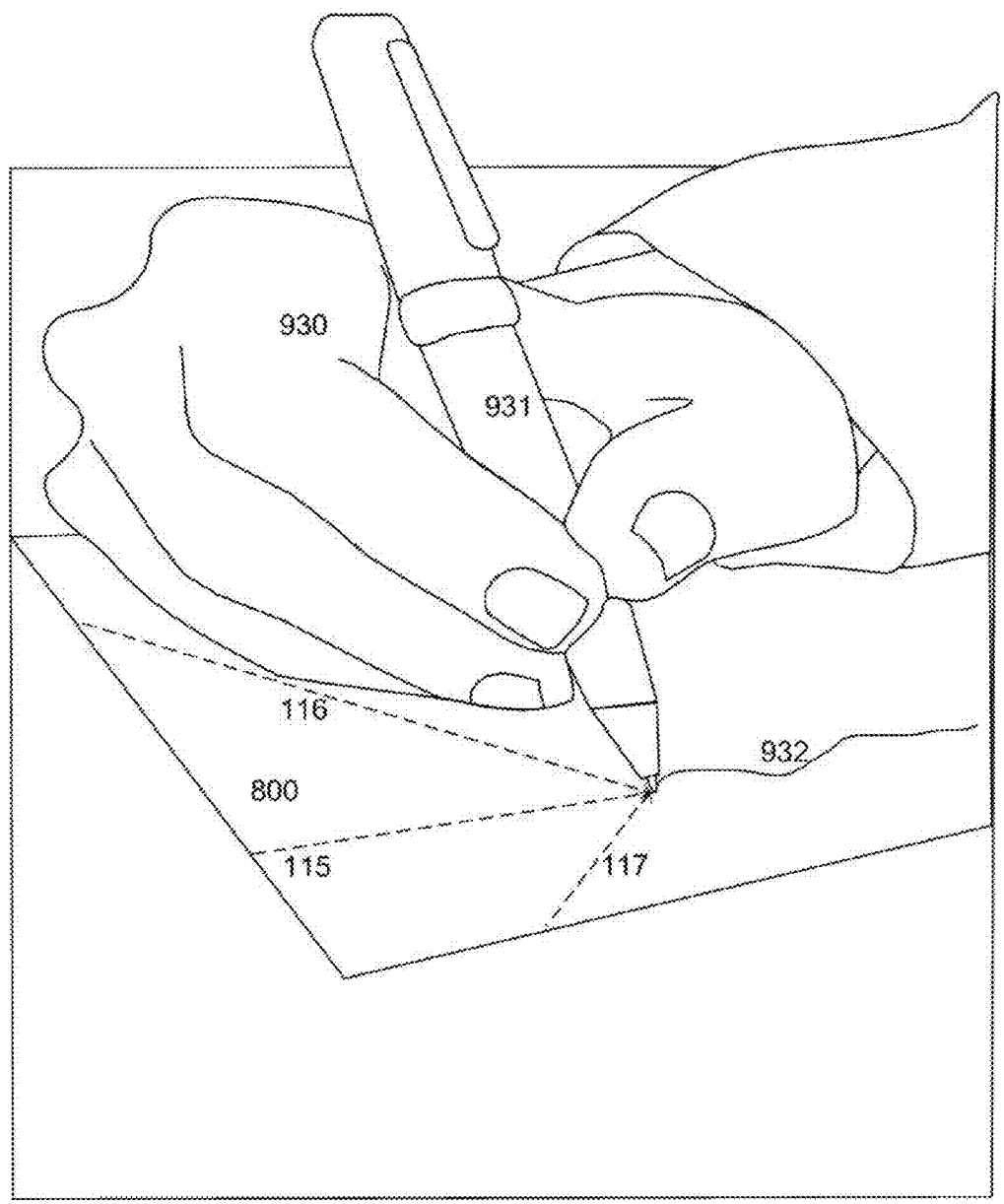
FIG. 108 is a simplified illustration of light beams detecting location of a stylus when a user's palm rests on a touch screen, in accordance with an embodiment of the present invention.

Embodiments of the present invention overcome the drawback illustrated in FIG. 107. Reference is made to FIG. 108, which is a simplified illustration of light beams detecting location of a stylus when a user's palm rests on a touch screen, in accordance with an embodiment of the present invention. By providing two sets of detection axes; namely, an orthogonal set and a diagonal set, a two-dimensional location of a stylus is determined. FIG. 108 shows that beams 115 and 116 uniquely detect a stylus. Since each detection comprises overlapping wide beams whose signals are interpolated, as described hereinabove, the stylus position is determined with high precision, despite beams 115 and 116 not being perpendicular to one another. When the bottom of the user's palm does not block diagonal beam 117, then beam 117 also detects the stylus location separately from the palm. In such case, beams 116 and 117 are used to detect the stylus location. Alternatively, all three detecting beams 115-117 may be used.

Another challenge that arises with touch screens that support both stylus and finger input arises when a user places his palm on the screen in order to write with a stylus, is misinterpretation of the initial contact between palm and screen as being a tap on an icon, in response to which the device launches an unintended application whose icon was tapped. Once the palm is resting on the screen, an area of contact is used to reject the palm touch as a screen tap. Nevertheless, the initial contact may cover a small surface area of the screen and thus be misinterpreted as a screen tap.

According to embodiments of the present invention, light beams above the screen are used to detect a palm as it approaches the screen. In one embodiment this is accomplished by projecting light from each emitter at several heights above the screen, as illustrated in FIG. 18 showing an approaching finger 900 blocking beam 101 but not beam 102. In another embodiment, multiple layers of emitters and receivers are arranged around the screen, and used to detect objects at different heights above the screen, as described hereinabove with reference to a user input gesture cavity and, in particular, with the cavity frame folded on top of the screen.

Figure 109:
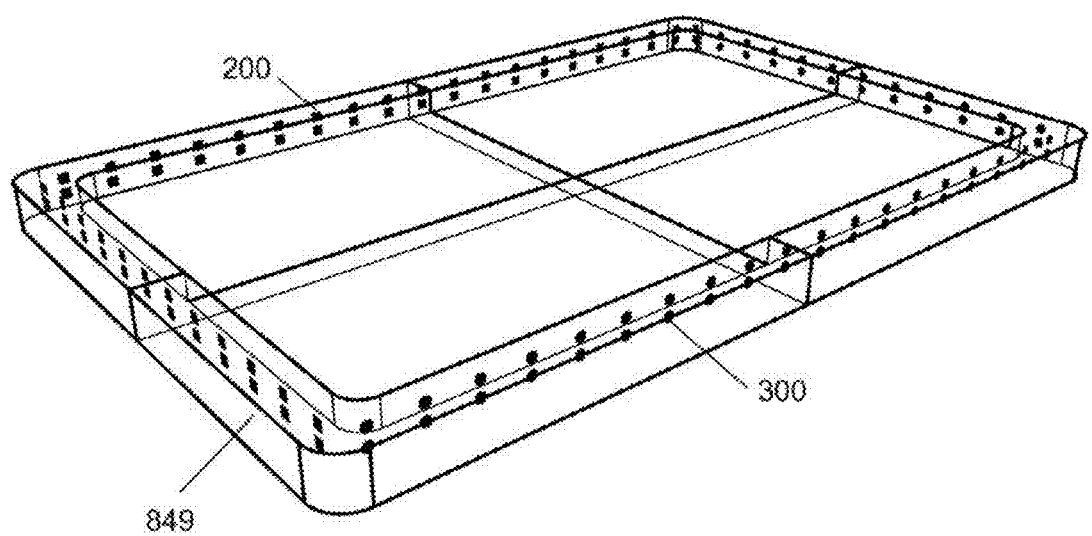
FIG. 109 is a simplified illustration of a frame surrounding a touch screen, in accordance with an embodiment of the present invention.

Reference is made to FIG. 109, which is a simplified illustration of a frame surrounding a touch screen, in accordance with an embodiment of the present invention. FIG. 109 shows a frame 849 surrounding a touch screen, similar to frame 849 of FIG. 55. Two stacked rows of emitters 200 and receivers 300 are provided in the frame. When assembled together with a display in an electronic device, the stacked rows of emitters and receivers are raised above the display surface and provide object detection at two heights, namely, on the screen by the lower row of emitters and receivers, and above the screen by the upper row of emitters and receivers. When a user's palm begins to touch the screen, a large palm area is detected hovering above the screen. This enables the device to determine that a palm is approaching the screen, and that any screen tap is inadvertent.

In another embodiment of the present invention, only one row of emitters and receivers is provided for detecting a palm hovering above the screen, and touches on the screen are detected by conventional detection systems imposed on the display including inter alia capacitive or resistive touch sensors.

According to an embodiment of the present invention, a user interface disables screen taps for activating functions when a palm is detected. When the palm is detected, the user interface is configured to launch applications in response to a user touching an icon and gliding his finger away from the touched location along the touch screen. I.e., two sets of user interface gestures are provided. When no palm is detected, the first set of gestures is used. With the first set of gestures, a tap on an icon activates an application or function associated with the icon. When a palm is detected hovering above the screen, the second set of gestures is used. With the second set of gestures, the user is required to touch an icon and then glide his finger away from the touch location along the touch screen in order to activate the application or function associated with the icon. In this way, the device does not launch an unintended application when a user places his palm on the screen. The second set of gestures does not disable activation of icons; it enables the user to activate the application or function associated with the icon, if he desires to do so, by a touch and glide gesture.

Situating Elements around Corners

Screen corners present several challenges for arranging emitters and receivers. One challenge is that two emitters need to be placed in the same location—one for each screen edge. The challenge is complicated by the layout illustrated in FIG. 44, whereby the emitter and receiver elements are positioned under the screen surface, and therefore the rectangle formed by these elements is smaller than the frame of lenses surrounding the screen. One approach to overcoming this challenge is placement of two emitters at approximately the same location on the PCB, with one of the emitters placed on the top surface of the PCB and the other emitter placed on the bottom surface of the PCB. However, this approach introduces complications with connectors and positioning of optical elements.

Another challenge is extending overlapping beams to the edges of the screen. Although the emitters and receivers are underneath the screen, touch detection covers the entire area bordered by the inner edges of the optical elements that surround the screen.

Figure 110:
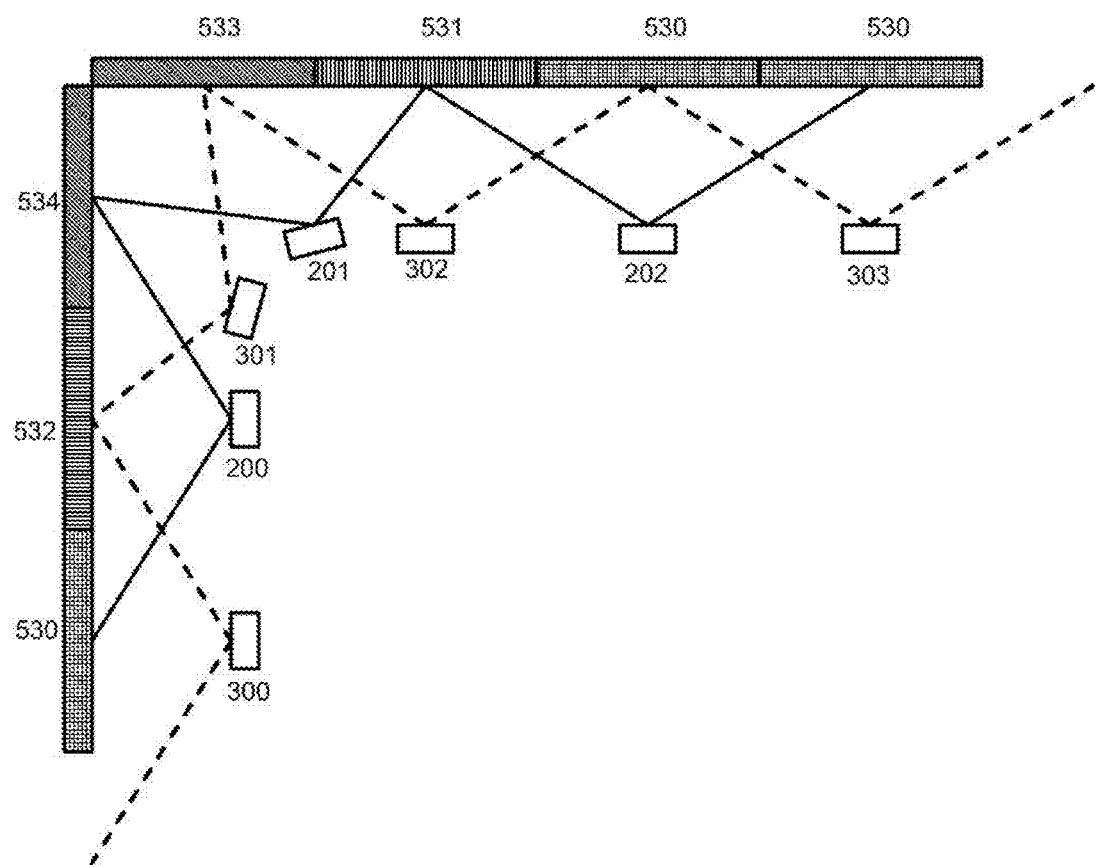
FIG. 110 is a simplified illustration of a first embodiment of emitters, receivers and optical elements for a corner of a touch screen, in accordance with an embodiment of the present invention.

Embodiments of the present invention provide arrangements that are suitable for use with orthogonal and diagonal detection axes, as described hereinabove. Reference is made to FIG. 110, which is a simplified illustration of a first embodiment of emitters, receivers and optical elements for a corner of a touch screen, in accordance with an embodiment of the present invention. FIG. 110 shows a first corner arrangement of emitter or receiver elements and their respective optical elements. Receivers 300-303 and emitters 200-202 are arranged alternatingly along two adjacent screen edges. Solid lines indicate light beams from the emitters, and dashed lines indicate light beams arriving at the receivers. Emitters and receivers 300, 200, 302, 202 and 303 are positioned according to a standard pitch, and optical elements 530 are configured accordingly. Receiver 301 and emitter 201 are oriented at an angle, and their wide beams are divided such that half of a beam traverses the screen in a first direction, e.g., along the screen's vertical axis, and the other half of the beam traverse the screen in a second direction, e.g., along the screen's horizontal axis. Moreover, in embodiments that include a second lens having three-sided cavities for splitting beams, as described hereinabove, half of the wide beam is split into a first pair of diagonal beams that originate along one screen edge, and the other half of the beam is split into a second pair of diagonal beams that originate along an adjacent screen edge. A hybrid optical element 531 is provided in order to overlap beams for emitter 201 and receiver 302. Optical element 531 is referred to as a "hybrid optical element" because the right half of the element is the same as the right half of element 530, but a portion of the reflective or refractive facets on the left half are directed at the non-standard location and orientation of emitter 201. Similarly, a hybrid optical element 532 is provided in order to overlap beams for emitter 200 and receiver 301. The lower half of hybrid optical element 532 is similar to the left half of element 530. Both halves of corner element 533 are uniquely configured; namely, the left half overlaps beams for emitter 201 and receiver 301, and the right half overlaps beams for emitter 201 and receiver 302. Both halves of corner optical element 534 are also uniquely configured for emitters 200 and 201 and for receiver 301.

Figure 111:
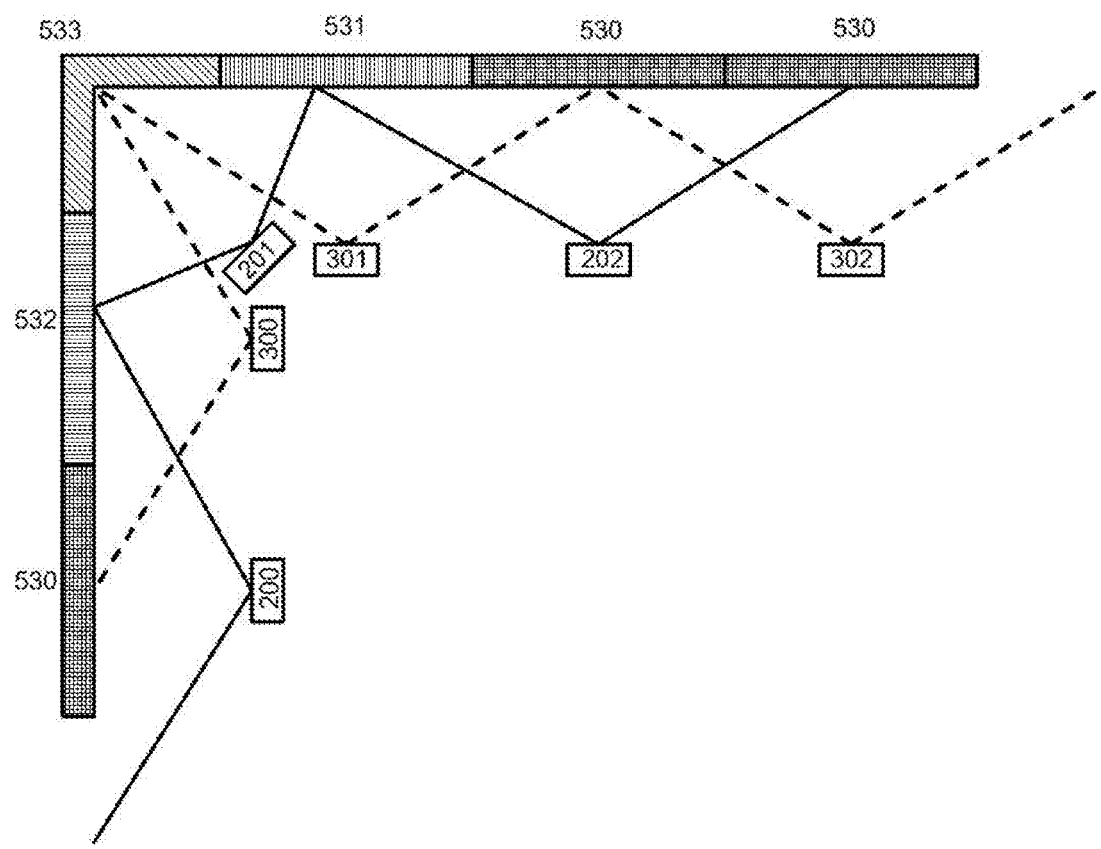
FIG. 111 is a simplified illustration of a second embodiment of emitters, receivers and optical elements for a corner of a touch screen, in accordance with an embodiment of the present invention.

Reference is made to FIG. 111, which is a simplified illustration of a second embodiment of emitters, receivers and optical elements for a corner of a touch screen, in accordance with an embodiment of the present invention. FIG. 111 shows an alternative corner arrangement of emitter or receiver elements and their respective optical elements. In the arrangement shown in FIG. 111, only one emitter 201 is placed at a non-standard pitch and orientation. Standard optical elements 530 are used together with hybrid optical elements 531 and 532 and unique corner optical elements 533. Optical elements 531-533 are configured for the emitter-receiver arrangement shown, and are therefore different than elements 531-533 of FIG. 110.

Integrated Modules

In general, there is low tolerance for assembly errors for touch systems using alternating reflective or refractive facets aimed at two foci. An offset in placement of an emitter or a receiver causes it to be out of the reflective facet's focus, which can degrade accuracy and performance of such systems. In accordance with an embodiment of the present invention, rigid modular blocks containing reflective or refractive facets and an emitter or a receiver are prepared, in order to ensure the required assembly precision. Such modular blocks are useful for simplifying the process of integrating touch screen components, and for minimizing the tolerance chain for a manufacturer. These modular blocks are formed so as to be easily positioned together in a row along an edge of a display, for fast assembly of a touch screen. The high tolerance requirements of placing an emitter or receiver in exactly the correct position vis-à-vis the reflective or refractive facets, are handled during manufacture of the modular blocks, thus removing the burden of high precision assembly from a device manufacturer.

Simplified manufacturing is achieved by integrating optical elements and electronic components into a single unit. As such, complex surfaces may be gathered into one component, thereby reducing the need for high assembly tolerances.

Figure 112:
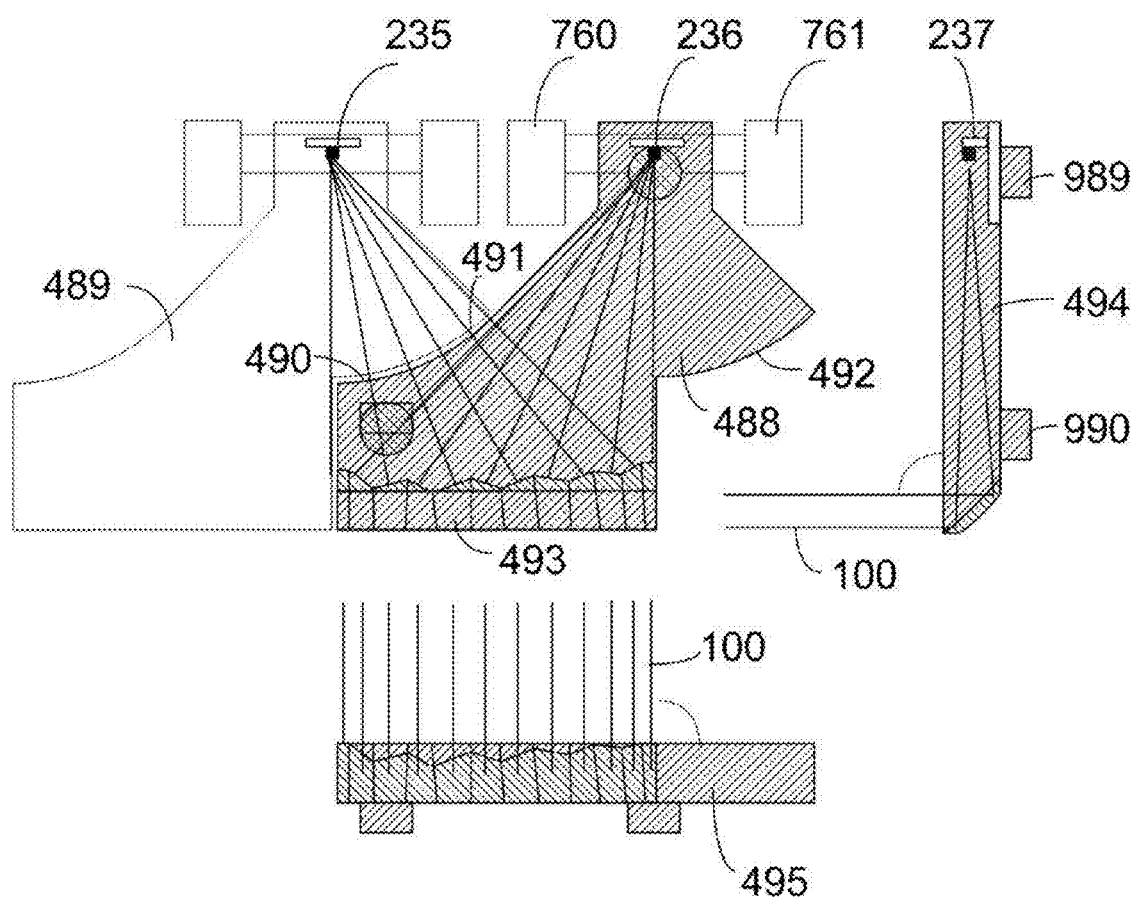
FIG. 112 is an illustration of optical components made of plastic material that is transparent to infrared light, in accordance with an embodiment of the present invention.

Reference is made to FIG. 112, which is an illustration of optical components made of plastic material that is transparent to infrared light, in accordance with an embodiment of the present invention. Shown in FIG. 112 is an optical component 488 that includes a forward-facing LED 236, and electronics to handle the LED signal. Optical component 488 is connected to electrical pads 760 and 761. Optical component 488 is used to transmit collimated light beams from two emitters; namely, emitter 235 and emitter 236. Emitter 235 is included in a neighboring optical component 489. In the alternating emitter-receiver embodiment described hereinabove, optical component 488 is used to transmit collimate light beams for one emitter and one receiver. E.g., neighboring module 489 includes a receiver instead of emitter 235.

Light beams from emitter 235 exit optical component 489 through a tight-fitting surface 491, and enter optical component 488 through a tight-fitting surface 490. FIG. 105 shows non-parallel light beams from emitters 235 and 236 hitting alternating facets on a wave-like multi-faceted reflective surface 493. Components 488 and 489 are substantially identical, and fit together. A device manufacturer can thus use these components as building blocks to create a touch screen, by arranging a series of these building blocks in a row along each edge of the display. Typical arrangements are (a) two adjacent display edges are lined with emitter components, and the other two edges are lined with receiver components, and (b) all four display edges are lined with alternating emitter/receiver components, i.e., each emitter has a neighboring receiver. Indeed, the emitter and receiver components, being of substantially identical shape, can be positioned together in the same row.

An optical component 494 is similar to optical component 488, except that an LED 237 is side-facing instead of forward-facing. FIG. 112 shows collimated light beams 100 exiting optical component 494. Pins 989 and 990 guide optical component 494 on a printed circuit board.

Optical component 495 is optical component 488 as viewed from the front. FIG. 1112 shows collimated light beams 100 exiting optical component 495.

Similar optical components (not shown) are also provided for receiving light beams that traverse the screen surface. For these components, the emitters are replaced by receivers, and the electrical components handle the receiver signals. Such optical components receive collimated light beams, and direct the beams onto two different receivers.

Figure 113:
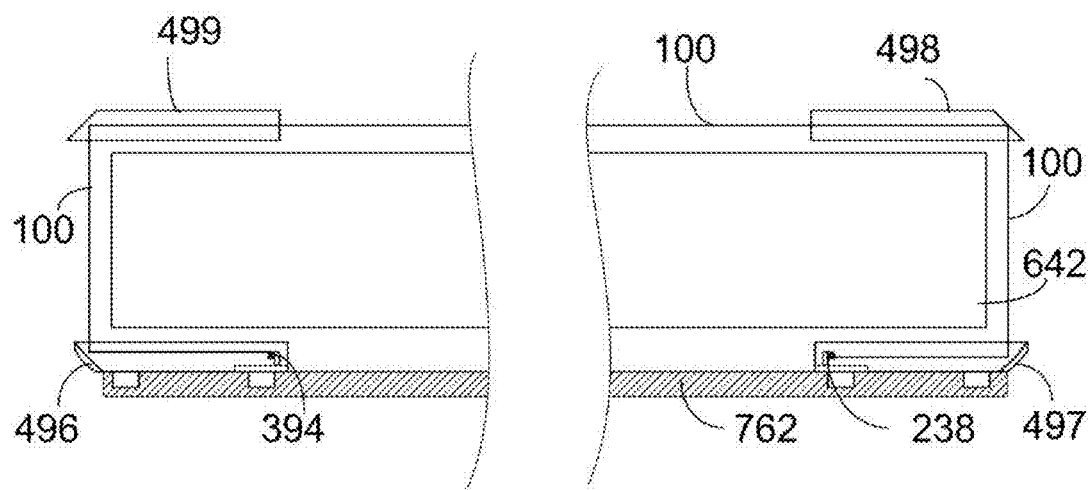
FIG. 113 is a simplified diagram of a side view of a touch screen with light guides, in accordance with an embodiment of the present invention.

Reference is made to FIG. 113, which is a simplified diagram of a side view of a touch screen with light guides, in accordance with an embodiment of the present invention. Shown in FIG. 113 are a display 642, an optical element 496, a photo diode 394 within optical element 496, an optical element 497, and an emitter 238 within optical element 497. Optical elements 496 and 497 are connected to a printed circuit board 762. Emitter 238 emits non-parallel light beams and, as described hereinabove with reference to FIG. 112, the non-parallel beams are converted into collimated beams, or substantially collimated beams, before exiting optical element 497. Another portion of the non-parallel beams are collimated by a neighboring module, not shown in FIG. 112. The beams 100 that exit optical element 497 are directed upwards and are reflected over display 642 by a light guide 498. In an embodiment of the present invention, three-way refracting cavities are etched, or otherwise formed, on the lower surface of optical element 498 to refract the light beams in three directions in order to provide two coordinate systems for determining a touch location. The light beams 100 enter a light guide 499 on the opposite side of screen 642, and are reflected below display 642 into optical element 496. In embodiments supporting the two coordinate systems, the three-way refracting cavities are present on the underside of optical element 499 as well. As described hereinabove, optical element 496 and its neighboring optical element, not shown, focus the incoming light beams on photo diode 394. In one embodiment of the present invention, the light guides 498 and 499 are constructed as a frame that surrounds display 642.

In the touch screen of FIG. 113, two types of light beam redirection occur. A first redirection requires multiple facets directed at a single focus point. A second redirection uniformly redirects incoming beams at a 90° angle, or folds incoming light beams into a narrow waist or focus, as described hereinabove with reference to configuration no. 5. In some embodiments, the collimated beams are refracted in three directions, in between the first and second redirections, by refracting cavities.

The first type of redirection requires that the emitter or receiver be positioned at a specific location relative to the focal point of many facets. As such, the positioning of the emitter or receiver and its reflective surfaces, is sensitive to variations in placement. Thus the assembly of the emitter or receiver, together with its corresponding surface of reflective facets, has a low tolerance of error. The second type of redirection, involving reflection and, in some cases, uniform refraction in three directions, is robust to variations in position of the reflector and to the pattern of refracting cavities located in the light guide. Thus assembly of this portion of the light guide has a high tolerance for error.

The light guides that reflect light above the screen surface may be manufactured separately and assembled with other touch screen components. Thus in FIG. 113 light guides 498 and 499 are shown separate from optical elements 496 and 497.

Figure 114:
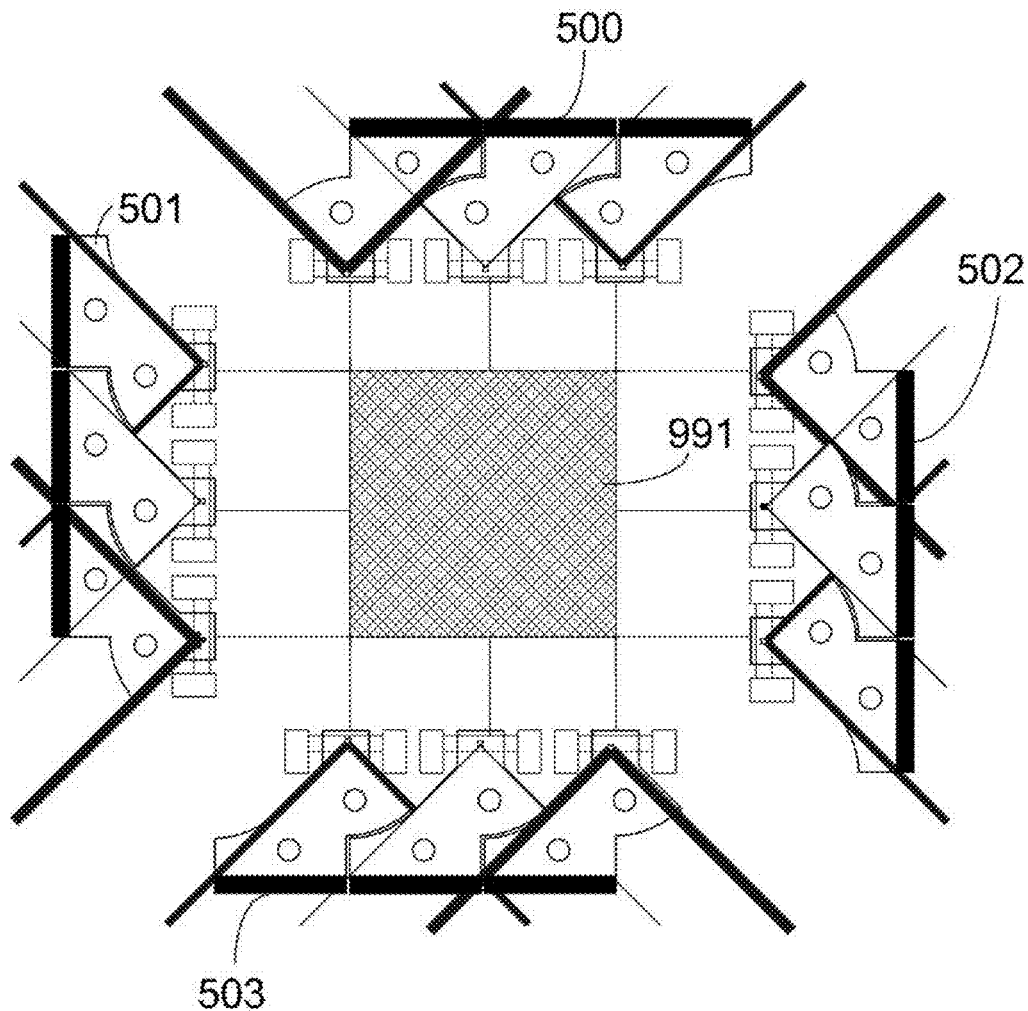
FIG. 114 is an illustration of a touch screen with a block of three optical components on each side, in accordance with an embodiment of the present invention.

Reference is made to FIG. 114, which is an illustration of a touch screen with a block of three optical components on each side, in accordance with an embodiment of the present invention. Blocks 500 and 501 are emitters, and blocks 502 and 503 are receivers. The blocks create an active area 991, where an x-y touch position of a stylus or finger may be calculated based on detected blocked light. Adding more optical components of the same type to each block serves to enlarge the active area that is created.

Figure 115:
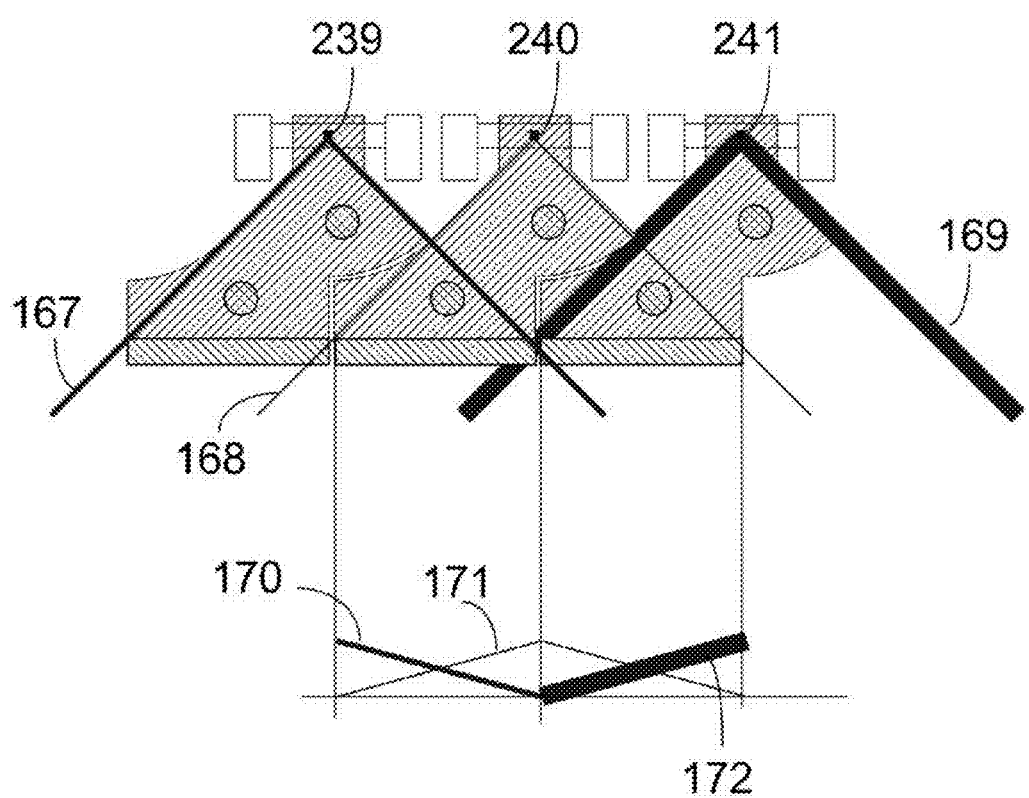
FIG. 115 is a magnified illustration of one of the emitter blocks of FIG. 114, in accordance with an embodiment of the present invention.

Reference is made to FIG. 115, which is a magnified illustration of one of the emitter blocks of FIG. 114, in accordance with an embodiment of the present invention. Shown in FIG. 115 are three emitters 239, 240 and 241, that emit respective wide beams 167, 168 and 169 from one edge of a screen, which are read as respective signals 170, 171 and 172. The signal gradients are indicated by their diagonal orientations. At the opposite edge of the screen, signals 170, 171 and 172 are each redirected onto respective receivers by respective optical components. An accurate position of an object, such as a finger or stylus, touching the screen, is then determined based on values of blocked light at the receivers, as described below.

Touch Screen System Configuration No. 7

Configuration no. 7 uses total internal reflection in a touch screen. Whereas in configurations 1-6 the light beams travel in air above the screen surface, in configuration no. 7 the light beams travel through a sheet of glass or plastic that is transmissive to the wavelengths used in the touch detection system. In other embodiments, the light travels through a liquid or gel layer that is transmissive to the wavelengths used in the touch detection system.

Total internal reflection is an optical phenomenon that occurs when a ray of light strikes a medium boundary at an angle larger than a particular critical angle, with respect to the normal to the surface. If the refractive index is lower on the other side of the boundary and the incident angle is greater than the critical angle, no light passes through the boundary and all of the light is reflected. The critical angle is the angle of incidence above which the total internal reflection occurs.

When a light beam crosses a boundary between materials with different refractive indices, the light beam is partially refracted at the boundary surface, and partially reflected. However, if the angle of incidence is greater (i.e., the ray is closer to being parallel to the boundary) than the critical angle—the angle of incidence at which light is refracted such that it travels along the boundary—then the light stops crossing the boundary altogether and instead is totally reflected back internally. This only occurs where light travels from a medium with a higher refractive index to one with a lower refractive index. For example, it occurs when passing from glass to air.

A touch screen according to configuration no. 7 has a glass or plastic sheet or pane above the display screen referred to as a cover glass. Alternatively, a gel layer or a liquid filled sac is placed over the display. The cover glass, or gel or liquid filled sac material is transparent to light at the wavelength used. Typically optical touch systems use wavelengths in the near infrared range, i.e., wavelengths below 1100 nm, e.g., 940 nm. A narrow air gap is provided between the cover glass and the display such that both the upper and lower surfaces of the cover glass, exposed to air, internally reflect light inside the cover glass. Using any of the collimating lenses described above with reference to configurations 1-6, light enters the cover glass from below at an angle larger than the critical angle with respect to the normal to the cover glass surface, and is directed through the cover glass by total internal reflection. A finger touching the cover glass from above absorbs a portion of the light inside the cover glass at the touched location. In addition, the finger also scatters a portion of the light inside the cover glass at the touched location. Both of these actions diminish the amount of light that arrives at a respective detector, and the detector measurement is used as described herein to calculate the location of the touch.

Figure 116:
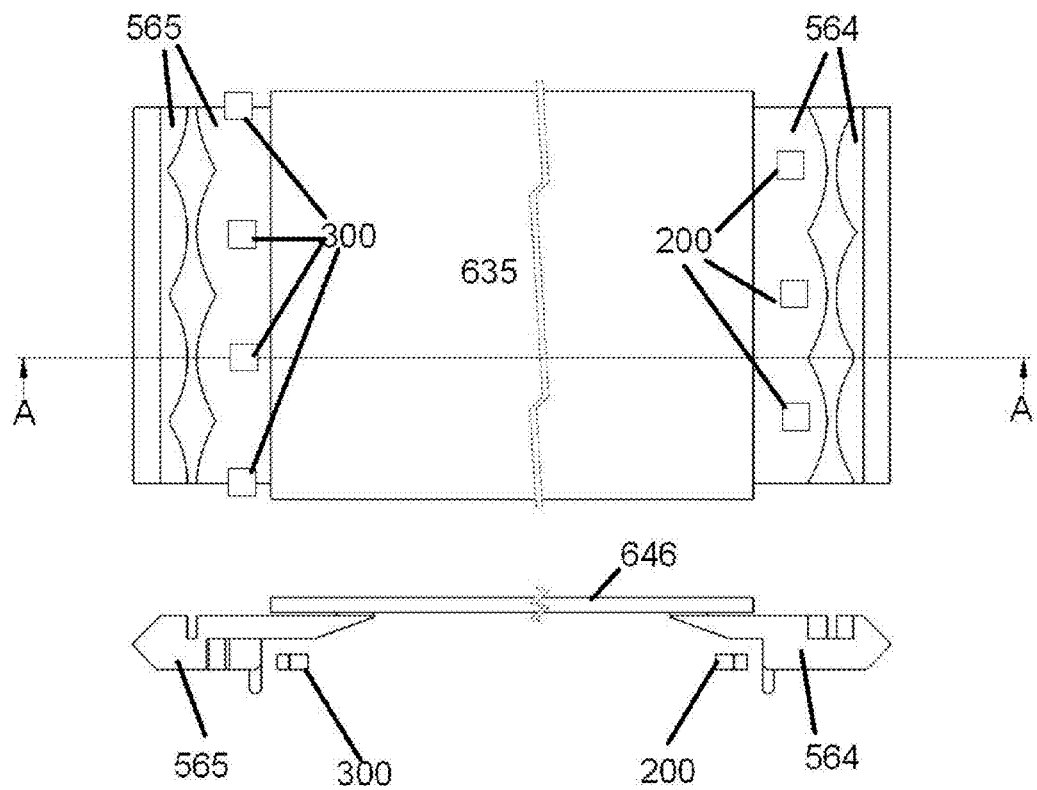
FIG. 116 is a simplified illustration of a touch screen assembly having a cover glass, in accordance with an embodiment of the present invention.

Reference is made to FIG. 116, which is a simplified illustration of a touch screen assembly having a cover glass, in accordance with an embodiment of the present invention.

FIG. 116 shows a screen 635, a cover glass 646, emitters 200, emitter lenses 564, receivers 300 and receiver lenses 565. FIG. 116 shows a view from above, and a cross section along the line A-A. The emitters and receivers in FIG. 116 are shift-aligned, and the lenses ensure that light from each emitter reaches two opposite receivers.

Figure 117:
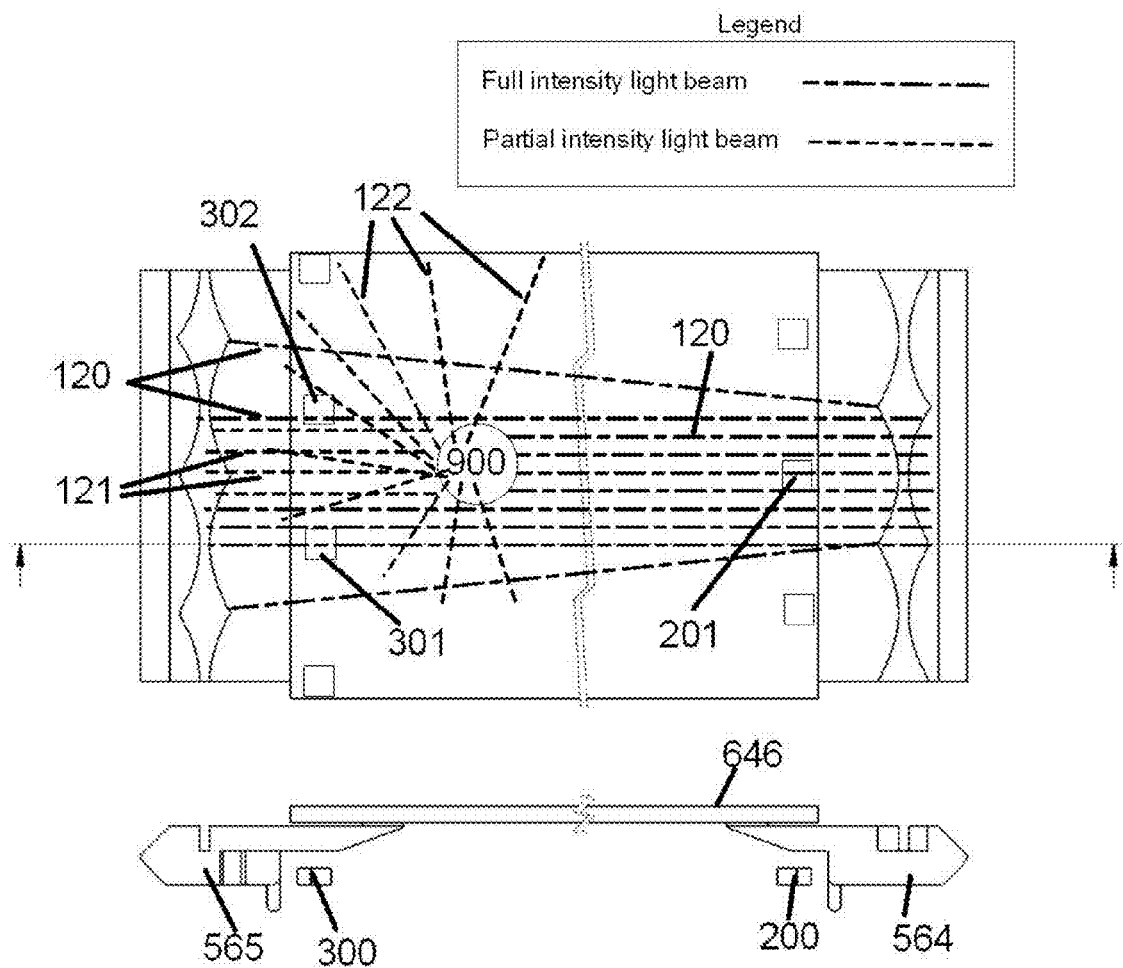
FIG. 117 is a simplified illustration of a touch scattering internally reflected light in a screen assembly having a cover glass, in accordance with an embodiment of the present invention.

Reference is made to FIG. 117, which is a simplified illustration of a touch object scattering internally reflected light in a screen assembly having a cover glass, in accordance with an embodiment of the present invention. FIG. 117 shows scattering of light by an object touching the screen. Light beams 120 from emitter 201 to receivers 301 and 302 are internally reflected inside cover glass 646 and scattered by a touch object 900. FIG. 117 shows scattered beams 121. However, a portion of the detection channel beams 122 beneath touch object 900 arrive at receivers 301 and 302.

Figure 118:
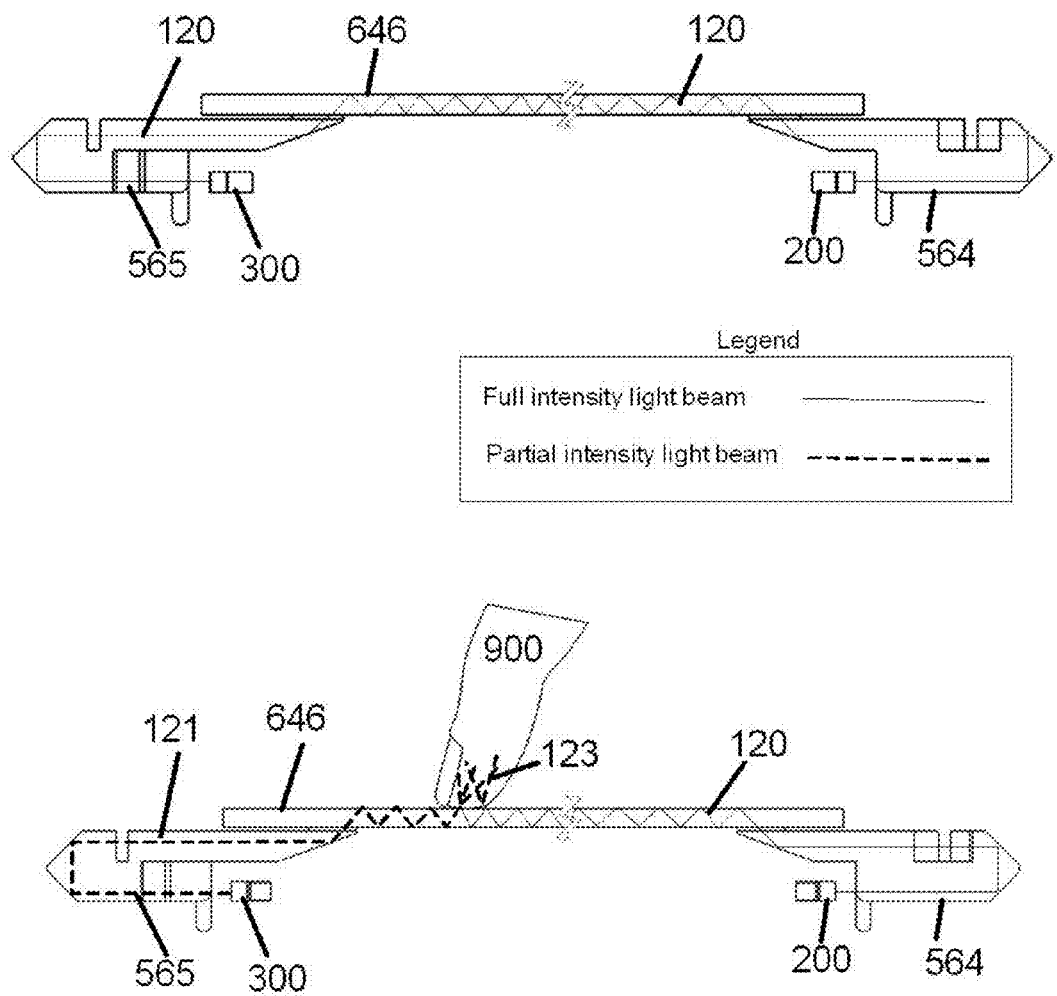
FIG. 118 is a simplified illustration of a touch object absorbing internally reflected light in a screen assembly having a cover glass, in accordance with an embodiment of the present invention.

Reference is made to FIG. 118, which is a simplified illustration of a touch object absorbing internally reflected light in a screen assembly having a cover glass, in accordance with an embodiment of the present invention. FIG. 118 shows absorption of light by a finger 900 touching the screen. The light beams from emitter 201 to receiver 301 are internally reflected inside cover glass 646 and are partially absorbed into finger 900.

Figure 119:
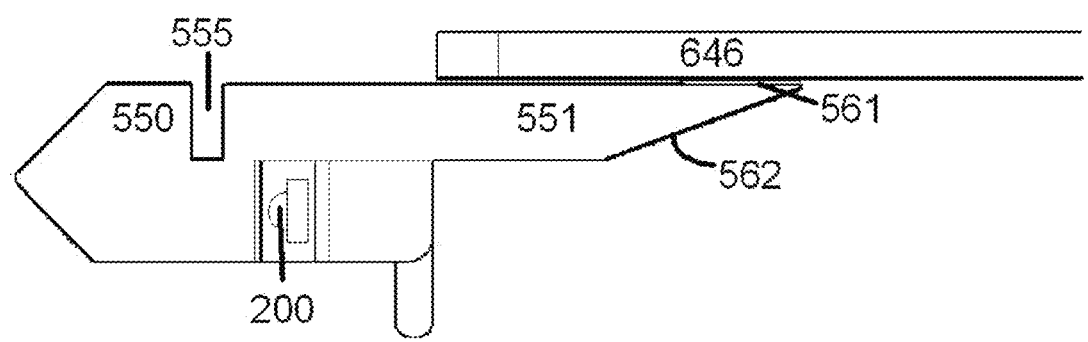
FIG. 119 is a simplified illustration of a touch screen assembly having a cover glass, in accordance with an embodiment of the present invention.
Figure 120:
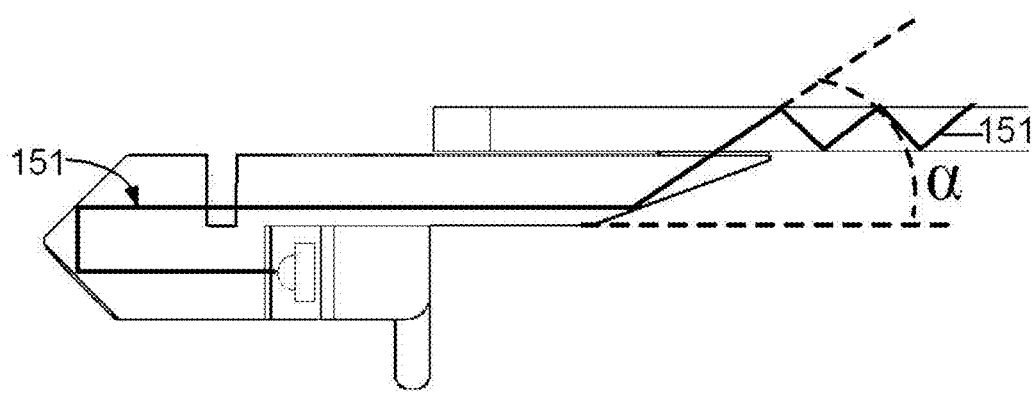
FIG. 120 is a simplified illustration of a light beam path in the touch screen assembly of FIG. 119, in accordance with an embodiment of the present invention.
Figure 121:
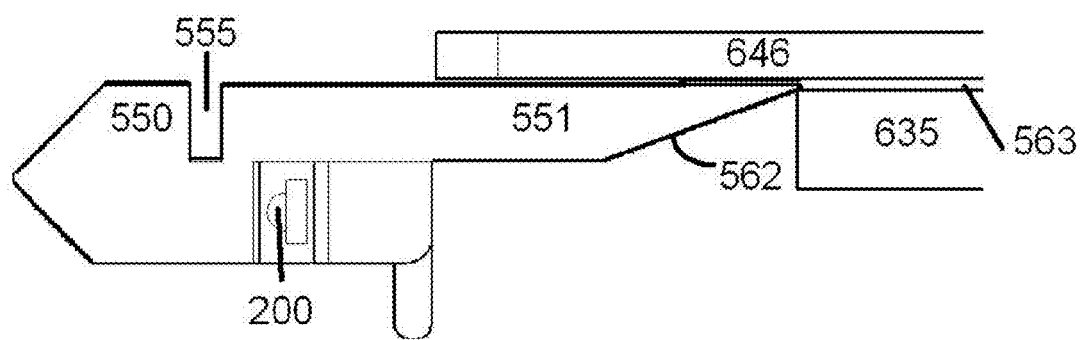
FIG. 121 is a simplified illustration of a touch screen assembly having a cover glass, in accordance with an embodiment of the present invention.

Reference is made to FIG. 119, which is a simplified illustration of a touch screen assembly having a cover glass, in accordance with an embodiment of the present invention. FIG. 119 shows the lens arrangement of FIGS. 60 and 61 modified for a system according to configuration no. 7. As in FIG. 60, an LED 200 is coupled with a pair of lenses 550 and 551, separated by an air gap 555, for collimating light. In addition, FIG. 119 includes cover glass 646 that receives light beams emitted by emitter 200 and transmits the beams through cover glass 646 using total internal reflection. This lens differs from that of FIG. 60 in that it is entirely below the height of the device. Also, lens 551 includes an additional reflective facet 562 for guiding light into the underside of cover glass 646 at a suitable angle α, i.e., at an angle less than the critical angle with respect to the cover glass surface, as illustrated in FIG. 120. For example, the critical angle for a glass-to-air boundary is roughly 46° so a suitable angle α in this case is 40°. The actual refractive indices of the cover glass material, air, and a low-index adhesive, if such is used to laminate the cover glass to the display, determine the critical angle for each embodiment. Lens 551 is connected to cover glass 646 using an optically clear transfer tape 561, e.g., TESA 69304 optically clear pure acrylic adhesive manufactured by TESA Corp. of Charlotte, N.C., so that this reflected light enters cover glass 646. A similar arrangement at an opposite edge of the screen guides the light out of cover glass 646 and onto one or more respective photo detectors. In other embodiments light guide 551 is formed as a unitary molded plastic unit together with cover glass 646 and adhesive transfer tape 561 is not used. In an alternative embodiment light enters cover glass 646 from the side instead of from underneath, as illustrated in FIG. 121.

Reference is made to FIG. 120, which is a simplified illustration of a light beam path in the touch screen assembly of FIG. 119, in accordance with an embodiment of the present invention. Reference is also made to FIG. 121, which is a simplified illustration of a touch screen assembly having a cover glass, in accordance with an embodiment of the present invention. FIG. 120 shows the path of light beam 151 from emitter 200 through lenses 550 and 551 and into cover glass 646 at a suitable angle α where it propagates by virtue of total internal reflection. FIG. 121 shows air gap 563 between cover glass 646 and display 635. This air gap creates the necessary medium boundary on the underside of the cover glass for total internal reflection inside cover glass 646. Alternatively, the necessary medium boundary for total internal reflection is provided by laminating the cover glass to the screen using a suitable low-index adhesive. Cover glass 646 is preferably 1-2 mm thick.

Configuration 7 differs from configurations 1-6 in the amount of light blocked during a touch. In general, a touch in configuration nos. 1-6 blocks more of the beam than a comparable touch in configuration no. 7. However principles such as gradations of intensity along the width of the beams described hereinabove, inter alia with reference to FIGS. 47, 48 and 68-76, are the same in configuration no. 7 as they are in configuration nos. 1-6. Therefore the methods for interpolating signals described herein are applicable to configuration no. 7, once the lower amount of light beam blockage in configuration no. 7 is accounted for. The arrangement of divergent beams where three divergent wide beams are directed out of each emitter, as described in detail with reference to FIGS. 79-83, 91-92 and 99-109, is also applicable to configuration no. 7 with the divergent beams all being directed into the cover glass at an appropriate angle for total internal reflection.

Configuration no. 7 enables designing a device without a protruding bezel around the screen. This is an advantage over configurations 1-6 in terms of design.

Another advantage relates to multi-touch detection. In configurations 1-6, when two or more objects are inserted into a light beam path simultaneously, the light beam shadow patterns no longer correspond to unique finger positions, and therefore the signal pattern is ambiguous. Examples of different touch patterns that produce the same shadow signal are shown in FIGS. 85-87. In systems using total internal reflection, each touch results in a further partial reduction in the signal so that the number of touches between transmitter and receiver may be calculated.

This calculation is simplest if the system assumes that only one type of item may be placed on the screen. Otherwise, a thick finger could be mistaken for two thin fingers, for example. However, in many cases there is a delay between each of the touches in a multi-touch gesture. When the system detects incremental steps in the magnitude of the touch detection signal, it indicates that the signal is generated by multiple touches as opposed to a large touch object. Thus when the system samples the screen at a high frequency, such that new samples are generated as each additional touch is added, the system determines that an additional touch occurred due to the further partial reduction in the signal. In particular, when using the controller described below, the system can sample the screen at rates of up to 1000 Hz, enabling discriminating between touches that occur at almost the same time.

Another advantage provided by configuration no. 7 relates to scattering of light by the touch object. A finger touching the screen scatters a portion of the light inside the cover glass at the touched location. The lenses 550 and 551 collimate the light from the emitter 200 and direct it at one or more respective detectors. The scattering of light by a touch object results in the light reaching other detectors. The collimating lenses associated with the detectors direct light scattered from a point along the collimated path onto the detectors. Therefore, in cases that may indicate multi-touch, the system polls additional detectors and resolves the multi-touch locations based on the detection of scattered light.

Figure 122:
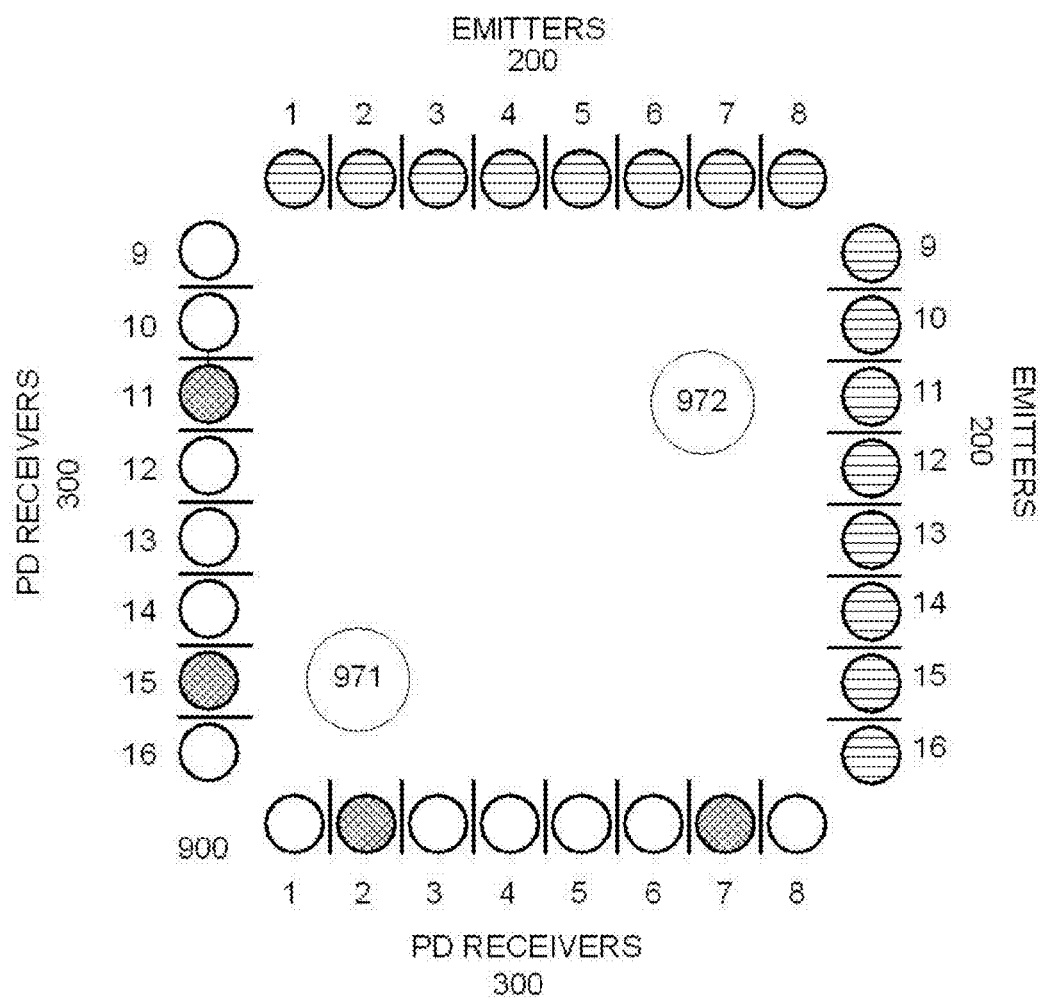
FIG. 122 is a simplified illustration of emitters and receivers detecting two diagonal touch points, in accordance with an embodiment of the present invention.

An example illustrates this advantage, with reference to FIG. 122, which is a simplified illustration of emitters and receivers detecting two diagonal touch points, in accordance with an embodiment of the present invention. FIG. 122 shows an arrangement of emitters 200 and PD receivers 300 surrounding a touch screen according to configuration no. 7. Two touch points 971 and 972 are drawn. Emitters 200 and PD receivers 300 are both numbered 1-16. A reduction in expected light occurs at PD numbers 2, 7, 11 and 15 and, as already explained, this signal pattern is not unique to these two touch points. In this case the system activates emitter number 2 and samples two PDs: PD number 11 and PD number 15. Each detector has an associated collimating lens not shown in the figure. In the touch pattern drawn, PD number 15 will detect a greater amount of scattered light (by touch point 971) than PD number 11 because touch point 971 is situated along the path of the collimating lens associated with PD number 15 but not along the path of the collimating lens associated with PD number 11. Similarly, the system activates emitter number 15 and samples two PDs: PD number 2 and PD number 7. In the touch pattern drawn, PD number 2 will detect a greater amount of scattered light (by touch point 971) than PD number 7. Based on this, the system determines that the touches are at the locations shown and not at the opposite corners of the screen.

Figure 123:
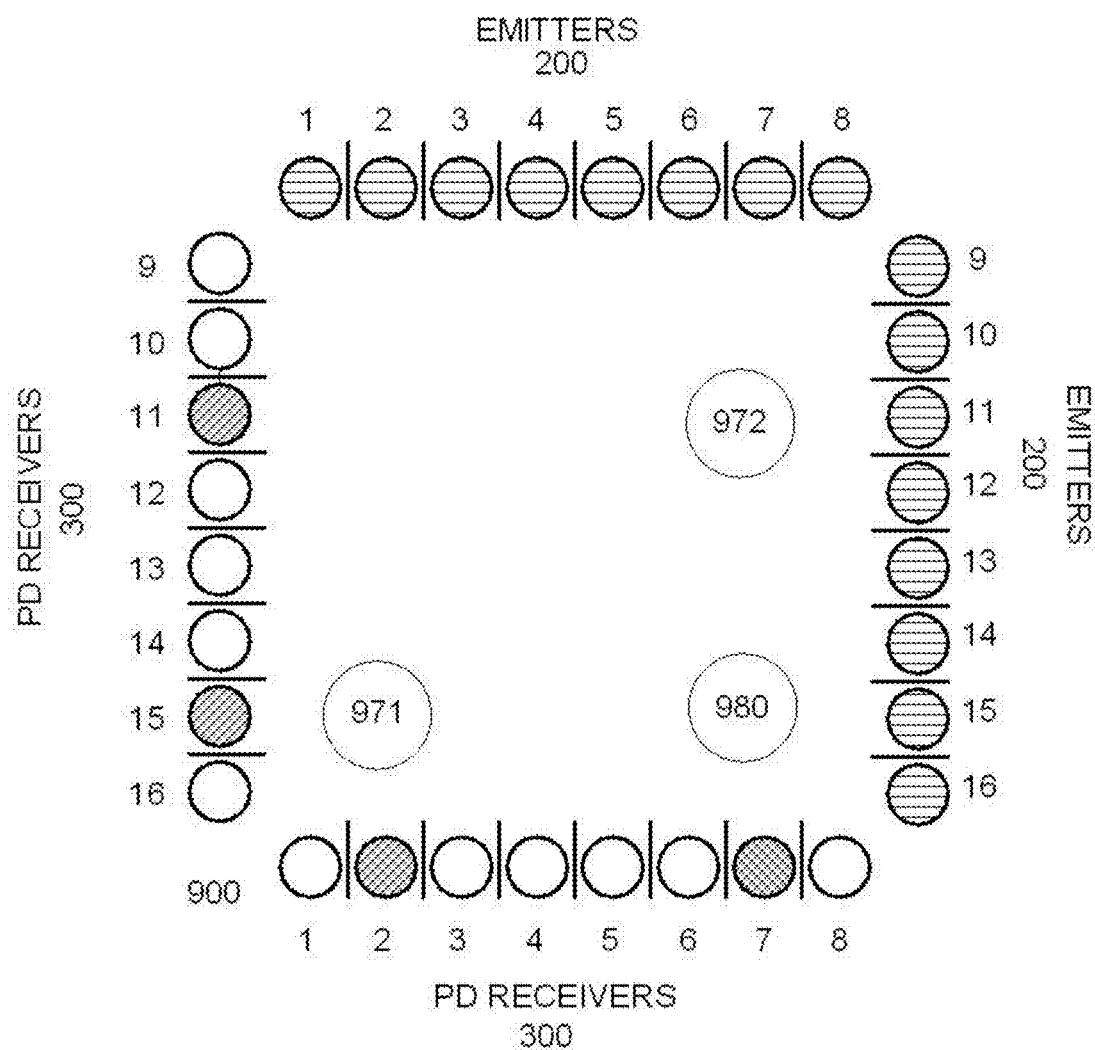
FIG. 123 is a simplified illustration of emitters and receivers detecting three touch points, in accordance with an embodiment of the present invention.

Reference is made to FIG. 123, which is a simplified illustration of emitters and receivers detecting three touch points, in accordance with an embodiment of the present invention. Continuing the example of FIG. 122, FIG. 123 adds a third touch point 980. In this case, PD number 7 detects a significantly greater reduction in expected light from its respective emitter (number 7) than PD number 2 detects from its respective emitter (number 2). This is because two touches (972, 980) absorb light from emitter 7, but only one touch (971) absorbs light from emitter 2. Based on this, the system determines that the touches are at the locations shown.

Figure 124:
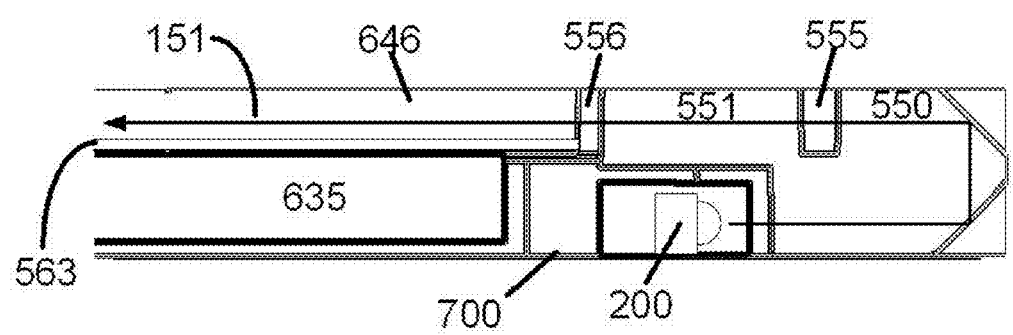
FIG. 124 is a simplified illustration of a touch screen assembly having a cover glass, in accordance with an embodiment of the present invention.

Reference is made to FIG. 124, which is a simplified illustration of a touch screen assembly having a cover glass, in accordance with an embodiment of the present invention. With respect to scattered light, in the touch screen of FIG. 124, during activation of emitter 15, detectors 7 and 2 detect scattered light from touch points 971 and 980 respectively; whereas during activation of emitter 2, detector 15 detects scattered light from touch point 971, and detector 11 detects much less scattered light. This indicates that touch point 980 is at the bottom right of the screen and not at the upper left corner.

In general, an activation sequence of emitters and detectors aimed at detecting scattered light may be employed selectively. For example, it may be performed only when a potential ghosted gesture is possible. Also, the sequence aimed at detecting scattered light may be limited to activating only those emitter-detector pairs that are likely to resolve the ghosting; e.g., when the detection pattern of FIGS. 122 and 123 occurs, only activating emitter-detector pairs 15-2, 15-7, 2-11 and 2-15.

Figure 125:
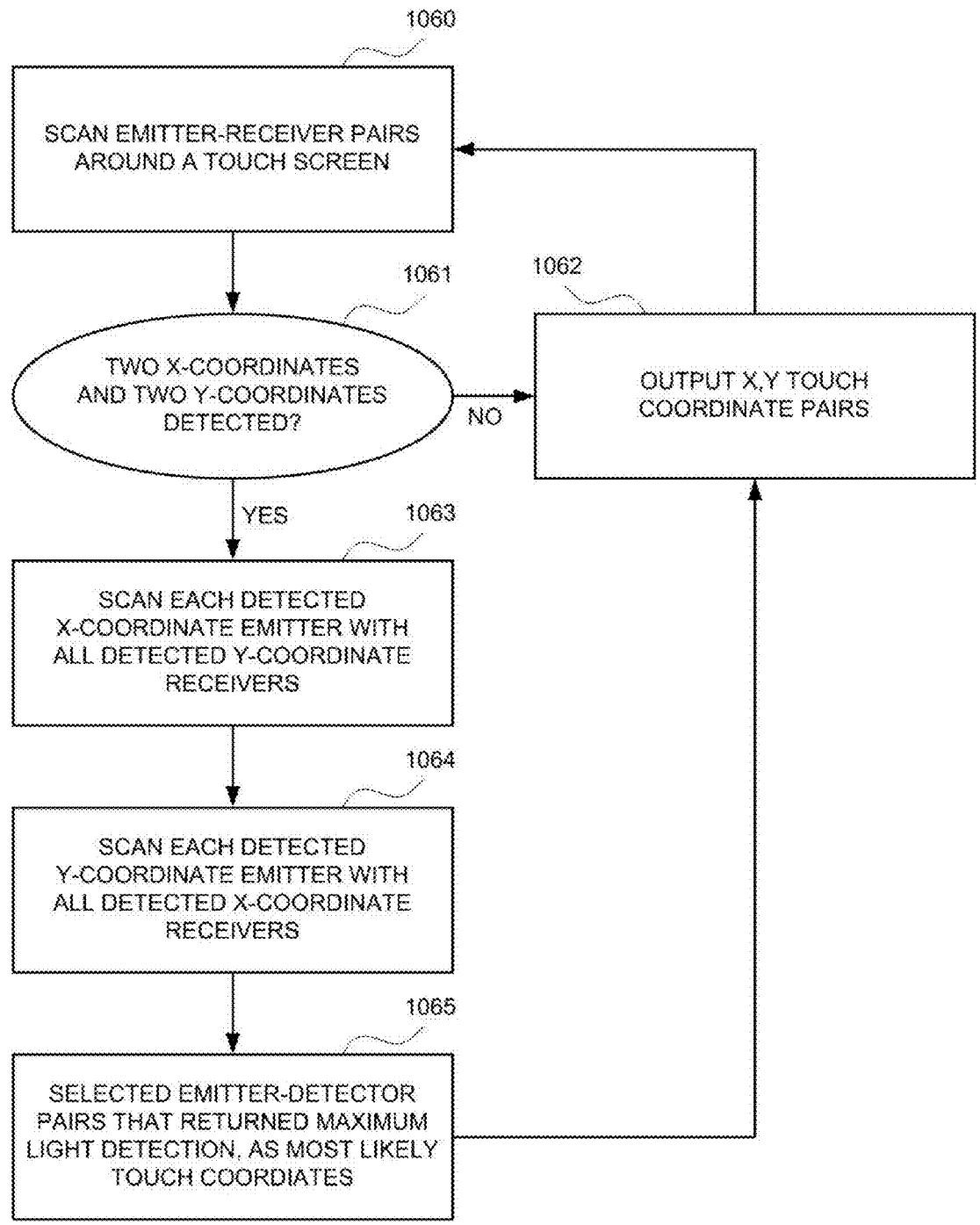
FIG. 125 is a flowchart of a method for disambiguating multiple touch detection signals in accordance with an embodiment of the present invention.

Reference is made to FIG. 125, which is a flowchart of a method for disambiguating multiple touch detection signals in accordance with an embodiment of the present invention. At step 1060 emitter-receiver pairs around a touch screen are scanned. A reduction in expected light indicates a touch along the emitter-receiver signal paths. If at least two x-coordinate channels and at least two y-coordinate channels detect a touch, the system proceeds through steps 1063-1065 to correctly pair the x, y coordinates. At step 1063 the system pairs each x coordinate emitter with all of the detected y-coordinate receivers to create a second set of touch detection channels. In these channels, a touch is indicated by an increase in detected light that results from light being scattered by the touch object. At step 1064 the system pairs each y-coordinate emitter with all of the detected x-coordinate receivers to create a similar set of touch detection channels. At step 1065 the system determines the most likely touch, based on steps 1063 and 1064, and outputs the touch coordinates at step 1062.

If only one x-coordinate or only one y-coordinate is returned at step 1061 the system outputs touch coordinates at step 1062 as follows: if one x-coordinate and one y-coordinate are detected, then output one x,y touch coordinate. If multiple coordinates are detected along one axis, pair each of these one axis coordinates with the single x or y-coordinate on the other axis.

Touch Screen System Configuration No. 8

Configuration no. 8 combines over-air light beams, as in configurations 1-6, with total internal reflection light beams as described in configuration 7. In certain embodiments, each emitter-detector pair activation includes a first portion of light traveling in air above the screen, and a second portion of light traveling through a cover glass. Both portions of light originate at the emitter and arrive at the detector.

Figure 126:
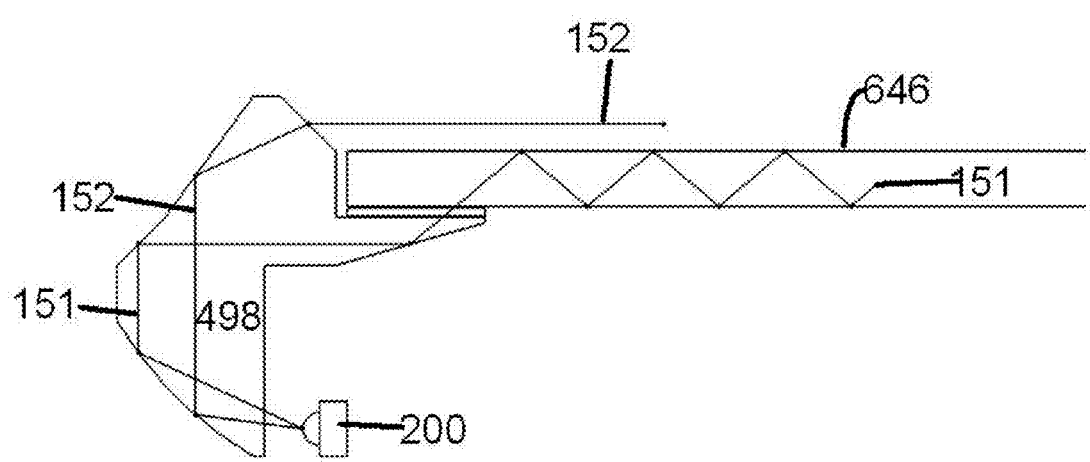
FIG. 126 is a simplified illustration of a touch screen assembly having a cover glass, in accordance with an embodiment of the present invention.

Reference is made to FIG. 126, which is a simplified illustration of a touch screen assembly having a cover glass, in accordance with an embodiment of the present invention. FIG. 126 shows two light beams 151 and 152 in a touch system according to configuration no. 8. Both beams originate at emitter 200 and both beams converge onto an opposite detector not shown in the figure. Beam 151 is directed into cover glass 646 from beneath, and beam 152 is directed over air, above cover glass 646. Light guide 498 guides both beams from emitter 200.

Configuration no. 8 has several advantages. This configuration detects a hovering object that blocks a portion of the over-air beam. However, a hovering object does not affect the total internal reflection; actual contact with the cover glass is required to frustrate the total internal reflection. As such, there is a significant drop in the signal when contact occurs. This enables the system to clearly distinguish a hover gesture from a touch gesture.

Another advantage is that configuration no. 8 has two detection systems: the over-air beams and the total internal reflection beams. When one of these systems is impaired, the other system provides touch detection. For example, a narrow stylus point is accurately traced by the over-air beams as described hereinabove, but the narrow stylus point does not absorb or frustrate much of the total internal reflection beams.

Yet another advantage is that the total internal reflection system is available to resolve ghosted gestures, as explained above with reference to configuration no. 7.

Touch Screen System Configuration No. 9

Configuration no. 9 uses a reduced number of components by coupling an emitter or a receiver to one end of a long thin light guide situated along an edge of the screen. Such a light guide is described in U.S. Pat. No. 7,333,095 entitled ILLUMINATION FOR OPTICAL TOUCH PANEL.

Figure 127:
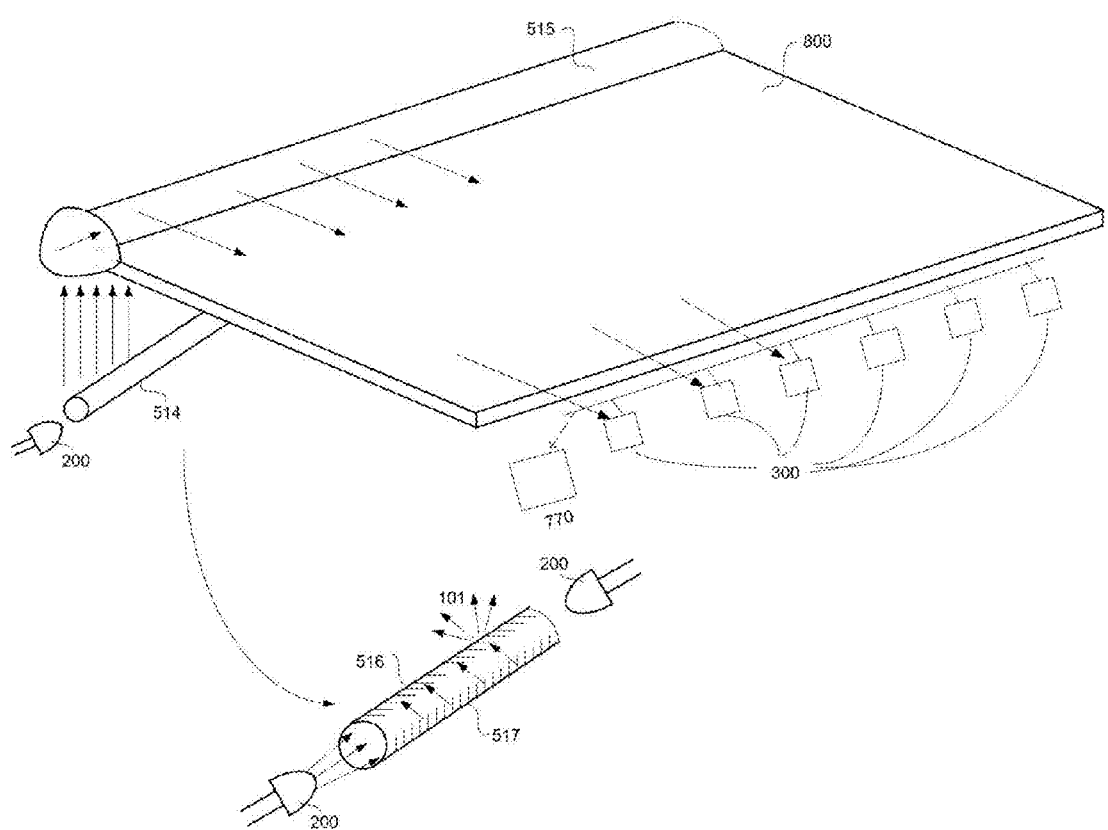
FIG. 127 is an illustration of a touch screen having a long thin light guide along a first edge of the screen, for directing light over the screen, and having an array of light receivers arranged along an opposite edge of the screen for detecting the directed light, and for communicating detected light values to a calculating unit, in accordance with an embodiment of the present invention.

Reference is made to FIG. 127, which is an illustration of a touch screen having a long thin light guide 514 along a first edge of the screen, for directing light over the screen, and having an array of light receivers 300 arranged along an opposite edge of the screen for detecting the directed light, and for communicating detected light values to a calculating unit 770, in accordance with an embodiment of the present invention. Light emitters 200 are coupled to both ends of light guide 514. Light guide 514 is positioned along one edge of a touch screen 800. Light is emitted into light guide 514 along a screen edge, and is re-directed across the screen surface by a reflector 515. A plurality of receivers 300 is situated along the opposite edge of touch screen 800, to enable multiple receivers to detect a touch, as described hereinabove with reference to configuration nos. 2 and 3.

Figure 128:
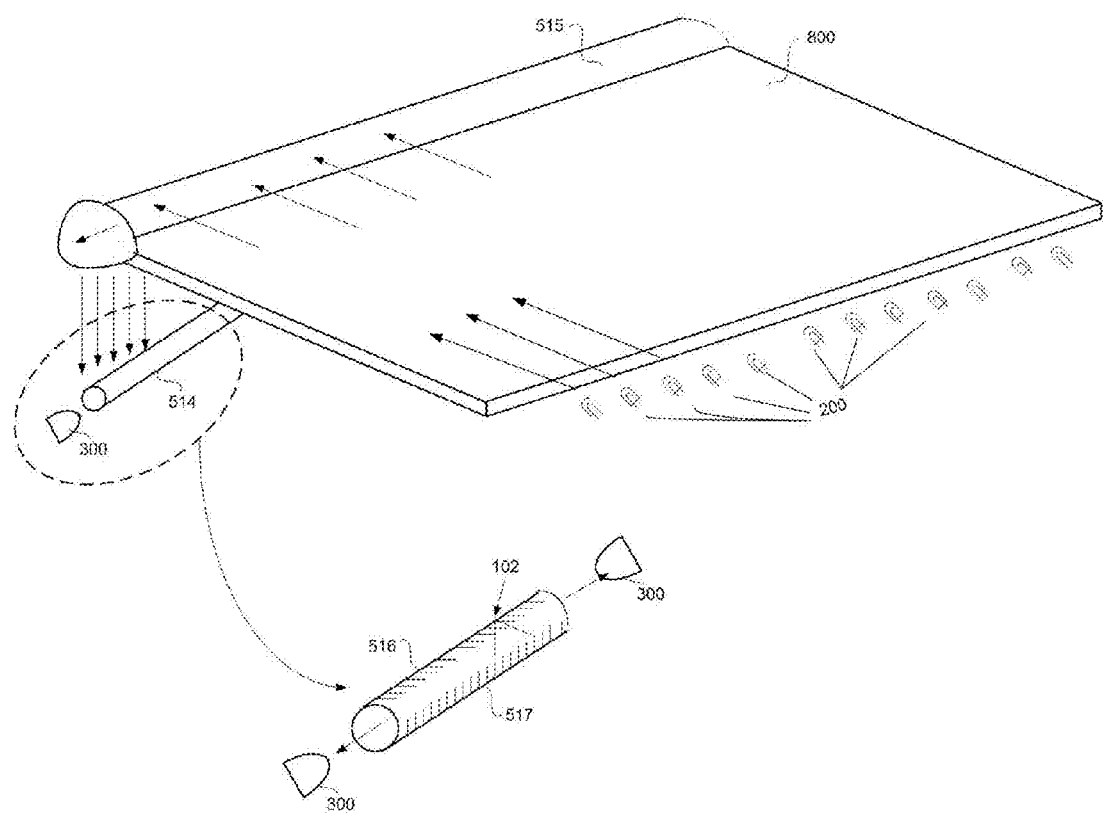
FIG. 128 is an illustration of a touch screen having an array of light emitters along a first edge of the screen for directing light beams over the screen, and having a long thin light guide for receiving the directed light beams and for further directing them to light receivers situated at both ends of the light guide, in accordance with an embodiment of the present invention.

Reference is made to FIG. 128, which is an illustration of a touch screen having an array of light emitters 200 along a first edge of the screen for directing light beams over the screen, and having a long thin light guide 514 for receiving the directed light beams and for further directing them to light receivers 300 situated at both ends of light guide 514, in accordance with an embodiment of the present invention. Detected light values at receiver 300 are communicated to a calculating unit (not shown). According to another embodiment of the present invention, only one light receiver 300 is coupled to one end of light guide 514. Light guide 514 is positioned along one edge of a touch screen 800. A plurality of emitters is situated along the opposite edge of the touch screen, to enable receiver(s) 300 to detect a touch based on serial activation of multiple emitters, as described hereinabove with reference to configuration nos. 2 and 3. Light emitted across the screen surface is re-directed by a reflector 515. Light is received into light guide 514 along the screen edge and is directed through the length of light guide 514 onto a receiver 300.

Figure 129:
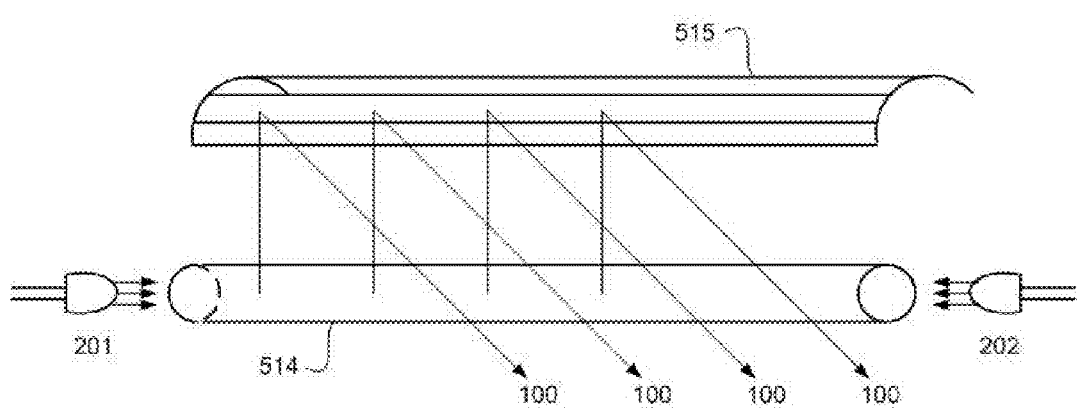
FIG. 129 is an illustration of two light emitters, each emitter coupled to each end of a long thin light guide, in accordance with an embodiment of the present invention.

Reference is made to FIG. 129, which is an illustration of two light emitters, 201 and 202, each emitter coupled to an end of a long thin light guide 514, in accordance with an embodiment of the present invention. Light guide 514 is positioned along one edge of a touch screen. Light 100 is emitted into light guide 514 along a screen edge, and is re-directed across the screen surface by a reflector 515. A plurality of receivers is situated along the opposite edge of the touch screen, to enable multiple receivers to detect a touch, as described hereinabove with reference to configuration nos. 2 and 3. Each emitter 201 and 202 is activated separately, and the receivers thus detect a touch based on blocked light from each of the two emitters. The amount of light 100 emitted at any given location along the length of the light guide decreases as a function of the distance between the location and the emitter. As such, different amounts of detected light from each emitter 201 and 202 are used to calculate the precise location of a touch, as described hereinabove with reference to configuration nos. 2 and 3.

Embodiments of the present invention improve upon the light guide of U.S. Pat. No. 7,333,095, by etching or otherwise forming micro patterns 516 on the outer surface of the light guide, in order to widely refract outgoing light beams 101 of FIG. 127, or incoming light beams 102 of FIG. 106, as described hereinabove with reference to configuration nos. 2 and 3. Micro patterns 516 are a uniform substantially parallel pattern of grooves along light guide 514, and are simpler to form than the fan pattern described hereinabove with reference to configuration no. 2. Light guide 514 also includes a light scatterer strip 517 inside of light guide 514. Micro patterns 516 and light scatterer strip 517 appear in FIGS. 127 and 128.

Touch Screen System Configuration No. 10

Configuration no. 10 enables detecting pressure on a touch screen, as applied during a touch operation. Detecting pressure enables discrimination between a light touch and a hard press, and is useful for user interfaces that associate separate actions to a touch and a press. E.g., a user may select a button or icon by touching it, and activate the function associated with the button or icon by pressing on it. Such a user interface is described in applicants' co-pending U.S. application Ser. No. 12/486,033, entitled USER INTERFACE FOR MOBILE COMPUTER UNIT.

In some embodiments of the present invention, a touch enabled device includes a base plane, such as a PCB, a light guide frame rigidly mounted on the base plane, and a resilient member attached to the base plane to suspend or "float" a non-rigidly mounted touch screen inside the light guide frame. A press on the touch screen deflects the floating touch screen along a z-axis, exposing more of the light guide frame. A light guide frame reflector, which directs light over the screen as described hereinabove, is formed so that the exposure allows more light to traverse the screen. In this way, when a hard press on the screen occurs, many of the receivers detect a sudden increase in detected light. Moreover, detection of a hard press may be conditioned upon a touch being detected at the same time, thus preventing false detection of a hard press due to a sudden increase in ambient light. When the downward pressure is released, the resilient member returns the screen to its original position within the light guide frame.

Figure 130:
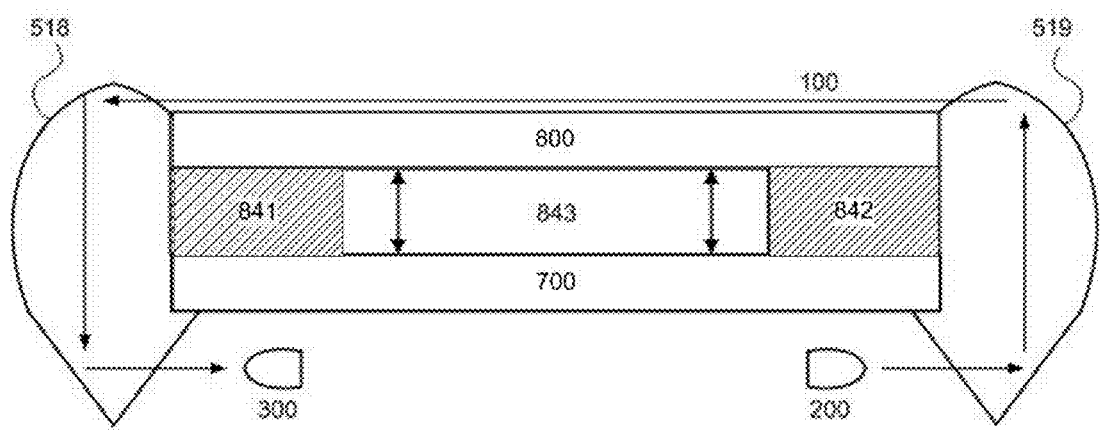
FIGS. 130-133 are illustrations of a touch screen that detects occurrence of a hard press, in accordance with an embodiment of the present invention.
Figure 131:
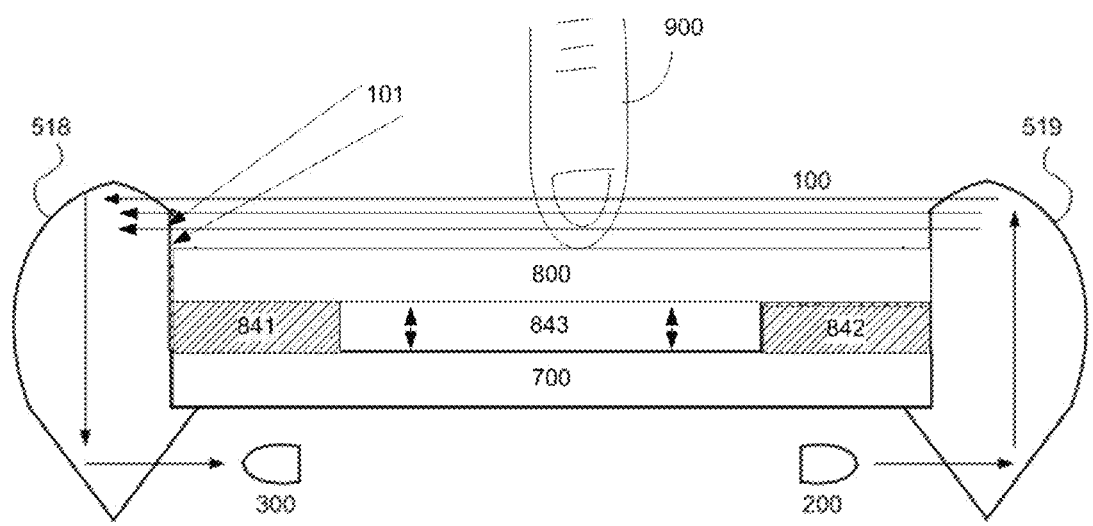

Reference is made to FIGS. 130-133, which are illustrations of a touch screen 800 that detects occurrence of a hard press, in accordance with an embodiment of the present invention. FIG. 130 shows touch screen 800 in rest position, screen 800 being supported by resilient supporting members 841 and 842 that create a flex air gap 843, which are mounted on a printed circuit board 700. FIG. 130 shows two light guides, 518 and 519, one on either side of screen 800, for directing light 100 from an emitter 200 over screen 800 to a receiver 300. Only a small upper portion of each light guide 518 and 519 extends above screen 800. Receiver 300 communicates detected light intensities to a calculating unit (not shown).

Figure 133:
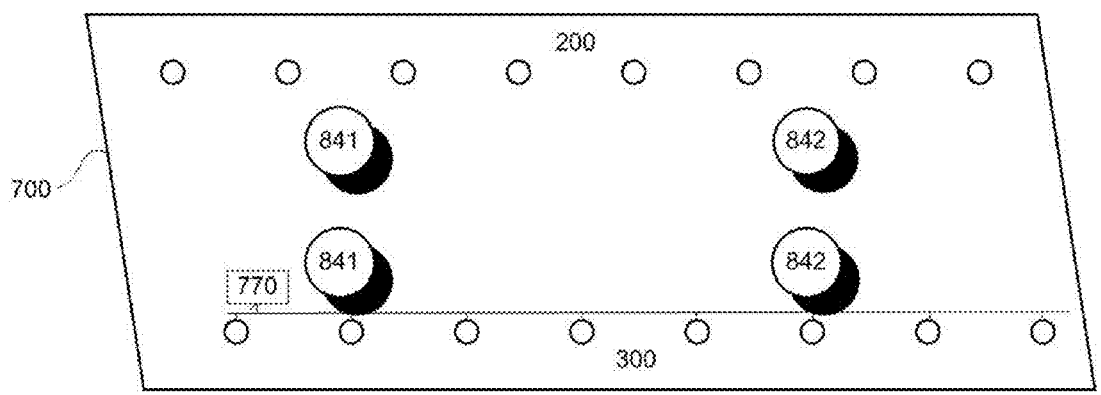

FIG. 133 shows a finger 900 pressing down on the screen, causing members 841 and 842 to compress and to narrow flex air gap 843. As a result, a larger portion of light guides 518 and 519 are exposed above screen 800, thus allowing (a) more light 100 from emitter 200 to traverse screen 800 and be detected by receiver 300, and (b) more ambient light 101 to reach receiver 300. In various embodiments, either or both of these increases in detected light are used to indicate a hard press. In other embodiments, the amount of downward pressure applied is determined based on the amount of additional detected light, thus enabling discrimination between more hard and less hard touches.

Figure 132:
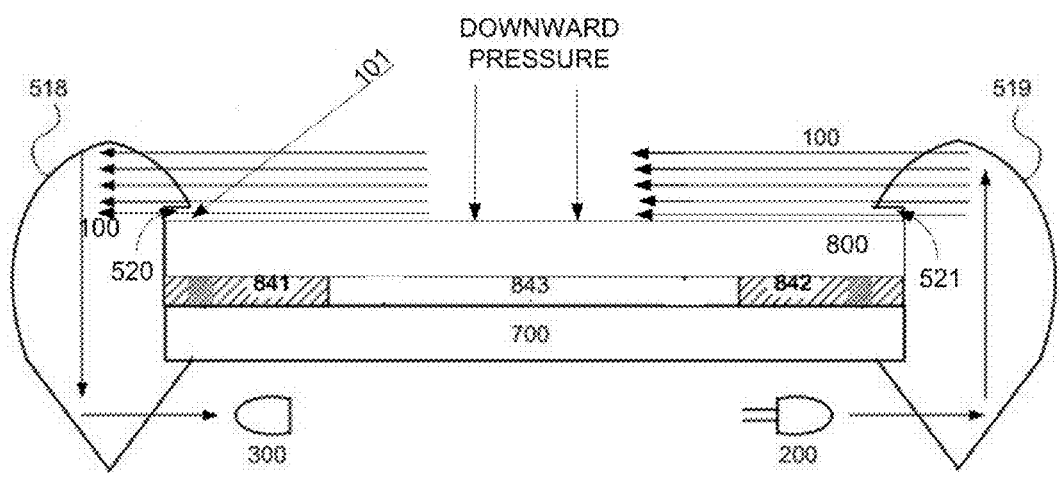

In some embodiments, the light guide frame includes protruding lips 520 and 521, shown in FIG. 132, that extend over the edges of screen 800, to counter balance the upward force of resilient members 841 and 842 when no downward pressure is applied to screen 800. Resilient members 841 and 842 may comprise inter alia a flexible mounting material, a torsion spring, an elastic polymer body, or a hydraulic suspension system. FIG. 133 shows emitters 200, receivers 300 coupled with calculating unit 770, and resilient members 841 and 842 arranged on a single PCB 700.

In other embodiments, the touch screen is not displaceable relative to the frame. However, the screen flexes or bends somewhat in response to a hard press. The bending of the screen causes a sudden increase in detected light in many of the receivers, indicating a hard press on the screen. As indicated hereinabove, detection of a hard press may be conditioned upon a touch also being detected at the same time, thus preventing false detection of a hard press in response to trauma to the device.

Figure 134:
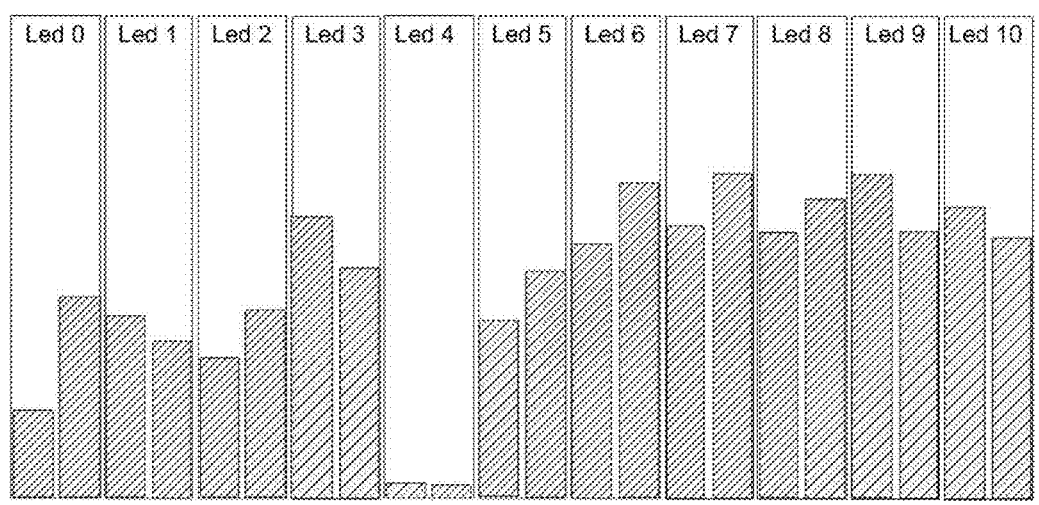
FIGS. 134 and 135 are bar charts showing increase in light detected, when pressure is applied to a rigidly mounted 7-inch LCD screen, in accordance with an embodiment of the present invention.
Figure 135:
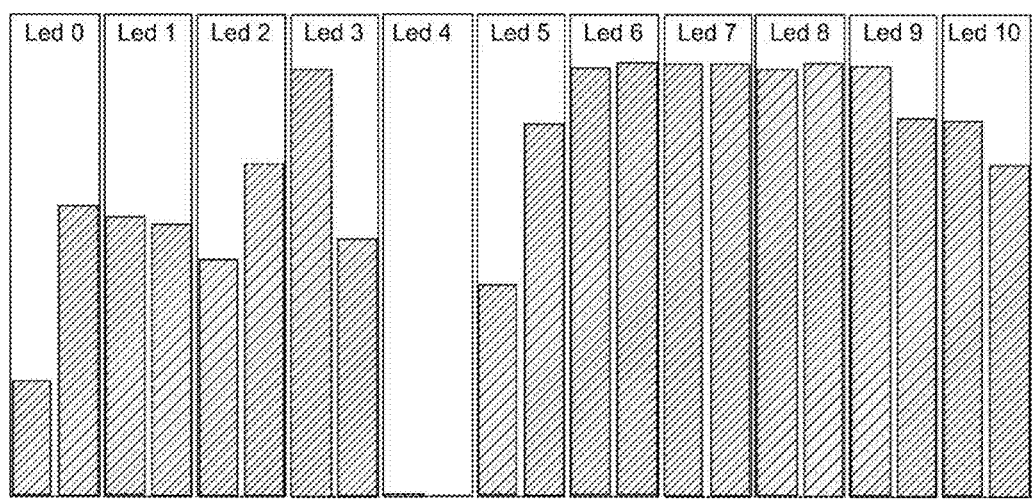

Reference is made to FIGS. 134 and 135, which are bar charts showing increase in light detected, when pressure is applied to a rigidly mounted 7-inch LCD screen, in accordance with an embodiment of the present invention. The bar charts show the amount of light detected from each emitter along one edge of the screen when a soft touch occurs (FIG. 134), and when a hard touch occurs (FIG. 135). The light emitters and light receivers are shift-aligned, so that light from each emitter is detected by two receivers. As such, two bars are shown for each emitter, indicating the light detected by each of the two receivers. Both bars indicate that a touch is detected at receivers opposite LED 4, where no light is detected. The bar charts show that more light is detected from neighboring emitters in the case of a hard touch, than in the case of a soft touch.

Operation of Configurations Nos. 2 and 3

The following discussion relates to methods of operation for arrangements of the optical elements shown in configurations nos. 2 and 3, around a touch screen, used in conjunction with the cover glass described above with reference to configurations nos. 6 and 7, to achieve accurate touch detection based on total internal reflection. These methods are of advantage for pen and stylus support, which have fine touch points, and provide highly accurate touch location determination for single-finger and multi-finger touches as well.

Figure 136:
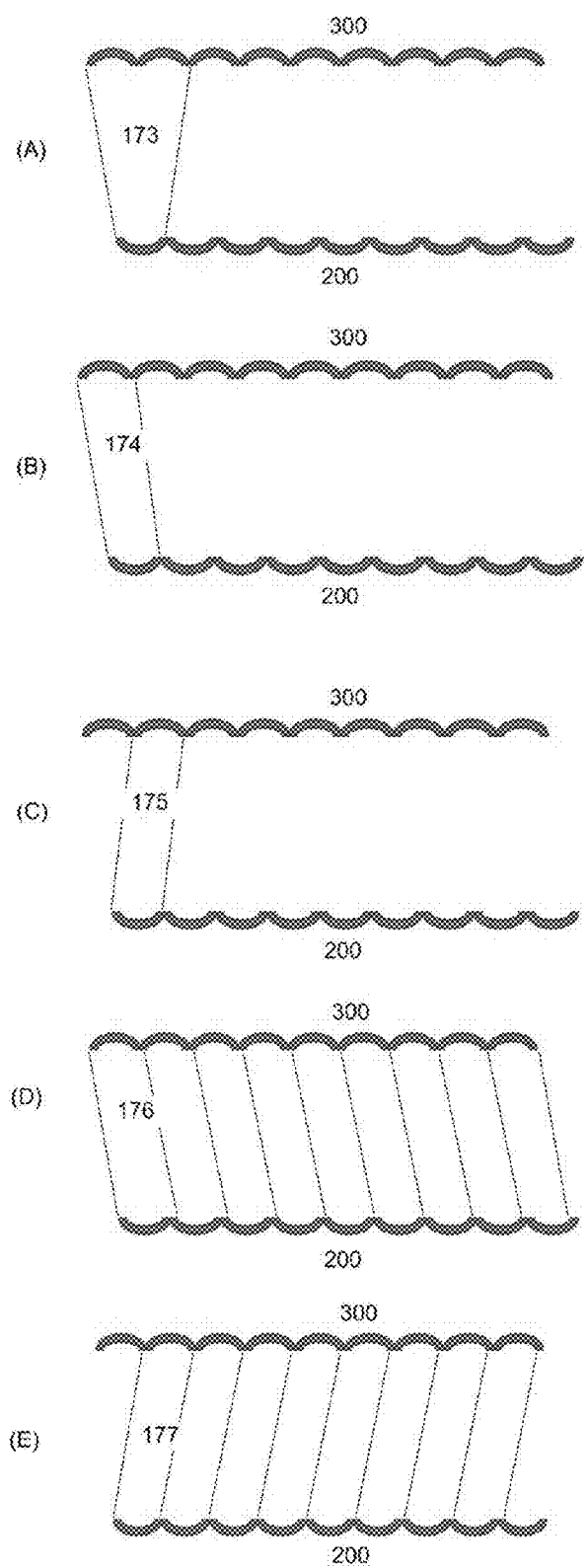
FIGS. 136 and 137 are illustrations of opposing rows of emitter and receiver lenses in a touch screen system, in accordance with an embodiment of the present invention.
Figure 137:
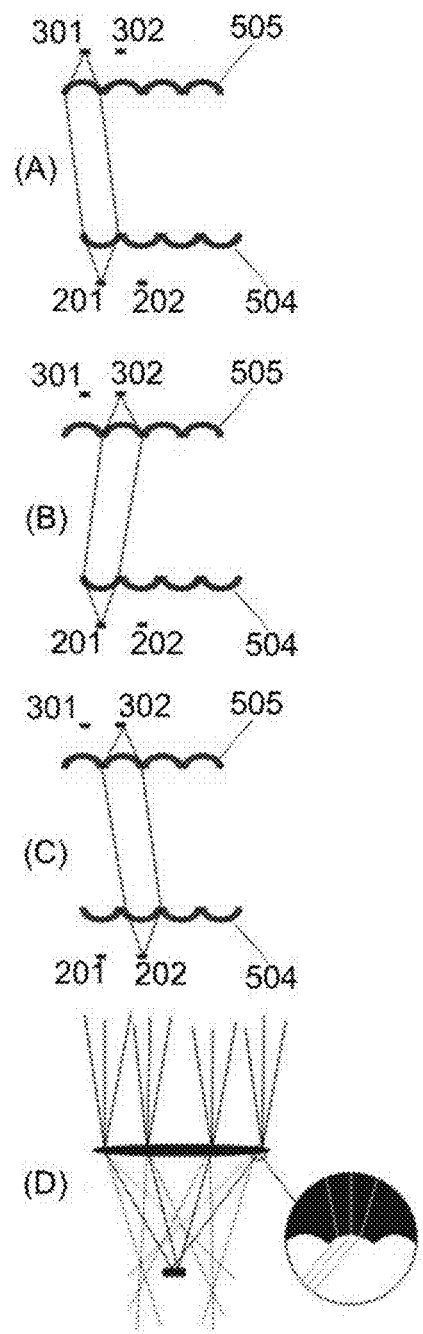
Figure 138:
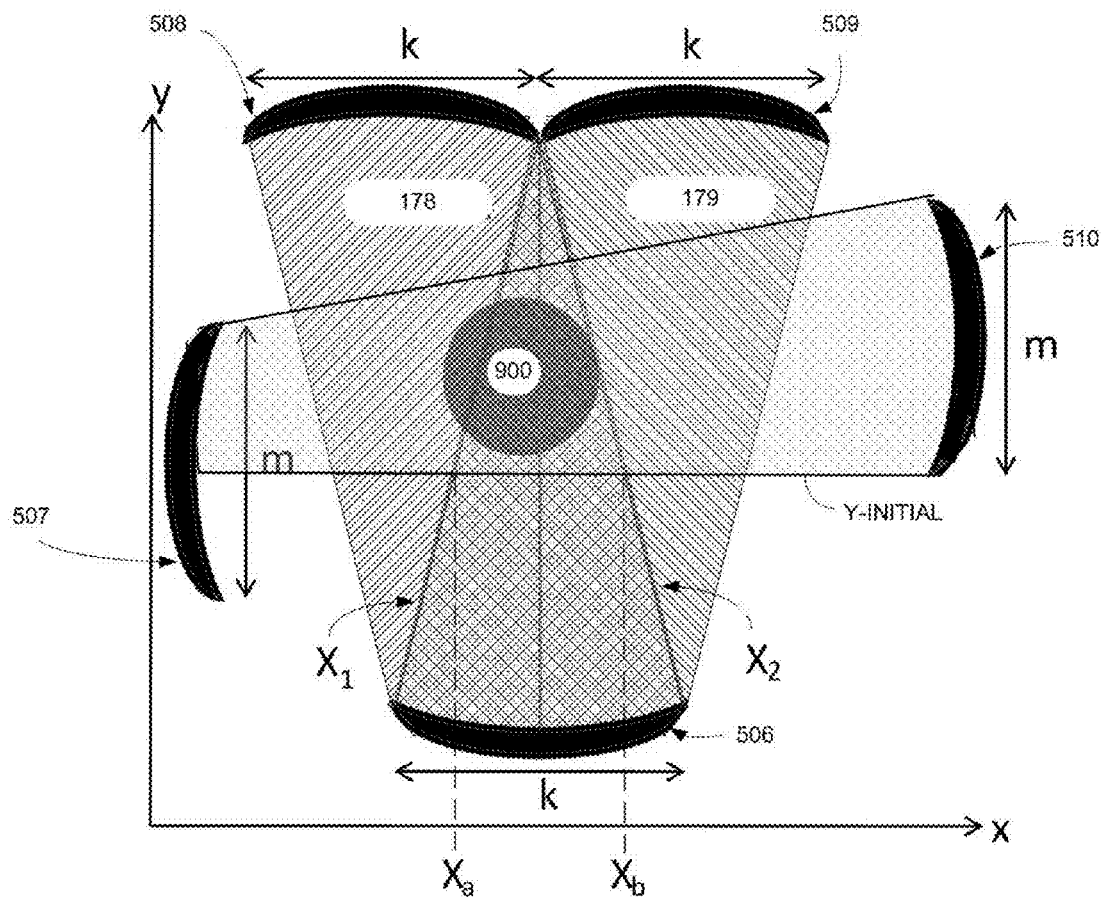
FIG. 138 is a simplified illustration of a technique for determining a touch location, by a plurality of emitter-receiver pairs in a touch screen system, in accordance with an embodiment of the present invention.

Reference is made to FIGS. 136 and 137, which are illustrations of opposing rows of emitter lenses and receiver lenses in a touch screen system, in accordance with an embodiment of the present invention. Positioned behind each emitter and receiver lens is a corresponding respective light emitter 200 or light receiver 300. As shown in FIG. 138, each emitter 200 is positioned opposite two receivers 300 that detect light beams emitted by the emitter. Similarly, each receiver 300 is positioned opposite two emitters 200, and receives light beams emitted from both emitters.

FIG. 136 shows (A) a single, full beam 173 from an emitter 200 that spans two receivers 300; (B) the portion of the full beam, designated 174, detected by the left one of the two receivers 300; (C) the portion of the full beam, designated 175, detected by the right one of the two receivers 300; (D) multiple beams 176, for multiple emitters 200, covering the touch screen, and (E) multiple beams 177, for multiple emitters 200, covering the touch screen. Generally, each emitter 200 is activated alone. Precision touch detection is described hereinbelow, wherein a touch point is detected by multiple beams. It will be appreciated from (D) and (E) that points on the screen are detected by at least one beam 176 and one beam 177.

To conserve power, when the touch screen is idle only one set of beams, namely, beams 176 or beams 177, are scanned in a scanning sweep, and only for the axis with the smallest number of emitters 200. The scanning toggles between beams 176 and beams 177, and thus two scanning sweeps along the axis activate every emitter-receiver pair along the axis. The other axis, with the larger number of emitters, is only scanned when either a touch is present, or when a signal differs from its reference value by more than an expected noise level, or when an update of reference values for either axis is being performed. Reference values are described in detail hereinbelow.

FIG. 137 shows (A) an emitter 201 sending light to a receiver 301 at an angle of 15° to the left; (B) emitter 201 sending light to a receiver 302 at an angle of 15° to the right; (C) emitter 202 sending light to receiver 302 at an angle of 15° to the left; and (D) a microstructure refracting incoming light. The emitter lenses and receiver lenses shown in FIG. 137 are equipped with the microstructure shown in (D), in order (i) to emit light in both left and right directions from multiple locations along the emitter lens surface, and (ii) to ensure that light received at any angle of incidence at any location along the receiver lens surface is detected by the receiver.

Reference is made to FIG. 138, which is a simplified illustration of a technique for detecting a touch location, by a plurality of emitter-receiver pairs in a touch screen system, in accordance with an embodiment of the present invention. Shown in FIG. 138 is an optical emitter lens 506 of width k, positioned opposite two optical receiver lenses 508 and 509, each of width k, on a touch screen. A pointer, 900, touching the screen blocks a portion of the light beam emitted from optical emitter lens 506. Optical emitter lens 506 emits overlapping beams that cover both optical receiver lenses 508 and 509. The spread angle of the wide beam depends on the screen dimensions, and on the lens width, k, along the x-axis. Another optical emitter lens 507 is also shown, shifted by half an element width, m, below an optical receiver lens 510.

In accordance with an embodiment of the present invention, at least one surface of optical emitter lens 506 is textured with a plurality of ridges. Each ridge spreads a beam of light that spans the two opposing receiver lenses 508 and 509. As such, light from each of many points along the surface of optical emitter lens 506 reaches both opposing receiver lenses 508 and 509, and the light beams detected by adjacent receivers overlap. In configuration no. 2 these ridges form a feather pattern, and in configuration no. 3 these ridges form a tubular pattern.

In accordance with an embodiment of the present invention, the ridges form micro-lenses, each having a pitch of roughly 0.2-0.5 mm, depending on the touch screen configuration. In the case of a feather pattern, the ridges form a fan, and their pitch narrows as the ridges progress inward and become closer together. In the case of a tubular pattern, the pitch of each micro-lens remains constant along the length of the micro-lens.

At least one surface of each receiver lens 508 and 509 is similarly textured, in order that at least a portion of light arriving at each of many points along the receiver lens surface, arrive at the receiver photo diode.

In accordance with an embodiment of the present invention, the output x and y coordinates are filtered temporally and spatially. The following discussion relates to determination of the x-coordinate, and it will be appreciated by those skilled in the art that the same method applies to determination of the y-coordinate.

Configurations nos. 2 and 3 show that a touch location is detected by at least two emitter-receiver pairs. FIG. 138 shows two such emitter-receiver pairs, 506-508 and 506-509, detecting a touch location of object 900 along the x-axis. In FIG. 138, beams 506-508 are denoted by beam 178, and beams 506-509 are denoted by beam 179. FIG. 138 shows three detection areas; namely, (i) the screen area detected by emitter-receiver pair 506-508, drawn as a wedge filled with right-sloping lines, (ii) the screen area detected by emitter-receiver 506-509, drawn as a wedge with left-sloping lines, and (iii) the screen area detected by both emitter-receiver pairs 506-508 and 506-509, drawn as a wedge with a crosshatch pattern. The left and right borders of this third screen area are shown as lines $X_1$ and $X_2$, respectively.

In order to determine the x-coordinate $X_p$ of object 900's touch location ($X_p$, $Y_p$), an initial y-coordinate, $Y_{initial}$, is determined corresponding to the location along the y-axis of the emitter-receiver pair having the maximum touch detection signal among all emitter-receiver pairs along the y-axis. In FIG. 138, this emitter-receive pair is 507-510. The lines designated $X_1$ and $X_2$ in FIG. 138 are then traversed until they intersect the line $y=Y_{initial}$ at locations ($X_a$, $Y_{initial}$) and ($X_b$, $Y_{initial}$). Coordinates $X_a$ and $X_b$ are shown in FIG. 138. The x-coordinate of object 900 is then determined using the weighted average $$X_p = (W_a X_a + W_b X_b)/(W_a + W_b), \qquad (2)$$

where the weights $W_a$ and $W_b$ are normalized signal differences for beam 178 and beam 179, respectively. The signal difference used is the difference between a baseline, or expected, light value and the actual detected light value. Such difference indicates that an object is touching the screen, blocking a portion of the expected light. The weights $W_a$ and $W_b$ are normalized because the detection signal of a touch occurring near the row of emitters is different from a touch occurring near the row of receivers, as described hereinbelow with reference to FIGS. 144-151. A touch screen design is tested to determine different signal strength and attenuation patterns as an object crosses a beam at various portions along the length of the beam. Different scenarios are tested, e.g., a scenario for objects near the beam's emitter, a scenario for objects near the beam's receiver, and a scenario for objects in the middle of the screen. When a touch is detected, the detection pattern of detecting receivers is analyzed to select an appropriate scenario, and the signals are normalized according to the selected scenario. Calibration and further normalization of the weights is described hereinbelow. A similar weighted average is used to determine the y-coordinate $Y_p$.

If the pointer 900 is detected by more than two emitter-receiver pairs, then the above weighted average is generalized to $$X_p = \Sigma(W_n X_n)/(\Sigma W_n), \quad (3)$$

where the weights $W_n$ are normalized signal differences, and the $X_n$ are weight positions.

In one embodiment of the present invention, where the pointer 900 is a small object, the largest signal difference is used in conjunction with the two closest signals to calculate the position. This compensates for the fact that the signal differences for small objects are small, and noise thus becomes a dominant error factor. Use of the two closest signals reduces error due to noise. In another embodiment of the present invention, only the two largest signal differences are used.

Figure 139:
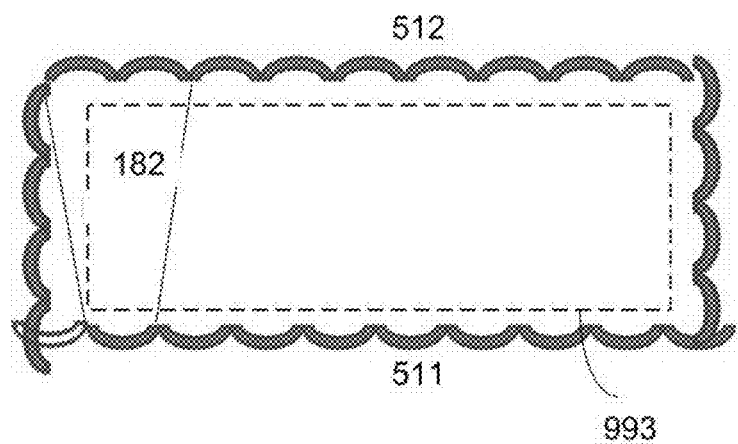
FIG. 139 is an illustration of a light guide frame for the configuration of FIGS. 136 and 137, in accordance with an embodiment of the present invention.

Reference is made to FIG. 139, which is an illustration of a light guide frame for the configuration of FIGS. 136 and 137, in accordance with an embodiment of the present invention. Shown in FIG. 139 are four edges of a light guide frame, with optical emitter lenses 511 and optical receiver lenses 512. It is noted that the inner edges of the frame are not completely covered by beams 182. As such, in some embodiments of the present invention only an inner touch area 993, indicated by the dashed rectangle, is used.

To reduce error due to signal noise, the final coordinate is determined as the output of a temporal filter, using the spatially filtered current coordinate value, determined as above, and a previous coordinate value. The higher the filter weight given to the current x-coordinate, the closer the output will be to that value, and the less will be the impact of the filter. Generally, use of substantially equal weights for both coordinate values results in a strong filter. In one embodiment of the present invention, the temporal filter is a low-pass filter, but other filters are also contemplated by the present invention. In accordance with an embodiment of the present invention, different pre-designated filter weight coefficients may be used in different cases. In an alternative embodiment, the filter weight coefficients are calculated as needed.

Choice of appropriate filter coefficients is based on scanning frequency, the speed at which a touch object is moving across the screen, whether the object motion is along a straight line or not, and the size of the touch object.

Generally, the higher the scanning frequency, the nearer the current coordinate value is to the previous coordinate value, and a stronger filter is used. Scanning frequency is used to estimate the speed and direction of movement of an object. Based on the scanning frequency, a threshold distance is assigned to two input values, the threshold indicating fast movement. If the difference between the current and previous coordinate values is greater than the threshold distance, a weaker filter is used so that the output coordinate not lag considerably behind the actual touch location. It has been found by experiment that the filter $$\text{output\_val} = 1/10 * \text{previous\_val} + 9/10 * \text{current\_val} \quad (4)$$

provides good results in this case. In addition, the lag value, described hereinbelow, is reset to equal the output value in this case.

If the difference between the current and previous coordinate values is less than the threshold distance, then a lag value is determined. The lag value indicates speed and direction along an axis. In has been found by experiment that the value $$\text{lag} = 5/6 * \text{lag} + 1/6 * \text{current\_val} \quad (5)$$

provides good results in this case. The filter weight coefficients are selected based on the difference between the lag value and the current coordinate value. Generally, the greater this difference, which indicates either fast motion or sudden change in direction, the weaker the filter.

For example, if the touch object is stationary, the lag value eventually is approximately equal to the current coordinate value. In such case, signal noise may cause small differences in the spatially calculated touch position, which in turn may cause a disturbing jitter effect; i.e., the touch screen would show the object jittering. Use of a strong temporal filter substantially dampens such jittering.

If the touch object is moving fast or makes a sudden change in direction, a strong temporal filter may create a perceptible lag between the actual touch location and the displayed touch location. In the case of a person writing with a stylus, the written line may lag behind the stylus. In such cases, use of a weak temporal filter reduces such lagging.

When the touch object covers a relatively large screen area, such as a finger or other blunt object touching the screen, the lag between the actual finger motion and the displayed trace of the motion is less perceptible, because the finger covers the area of the lag. In such case, a different temporal filter is used.

The type of object, finger vs. stylus, being used may be inferred by knowing expected user behavior; e.g., a user interface intended for finger touch assumes a finger being used. The type of object may also be inferred by the shadowed area created by the object. The size of the touch area as determined based on shadowed emitter signals, is therefore also a factor used in selecting temporal filter weight coefficients.

Figure 140:
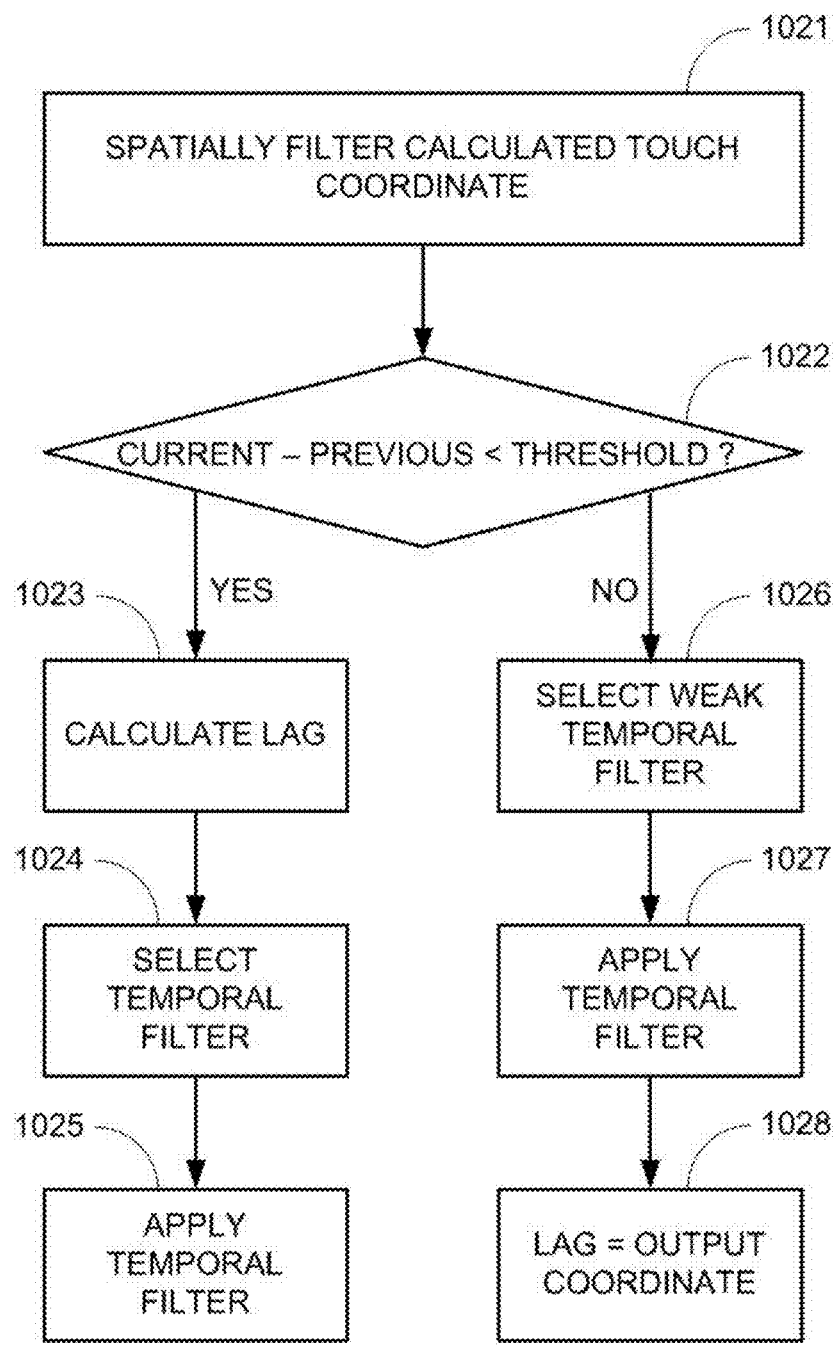

Reference is made to FIG. 140, which is a simplified flowchart of a method for touch detection for a light-based touch screen, in accordance with an embodiment of the present invention. At operation 1021, a current coordinate value is received, based on a spatial filter that processes signals from multiple emitter-receiver pairs. A threshold distance is provided, based on a scan frequency. At operation 1022, the difference between the current coordinate value and a previous coordinate value is compared to the threshold distance. If the difference is less than or equal to the threshold distance, then at operation 1023 a new lag value is calculated, as in EQ. (5). At operation 1024 temporal filter weight coefficients are determined based on the difference between the current coordinate value and the lag value. At operation 1025, the temporal filter is applied to calculate an output coordinate value, as in EQ. (4).

If, at operation 1022, the difference between the current coordinate value and previous coordinate value is greater than the threshold distance, then weak filter weight coefficients are selected at operation 1026. At operation 1027, the temporal filter is applied to calculate an output coordinate value, as in EQ. (4). At operation 1028 the lag value is set to the output coordinate value.

Figure 141:
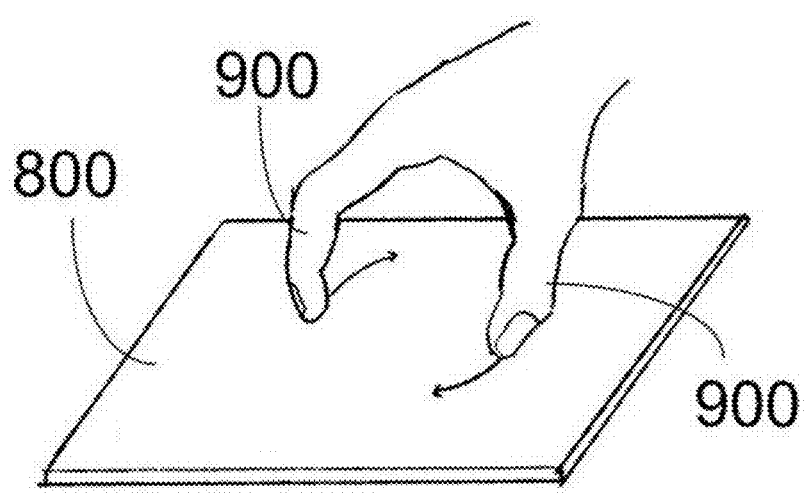

Embodiments of the present invention provide a method and apparatus for detecting a mufti-touch operation whereby two touches occur simultaneously at two corners of a touch screen. An example of such a mufti-touch is a rotation gesture, shown in FIGS. 141-143, whereby a user places two fingers 900 on a screen 800 and turns them around an axis. As pointed out hereinabove with reference to FIGS. 15 and 16, it is difficult for a light-based system to discriminate between a top-left & bottom-right touch vs. a bottom-left & top-right touch. Use of shift-aligned emitters and receivers enables such discrimination, as described hereinbelow.

Figure 144:
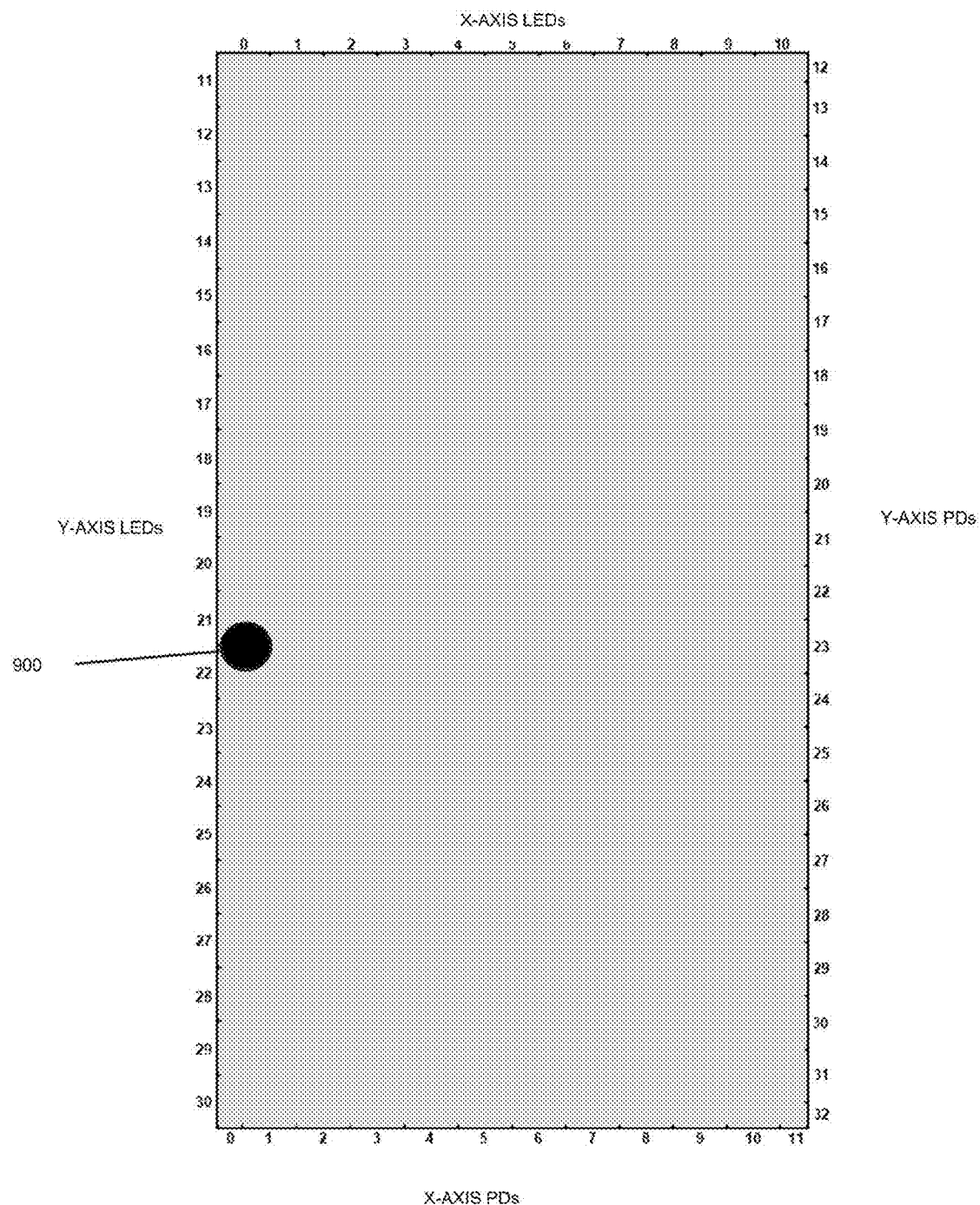
Figure 145:
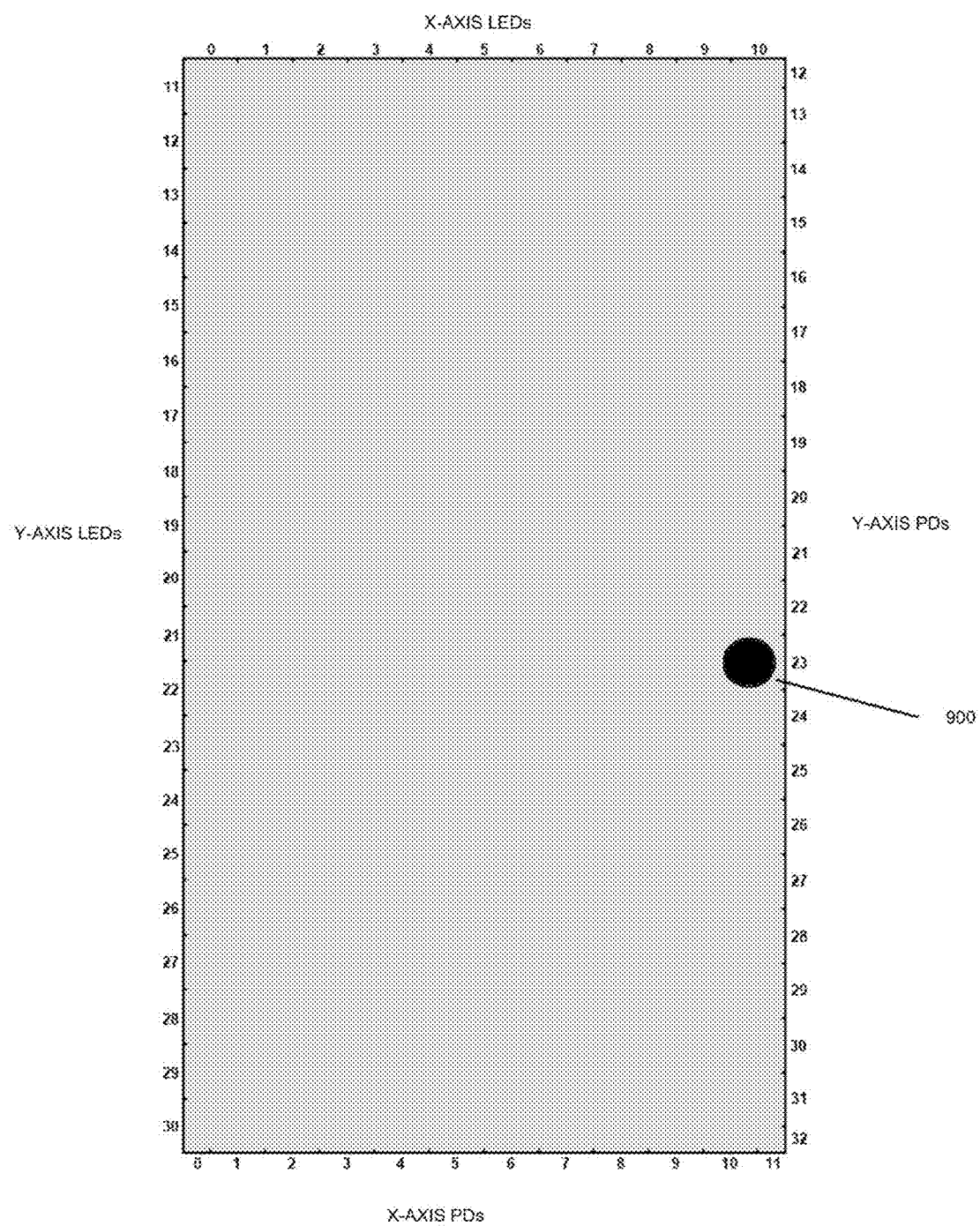
Figure 146:
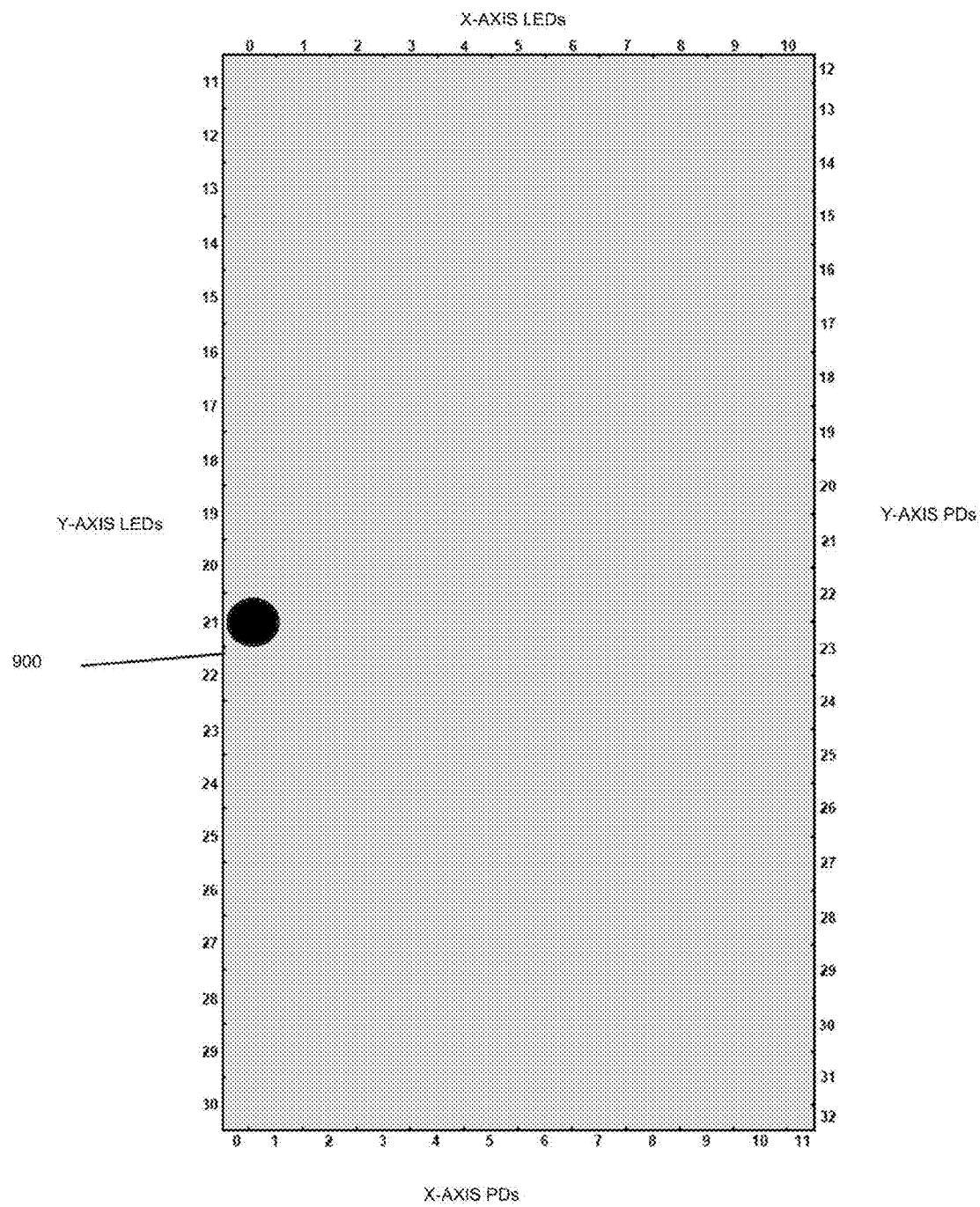
Figure 147:
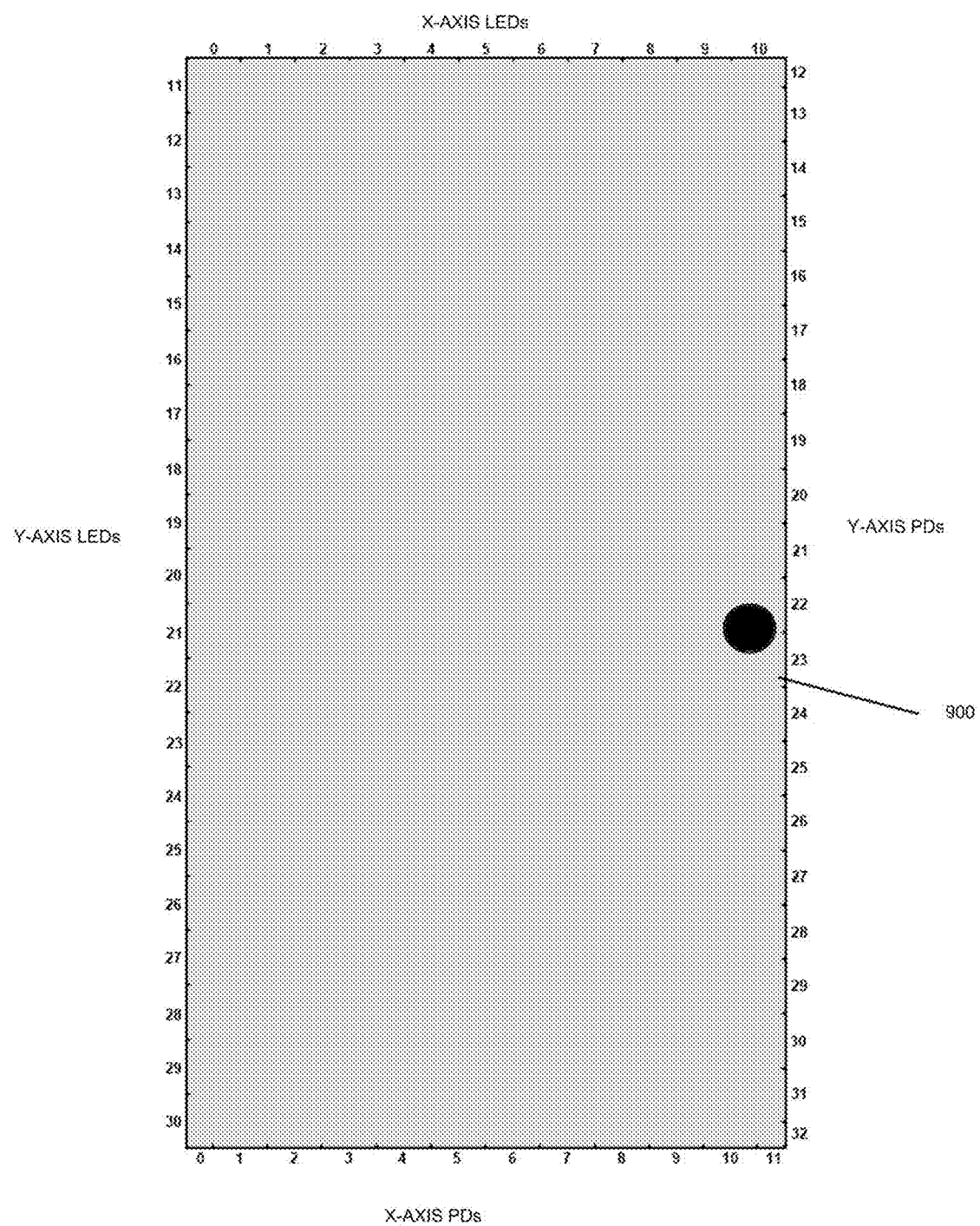

In accordance with an embodiment of the present invention, data from receivers along a first axis is used to determine a touch location along two axes. Reference is made to FIGS. 144-147 which are illustrations of a finger 900 touch event at various locations on a touch screen, and corresponding FIGS. 148-151, which are respective bar charts of light saturation during the touch events, in accordance with an embodiment of the present invention. FIG. 144 shows a touch located near a row of emitters, between two emitters. FIG. 145 shows a touch located near a row of receivers, blocking a receiver. FIG. 146 shows a touch located near a row of emitters, blocking an emitter. FIG. 147 shows a touch located near a row of receivers, between two receivers.

FIGS. 148-151 each include two bar charts; namely, an upper chart showing light saturation at receivers along an x-axis, and a lower chart showing light saturation at receivers along a y-axis. Each row of receivers is shift-aligned with an opposite row of emitters. As such, each emitter is detected by two receivers. Correspondingly, FIGS. 148-151 show two bars for each emitter, one bar per receiver.

Figure 148:
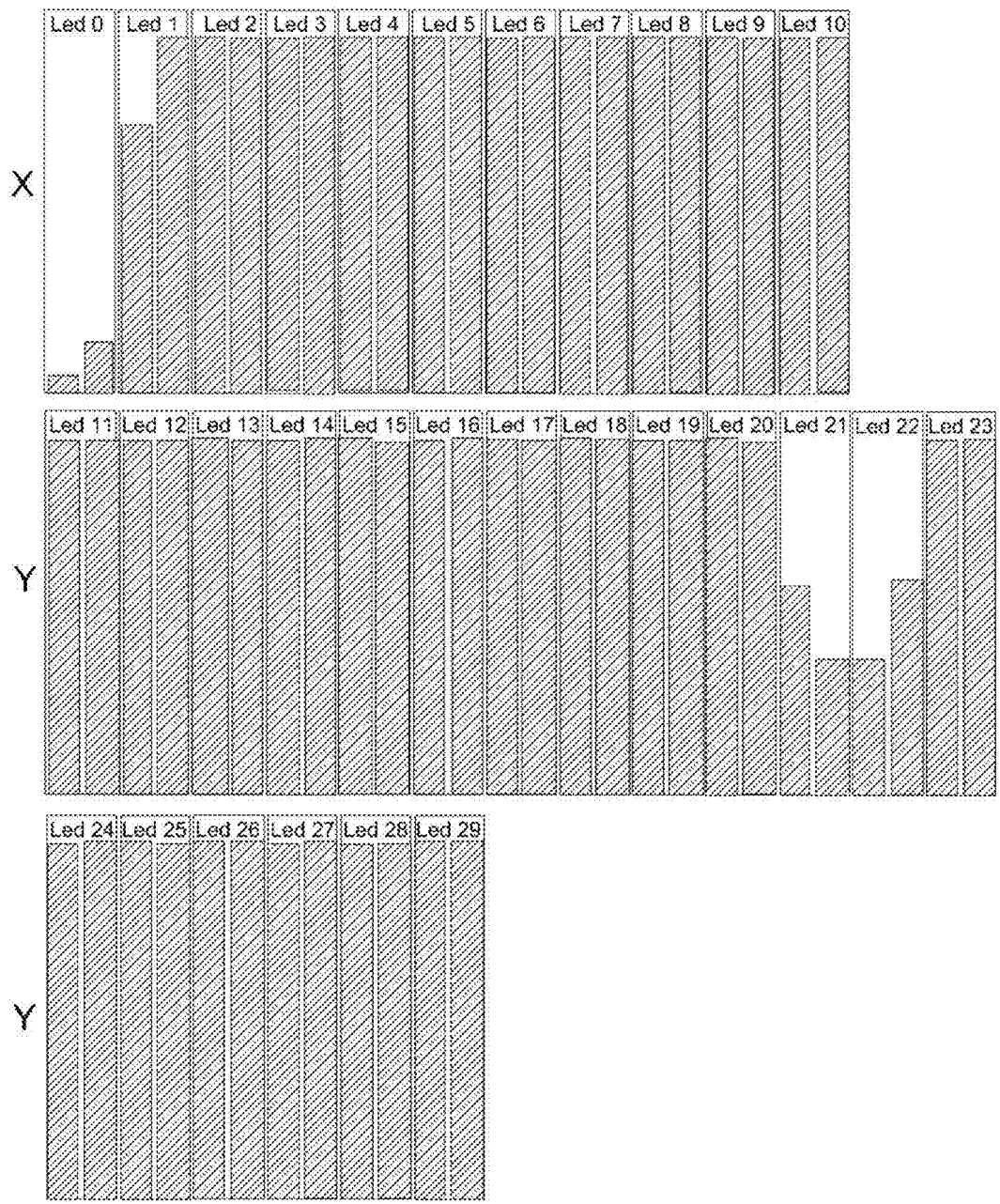
Figure 149:
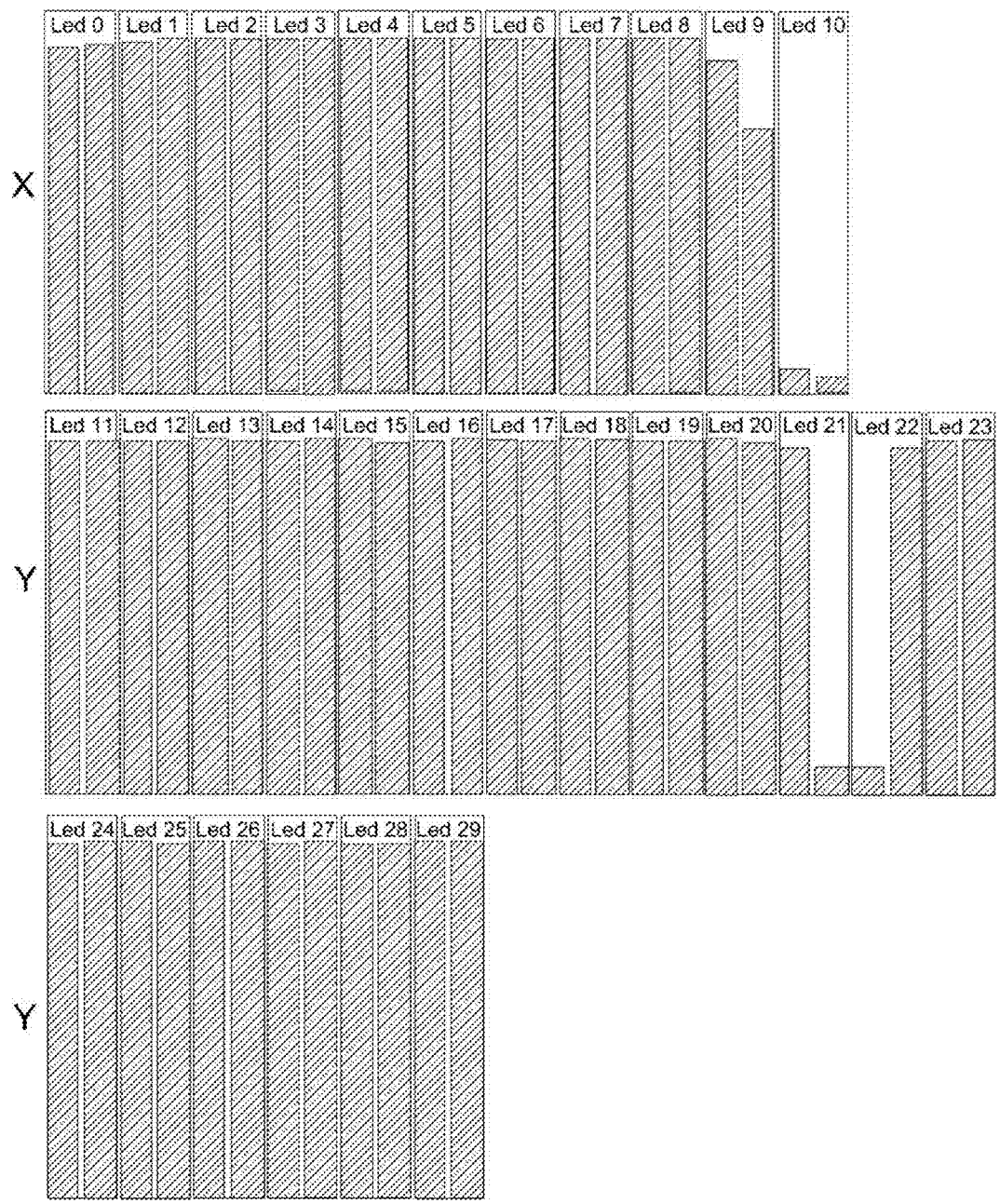
Figure 150:
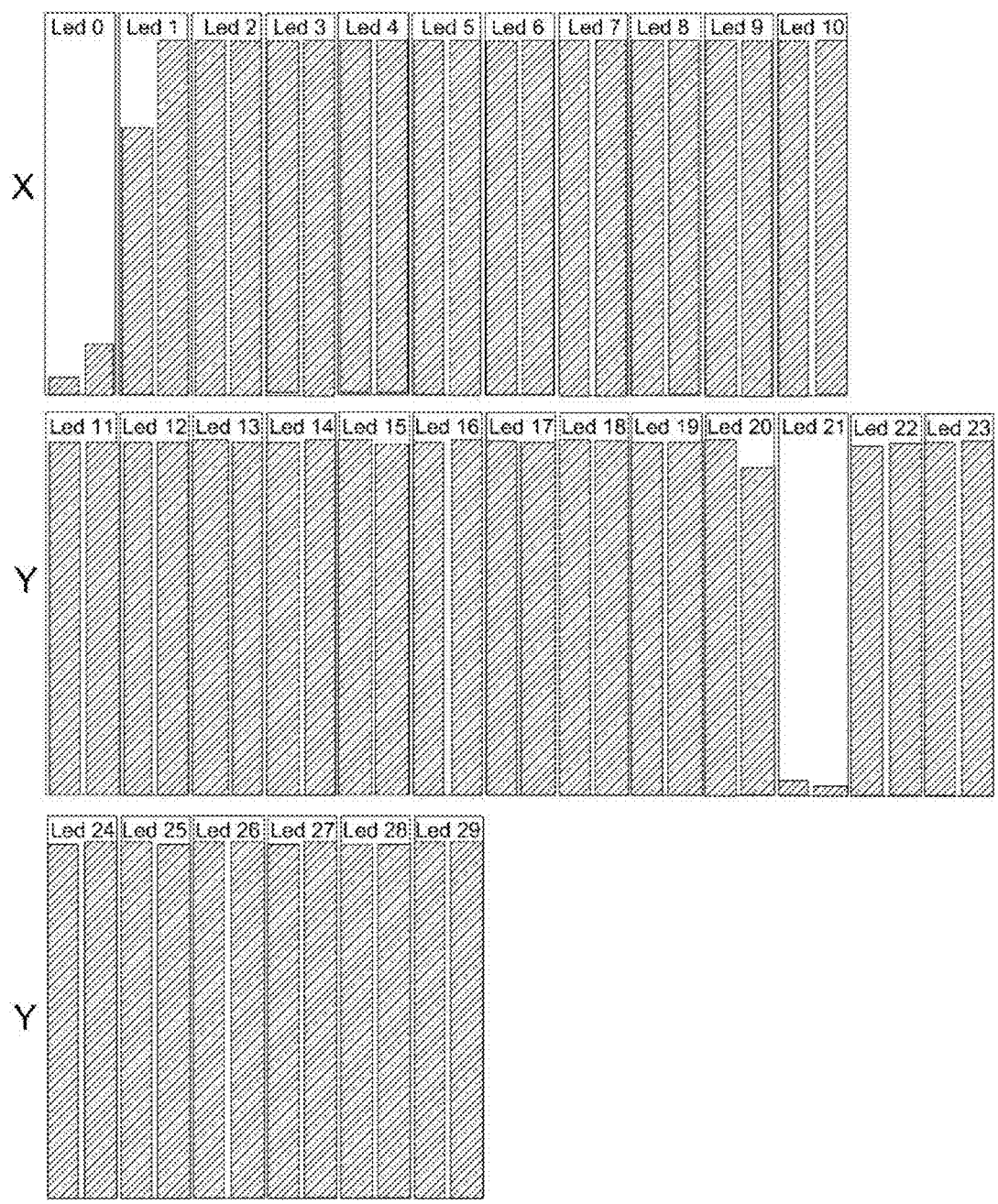
Figure 151:
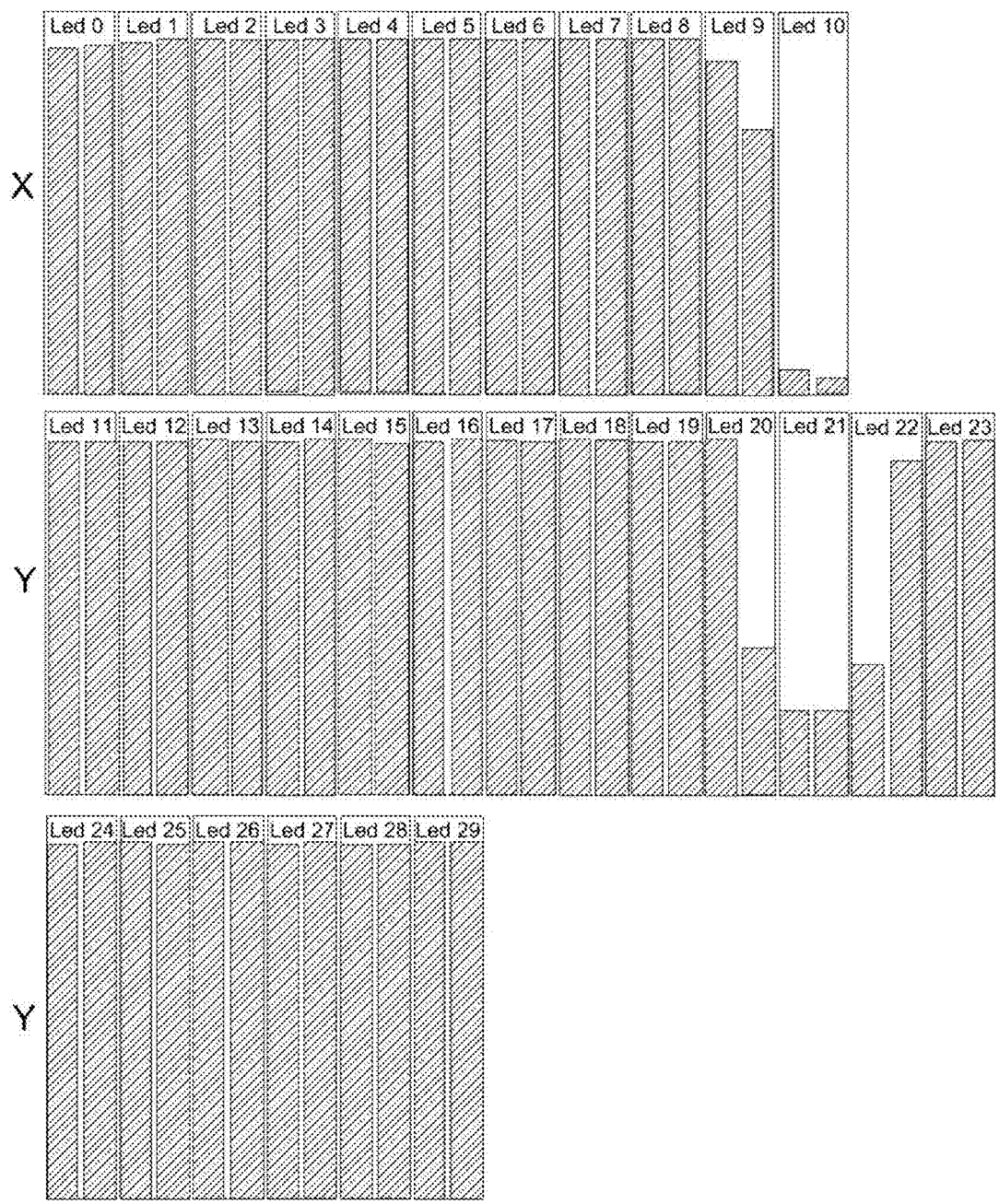

FIGS. 148-151 exhibit four distinct detection patterns. FIG. 148 shows an absence of light detected primarily by one receiver from its two respective emitters. The absence of light is moderate. FIG. 149 shows an absence of light detected primarily by one receiver from its two respective emitters. The absence of light is large. FIG. 150 shows two adjacent receivers detecting a large absence of expected light from the blocked emitter. Both receivers detect some light from neighboring elements. FIG. 151 shows two adjacent receivers detecting a moderate absence of expected light from the blocked emitter. Both receivers detect some light from neighboring emitters. TABLE III summarizes these different patterns.

TABLE III

Patterns of touch detection based on proximity to and alignment with emitters and receivers

Figure 142:
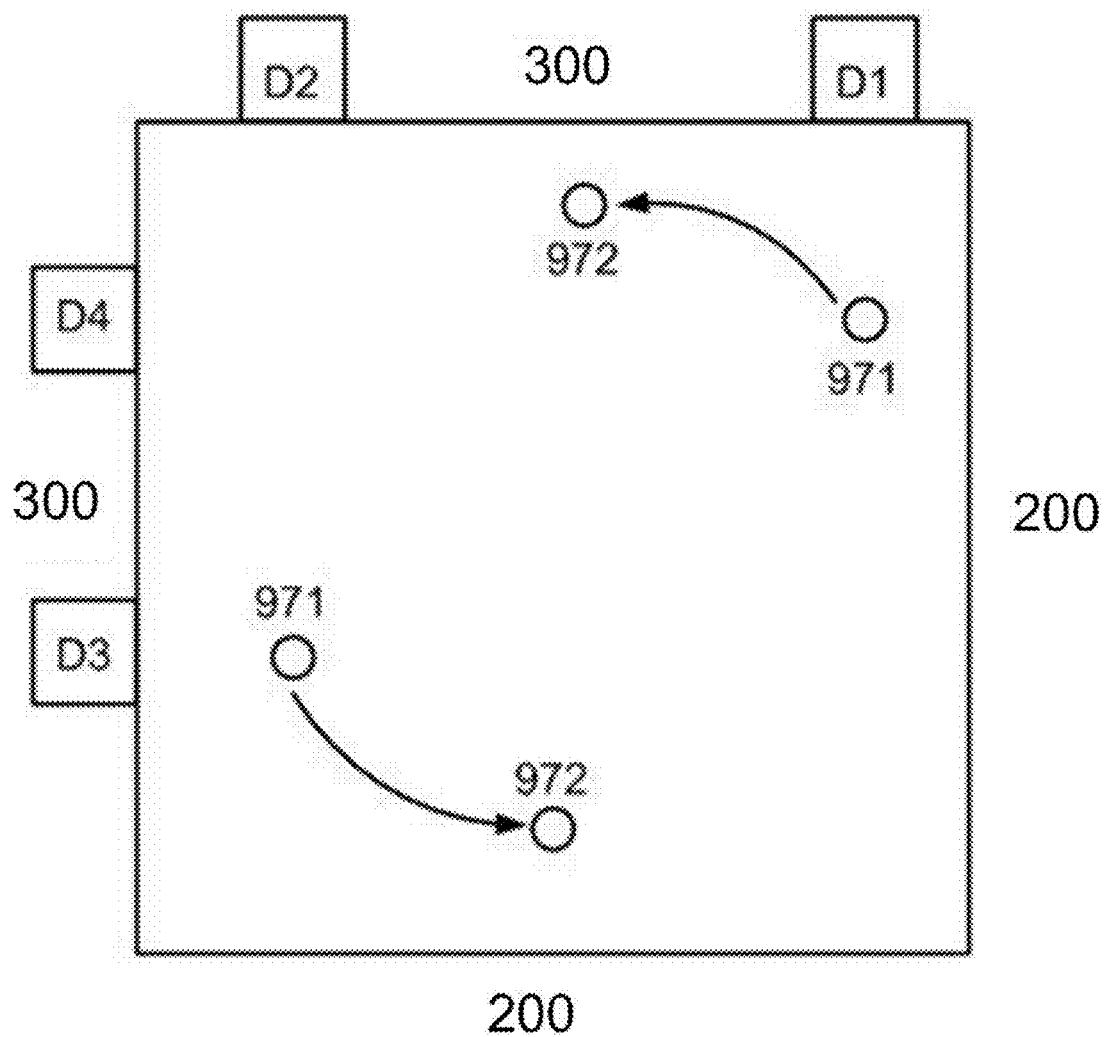
Figure 143:
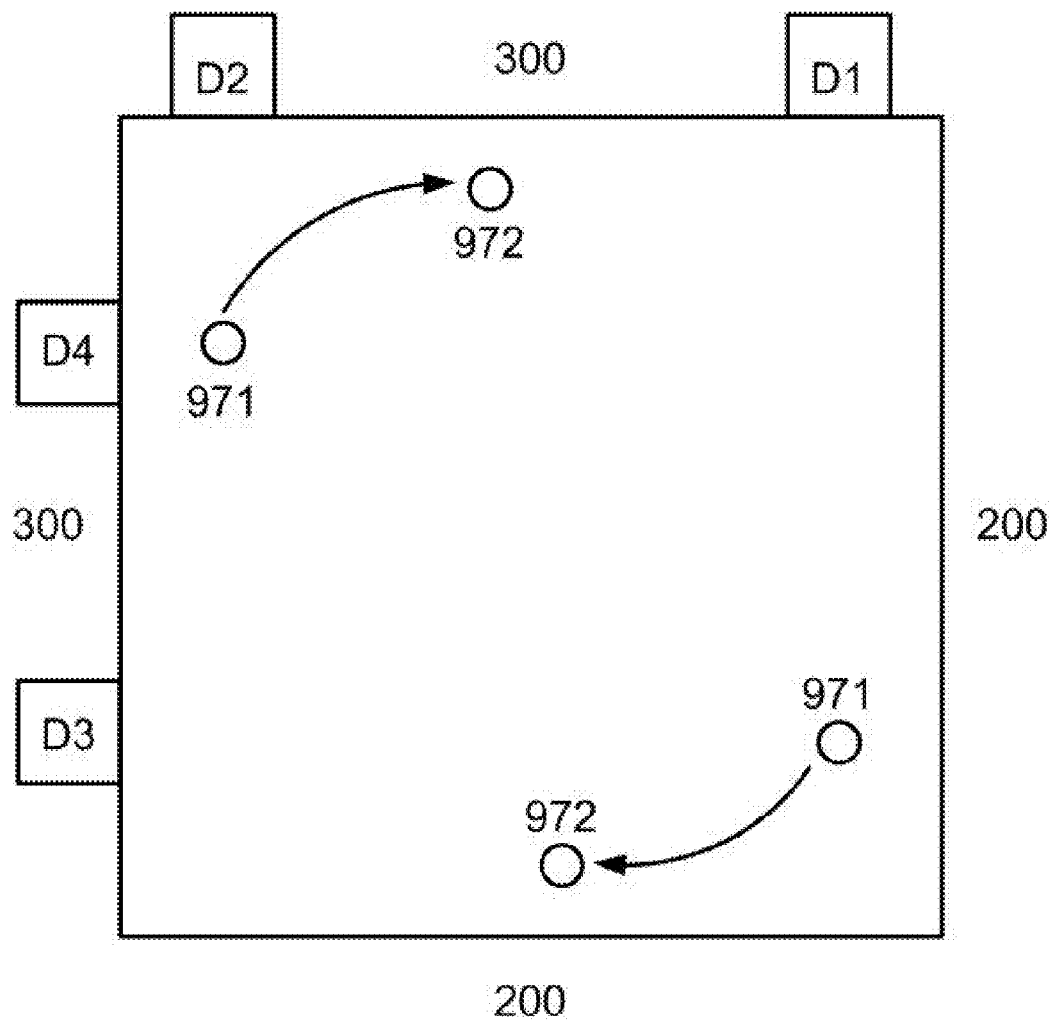

| Pattern No. FIGS. | Touch Location | No. of Receivers Detecting the Touch | Amount of Expected Light that is Blocked |
|---|---|---|---|
| 1 FIG. 142 FIG. 145 | Near a row of emitters, between two emitters | 1 | Moderate |
| 2 FIG. 143 FIG. 147 | Near a row of receivers, blocking a receiver | 1 | Large |
| 3 FIG. 144 FIG. 148 | Near a row of emitters, blocking an emitter | 2 | Large |
| 4 FIG. 145 FIG. 149 | Near a row of receivers, between two receivers | 2 | Moderate |

According to an embodiment of the present invention, determination of location of a multi-touch is based on the patterns indicated in TABLE III. Thus, referring back to FIG. 142, four detection points are shown along two rows of receivers. Detections D1-D4 detect touch points 971 in upper-right & lower-left corners of the screen. Based on whether the detection pattern of each point is of type 1 or 3, or of type 2 or 4, the detection patterns determine whether the corresponding touch is closer to the emitters, or closer to the receivers. Each touch has two independent indicators; namely, the X-axis detectors, and the Y-axis detectors. Thus, for detection points 971 in FIG. 142, detections D1 and D3 are of types 2 or 4, and detections D2 and D4 are of types 1 or 3. In distinction, for detection points 971 in FIG. 142, detections D2 and D4 are of types 2 or 4, and detections D1 and D3 are of types 1 or 3.

In addition to evaluation of detection points independently, the various detection patterns may be ranked, to determine which touch point is closer to the emitters or to the receivers.

Moreover, when a rotate gesture is performed, from touch points 971 to touch points 972, movement of detections discriminates whether the gesture glides away from the emitters and toward the receivers, or vice versa. In particular, subsequent detections are compared, and discrimination is based on whether each detection pattern is becoming more like type 1 or 3, or more like type 2 or 4.

Figure 152:
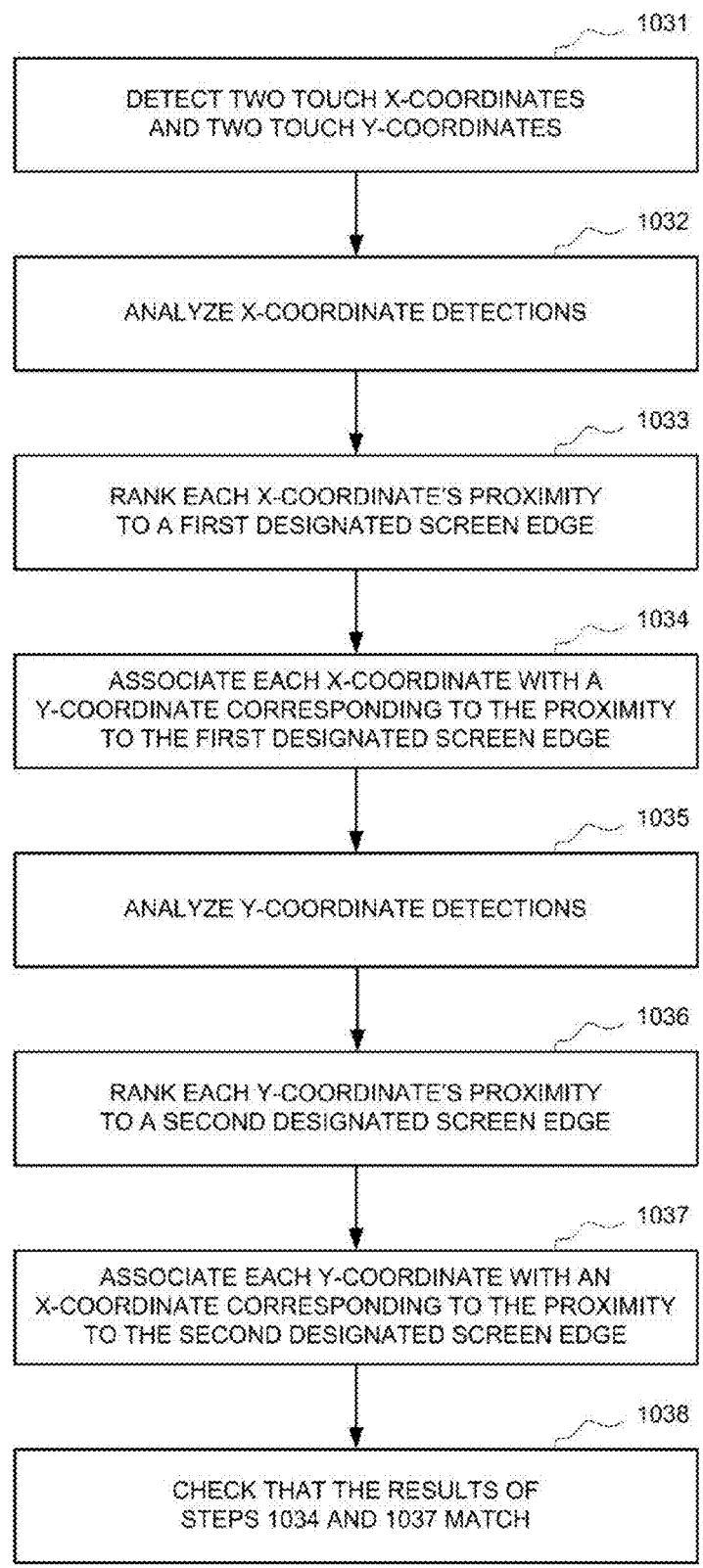

Reference is made to FIG. 152, which is a simplified flowchart of a method for determining the locations of simultaneous, diagonally opposed touches, in accordance with an embodiment of the present invention. At operation 1031, two x-coordinates and two y-coordinates are detected, such as x-coordinates D1 and D2, and y-coordinates D3 and D4, shown in FIGS. 142 and 143. At operation 1032 the detected x-coordinates are analyzed to identify a pattern of detection from among those listed in TABLE I. At operation 1033 the detected x-coordinates are ranked according to touches that occurred closer to or farther from a designated screen edge, based on the pattern detected at operation 1032 and based on the "Touch Location" column of TABLE III. The y-coordinates represent distances from the designated edge. At operation 1034, each ranked x-coordinate is paired with a corresponding y-coordinate. Operations 1035-1037 are performed for the y-coordinates, similar to operations 1032-1034 performed for the x-coordinates. At operation 1038, the two sets of results are compared.

Figure 153:
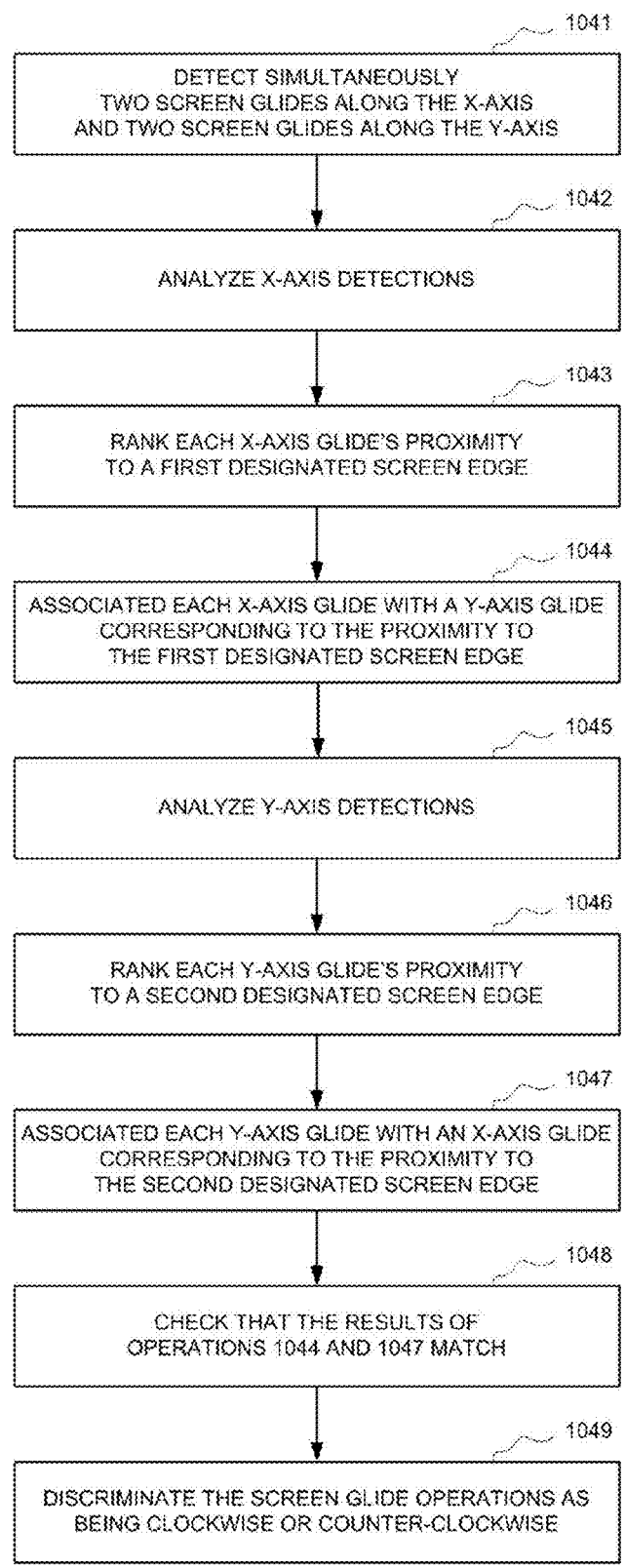

Reference is made to FIG. 153, which is a simplified flowchart of a method for discriminating between clockwise and counter-clockwise gestures, in accordance with an embodiment of the present invention. At operation 1041, two glide gestures are detected along an x-axis. Each glide gesture is detected as a series of connected touch locations. Thus, with reference to FIGS. 142 and 143, a first glide gesture is detected as a connected series of touch locations beginning at x-coordinate D1, and a second concurrent glide gesture is detected as a connected series of touch locations beginning at x-coordinate D2. At operation 1042, the x-glide detections are analyzed to determine the types of detections that occurred in each series, from among the patterns listed in TABLE III.

At operation 1043, the x-glide detections are ranked according to touches that occurred closer to or farther from a designated screen edge, based on the patterns of detections determined at operation 1042, and based on the "Touch Location" column of TABLE III. Operation 1043 relates to series of connected touch detections over a time interval. Each series generally includes touch detections of patterns 1 and 3, or of patterns 2 and 4, listed in TABLE III, depending on whether the glide was closer to or further away from the designated edge. In addition to analyzing the individual detections that comprise a glide, the series of touch detections is also analyzed to determine if the glide is moving closer to or farther from the designated edge, based on comparison of intensities of detections over time. E.g., in one series of detections having multiple pattern 1 detections, if the amount of blocked light increases over time, then it is inferred that the glide is moving toward the receivers, otherwise the glide is moving toward the emitters.

The y-coordinates represent distances from a designated edge, such as the edge of emitters. At operation 1044 each ranked x-axis glide is paired with a corresponding y-axis glide. Operations 1045-1047 are performed for the y-axis glide, similar to operations 1042-1044 performed for the x-axis glide. At operation 1048 the two sets of results are compared. At step 1049 a discrimination is made as to whether the rotation gesture is clockwise or counter-clockwise.

FIGS. 63 and 79 show alignments of emitters and receivers whereby right and left halves of each beam overlap neighboring beams, as shown in FIGS. 70 and 82. Three beams are shown in these figures; namely, beams 167, 168 and 169. The left half of beam 167 overlaps the right half of beam 168, and the right half of beam 167 overlaps the left half of beam 169. As such, a touch at any location within beam 167 is detected by two beams. The two detecting beams have different detection gradients along the widths of the beams, as shown by light detection areas 910-912 in the figures.

The gradient of light attenuation is substantially linear across the width of the beam. As such, a weighted average of the different detection signals is used to calculate a position along one axis using EQS. (2) and (3) above. EQ. (2) extends to a number, n, of samples. E.g., if a finger at the center of beam a blocks 40% of the expected signal of beam a, and blocks none of the expected signal of beam b, then $W_a$ and $W_b$ are 0.4 and 0, respectively, and the location $X_p$ is calculated as $$X_p = (0.4 * X_a + 0 * X_b)/(0.4 + 0) = X_a.$$

The same value of $X_p$ is obtained for a stylus at the screen position which, due to its being narrower than the finger, blocks only 20% of the expected signal of beam a.

Similarly, if a finger between the centers of beams a and b blocks similar amounts of expected light from both beams, say 30%, then $X_p$ is calculated as $$X_p = (0.3 * X_a + 0.3 * X_b)/(0.3 + 0.3) = \frac{1}{2}(X_a + X_b),$$

which is the midpoint between $X_a$ and $X_b$.

Location calculation in a system of aligned emitters and receivers differs in several aspects from location calculation in a system of shift-aligned emitters and receivers. In a system of aligned emitters and receivers, beams are aligned with the coordinate system used for specifying the touch location. In this case, the touch location is calculated along a first axis without regard for the touch location along the second axis. By contrast, in a shift-aligned system the primary beam coordinate, e.g., $X_a$ for beam a, is determined based on an assumed touch coordinate on the second axis, $Y_{initial}$.

Further, in a system of aligned emitters and receivers the attenuation and signal strength pattern generated by an object crossing the beam is substantially the same at all locations along the length of the beam. As described hereinabove with reference to FIGS. 76 and 107, as an object moves across the width of a beam, it generates substantially similar signal patterns whether it crosses the beam near the beam's emitter, detector or in mid-screen. Therefore, an initial normalizing of weights, $W_a, W_b, \ldots, W_n$, based on the detection pattern is required in shift-aligned systems, and is not required in aligned systems.

When a light-blocking object is placed at the center of a beam, such as beam 167 in FIGS. 70 and 82, a portion of the neighboring beam is blocked. E.g., 40% of beam 167 is blocked and 5% of beam 168 is blocked. However, the signals include both random noise and also noise caused by the alternating facets that may account for signal fluctuations. A technique is required to determine whether the touch is in fact at the center of beam 167, or slightly offset from the center.

In accordance with an embodiment of the present invention, multiple samples of each signal are taken, and combined to filter out signal noise. Additionally, the neighboring beams 168 and 169 are configured by their respective optical elements to overlap around the center of beam 167, as seen in FIGS. 72 and 106 where all three signals detect touches around the center of the middle signal. In cases where the main detection signal is concentrated in one beam, detection signals from both left and right neighboring beams are used to fine tune the touch location calculation. Specifically, filtered signals of neighboring beams 168 and 169 are used to determine an offset from the center of beam 167.

In embodiments with optical elements with three-way lenses that create light beams along two sets of axes, similar calculations are performed on the diagonal detection beams to determine locations on the second axis system. As described hereinabove, touch objects typically block a larger portion of the diagonal signals that of the orthogonal signals.

The spatial and temporal filters described hereinabove with reference to shift-aligned emitter-receiver arrangements are applied in aligned emitter-receiver arrangements as well.

Calibration of Touch Screen Components

Figure 154:
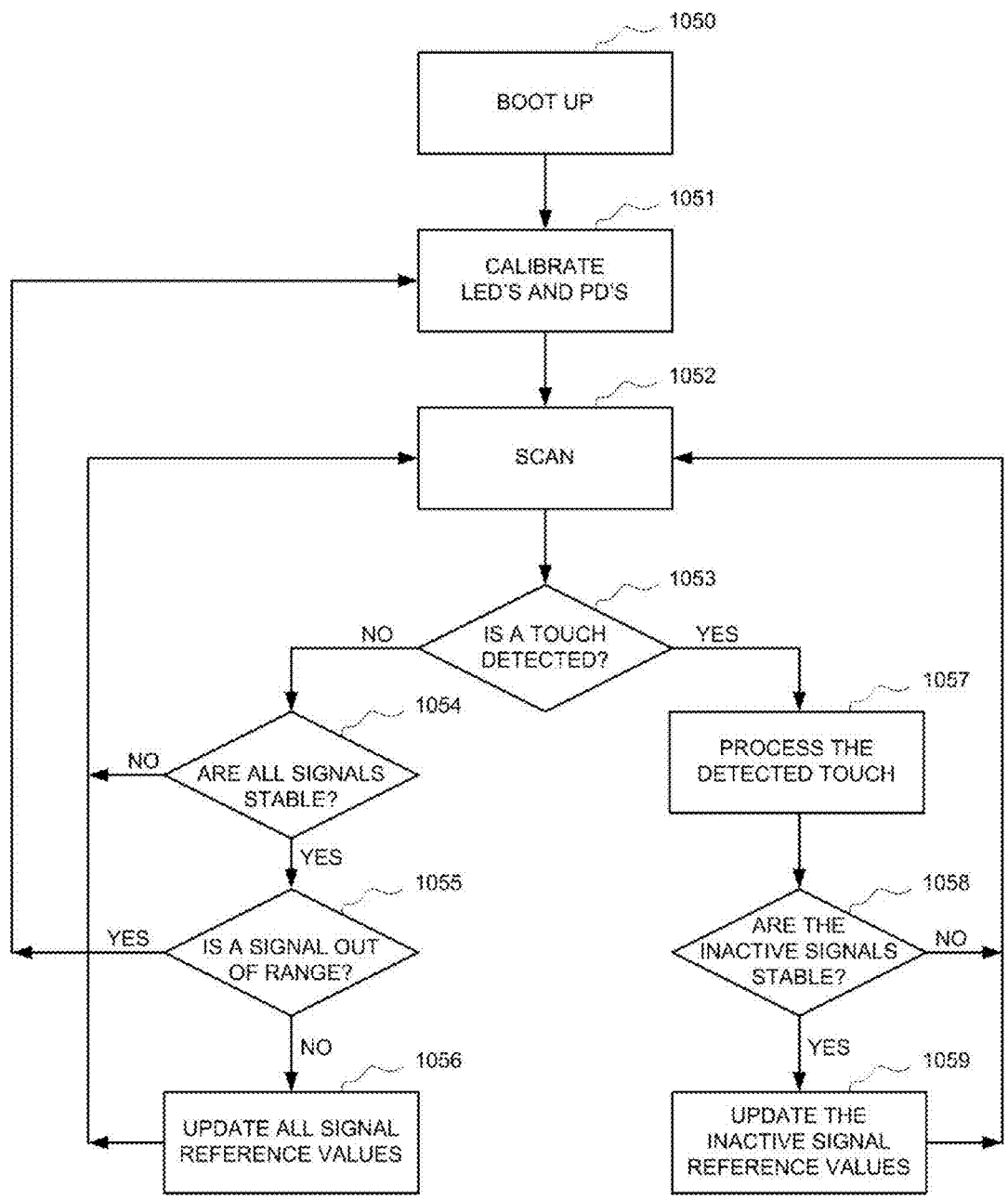

Reference is made to FIG. 154, which is a simplified flowchart of a method of calibration and touch detection for a light-based touch screen, in accordance with an embodiment of the present invention. In general, each emitter/receiver pair signal differs significantly from signals of other pairs, due to mechanical and component tolerances. Calibration of individual emitters and receivers is performed to ensure that all signal levels are within a pre-designated range that has an acceptable signal-to-noise ratio.

In accordance with an embodiment of the present invention, calibration is performed by individually setting (i) pulse durations, and (ii) pulse strengths, namely, emitter currents. For reasons of power consumption, a large current and a short pulse duration is preferred. When a signal is below the pre-designated range, pulse duration and/or pulse strength is increased. When a signal is above the pre-designated range, pulse duration and/or pulse strength is decreased.

As shown in FIG. 154, calibration (operation 1051) is performed at boot up (operation 1050), and is performed when a signal is detected outside the pre-designated range (operation 1055). Calibration is only performed when no touch is detected (operation 1053), and when all signals on the same axis are stable (operation 1054); i.e., signal differences are within a noise level over a time duration.

Reference signal values for each emitter/receiver pair are used as a basis of comparison to recognize a touch, and to compute a weighted average of touch coordinates over a neighborhood. The reference signal value for an emitter/receiver pair is a normal signal level. Reference signal values are collected at boot up, and updated when a change, such as a change in ambient light or a mechanical change, is detected. In general, as shown in FIG. 154, reference signal values are updated (operation 1056) when signals are stable (operation 1054); i.e., when signal variations are within an expected range for some number, N, of samples over time.

A touch inside the touch area of a screen may slightly bend the screen surface, causing reflections that influence detected signal values at photo diodes outside of the touch area. Such bending is more pronounced when the touch object is fine or pointed, such as a stylus. In order to account for such bending, when a touch is detected (operation 1053), all stable signals (operation 1058) outside the touch area undergo a reference update (operation 1059). When no touch is present and all signals are stable (operation 1054), but a signal along an axis differs from the reference value by more than the expected noise level (operation 1055), the emitters are calibrated (operation 1051). Recalibration and updating of reference values require stable signals in order to avoid influence of temporary signal values, such as signal values due to mechanical stress by bending or twisting of the screen frame.

To further avoid error due to noise, if the result of an emitter/receiver pair differs from a previous result by more than an expected noise level, a new measurement is performed, and both results are compared to the previous result, to get a best match. If the final value is within the expected noise level, a counter is incremented. Otherwise, the counter is cleared. The counter is subsequently used to determine if a signal is stable or unstable, when updating reference values and when recalibrating.

After each complete scan, signals are normalized with their respective reference values. If the normalized signals are not below a touch threshold, then a check is made if a recalibration or an update of reference values is necessary. If a normalized signal is below the touch threshold, then a touch is detected (operation 1053).

To reduce risk of a false alarm touch detection, due to a sudden disturbance, the threshold for detecting an initial point of contact with the screen, such as when a finger first touches the screen, is stricter than the threshold for detecting movement of a point of contact, such as gliding of a finger along the screen while touching the screen. I.e., a higher signal difference is required to detect an initial touch, vis-à-vis the difference required to detect movement of an object along the screen surface. Furthermore, an initial contact is processed as pending until a rescan verifies that the touch is valid and that the location of the touch remains at approximately the same position.

To determine the size of a touch object (operation 1057), the range of blocked signals and their amplitudes are measured. For large objects, there is a wait for detecting an initial point of contact with the screen, until the touch has settled, since the touch of a large object is generally detected when the object is near the screen before it has actually touched the screen. Additionally, when a large object approaches the screen in a direction not perpendicular to the touch area, the subsequent location moves slightly from a first contact location.

However, objects with small contact areas, such as a pen or a stylus, are typically placed directly at the intended screen location. As such, in some embodiments of the present invention, the wait for detecting an initial contact of a fine object is shortened or skipped entirely.

It has been found advantageous to limit the size of objects that generate a touch, in order to prevent detection of a constant touch when a device with a touch screen is stored in a pouch or in a pocket.

Figure 155:
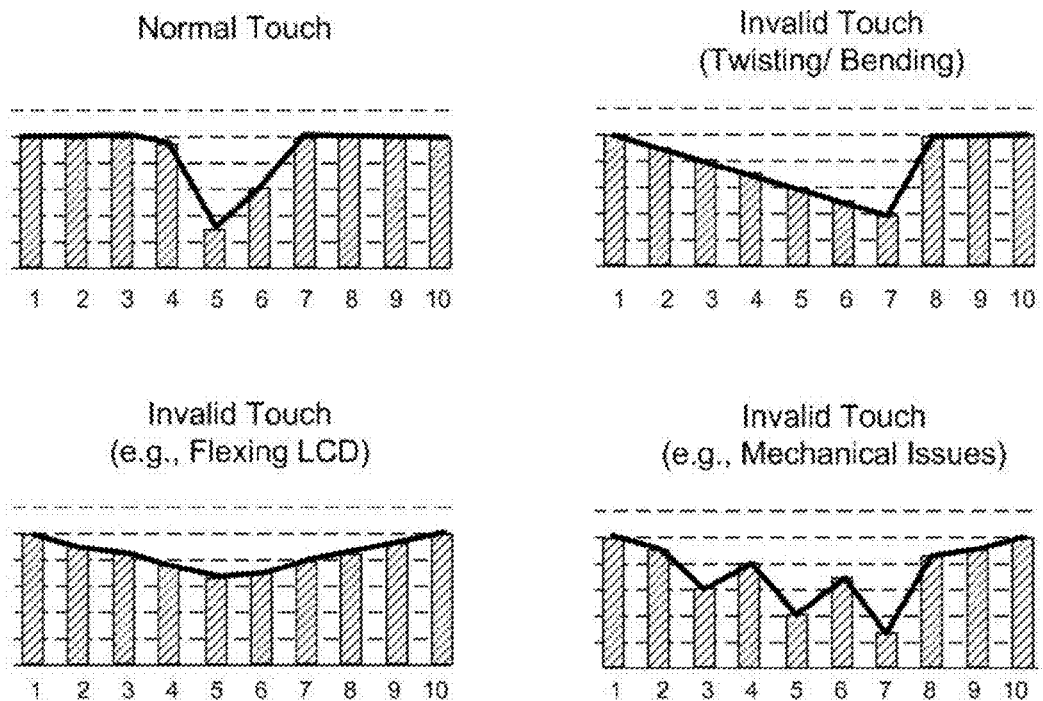

At operation 1053, it is also necessary to distinguish between signals representing a valid touch, and signals arising from mechanical effects. In this regard, reference is made to FIG. 155, which is a picture showing the difference between signals generated by a touch, and signals generated by a mechanical effect, in accordance with an embodiment of the present invention. Each of the four graphs in FIG. 155 shows detection beams 1-10 during a scan along one screen axis. As seen in FIG. 155, signal gradients discriminate between a valid touch and a mechanical effect.

Figure 156:
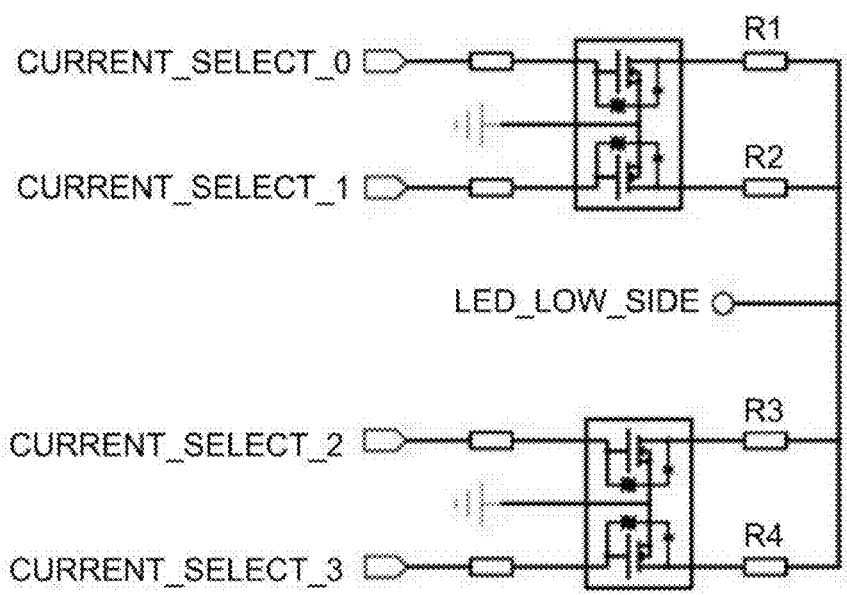
Figure 157:
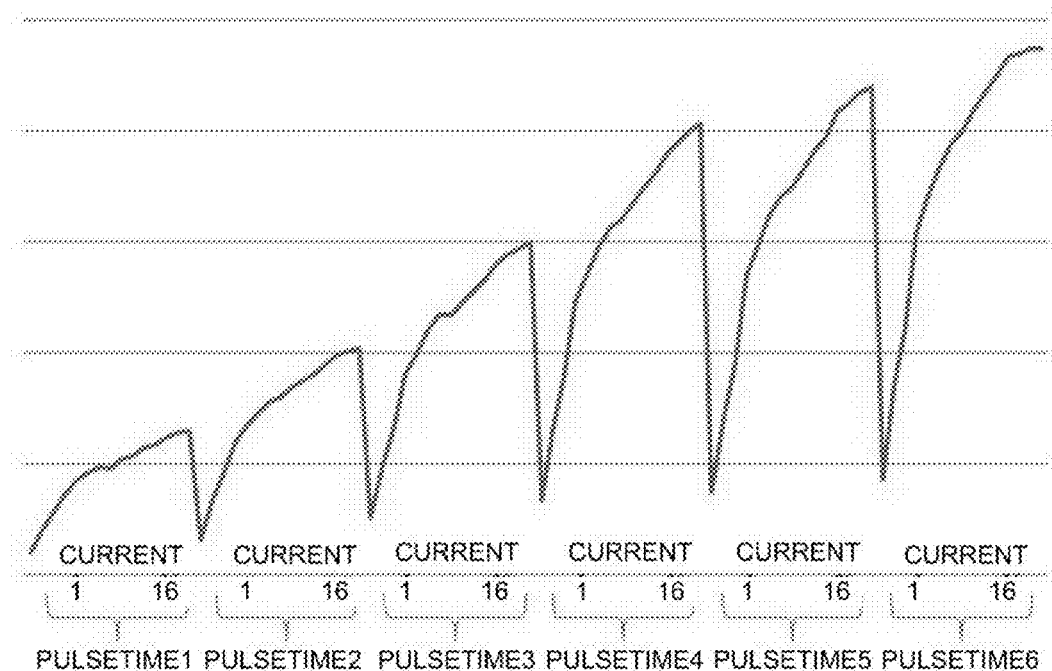

Reference is made to FIG. 156, which is a simplified diagram of a control circuit for setting pulse strength when calibrating a light-based touch screen, in accordance with an embodiment of the present invention. Reference is also made to FIG. 157, which is a plot of calibration pulses for pulse strengths ranging from a minimum current to a maximum current, for calibrating a light-based touch screen in accordance with an embodiment of the present invention. FIG. 157 shows plots for six different pulse durations (PULSETIME1-PULSETIME6), and sixteen pulse strength levels (1-16) for each plot.

The control circuit of FIG. 156 includes 4 transistors with respective variable resistors R1, R2, R3 and R4. The values of the resistors control the signal levels and the ratio between their values controls gradients of the pulse curves shown in FIG. 156.

Figure 158:
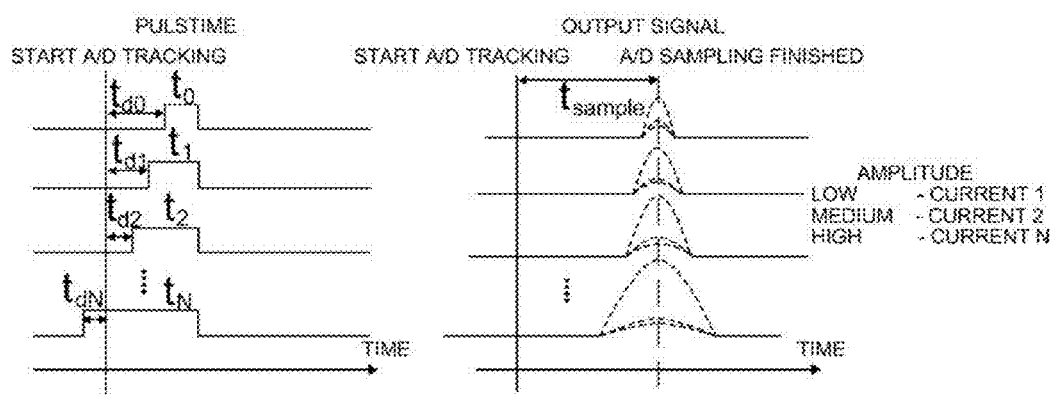

Reference is made to FIG. 158, which is a simplified pulse diagram and a corresponding output signal graph, for calibrating a light-based touch screen, in accordance with an embodiment of the present invention. The simplified pulse diagram is at the left in FIG. 158, and shows different pulse durations, $t_0, \ldots, t_N$, that are managed by a control circuit when calibrating the touch screen. As shown in FIG. 158, multiple gradations are used to control duration of a pulse, and multiple gradations are used to control the pulse current. The corresponding output signal graph is at the right in FIG. 158.

As shown in FIG. 158, different pulse durations result in different rise times and different amplitudes. Signal peaks occur close to the time when the analog-to-digital (A/D) sampler closes its sample and hold circuit. In order to obtain a maximum output signal, the emitter pulse duration is controlled so as to end at or near the end of the A/D sampling window. Since the A/D sampling time is fixed, the timing, $t_d$, between the start of A/D sampling and the pulse activation time is an important factor.

Assembly of Touch Screen Components

As described hereinabove, a minimum of tolerances are required when aligning optical guides that focus on respective light emitters and light receivers, in order to achieve accurate precision on a light-based touch screen. A small misalignment can severely degrade accuracy of touch detection by altering the light beam. It is difficult to accurately place a surface mounted receiver and transmitter such that they are properly aligned with respective light guides.

Because of this difficulty, in an embodiment of the present invention, a light guide and transmitter or receiver are combined into a single module or optical element, as described above with reference to FIGS. 115-118.

In some instances it may be of advantage not to combine an emitter or a receiver into an optical element, e.g., in order to use standard emitter and receiver components. In such instances precision placement of components is critical.

In some embodiments of the present invention, the optical lens that includes the feather pattern is part of a frame that fits over the screen. FIG. 46 shows a cross-section of such a frame 455, which is separate from LED 200.

Reference is made to FIG. 159, which is an illustration showing how a capillary effect is used to increase accuracy of positioning a component, such as an emitter or a receiver, on a substrate, inter alia a printed circuit board or an optical component, in accordance with an embodiment of the present invention. Shown in FIG. 159 is an emitter a receiver 398 that is to be aligned with an optical component or temporary guide 513. Optical component or temporary guide 513 is fixed to a printed circuit board 763 by guide pins 764. Solder pads 765 are placed at an offset from component solder pads 766. Printed circuit board 763 is then inserted into a heat oven for soldering.

Reference is made to FIG. 160, which is an illustration showing the printed circuit board 763 of FIG. 159, after having passed through a heat oven, in accordance with an embodiment of the present invention. As shown in FIG. 160, component 398 has been sucked into place by the capillary effect of the solder, guided by a notch 768 and a cavity 769 in optical component or temporary guide 513. When a temporary guide is used, it may be reused for subsequent soldering.

The process described with reference to FIGS. 159 and 160 is suitable for use in mass production of electronic devices.

ASIC Controller for Light-Based Touch Screens

Aspects of the present invention relate to design and use of a programmable state machine for novel light-based touch screen ASIC controllers that execute a scanning program on a series of emitters and detectors. The scanning program determines scan sequence, current levels and pulse widths. The controller includes integrated LED drivers for LED current control, integrated receiver drivers for photo detector current measurement, and an integrated A/D convertor to enable communication between the controller and a host processor using a standard bus interface, such as a Serial Peripheral Interface (SPI).

In accordance with the present invention, a program is loaded onto the controller, e.g., over SPI. Thereafter, scanning execution runs independently from the host processor, optimizing overall system power consumption. When the scan data are ready, the controller issues an interrupt to the host processor via an INT pin.

Reference is made to FIG. 161, which is a simplified illustration of a light-based touch screen 800 and an ASIC controller therefor, in accordance with an embodiment of the present invention.

Reference is made to FIG. 162, which is a circuit diagram of a chip package 731 for a controller of a light-based touch screen, in accordance with an embodiment of the present invention.

As shown in FIG. 162, chip package 731 includes emitter driver circuitry 740 for selectively activating a plurality of photoemitters 200 that are outside of the chip package, and signal conducting pins 732 for connecting photoemitters 200 to emitter driver circuitry 740. Emitter driver circuitry 740 is described in applicants' co-pending patent application U.S. Ser. No. 12/371,609 entitled LIGHT-BASED TOUCH SCREEN filed on Feb. 15, 2009, the contents of which are hereby incorporated by reference. Inter alia, reference is made to paragraphs [0073], paragraphs [0087]-[0091] and FIG. 11 of this application as published in U.S. Publication No. 2009/0189878 A1 on Jul. 30, 2009.

Emitter driver circuitry 740 includes circuitry 742 for configuring individual photoemitter pulse durations and pulse currents for each emitter-detector pair via a programmable current source. Circuitry 742 is described in applicants' co-pending patent application U.S. Ser. No. 13/052,511 entitled LIGHT-BASED TOUCH SCREEN WITH SHIFT-ALIGNED EMITTER AND RECEIVER LENSES filed on Mar. 21, 2011, the contents of which are hereby incorporated by reference. Inter alia, reference is made to paragraphs [0343]-[0358] and FIGS. 99-101 of this application as published in U.S. Publication No. 2011/0163998 on Jul. 7, 2011.

Chip package 731 includes detector driver circuitry 750 for selectively activating a plurality of photo detectors 300 that are outside of the chip package, and signal conducting pins 733 for connecting photo detectors 300 to detector driver circuitry 750. Detector driver circuitry 750 includes circuitry 755 for filtering current received from photo detectors 300 by performing a continuous feedback bandpass filter, and circuitry 756 for digitizing the bandpass filtered current. Circuitry 755 is described inter alia at paragraphs [0076], paragraphs [107]-[0163] and FIGS. 14-23B of the above-referenced U.S. Publication No. 2009/0189878 A1. Chip package 731 also includes detector signal processing circuitry 753 for generating detection signals representing measured amounts of light detected on photo detectors 300.

Chip package 731 further includes I/O pins 736 for communicating with a host processor 772. Chip package 731 further includes controller circuitry 759 for controlling emitter driver circuitry 740 and detector driver circuitry 750. Controller circuitry 759 communicates with host processor 772 using a bus standard for a Serial Peripheral Interface (SPI) 775. Chip package 731 further includes a chip select (CS) pin 737 for coordinating operation of controller circuitry 759 with at least one additional controller 774 for the light-based touch screen.

The controller shown in FIG. 162 packages all of the above mentioned elements within chip package 731, (i) thereby enabling automatic execution of an entire scan sequence, such as 52 emitter-receiver pairs, and (ii) thereby storing the detection signals in a register array located in controller circuitry 759, for subsequent analysis by host processor 772. This register array provides storage for at least 52, 12-bit receiver results. Additional registers in controller circuitry 759 are provided for configuring individual pulse durations and pulse currents for individual emitter-receiver pairs. In order to support 52 unique emitter-receiver pairs, at least 104 registers are provided; namely, 52 registers for configuring individual pulse durations, and 52 registers for configuring individual pulse currents.

Reference is made to FIG. 163, which is a circuit diagram for six rows of photo emitters with 4 or 5 photo emitters in each row, for connection to pins 732 of chip package 731, in accordance with an embodiment of the present invention. The 11 lines LED_ROW1, . . . , LED_ROW6 and LED_COL1, . . . , LED_COL5 provide two-dimensional addressing for 26 photo emitters, although the photo emitters are physically arranged around two edges of the touch screen, as shown in FIG. 150. TABLE IV shows LED multiplex mapping from photo emitter LEDs to LED_ROW and LED_COL pins. More generally, an LED matrix may include an m×n array of LEDs supported by m+n I/O pins on the controller.

As such, an LED is accessed by selection of a row and a column I/O pin. The controller includes push-pull drivers for selecting rows and columns. It will be appreciated by those skilled in the art that the row and column coordinates of the LEDs are unrelated to the physical placement of the LEDs and the push-pull drivers. In particular, the LEDs do no need to be physically positioned in a rectangular matrix.

In an alternative embodiment of the controller of the present invention, current source drivers are used instead of push-pull drivers. In another embodiment of the controller of the present invention, some of the push-pull drivers are combined with current source drivers, and others of the push-pull drivers are combined with current sink drivers.

TABLE IV

LED multiplex mapping to LED_ROW and LED_COL pins

| LED | LED_ROW pin enabled | LED_COL pin enabled |
|---|---|---|
| 1 | 1 | 1 |
| 2 | 2 | 1 |
| 3 | 3 | 1 |
| 4 | 4 | 1 |
| 5 | 5 | 1 |
| 6 | 6 | 1 |
| 7 | 1 | 2 |
| 8 | 2 | 2 |
| 9 | 3 | 2 |
| 10 | 4 | 2 |
| 11 | 5 | 2 |
| 12 | 6 | 2 |
| 13 | 1 | 3 |
| 14 | 2 | 3 |
| 15 | 3 | 3 |
| 16 | 4 | 3 |
| 17 | 5 | 3 |
| 18 | 6 | 3 |
| 19 | 1 | 4 |
| 20 | 2 | 4 |
| 21 | 3 | 4 |
| 22 | 4 | 4 |
| 23 | 5 | 4 |
| 24 | 6 | 4 |
| 25 | 1 | 5 |
| 26 | 2 | 5 |

TABLE V

Photometer power consumption for 50 emitter-receiver pairs at 100 Hz with 2.7 V power source

| Pulse duration (μs) | Pulse current (A) | Current consumption (μA) | Power (mW) |
|---|---|---|---|
| 0.125 | 0.05 | 31.25 | 0.084375 |
| 0.25 | 0.05 | 62.5 | 0.16875 |
| 0.5 | 0.05 | 125 | 0.3375 |
| 1 | 0.05 | 250 | 0.675 |
| 2 | 0.05 | 500 | 1.35 |
| 4 | 0.05 | 1000 | 2.7 |
| 0.125 | 0.1 | 62.5 | 0.1685 |
| 0.25 | 0.1 | 125 | 0.3375 |
| 0.5 | 0.1 | 250 | 0.675 |
| 1 | 0.1 | 500 | 1.35 |
| 2 | 0.1 | 1000 | 2.7 |
| 4 | 0.1 | 2000 | 5.4 |
| 0.125 | 0.2 | 125 | 0.3375 |
| 0.25 | 0.2 | 250 | 0.675 |
| 0.5 | 0.2 | 500 | 1.35 |
| 1 | 0.2 | 1000 | 2.7 |
| 2 | 0.2 | 2000 | 5.4 |
| 4 | 0.2 | 4000 | 10.8 |
| 0.125 | 0.4 | 250 | 0.675 |
| 0.25 | 0.4 | 500 | 1.35 |
| 0.5 | 0.4 | 1000 | 2.7 |
| 1 | 0.4 | 2000 | 5.4 |
| 2 | 0.4 | 4000 | 10.8 |
| 4 | 0.4 | 8000 | 21.6 |

Advantages of having a dedicated controller for emitters and receivers in a light-based touch screen are power savings and performance. In conventional systems, a conventional chip, such as the MSP430 chip manufactured by Texas Instruments of Dallas, Tex., controls emitters and receivers. Regarding power savings, conventional chips do not provide access to all of the power consuming chip elements. Moreover, with conventional chips it is not possible to power on and off external elements in sync with the emitters. For example, with a conventional chip the amplifier unit connected to the receivers and the analog-to-digital convertor (ADC) for digitizing receiver light detection current, cannot be turned on and off in sync with activation of the emitters. In conventional systems, these elements are left powered on throughout an entire scan sequence. In distinction, the dedicated controller of the present invention is able to power these elements on and off at a resolution of microseconds, in sync with emitter activation. This and other such selective activation of controller blocks, reduce the total power consumption of the touch system considerably. In fact, power consumption for the amplifier, the ADC and other controller blocks is reduced to the extent that their collective power consumption is negligible as compared to photoemitter activation power. As such, system power consumption is nearly the same as the power consumption for activating the photoemitters.

When the dedicated controller of the present invention scans a series of emitter-receiver pairs, an LED driver supplies an amount of current to an LED in accordance with settings in LED current control registers and LED pulse length control registers. TABLE V shows the power consumption of the dedicated controller, for 50 emitter-receiver pairs at 100 Hz with a power source of 2.7V. Pulse durations and pulse currents are set via circuitry 742 using configuration registers. Current consumption is calculated as 100 Hz×50 activation pairs×pulse duration (μs)×pulse current (A)==current consumption (μA) from the battery.

Power consumption is calculated as current consumption (μA)*voltage (V)=power (mW).

Regarding performance, the time required to complete a scan of all emitter-receiver pairs around the screen is critical, especially for fast stylus tracing. Reference is made to FIG. 164, which is a simplified illustration of a touch screen surrounded by emitters 200 and receivers 300, in accordance with an embodiment of the present invention. Emitters 200 are scanned in a scan sequence; e.g., emitters 200 may be scanned in the numbered order 1-16 shown in FIG. 164. Touch points 900 correspond to touches made by a person writing his signature in a fast scrawl using a fine-point stylus. Three locations are indicated for touch points 900. At a time n, when emitter 1 is activated, the stylus is located at a location a. At a time t2, when emitter 16 is activated, the stylus is located at a location b, due to the quick movement as the user signs his name. However, the detected location on the screen at time t2 is a location c, different than location b; because at time t2, when emitter 16 is activated, the stylus has moved from its location at time t1. Such time lag between x-coordinate detection and y-coordinate detection produces errors in detecting touch positions of the stylus on the screen. These errors are most pronounced with fast stylus writing. As such, it is desirable to complete an entire scan sequence as fast as possible.

The dedicated controller of the present invention completes a scan sequence faster than conventional chips. The dedicated controller of the present invention includes register arrays that store necessary parameters to execute an entire scan sequence automatically. The dedicated controller further includes a register array for storing filtered, digital results for a scan sequence. In distinction, with conventional chips not all registers are available, and configuration data in registers is not automatically parsed. Thus, during a scan sequence using conventional chips, some cycles are required for configuring further emitter activations and for reading results.

In accordance with an embodiment of the present invention, for configurations where the number of emitters and receivers is larger than what may be supported by a single dedicated controller, multiple controllers are used. The multiple controllers are each configured prior to executing a scan, and then a scan is executed by each controller in rapid succession. For this embodiment, after configuring registers in all controllers, a host selects a first controller chip, using the chip-select (CS) pin shown in FIG. 162, and activates that chip. When the scan sequence on that chip is completed, the chip sends an interrupt to the host. The host then selects a second controller chip using its CS pin, and runs the second chip's scan sequence. After all of the controller chips have completed their respective scans, the host reads the results from each chip and calculates touch locations.

In this regard, reference is made to FIG. 165, which is a simplified application diagram illustrating a touch screen configured with two controllers, indicated as Device 1 and Device 2, in accordance with an embodiment of the present invention. Shown in FIG. 165 is touch screen 800 surrounded with LEDs and shift-aligned PDs. Twenty-six LEDs, $LED_1$-$LED_{26}$, are connected along a first screen edge to LED pins from Device 1, and additional LEDS, $LED_1$-$LED_{CR}$, along this edge are connected to LED pins from Device 2. Along the opposite edge, PDs are shift-aligned with the LEDs. PDs that detect light from the Device 1 LEDS are connected to Device 1 PD pins, and PDs that detect light from Device 2 LEDs are connected to Device 2 PD pins. The dashed lines connecting each LED to two PDs show how light from each LED is detected by two PDs. Each PD detects light from two LEDs.

As shown in FIG. 165, $PD_{27}$ of Device 1 detects light from $LED_{26}$ of Device 1 and also from $LED_1$ of Device 2. As such, $PD_{27}$ is connected to the $PD_{27}$ pin of Device 1 and also to the $PD_1$ pin of Device 2. When detecting light from $LED_{26}$ of Device 1, $PD_{27}$ is sampled over the $PD_{27}$ pin of Device 1 and its result is stored on Device 1; and when detecting light from $LED_1$ of Device 2, $PD_{27}$ is sampled over the $PD_1$ pin of Device 2 and its result is stored on Device 2. As such, each controller coordinates LED activation with respective PD activation. The host processor calculates touch locations along the Device 1-Device 2 border by interpolating the PD results from the two devices.

Reference is made to FIG. 166, which is a graph showing performance of a scan sequence using a conventional chip vs. performance of a scan using a dedicated controller of the present invention. The duration of each complete screen scan is longer with the conventional chip than with the dedicated controller. The dedicated controller can be powered down between scan sequences, providing further power savings, especially since the stretches of time between scan sequences may be larger with use of the dedicated controller than with use of a conventional chip. To connect touch points of multiple scans, the host processor may use spline interpolation or such other predictive coding algorithms, to generate smooth lines that match the user's pen strokes. Of significance is that each touch point is very accurate, when using a dedicated controller of the present invention.

Moreover, it is apparent from FIG. 166 that a host using a dedicated controller of the present invention may increase the scan frequency beyond the limits possible when using a conventional chip. E.g., a host can scan 50 emitter receiver pairs at 1000 Hz, using a controller of the present invention. In distinction, touch screens using convention chips typically operate at frequencies of 100 Hz or less. The high sampling rate corresponding to 1000 Hz enables accurate touch location calculation over time. In turn, this enables temporal filtering of touch coordinates that substantially eliminates the jitter effect described above when a stylus remains stationary, while substantially reducing the lag time described above between a stylus location and a line representing the stylus' path along the screen.

Such high sampling rates on the order of 50 emitter-receiver pairs at 1000 Hz cannot be achieved if individual LEDs require configuration prior to activation. The dedicated controller of the present invention achieves such high sampling rates by providing the registers and the circuitry to automatically activate an entire scan sequence.

A further advantage of completing multiple scan sequences in a short time is disambiguation of touch signals. The problem of ambiguous signals is described above with reference to FIGS. 15 and 16. As explained above, the same detection pattern of photo detectors is received for two concurrent touches along a screen diagonal, as illustrated in FIGS. 15 and 16. When placing two fingers on the screen, there is an inherent delay between the first and second touches. Completing multiple scan sequences in a very short time allows the system to determine the first touch, which is unambiguous. Then, assuming that the first touch is maintained when the second touch is detected, the second touch location is easily resolved. E.g., if it is determined that one touch is in the upper left corner and the touch detection pattern is as shown in FIGS. 15 and 16, then the second touch location must be at the lower right corner of the screen.

Thus it will be appreciated by those skilled in the art that a dedicated controller in accordance with the present invention is power-efficient, highly accurate and enables highs sampling rates. The host configures the controller for low power, corresponding to 100 Hz or less, or for high frequency scanning, such as 500 Hz-1000 Hz.

Determination of which configuration is appropriate is based inter alia on the area of the touch screen covered by a touch pointer, since jitter and lag are less prominent for a touch covering a relative large area, such as a finger touch, than for a touch covering a relatively small area, such as a stylus touch. Based on the area covered by the pointer, as determined by the size of the shadowed area of light-based touch screen signals, the host determines whether a finger or a stylus is being used, and configures an appropriate scan rate based on the trade-off between power and accuracy.

In accordance with an embodiment of the present invention, the dedicated controller includes scan range registers for selectively activating LEDs, and current control and pulse duration registers for specifying an amount of current and a duration, for each activation. The scan range registers designate a first LED and a first PD to be activated along each screen edge, the number of LEDs to be activated along each edge, and the step factor between activated LEDs. A step factor of 0 indicates that at each step the next LED is activated, and a step factor of 1 indicates that every other LED is activated. Thus, to activate only odd or only even LEDs, a step factor of 1 is used. Step factors of 2 or more may be used for steps of 2 or more LEDs, respectively. An additional register configures the number of PDs that are activated with each LED. A value of 0 indicates that each LED is activated with a single corresponding PD, and a value of 1 indicates that each LED is activated with two PDs. The number of PDs activated with each LED may be as many PD that are available around the touch screen.

To save power, it is advantageous to have a low resolution scan mode for detecting an initial touch location. The host may run in this mode, for example, when no touch is detected. When a touch is detected, the host switches to a high resolution scan mode, in order to calculate a precise touch location, as described above with reference to FIG. 136. In terms of controller scan sequence registers, every emitter is activated, i.e., step=0, with one receiver. The scan sequence of FIG. 136(*d*) differs from that of FIG. 136(*e*) in the initial PD used in the sequence on each screen edge. Specifically, the first PD, namely, PD0, is used in FIG. 136(*d*), and the second PD, namely, PD1, is used in FIG. 136(*e*). The initial PD to be used along each screen edge is configured by a register.

When each LED is activated with more than one PD, the LED is activated separately for each of the PDs. Each such separate activation has respective current control and pulse duration registers.

The controller of the present invention automatically controls a mux to direct current to desired LEDs. The LED mux control is set by the scan control registers. The controller automatically synchronizes the correct PD receivers when the drivers pulse the LEDS. Twelve-bit ADC receiver information is stored in PD data registers. Upon completion of scanning, the controller issues an interrupt to the host processor, and automatically enters standby mode. The host then reads receiver data for the entire scan sequence over the SPI interface.

In some touch screen configurations, emitters are shift-aligned with receivers, with emitters being detected by more than one receiver and being activated one or more times for each detecting receiver. For example, an emitter may be activated three times in rapid succession, and with each activation a different receiver is activated. Moreover, a receiver is further activated during the interval between emitter activations to determine an ambient light intensity.

In other touch screen configurations, emitters and receivers are aligned, but each emitter is detected by more than one receiver, and each emitter is activated separately for each detecting receiver. Emitter-receiver activation patterns are described in in applicants' co-pending patent application U.S. Ser. No. 12/667,692 entitled SCANNING OF A TOUCH SCREEN filed on Jan. 5, 2010, the contents of which are hereby incorporated by reference. Inter alia, reference is made to paragraphs [0029], [0030], [0033] and [0034] of this application as published in U.S. Publication No. 2011/0043485 on Feb. 24, 2011.

Reference is made to FIG. 167, which is a simplified illustration of a touch screen 800 having a shift-aligned arrangement of emitters and receivers, in accordance with an embodiment of the present invention. Shown in FIG. 167 are emitters 204-208 along the south edge of screen 800, shift-aligned receivers 306-311 along the north edge of screen 800, emitters 209-211 along the east edge of screen 800, and shift-aligned receivers 312-315 along the west edge of screen 800. It is noted that each edge of receivers has one or more receivers than the number of emitters along the opposite edge, in order to detect touches in the corners of screen 800. A beam 174 depicts activation of emitter 204 and detection by receiver 306. TABLE VI lists an activation sequence in terms of emitter-receiver pairs.

TABLE VI

| Activation sequence of emitter-receiver pairs | | |
|---|---|---|
| Activation No. | Emitter | Receiver |
| 1 | 204 | 306 |
| 2 | 204 | 307 |
| 3 | 205 | 307 |
| 4 | 205 | 308 |
| 5 | 206 | 308 |
| 6 | 206 | 309 |
| 7 | 207 | 309 |
| 8 | 207 | 310 |
| 9 | 208 | 310 |
| 10 | 208 | 311 |
| 11 | 209 | 312 |
| 12 | 209 | 313 |

TABLE VI-continued

| Activation sequence of emitter-receiver pairs | | |
|---|---|---|
| Activation No. | Emitter | Receiver |
| 13 | 210 | 313 |
| 14 | 210 | 314 |
| 15 | 211 | 314 |
| 16 | 211 | 315 |

Activation no. 10, 208-311, is the last activation along the horizontal dimension of screen 800. Activation no. 11 is the first activation along the vertical dimension of screen 800. Such turning of a corner afters the activation pattern along screen edges. Specifically, the activation pattern along a screen edge is of the form AA-AB-BB-BC-CC-CD . . . , where the first letter of each pair designates an emitter and the second letter designates a receiver. Thus in AA-AB a same emitter is activated with two receivers, and in AB-BB two emitters are activated with a same receiver. When turning a corner, as at activation no. 11, the pattern is reset. The active emitter, 209, is not detected by the previously activated receiver 311, since emitter 209 and receiver 311 are not situated along opposite screen edges. Instead, emitter 209 is detected by receiver 312, thus starting a new AA-AB-BB-BC . . . activation pattern along the vertical screen dimension. The controller handles a pattern reset based on the scan sequence registers, which indicate when a scan along a screen edge is complete.

Reference is made to FIG. 168, which is a simplified diagram of a touch screen 800 having alternating emitters and receivers along each screen edge, in accordance with an embodiment of the present invention. As shown in FIG. 165, each emitter is situated between two receivers, resulting in n emitters and n+1 receivers along a given edge, for some number n. FIG. 165 shows touch screen 800 surrounded by ten emitters 204-213 and fourteen receivers 306-319. As described above with reference to FIG. 164, each emitter is paired with two receivers. The dotted arrows 174 and 175 in FIG. 168 indicate two activations of emitter 204; namely, an activation detected by receiver 316, and another activation detected by receiver 315.

In accordance with an embodiment of the present invention, when an activation sequence arrives at the end of a sequence of emitters along a screen edge, the activation pattern is restarted when activating emitters along an adjacent edge. In accordance with another embodiment of the present invention, the angle of orientation of each emitter with a detecting receiver is substantially 45° from the normal to the edge along which the emitter is arranged. In such case, a receiver along an adjacent edge is operative to detect light from an emitter near a screen corner. As such, the activation pattern is not restarted, but instead continues as a series of activated emitters turn a corner. Alternatively, the controller may restart the activation pattern when turning a corner by use of registers to store the index of the last LED to be activated by the controller along each screen dimension.

In accordance with an embodiment of the present invention, the controller is a simple state machine and does not include a processor core, such as an ARM core. As such, costs of controllers of the present invention are low. A light-based touch screen using a controller of the present invention costs less than a comparable capacitive touch screen, since a capacitive touch screen requires a processor core in order to integrate a large number of signals and calculate a touch location. In order to achieve a quick response time, a capacitive touch screen uses a dedicated processor core to calculate a touch location, instead of offloading this calculation to a host processor. In turn, this increases the bill of materials for capacitive touch screens. In distinction, light-based touch screens of the present invention use two neighboring receiver values to calculate a touch location along an axis, which enables the host to calculate a touch location and, consequently, enables use of a low-cost controller.

In accordance with an embodiment of the present invention, multiple controllers may be operative to control touch screen 800. As mentioned above, chip package 731 includes a chip select (CS) pin 737 for coordinating operation of scanning controller circuitry 759 with at least one additional controller 774 for the light-based touch screen.

In accordance with embodiments of the present invention, the controller supports activation sequences for the touch screen of configuration no. 6 described hereinabove. In a first embodiment, emitters are positioned along two screen edges, directly opposite respective receivers along the remaining two screen edges, as shown in FIG. 63. Each emitter sends a two-pitch wide light beam to its respective receiver. An optical element, such as element 530 described hereinabove with reference to FIG. 64, interleaves this wide beam with neighboring wide beams, to generate two sets of overlapping wide beams that cover the screen; e.g., the set including every second beam covers the screen. FIG. 69 shows a contiguous area covered by beams 168 and 169 generated by respective emitters 201 and 202, with emitter 200 between them.

Two activation sequences are provided; namely, an activation sequence for low-resolution detection when no touch is detected, and an activation sequence for high resolution detection for tracing one or more detected touches. In low-resolution detection every second emitter-receiver pair is activated along one screen edge. For a rectangular screen, the shorter edge is used. In order to distribute use of components uniformly, odd and even sets of emitter-receiver pairs are activated alternately. Thus in low-resolution detection each emitter is configured to be activated with one receiver, and the step factor is 1; i.e., every second emitter is activated. In high resolution detection mode each emitter is configured to be activated with one receiver, and the step factor is 0; i.e., every emitter is activated. The scan in this mode activates emitters along both emitter-lined screen edges.

In an alternative embodiment, emitters and receivers are alternated along screen edges, as shown in FIG. 79. Each emitter sends a two-pitch wide beam to its respective receiver. An optical element, such as element 530 described hereinabove with reference to FIG. 64, interleaves this wide beam with neighboring wide beams, to generate two sets of overlapping wide light beams that cover the screen; e.g., the set including every second beam covers the screen. FIG. 78 shows a contiguous area covered by beams 168 and 169 generated by respective emitters 201 and 202, with receiver 300 between them.

In this embodiment three activation sequences are provided; namely, an activation sequence for low-resolution detection using detection on one axis, an activation sequence for high resolution detection using detection on two axes, and an activation sequence for high resolution detection using detection in four axes. In low-resolution detection every second emitter-receiver pair is activated along one screen edge. For a rectangular screen, the shorter edge is used. In order to distribute use of components uniformly, odd and even sets of beams are activated alternately. However, because neighboring beams are aimed in opposite directions, the emitters are connected to the ASIC LED connectors in such a way that the index of emitters is configured to increment along a single screen edge. Thus the step factor is 0; i.e., every second beam is activated, and the activation series ends at the last emitter along the active edge. In an alternative embodiment the emitters are connected to the ASIC LED connectors such that the index of emitters is configured to increment together with the series of beams. In this case the step factor is 1; i.e., every second beam is activated.

In high resolution detection mode using beams along two axes, each emitter is configured to be activated with one respective receiver, the step factor is 0, and the activation series covers all emitters.

In high resolution detection mode using beams along four axes, multiple activations are executed. A first activation activates beams along the horizontal and vertical axes. The initial emitter index matches the initial receiver index, and the emitter index increments together with the receiver index. A second activation series activates a first set of diagonal beams. In this case, the initial emitter and receiver indices define endpoints of one of the diagonal beams from the initial emitter. The emitter index then increments together with the receiver index around the screen. A third activation series activates a second set of diagonal beams. In this case, the initial emitter and receiver indices define endpoints of the second diagonal beam from the initial emitter.

Resilient Touch Surfaces

Reference is made to FIG. 169, which is a simplified illustration of a touch surface with a flexible compressible layer on top of the surface, in accordance with an embodiment of the present invention. Light beams that cross above the surface to provide touch detection are directed through the compressible layer. FIG. 169 shows emitters 200 and receivers 300 on a PCB 700, and a resilient flexible layer 650 situated above a display 642 and bonded to an outer edge of a light guide. The light guide has two units, namely, an upper section 463 and a lower section 464. Generally layer 650 is transparent, to enable viewing of display 462.

Reference is made to FIG. 170, which is a magnified view of the touch surface of FIG. 169, in accordance with an embodiment of the present invention. As shown in FIG. 170, light beam 100 travels from emitter 200 through light guide units 463 and 464, and into flexible layer 650. Light beam 100 is detected at the opposite edge of the surface by a respective receiver 300, shown in FIG. 169.

Reference is made to FIG. 171, which is a simplified illustration of an object pressing down on layer 650 of the touch surface of FIG. 169, and creating an impression thereon, in accordance with an embodiment of the present invention. As shown in FIG. 171, a user presses his finger 900 on layer 650 and disrupts or frustrates any beam 100 crossing the location of the impression before the beam can reach receiver 300. Such disruption or frustration of beam 100 has two measurable effects; namely, (i) a diminished detection signal at a corresponding receiver or receivers 300 at which the beam was directed, and (ii) increased detection signals at others of the receivers that receive the frustrated beams. Moreover, the greater the impression, the greater is the disruption. As such, the amount of missing expected light at some receivers and the pattern of increased detection at other receivers indicates the amount of pressure exerted by finger 900 on layer 650.

When layer 650 is formed as a single gel-like body, a deep impression, created by a large amount of downward pressure, has a wider radius than a shallow impression. In turn, the amount of light detected at the receivers indicates the width of the radius, which determines the amount of downward force applied by finger 900. In general, the pattern of blocked and frustrated beams created by an impression into a transmissive body, as in embodiments of the present invention, is more substantial than the frustrated total internal reflection of light transmitted into a rigid body when an object teaches the surface of the transmissive body but does not form an impression therein.

Reference is made to FIG. 172, which is a simplified illustration of an alternative touch surface with a flexible compressible layer on top of the surface, in accordance with an embodiment of the present invention. In the touch surface of FIG. 172, a flexible layer 650 is flush with an upper edge of light guide unit 463, and is suspended above the surface of a display 642, to form an air gap 843. FIG. 172 shows two light beams emitted from an emitter 200. A first light beam 100 travels through layer 650, and a second light beam 101 travels across air gap 843.

Reference is made to FIG. 173, which is a simplified illustration of an object pressing down on layer 650 of the touch surface of FIG. 172, and creating an impression thereon, in accordance with an embodiment of the present invention. A user pressing his finger 900 into layer 650 from above bends the layer and disturbs beam 100. In addition, the bent layer extends into air gap 843 and blocks beam 101.

In an alternative embodiment of the present invention, layer 650 is a thin elastic membrane, and only beams inside of air gap 843 are used for touch detection. In this alternative embodiment, light is not sent through the membrane, and the membrane may wrap the device.

In some embodiments of the present invention, a thin transparent elastic membrane is placed inside a frame that snaps on to and snaps off of a touch surface. In one embodiment, a handset for a police or fire department includes a light-based touch surface as described above, which is generally used without an elastic upper layer. However, when a policeman or fireman encounters a harsh environment, where water or debris may hit the surface and interfere with touch detections on the surface, the policeman or fireman snaps on the transparent elastic layer. The elastic layer protects the surface and prevents water and debris from reaching the light beams and causing false touch detections. Touches performed through the elastic layer are detected at a coarser resolution than touches performed without the elastic layer, because of the tapering of the elastic layer when it is pressed onto the surface by a pointer object. Moreover, often in harsh environments the policeman or fireman is wearing gloves, which also reduces the resolution of the touch since the surface area of a gloved finger is larger than that of a bare finger. For these reasons, in accordance with an embodiment of the present invention, a handset of this type provides a high-resolution user interface for use without the elastic membrane, and a low-resolution user interface for use with the elastic membrane. One difference between a high-resolution and a low-resolution user interface is the size and density of buttons presented on the display; namely, a low resolution user interface uses larger buttons that are spaced farther apart, and a high resolution user interface uses smaller buttons that are spaced closer together. A low resolution user interface provides an opportunity to reduce the scan rate, and to reduce the number of emitters and receivers used when scanning a surface, vis-à-vis a high resolution user interface, since lower touch precision is required. In some embodiments of the present invention, the snap-on frame includes an RFID chip, or such other identifier, whereby the handset detects when the elastic layer is snapped on or off and automatically toggles the low-resolution/high-resolution user interface accordingly.

Reference is made to FIG. 174, which is a simplified illustration of another alternative touch surface with a flexible compressible layer on top of the surface, in accordance with an embodiment of the present invention. FIG. 174 shows the edges of a light guide unit 463 extending above a flexible layer 650. A first light beam 100 travels above layer 650 and is interrupted when an object touches layer 650. A second light beam 101 travels through layer 650, and is interrupted or frustrated only when an object exerts downward pressure on layer 650, forming an impression thereon. As such, the touch surface of FIG. 174 provides at least two levels of touch detection; namely, detection of an initial touch, and detection of a touch with pressure.

It will thus be appreciated by those skilled in the art that embodiments of the present invention provide several advantages for handset and display manufacturers. A first advantage is having light-based touch surfaces without raised bezels around the screen, as shown in FIGS. 169-172. This advantage is also achieved using an elastic sheet suspended above the display, as described above. A second advantage is having light-based touch surfaces that operate in environments of water droplets, dust and dirt. The water, dust and dirt settle on top of layer 650, but do not generate a touch signal, since water, dust and dirt do not create impressions in layer 650. A third advantage is having light-based touch surfaces that provide tactile sensations to a user pressing a finger or stylus into the surface, by using an upper layer of semi-hard gel that cradles an object pressed upon it. The semi-hard layer transmits haptic feedback from the device to the user's finger or stylus. A semi-hard material transmits more compelling haptic sensations to the user than do the rigid plastic and glass surfaces used in prior art touch surface devices.

Touch surfaces in accordance with the present invention may be manufactured by performing a double injection mold of the light guide, referred to as "overmolding", with a soft material such as inter alia silicon, optically clear adhesive, or a bladder filled with a liquid. Overmolding mates the light guide and the soft material in a single process or tool, and reduces cost as compared with manufacturing a light guide and a flexible layer in two separate processes.

Light guides in accordance with the present invention may be made inter alia of polycarbonate or a cyclic olefin copolymer (COC) having a high glass transition temperature. COC has better optical properties than polycarbonate, better chemical resistance, better flow in the mold properties, and a lower shrinkage values, reducing the risk of sink marks. Thus COC provides flexibility in light guide design as well as high yield.

The present invention has broad application to electronic devices with touch sensitive screens, including small-size, mid-size and large-size screens. Such devices include inter alia computers, home entertainment systems, car entertainment systems, security systems, PDAs, cell phones, electronic games and toys, digital photo frames, digital musical instruments, e-book readers, TVs and GPS navigators.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A touch screen for a computing device, comprising:
    a housing;
    a layer of light-transmissive material mounted in said housing, comprising an upper and a lower surface, wherein said upper surface is exposed for touch by one or more objects from outside of said housing;
    a plurality of light emitters mounted in said housing underneath said upper surface, for emitting light beams;

a first lens assembly mounted in said housing for directing the light beams emitted by said light emitters into said layer at an angle such that the light beams, when entering said layer, remain confined to said layer by total internal reflection at said upper and lower surfaces of said layer when the light beams are not absorbed by any of the objects touching said upper surface;

a plurality of light detectors mounted in said housing underneath said upper surface, for detecting light beams and for generating outputs indicating the amounts of light detected;

a second lens assembly mounted in said housing for directing light beams at a surface of said layer towards one or more of said light detectors; and a calculating unit, mounted in said housing and connected to said light receivers, for determining respective one or more locations of the one or more objects touching said upper surface, based on outputs of said light detectors, wherein light beams in said layer are partially absorbed at said upper surface when they come into contact with any of the objects.

2. The touch screen of claim 1 wherein the light-transmissive material comprises glass or plastic that is transparent for infra-red light.

3. The touch screen of claim 1 wherein the light-transmissive material is a transmissive gel or liquid-filled sac that is transparent for infra-red light.

4. The touch screen of claim 1 further comprising an optically clear transfer tape to fasten said layer on said first and second lens assemblies.

5. The touch screen of claim 1 wherein said first lens assembly directs portions of the light beams emitted by said light emitters over said layer above said upper surface, and wherein said second lens assembly directs light beams from above said upper surface to one or more of said light detectors.

6. The touch screen of claim 1 wherein said first lens assembly directs the light beams emitted by said light emitters into said layer from one or more sides of said layer, and wherein said second lens assembly directs light beams emerging from or more sides of said layer to one or more of said light detectors.

7. The touch screen of claim 1 wherein said layer and said first and second lens assemblies comprise a single consolidated unit.

8. The touch screen of claim 1 wherein said light emitters are arranged along two adjacent edges of said layer, wherein said light detectors are arranged along two other adjacent edges of said layer, wherein said light emitters are shift-aligned with said light detectors, and wherein said calculating unit determines respective one or more locations of the one or more objects touching said upper surface, based on outputs of said light detectors being less than outputs expected when no objects touch said upper surface.

9. The touch screen of claim 1 wherein said light emitters and said light detectors are arranged in an alternating sequence along edges of said layer, and wherein said calculating unit determines respective one or more locations of the one or more objects touching said upper surface, based on outputs of said light detectors being less than outputs expected when no objects touch said upper surface.

10. A touch screen for a computing device, comprising:
a housing;
a layer of light-transmissive material mounted in said housing, comprising upper and lower surfaces, wherein said upper surface is exposed for touch by one or more objects from outside of said housing;

a plurality of light emitters mounted in said housing underneath said upper surface, for emitting light beams;

a first lens assembly mounted in said housing for directing the light beams emitted by said light emitters into said layer at an angle such that the light beams, when entering said layer, remain confined to said layer by total internal reflection at said upper and lower surfaces of said layer;

a plurality of light detectors mounted in said housing underneath said upper surface, for detecting light beams and for generating outputs indicating the amounts of light detected;

a second lens assembly mounted in said housing for directing light beams at a surface of said layer towards one or more of said light detectors; and a calculating unit, mounted in said housing and connected to said light receivers, for determining respective one or more locations of the one or more objects touching said upper surface, based on outputs of said light detectors, wherein light beams in said layer are scattered back into said layer at said upper surface when they come into contact with any of the objects, so that said second lens assembly directs them to more of said light detectors than had they not been scattered.

11. The touch screen of claim 10 wherein the light-transmissive material comprises glass or plastic that is transparent for infra-red light.

12. The touch screen of claim 10 wherein the light-transmissive material is a transmissive gel or liquid-filled sac that is transparent for infra-red light.

13. The touch screen of claim 10 further comprising an optically clear transfer tape to fasten said layer on said first and second lens assemblies.

14. The touch screen of claim 10 wherein said first lens assembly directs portions of the light beams emitted by said light emitters over said layer above said upper surface, and wherein said second lens assembly directs light beams from above said upper surface to one or more of said light detectors.

15. The touch screen of claim 10 wherein said first lens assembly directs the light beams emitted by said light emitters into said layer from one or more sides of said layer, and wherein said second lens assembly directs light beams emerging from or more sides of said layer to one or more of said light detectors.

16. The touch screen of claim 10 wherein said layer and said first and second lens assemblies comprise a single consolidated unit.

17. The touch screen of claim 10 wherein said light emitters are arranged along two adjacent edges of said layer, wherein said light detectors are arranged along two other adjacent edges of said layer, wherein said light emitters are shift-aligned with said light detectors, and wherein said calculating unit determines respective one or more locations of the one or more objects touching said upper surface, based on outputs of said light detectors being less than outputs expected when no objects touch said upper surface.

18. The touch screen of claim 10 wherein said light emitters and said light detectors are arranged in an alternating sequence along edges of said layer, and wherein said calculating unit determines respective one or more locations of the one or more objects touching said upper surface, based on outputs of said light detectors being less than outputs expected when no objects touch said upper surface.

19. The touch screen of claim 10 wherein said first and second lens assemblies comprise a repeating three-sided lens pattern for directing light beams from each of said light emitters in three directions.

20. The touch screen of claim 19 wherein the light directed from each of said emitters in three directions is received by three of said light detectors situated along three different edges of said layer.

* * * * *

UNITED STATES PATENT AND TRADEMARK OFFICE
CERTIFICATE OF CORRECTION

| | | Page 1 of 1 |
|---|---|---|
| PATENT NO. | : 8,553,014 B2 | |
| APPLICATION NO. | : 13/764812 | |
| DATED | : October 8, 2013 | |
| INVENTOR(S) | : Holmgren et al. | |

It is certified that error appears in the above-identified patent and that said Letters Patent is hereby corrected as shown below:

In the Claims

Column 81, line 16, please replace "receivers" with -- detectors --
Column 82, line 16, please replace "receivers" with -- detectors --

Signed and Sealed this
Twelfth Day of August, 2014

Michelle K. Lee
*Deputy Director of the United States Patent and Trademark Office*